(12) United States Patent
Kamio et al.

(10) Patent No.: US 7,312,595 B2
(45) Date of Patent: Dec. 25, 2007

(54) MOTOR CONTROL APPARATUS

(75) Inventors: Shigeru Kamio, Nagoya (JP); Kenichi Fujiki, Kariya (JP)

(73) Assignee: Denso Corporation, Kariya (JP)

( * ) Notice: Subject to any disclaimer, the term of this patent is extended or adjusted under 35 U.S.C. 154(b) by 221 days.

(21) Appl. No.: 10/448,409

(22) Filed: May 30, 2003

(65) Prior Publication Data
US 2004/0008002 A1 Jan. 15, 2004

(30) Foreign Application Priority Data

| Jul. 9, 2002 | (JP) | ............................. 2002-199469 |
| Jul. 16, 2002 | (JP) | ............................. 2002-207557 |
| Jul. 16, 2002 | (JP) | ............................. 2002-207558 |
| Jul. 16, 2002 | (JP) | ............................. 2002-207559 |

(51) Int. Cl.
*H02P 1/46* (2006.01)

(52) U.S. Cl. ...................... 318/701; 318/564; 318/724; 318/721; 318/568.24

(58) Field of Classification Search ................ 318/701, 318/696, 685, 254, 640
See application file for complete search history.

(56) References Cited

U.S. PATENT DOCUMENTS

| 4,789,874 | A | * | 12/1988 | Majette et al. ................. 347/37 |
| 5,637,972 | A | * | 6/1997 | Randall et al. .............. 318/616 |
| 5,694,014 | A | * | 12/1997 | Hegg et al. .................. 318/564 |
| 5,747,950 | A | * | 5/1998 | Friedrichsen et al. ........... 318/5 |
| 5,757,596 | A | * | 5/1998 | Weber et al. .................. 361/23 |
| 5,821,970 | A | * | 10/1998 | Sasaki et al. ................ 347/116 |
| 5,929,589 | A | | 7/1999 | Suzuki et al. |
| 6,230,576 | B1 | | 5/2001 | Yamada et al. |
| 6,351,048 | B1 | * | 2/2002 | Schob et al. ................ 310/90.5 |
| 6,392,418 | B1 | * | 5/2002 | Mir et al. .................... 324/503 |
| 6,555,985 | B1 | * | 4/2003 | Kawabata et al. .......... 318/685 |
| 6,900,607 | B2 | * | 5/2005 | Kleinau et al. .............. 318/432 |

FOREIGN PATENT DOCUMENTS

| JP | 61-151569 | 7/1986 |
| JP | 01-239415 | 9/1989 |
| JP | 05-103497 | 4/1993 |
| JP | 05-163988 | 6/1993 |
| JP | 06-101551 | 4/1994 |
| JP | 09-070199 | 3/1997 |
| JP | 10-257668 | 9/1998 |
| JP | 11-247807 | 9/1999 |
| JP | 2000-69779 | 3/2000 |
| JP | 2000-184791 | 6/2000 |
| JP | 2001-271917 | 10/2001 |
| JP | 2002-199780 | 7/2002 |

* cited by examiner

*Primary Examiner*—Lincoln Donovan
*Assistant Examiner*—Renata McCloud
(74) *Attorney, Agent, or Firm*—Nixon & Vanderhye Plc.

(57) ABSTRACT

Presence/absence of a failure in a feedback control system of a motor is monitored. When a failure is detected in the feedback control system, the motor is driven by switching to an open-loop control. During the open-loop control, the motor is rotated by sequentially switching the motor current supply phase without feeding back encoder count information. The position count is incremented or decremented every time the current supply phase is switched. When the position count has reached a target count, it is determined that the rotor has reached a target position, whereupon the open-loop control is finished.

21 Claims, 73 Drawing Sheets

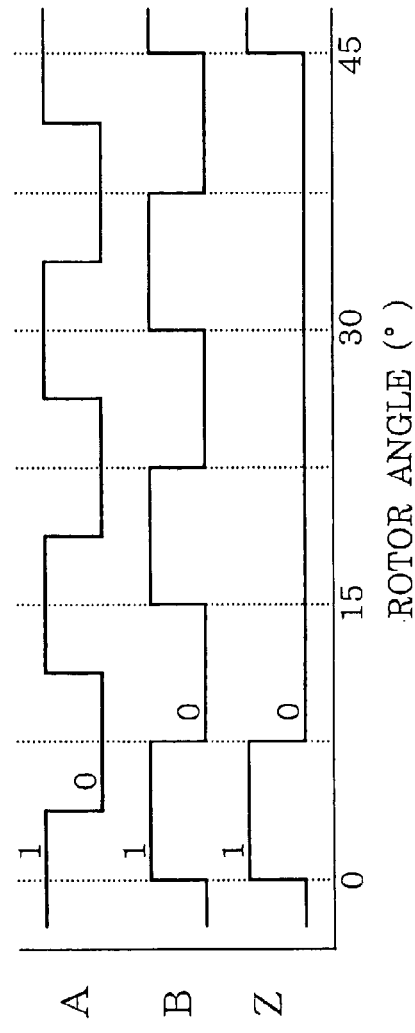
FIG. 7A (NON-P-POSITION→P-POSITION)
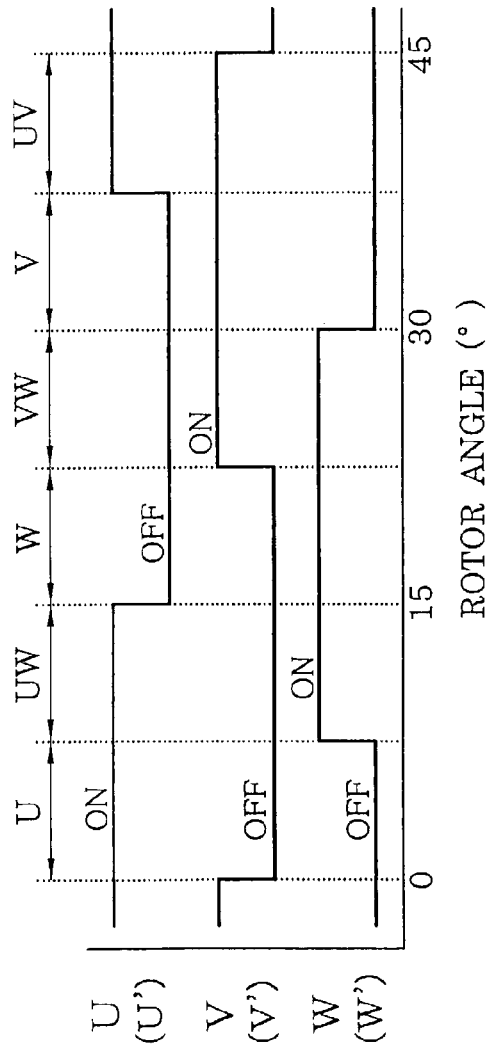
FIG. 7B (NON-P-POSITION→P-POSITION)

```
    ENCODER
    COUNTER
       │
       ▼
┌─────────────────┐
│ READ A(i), B(i) │─── 301
└─────────────────┘
       │
       ▼
┌──────────────────────────────┐
│ ΔN=f(A(i), B(i), A(i-1), B(i-1)) │─── 302
└──────────────────────────────┘
       │
       ▼
┌─────────────────┐
│  Ncnt=Ncnt+ΔN   │─── 303
└─────────────────┘
       │
       ▼
┌─────────────────┐
│   A(i)=A(i-1)   │
│   B(i)=B(i-1)   │─── 304
└─────────────────┘
       │
       ▼
      END
```

| B (i) | A (i) | B (i-1) | A (i-1) | ΔN |
|---|---|---|---|---|
| 0 | 1 | 0 | 0 | -1 |
| 1 | 0 | 0 | 0 | +1 |
| 0 | 0 | 0 | 0 | 0 |
| 1 | 1 | 0 | 0 | 0 |
| 1 | 1 | 0 | 1 | -1 |
| 0 | 0 | 0 | 1 | +1 |
| 0 | 1 | 0 | 1 | 0 |
| 1 | 0 | 0 | 1 | 0 |
| 0 | 0 | 1 | 0 | -1 |
| 1 | 1 | 1 | 0 | +1 |
| 1 | 0 | 1 | 0 | 0 |
| 0 | 1 | 1 | 0 | 0 |
| 1 | 0 | 1 | 1 | -1 |
| 0 | 1 | 1 | 1 | +1 |
| 1 | 1 | 1 | 1 | 0 |
| 0 | 0 | 1 | 1 | 0 |

| Mptn%12 | 0 | 1 | 2 | 3 | 4 | 5 | 6 | 7 | 8 | 9 | 10 | 11 |
|---|---|---|---|---|---|---|---|---|---|---|---|---|
| CURRENT SUPPLY | VW | VW | W | W | UW | UW | U | U | UV | UV | V | V |

| BATTERY (V) | 7.5 | 10 | 12 | 16 |
|---|---|---|---|---|
| DUTY (%) | 30 | 20 | 20 | 10 |

| BATTERY (V) | 7.5 | 12 | 14 | 16 |
|---|---|---|---|---|
| $\Delta$ Nover | 30 | 40 | 50 | 60 |

$\Delta Gnp = \Delta Gp = (\Delta Nact - \Delta Nd) / 2$

| Mptnop%6 | 0 | 1 | 2 | 3 | 4 | 5 |
|---|---|---|---|---|---|---|
| CURRENT SUPPLY PHASE | W | WU | U | UV | V | VW |

| BATTERY VOLTAGE | 6 | 7 | 8 | 10 | 12 |
|---|---|---|---|---|---|
| mspdmax | 6 | 6 | 6 | 7 | 7 |

| mspd | 0 | 1 | 2 | 3 | 4 |
|---|---|---|---|---|---|
| tm (ms) | 50 | 50 | 50 | 50 | 5 |
| mspd | 5 | 6 | 7 | 8 | 9 |
| tm (ms) | 5 | 4 | 3 | 3 | 3 |

| | BATTERY VOLTAGE (V) | 6 | 7 | 8 | 10 | 12 |
|---|---|---|---|---|---|---|
| NO COIL DISCONNECTION | mspdmax | 6 | 6 | 6 | 7 | 7 |
| COIL DISCONNECTION | mspdmax | 3 | 3 | 3 | 3 | 4 |

MOTOR CONTROL APPARATUS

CROSS REFERENCE TO RELATED APPLICATION

This application is based on and incorporates herein by reference Japanese Patent Applications No. 2002-199469 filed on Jul. 9, 2002, No. 2002-207557 filed on Jul. 16, 2002, No. 2002-207558 filed on Jul. 16, 2002, and No. 2002-207559 filed on Jul. 16, 2002.

FIELD OF THE INVENTION

The present invention relates to a motor control apparatus for rotationally driving (rotating) the rotor of a motor to a target position by detecting the rotation position of the rotor on the basis of the count of a pulse signal of an encoder and sequentially switching the current supply phase of the motor.

BACKGROUND OF THE INVENTION

Brushless motors such as switched reluctance motors are increasingly demanded recently because they are inexpensive and simple in structure. Those motors incorporate an encoder for outputting a pulse signal in synchronism with the rotation of the rotor, which is rotated by sequentially switching the current supply phase by counting pulses of a pulse signal of the encoder and detecting the rotation position of the rotor on the basis of the count. Enabling detection of the rotation position of the rotor on the basis of the encoder count after starting, motors of this type having an encoder are used as drive sources of various position switching devices in which a position switching control (positioning control) for rotating the rotor to a target position by means of a feedback control system (i.e., a closed-loop control system) is performed.

During a feedback control for rotating the rotor to a target position on the basis of the encoder count, if, for example, a pulse signal of the encoder is lost temporarily for a certain reason or a noise pulse occurring on a signal line of the encoder is erroneously recognized as a regular pulse, the synchronization between the current supply phase (encoder count) and the rotation phase of the rotor is lost and the rotor can no longer be driven normally. As a result, the rotor may stop or rotate in reverse to cause a state that the feedback control cannot be continued normally. In such a case, the motor becomes uncontrollable.

Further, if a disconnection occurs in the drive coil of a motor or their drive circuit fails, the motor cannot be driven normally. In view of this, JP-A-2001-271917 proposes a fail-safe circuit in which the stator core of a motor is equipped with two independent systems of drive coils and two systems of drive circuits for driving the respective systems of drive coils separately are provided. When a failure occurs in the drive coil or drive circuit of one system, the rotation position of the rotor is feedback-controlled by using the drive coil of the other system and the drive circuit of the other system that are free from failure.

However, when a failure occurs in the drive coil or drive circuit of one system and the rotation position of the rotor is feedback-controlled by using only the drive coil of the other system, the driving torque becomes a half of that in a normal state. Because of insufficient driving torque, the rotation position of the rotor may not be feedback-controlled. However, to secure sufficient driving torque that enables a normal feedback control only with the drive coil of a single system, a large drive coil is needed and hence the motor becomes unduly large.

SUMMARY OF THE INVENTION

An object of the present invention is to eliminate the above drawbacks.

According to a first aspect of the invention, presence/absence of an abnormality in the feedback control state during a feedback (closed-loop) control is monitored. When an abnormality is detected in the feedback control state, switching is made from the feedback control to an open-loop control and the rotor is rotated by sequentially switching the current supply phase of the motor without feeding back encoder count information.

If the encoder count becomes abnormal during a feedback control due to a loss of a pulse of the encoder or noise, for example, the current supply phase (i.e. encoder count) and the rotation phase of the rotor are no longer synchronized with each other to cause an abnormal feedback control state (rotor rotation state). In the invention, switching is made from the feedback control to the open-loop control upon detection of an abnormality. As a result, even if an abnormality or the like occurs in the encoder count during the feedback control to cause an abnormal feedback control state (rotor rotation state) temporarily, the rotor can be rotated to the target position by the open-loop control. The reliability of the motor control can thus be increased.

According to a second aspect of the invention, presence/absence of a failure in a feedback control system for rotating the rotor to a target position on the basis of the encoder count is monitored. When a failure is detected in the feedback control system, switching is made from the feedback control to an open-loop control and the current supply phase of the motor is switched sequentially without feeding back encoder count information. Further, the number of times of switching of the current supply phase is counted and the rotor is rotated to the target position on the basis of a resulting count.

Even when the feedback control system has failed to cause a state that the motor cannot be driven normally by a feedback control, the motor may still be driven normally by an open-loop control. For example, if the encoder fails that is an indispensable component of the feedback control system, the motor cannot be driven normally any more by a feedback control. However, even in this case, there remains a possibility that the motor can be driven normally by the open-loop control. Therefore, if switching is made from the feedback control to the open-loop control when a failure is detected in the feedback control system, the rotor may be rotated to the target position. The reliability of the motor control can thus be increased.

According to a third aspect of the invention, if a feedback control execution condition is satisfied, a feedback control is performed that rotates the rotor to a target position by detecting the rotation position of the rotor on the basis of the encoder count and sequentially switching the current supply phase of the motor. If the feedback control execution condition is not satisfied due to a failure or the like, switching is made from the feedback control to an open-loop control and the current supply phase is switched sequentially by supplying a drive signal to a drive circuit of the motor without feeding back encoder count information. Pulses of the drive signal are counted and the rotor is rotated to the target position on the basis of a resulting count. Presence/absence of an abnormality in the encoder is determined by comparing the encoder count and the count of the drive signal that are obtained during the open-loop control.

If the encoder count becomes abnormal during a feedback control due to a loss of a pulse of the encoder or noise, for example, or if a disconnection occurs in the signal lines of the encoder, the current supply phase (i.e. encoder count) and the rotation phase of the rotor are no longer synchronized with each other to cause an abnormal feedback control state (rotor rotation state). In such a case, the feedback control execution condition is not satisfied any more and switching is made from the feedback control to an open-loop control. As a result, even if an abnormality occurs in the encoder count due to a loss of a pulse of the encoder or noise or a disconnection occurs in the signal lines of the encoder, the rotor can be rotated to a target position by the open-loop control. An encoder count obtained during the open-loop control and the count of the drive signal that are obtained during the open-loop control are compared with each other. Whether the encoder is normal can be determined accurately on the basis of whether the encoder count (i.e., the rotation amount detected by using the encoder) corresponds to the count of the drive signal (i.e., the rotation amount of driving by the open-loop control).

According to a fourth aspect of the invention, the motor has at least two independent systems of drive coils and at least two systems of drive circuits for separately driving the at least two systems of drive coils of the motor are provided. The drive coil and the drive circuit of each system are provided so as to be able to rotate the rotor by themselves. Abnormality diagnosis means determines presence/absence of an abnormality in the drive coil and the drive circuit of each system. When an abnormality is detected in one of the at least two systems of drive coils and drive circuits, switching is made to an open-loop control in which the current supply phase is sequentially switched by supplying a drive signal to the drive circuit of the remaining system that operates normally. Pulses of the drive signal are counted and the rotor is rotated to a target position on the basis of a resulting count.

As described above, when an abnormality is detected in one of the at least two systems of drive coils and drive circuits, an open-loop control is performed by using the drive coil and the drive circuit of the remaining system that operate normally, whereby the rotor can be driven at a low speed. Therefore, even if an abnormality has occurred in the drive coil and the drive circuit of one system and the driving torque has decreased, the rotor can be rotated to a target position at a low speed by an open-loop control. As a result, the reliability of the motor control is increased and the drive coil of each system need not be increased in size, which makes it possible to avoid size increase of the motor.

BRIEF DESCRIPTION OF THE DRAWINGS

The above and other objects, features and advantages of the present invention will become more apparent from the following detailed description made with reference to the accompanying drawings. In the drawings:

FIG. 7A is a time chart showing output waveforms of the encoder;

FIG. 7B is a time chart showing a current supply phase switching pattern;

DETAILED DESCRIPTION OF THE PREFERRED EMBODIMENT

First Embodiment

A first embodiment in which the present invention is applied to a position switching device of a vehicle will be hereinafter described with reference to FIGS. 1-48.

Figure 1:
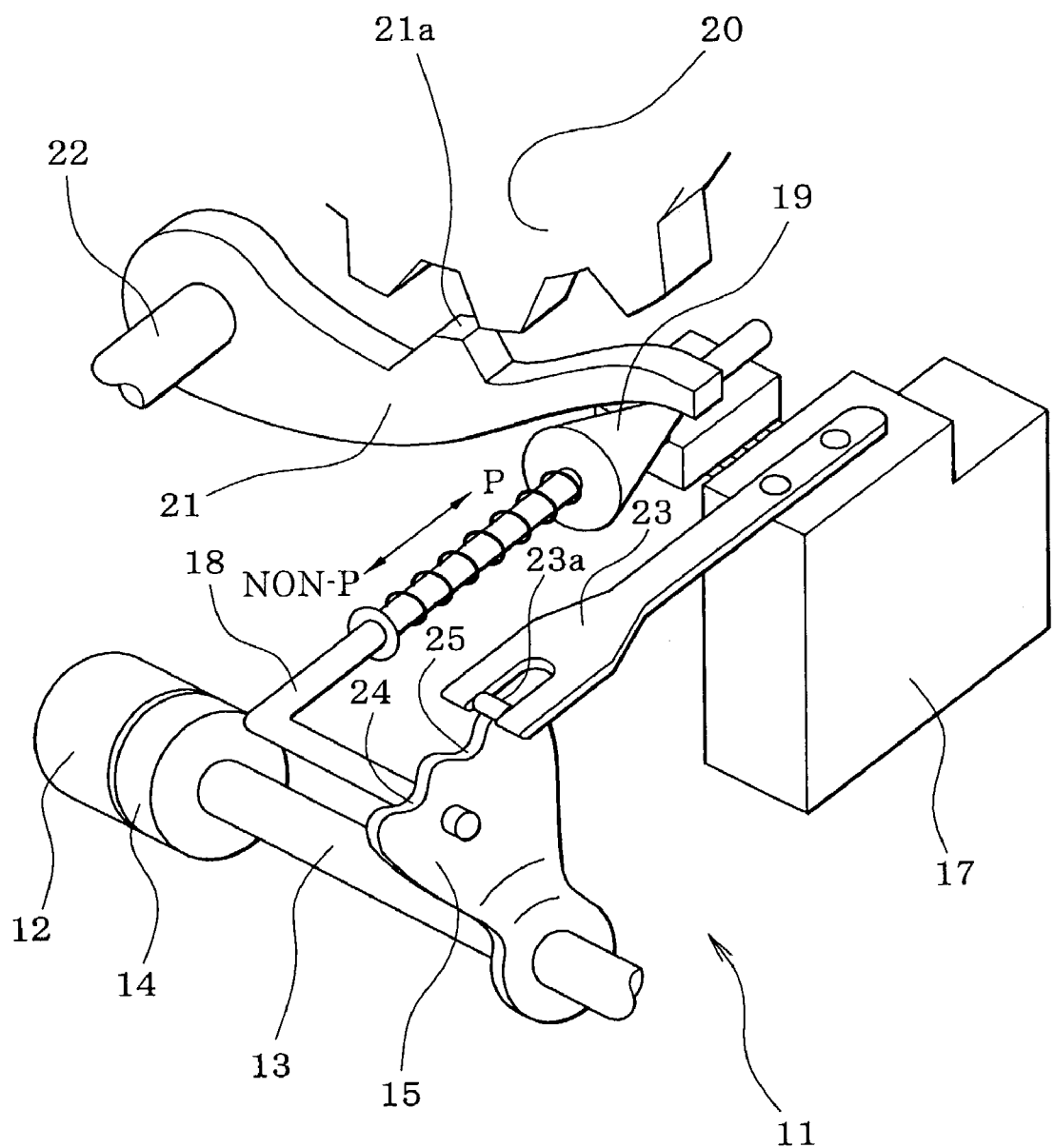
FIG. 1 is a perspective view of a position switching device according to a first embodiment of the present invention.

First, the configuration of a position switching mechanism 11 will be described with reference to FIG. 1. A motor 12 as a drive source of the position switching mechanism 11 is a switched reluctance motor, for example, incorporates a speed-reducing mechanism 26 (see FIG. 4), and is equipped with an output shaft sensor 14 for detecting a rotation position of the output shaft 13 of the speed-reducing mechanism 26. A detent lever 15 is fixed to the output shaft 13.

An L-shaped parking rod 18 is fixed to the detent lever 15. A conical body 19 that is provided at the tip of the parking rod 18 is in contact with a lock lever 21. The lock lever 21 is moved in the vertical direction in accordance with the position of the conical body 19 and thereby locks or unlocks a parking gear 20. The parking gear 20 is attached to the output shaft of an automatic transmission 27. If the parking gear 20 is locked by the lock lever 21, the drive wheels of the vehicle are kept in a rotation-prevented state (i.e., a parking state).

On the other hand, a detent spring 23 for keeping the detent lever 15 at the position of a parking position (hereinafter abbreviated as "P-position") or the other range (hereinafter referred to as "non-P-position") is fixed to a support base 17. The detent lever 15 is kept at the P-position when an engaging portion 23a that is provided at the tip of the detent spring 23 goes into a P-position holding recess 24 of the detent lever 15. The detent lever 15 is kept at the non-P-position when the engaging portion 23a of the detent spring 23 goes into a non-P-position holding recess 25 of the detent lever 15.

In the P-position, the parking rod 18 is moved in such a direction as to approach the lock lever 21, whereby a thick portion of the conical body 19 lifts up the lock lever 21 and a projection 21a of the lock lever 21 goes into a tooth space of the parking gear 20 to lock it. As a result, the output shaft of the automatic transmission 27 (and the drive wheels) is kept in a locked state (i.e., a parking state).

On the other hand, in the non-P-position, the parking rod 18 is moved in such a direction as to go away from the lock lever 21, whereby the thick portion of the conical body 19 goes out of contact with the lock lever 21 and hence the lock lever 21 goes down. As a result, the projection 21a of the lock lever 21 disengages from the parking gear 20 and hence the parking gear 20 is unlocked. The output shaft of the automatic transmission 27 is kept in a rotatable state (i.e., a state that the vehicle is capable of running).

The above output shaft sensor 14 is a rotary sensor (e.g., a potentiometer) for outputting a voltage corresponding to a rotation angle of the output shaft 13 of the speed-reducing mechanism 26 of the motor 12. Whether the current range is the P-position or the non-P-position can be recognized on the basis of the output voltage of the output shaft sensor 14.

Figure 2:
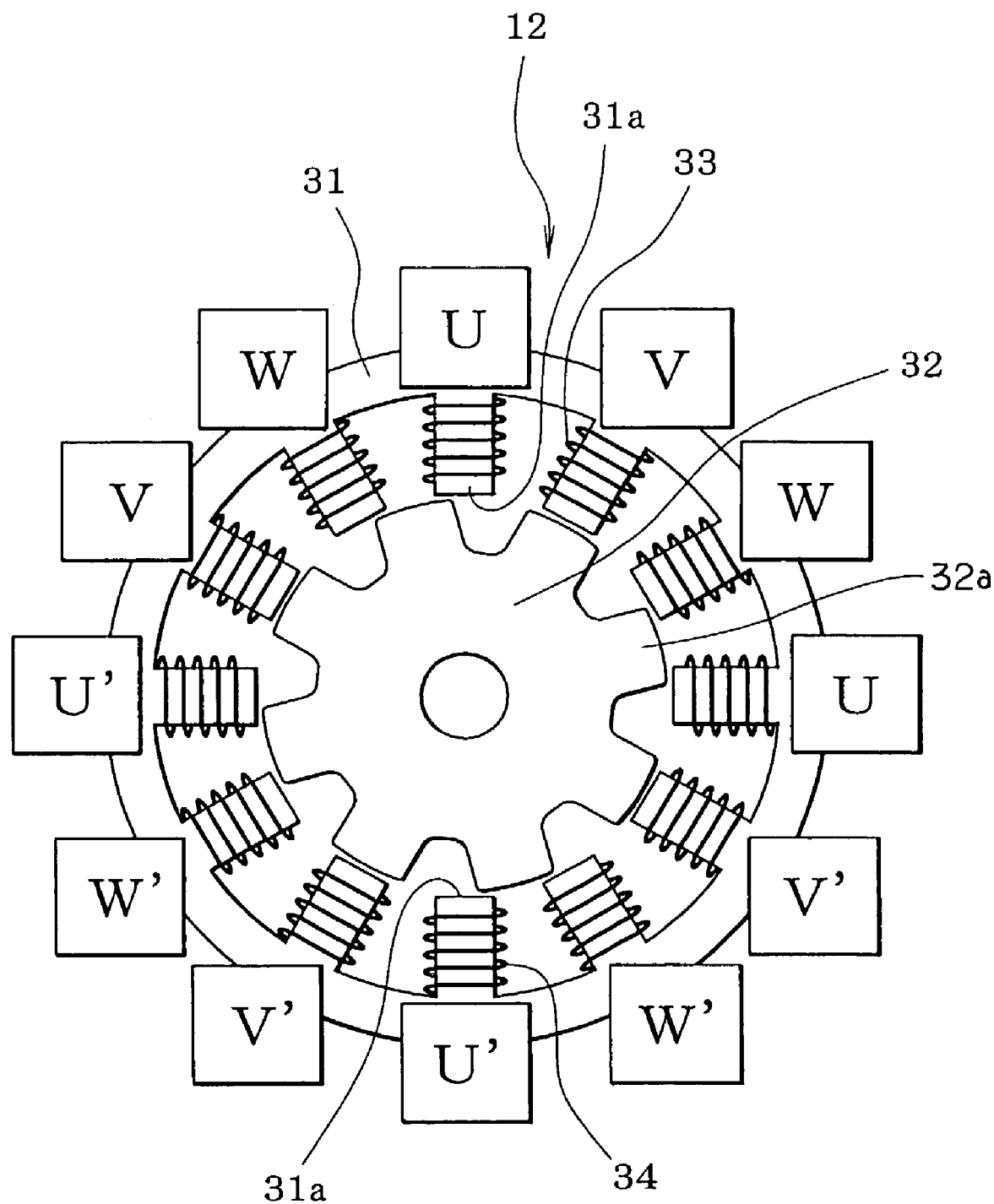
FIG. 2 shows an SR motor.

Next, the structure of the motor 12 will be described with reference to FIG. 2. In this embodiment, the motor 12 is a switched reluctance motor (hereinafter abbreviated as "SR motor"). The SR motor 12, in which both of a stator 31 and a rotor 32 have salient poles, has an advantage that no permanent magnet is necessary and hence the structure is simple. The inner circumferential surface of a cylindrical body of the stator 31 is formed with 12 salient poles 31a, for example, at regular intervals.

On the other hand, the rotor 32 has eight salient poles 32a, for example, that project outward and are arranged at regular intervals in the circumferential direction. As the rotor 32 rotates, each salient pole 32a of the rotor 32 faces the salient poles 31a of the stator 31 in order with a small gap interposed in between. The 12 salient poles 31a of the stator 31 are wound with a total of six windings 33 of U, V, and W-phases and a total of six windings 34 of U', V', and W'-phases in order. It goes without saying that the number of salient poles 31a of the stator 31 and the number of salient poles 32a of the rotor 32 may be changed as appropriate.

Figure 3:
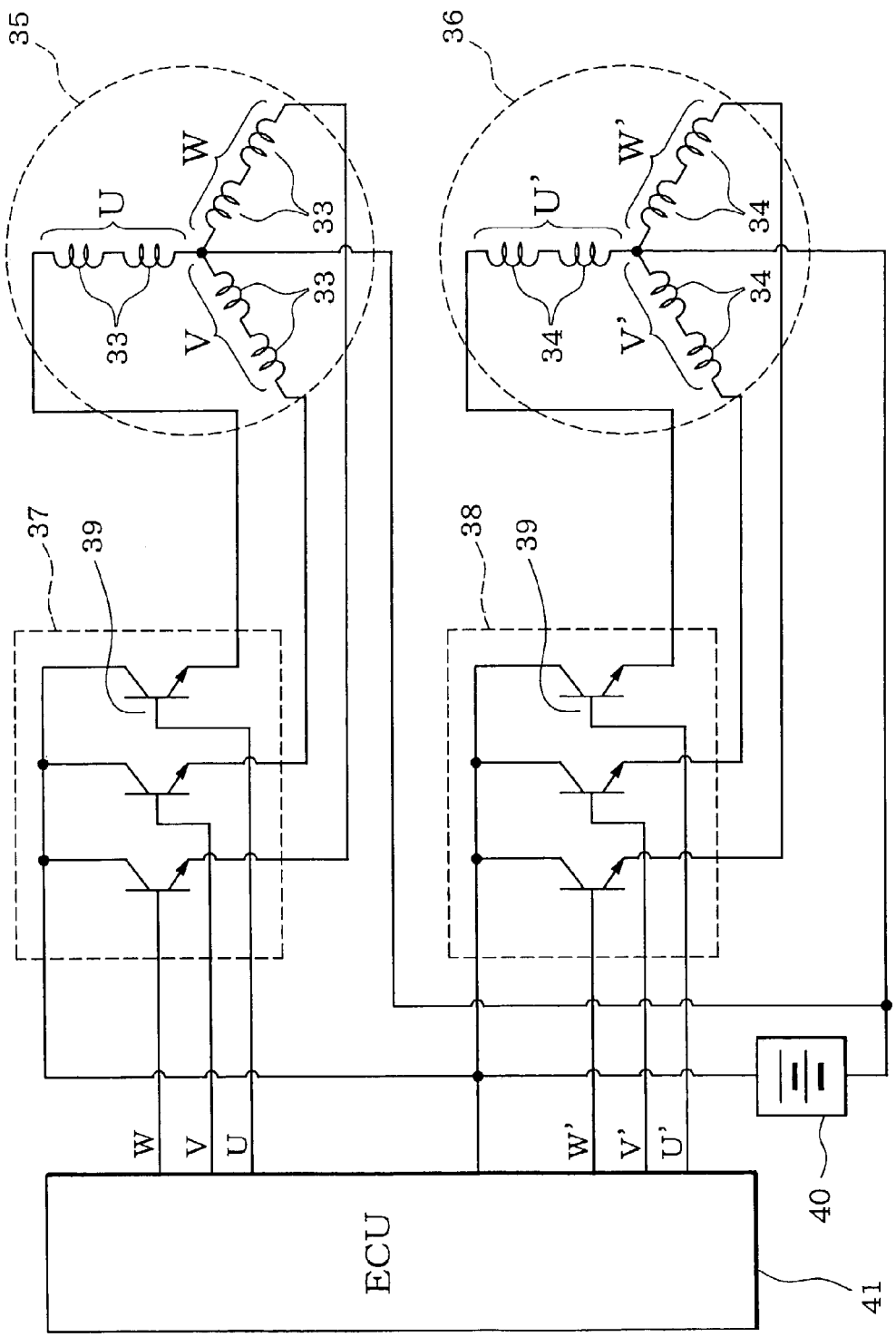
FIG. 3 is a circuit diagram showing a circuit for driving the SR motor.

In this embodiment, the windings 33 and 34 are wound on the 12 salient poles 31a of the stator 31 in order of V-phase→W-phase→U-phase→V-phase→W-phase→U-phase→V'-phase→W'-phase→U'-phase→V'-phase→W'-phase→U'-phase, for example. As shown in FIG. 3, the six windings 33 of the U, V, and W-phases and the six windings 34 of the U', V', and W'-phases are connected to each other so as to form two systems of motor energizing sections 35 and 36. The one motor energizing section 35 is formed by Y-connecting the six windings 33 of the U, V, and W-phases (the two windings 33 of the same phase are connected to each other in series). The other one motor energizing section 36 is formed by Y-connecting the six windings 34 of the U', V', and W'-phases (the two windings 34 of the same phase are connected to each other in series). In the two motor energizing sections 35 and 36, the windings of the U-phase and the U'-phase are energized at the same time, the windings of the V-phase and the V'-phase are energized at the same time, and the windings of the W-phase and the W'-phase are energized at the same time.

The two motor energizing sections 35 and 36 are driven by separate motor drivers 37 and 38, respectively, with a battery 40 of the vehicle used as a power source. Providing the two systems of motor energizing sections 35 and 36 and the two systems of motor drivers 37 and 38 in this manner makes it possible to rotate the SR motor 12 through the other system even if one system fails. Although the circuit configuration of each of the motor drivers 37 and 38 is of a unipolar driving type in which a switching element 39 such as a transistor is provided for each phase, a bipolar driving type circuit configuration may be employed in which two switching elements are provided for each phase. It goes without saying that the invention is also applicable to a configuration in which only a single-system motor energizing section and only a single-system motor driver are provided.

Figure 4:
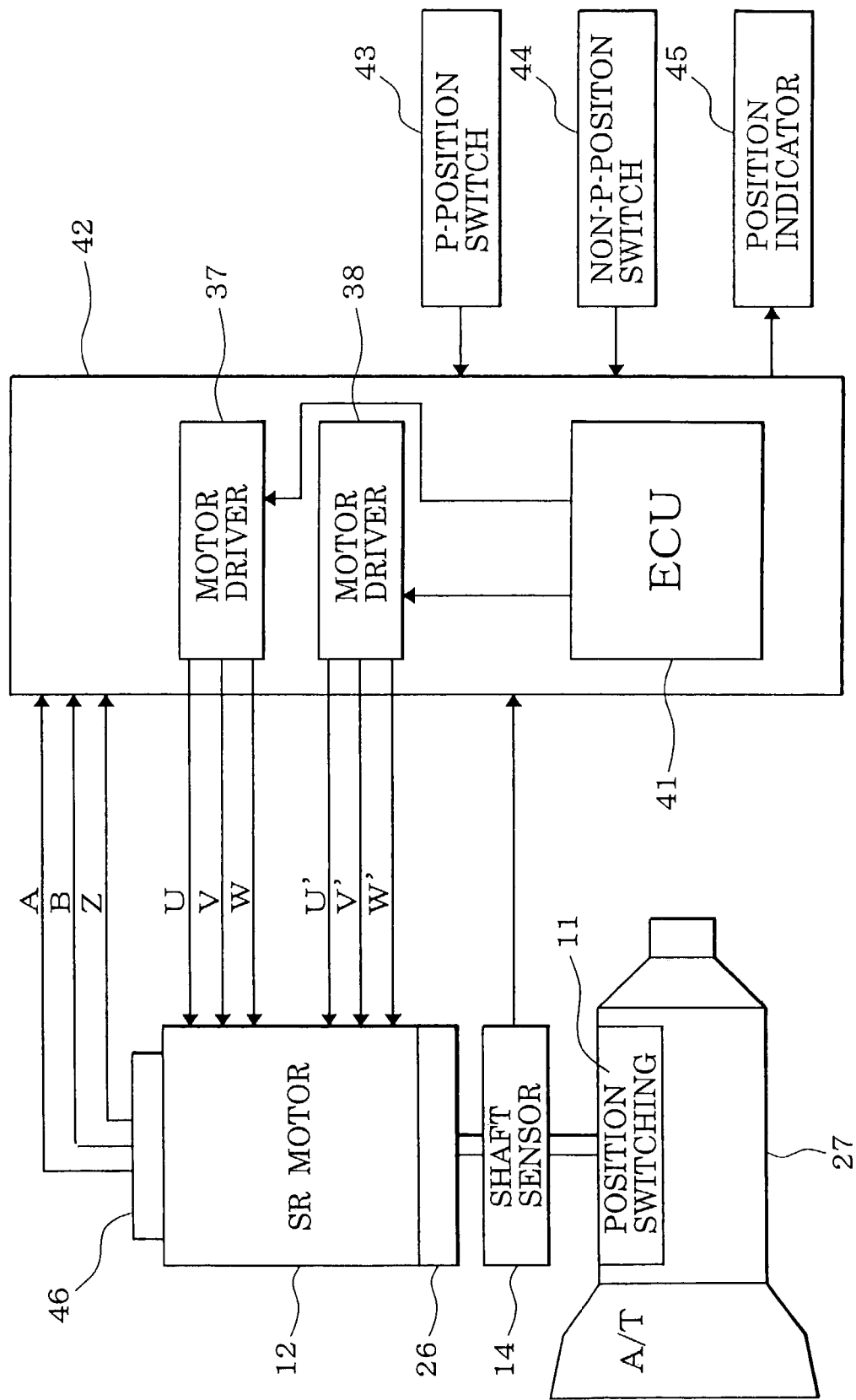
FIG. 4 schematically shows the entire control system of the position switching device.

The on/off control on the switching elements 39 of the motor drivers 37 and 38 is performed by an ECU 41 (control means). As shown in FIG. 4, the ECU 41 and the motor drivers 37 and 38 are incorporated in a position switching controller 42. Manipulation signals from a P-position switch 43 for a manipulation of switching to the P-position and a non-P-position switch 44 for a manipulation of switching to the non-P-position are input to the position switching controller 42. A range that has been selected by manipulating the P-position switch 43 or the non-P-position switch 44 is indicated in a range indication section 45 that is provided in an instrument panel (not shown). The P-position switch 43 or the non-P-position switch 44 are momentary switches, for example.

Figure 5:
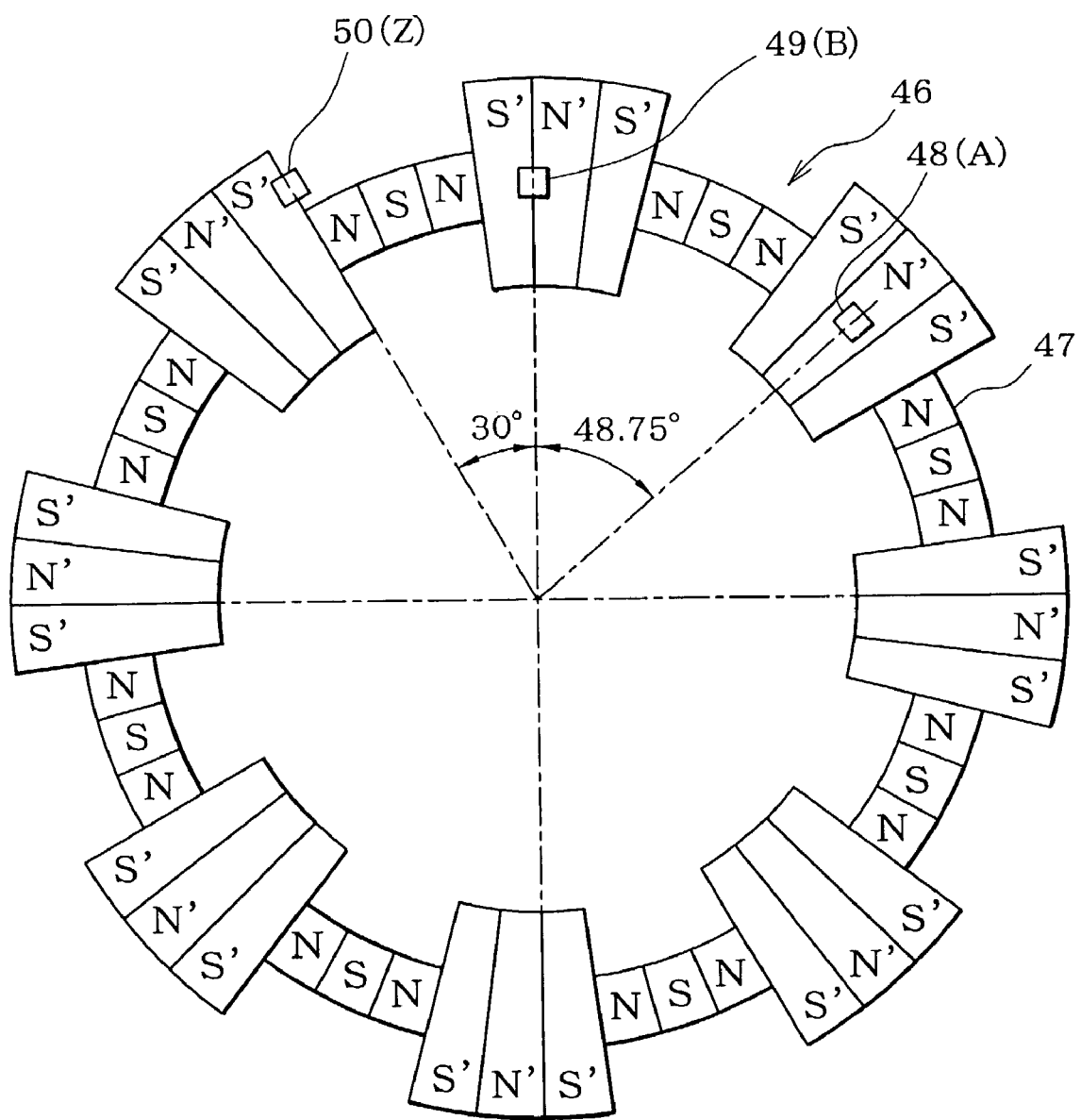
FIG. 5 is a plan view showing a rotary magnet of an encoder.
Figure 6:
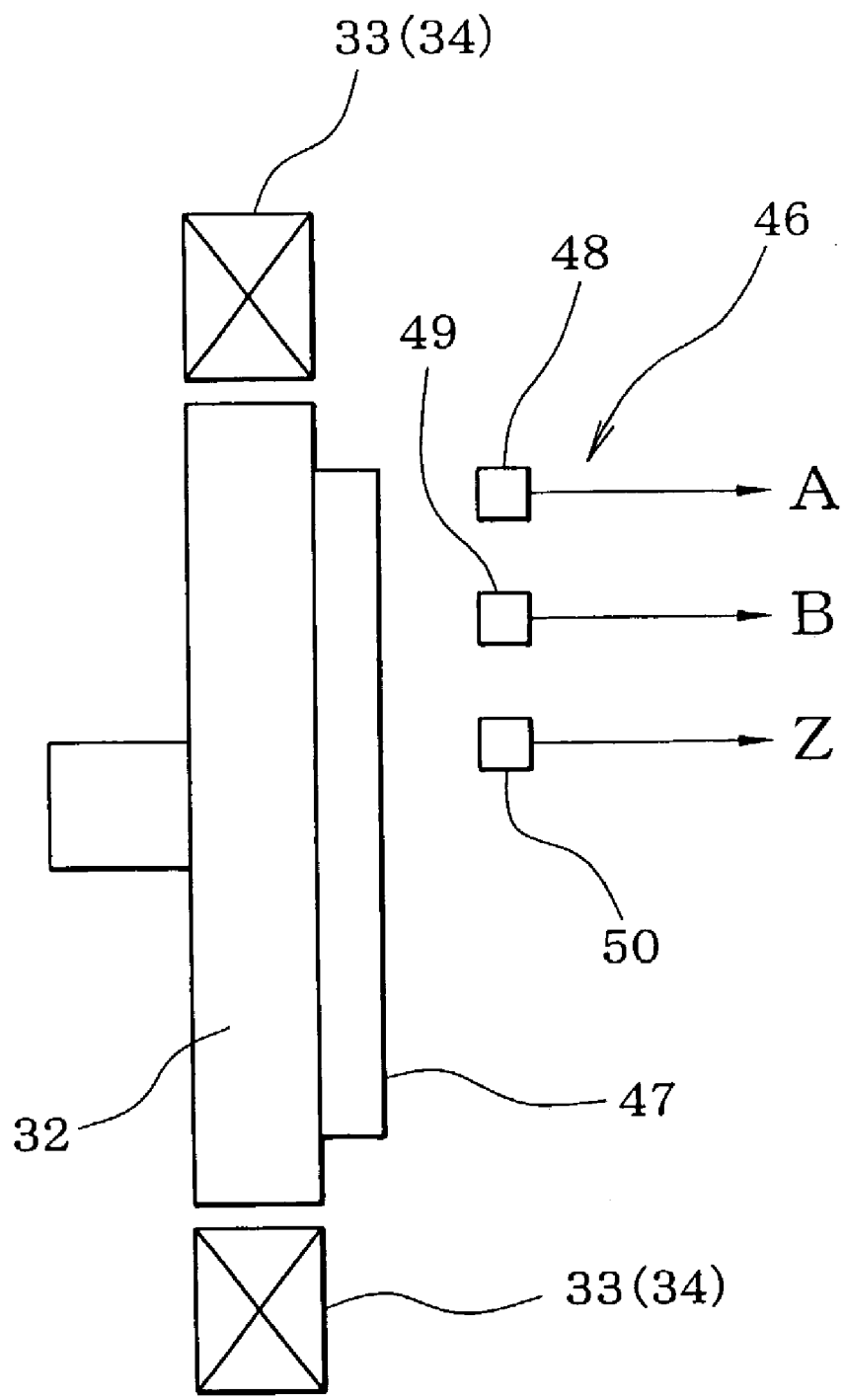
FIG. 6 is a side view of the encoder.

The SR motor 12 is equipped with an encoder 46 for detecting a rotation position of the rotor 32. A specific structure of the encoder 46, which is a magnetic rotary encoder, for example, is as follows. As shown in FIGS. 5 and 6, an annular rotary magnet 47 that is magnetized in such a manner that N poles and S poles are arranged alternately in the circumferential direction with a constant pitch is fixed to a side surface of the rotor 32 concentrically. Three magnetism detecting elements 48-50 such as Hall ICs are opposed to the rotary magnet 47. In this embodiment, the magnetization pitch of the N poles and the S poles of the rotary magnet 47 is set at 7.5°, which is equal to a rotation angle of the rotor 32 corresponding to single current supply on the SR motor 12. As described later, when the current supply phase of the SR motor 12 is switched six times by a one/two-phase current supply method, current supply is effected for all the phases around and the rotor 32 and the rotary magnet 47 rotate together by 7.50×6=45°. The number of N poles and S poles existing in this rotation angle range 45° of the rotary magnet 47 is six in total.

N poles (N' poles) corresponding to reference rotation positions of the rotor 32 and S poles (S' poles) on both sides of each of those N poles are wider than the other magnetic poles in the radial direction. In this embodiment, in view of the fact that the rotor 32 and the rotary magnet 47 rotate together by 45° while current supply is effected for all the phases of the SR motor 12 around, the wide magnetized portions (N') corresponding to the reference rotation positions of the rotor 32 are formed with a pitch of 45°. Therefore, a total of eight wide magnetized portions (N') corresponding to the reference rotation positions are formed in the entire rotary magnet 47. Alternatively, one a single wide magnetized portion (N') corresponding to a reference rotation position may be formed in the entire rotary magnet 47.

The three magnetism detecting elements 48-50 are disposed so as to have the following positional relationships with each other and with the rotary magnet 47. The magnetism detecting element 48 for outputting an A-phase signal and the magnetism detecting element 49 for outputting a B-phase signal are disposed on the same circle at such positions as to be able to face both of the narrow magnetized portions (N and S) and the wide magnetized portions (N' and S') of the rotary magnet 47. On the other hand, the magnetism detecting element 50 for outputting a Z-phase signal is disposed outside or inside the narrow magnetized portions (N and S) of the rotary magnet 47 at such positions as to be able to face only the wide magnetized portions (N' and S'). The interval between the two magnetism detecting elements 48 and 49 for outputting an A-phase signal and a B-phase signal, respectively, is set so that the phase difference between the A-phase signal and the B-phase signal becomes 90° in terms of an electrical angle (3.75° in terms of a mechanical angle) as shown in FIG. 7A.

The term "electrical angle" means an angle that is obtained when the cycle of occurrence of each of the A-phase signal and the B-phase signal is regarded as 360°. The term "mechanical angle" is an angle that is obtained when the angle of one rotation of the rotor 32 is regarded as 360°; that is, the mechanical angle of the phase difference between the A-phase signal and the B-phase signal is an angle by which the rotor 32 rotates in a time from a trailing edge (or rising edge) of the A-phase signal to that of the B-phase signal. The magnetism detecting element 50 for outputting the Z-phase signal is disposed so that the phase difference between the Z-phase signal and the B-phase signal (or A-phase signal) becomes 0.

The outputs of the respective magnetism detecting elements 48-50 are at a high level "1" when they face an N pole (or N' pole) and are at a low level "0" when they face an S pole (or S' pole). The output (Z-phase signal) of the magnetism detecting element 50 is at a high level "1" when it faces a wide N' pole corresponding to a reference rotation position of the rotor 32 and is at a low level when it is located at the other positions.

In this embodiment, the rotor 32 is rotated as the ECU 41 counts both of rising edges and trailing edges of the A-phase signal and the B-phase signal according to an encoder counter routine (described later) and switches the current supply phase of the SR motor 12 on the basis of the encoder count. In this operation, the ECU 41 determines the rotation direction of the rotor 32 on the basis of the order of occurrence of an A-phase signal pulse and a B-phase signal pulse. The ECU 41 increases the encoder count in the case of normal rotation (i.e., rotation in a direction from the P-position to the non-P position), and decreases the encoder count in the case of reverse rotation (i.e., rotation in a direction from the non-P-position to the P-position). With this measure, the correspondence between the encoder count and the rotation position of the rotor 32 is maintained irrespective of whether the rotor 32 is rotating in the normal direction or the reverse direction. Therefore, the rotor 32 can be rotated in either the normal direction or the reverse direction by detecting the rotation position (i.e., rotation angle) of the rotor 32 on the basis of the encoder count and energizes windings 33 or 34 of A-phase corresponding to the detected rotation position.

FIGS. 7A and 7B show output waveforms of the encoder 46 and a current supply phase switching pattern in a case that the rotor 32 is rotated in the reverse direction (i.e., the rotation direction from the non-P-position to the P-position), respectively. In either of the case that the rotor 32 is rotating in the reverse direction (i.e., the rotation direction from the non-P-position to the P-position) and the case that the rotor 32 is rotating in the normal direction (i.e., the rotation direction from the P-position to the non-P-position), switching is made between one-phase current supply and two-phase current supply every time the rotor 32 rotates by 7.5°. As the rotor 32 rotates by 45°, current supply is effected for all the phases around in order of U-phase→U and W-phases→W-phase→V and W-phases→V-phase→U and→V-phases, for example. Every time the current supply phase is switched, the rotor 32 rotates by 7.5° and the magnetic poles of the rotary magnet 47 that face the A-phase signal magnetism detecting element 48 and the B-phase signal magnetism detecting element 49 change from an N pole to an S pole (or an N' pole to an S' pole) or from an S pole to an N pole (or an S' pole to an N' pole), whereby the levels of the A-phase signal and the B-phase signal are inverted alternately.

As a result, the encoder count increases (or decreases) by two every time the rotor rotates by 7.5°. Further, every time current supply is effected for all the phases around and the rotor rotates by 7.5°, the Z-phase magnetism detecting element 50 faces a wide N' pole corresponding to a reference rotation position of the rotor 32 and the Z signal has a high-level value "1." In this specification, an event that the A-phase signal, the B-phase signal, or the Z-phase signal has a high-level value "1" may be referred to as "an A-phase signal pulse, a B-phase signal pulse, or a Z-phase signal pulse is output."

Since the encoder count is stored in the RAM of the ECU 41, the encoder count disappears when the power to the ECU 41 is turned off. Therefore, an encoder count ("0") in the ECU 41 immediately after power application does not correspond to an actual rotation position (or a current supply phase) of the rotor 32. To switch the current supply phase on the basis of the encoder count, it is necessary to establish correspondence between an encoder count and an actual rotation position of the rotor 32, that is, between an encoder count and a current supply phase, after power application.

In this embodiment, the ECU 41 of the position switching controller 42 executes an initial drive routine shown in FIGS. 8 and 9 (described later). That is, during an initial drive that is performed after power application to the ECU 41, current supply is effected for all the phases of the SR motor 12 around according to a prescribed time schedule and edges of the A-phase signal and the B-phase signal of the encoder 46 are counted. A corresponding relationship between an encoder count, a rotation position of the rotor 32, and a current supply phase at the time of completion of the initial drive is learned. In an ordinary drive that is performed subsequently, the current supply phase is determined on the basis of the encoder count and a learning result that was obtained at the end of the initial drive.

Figure 12:
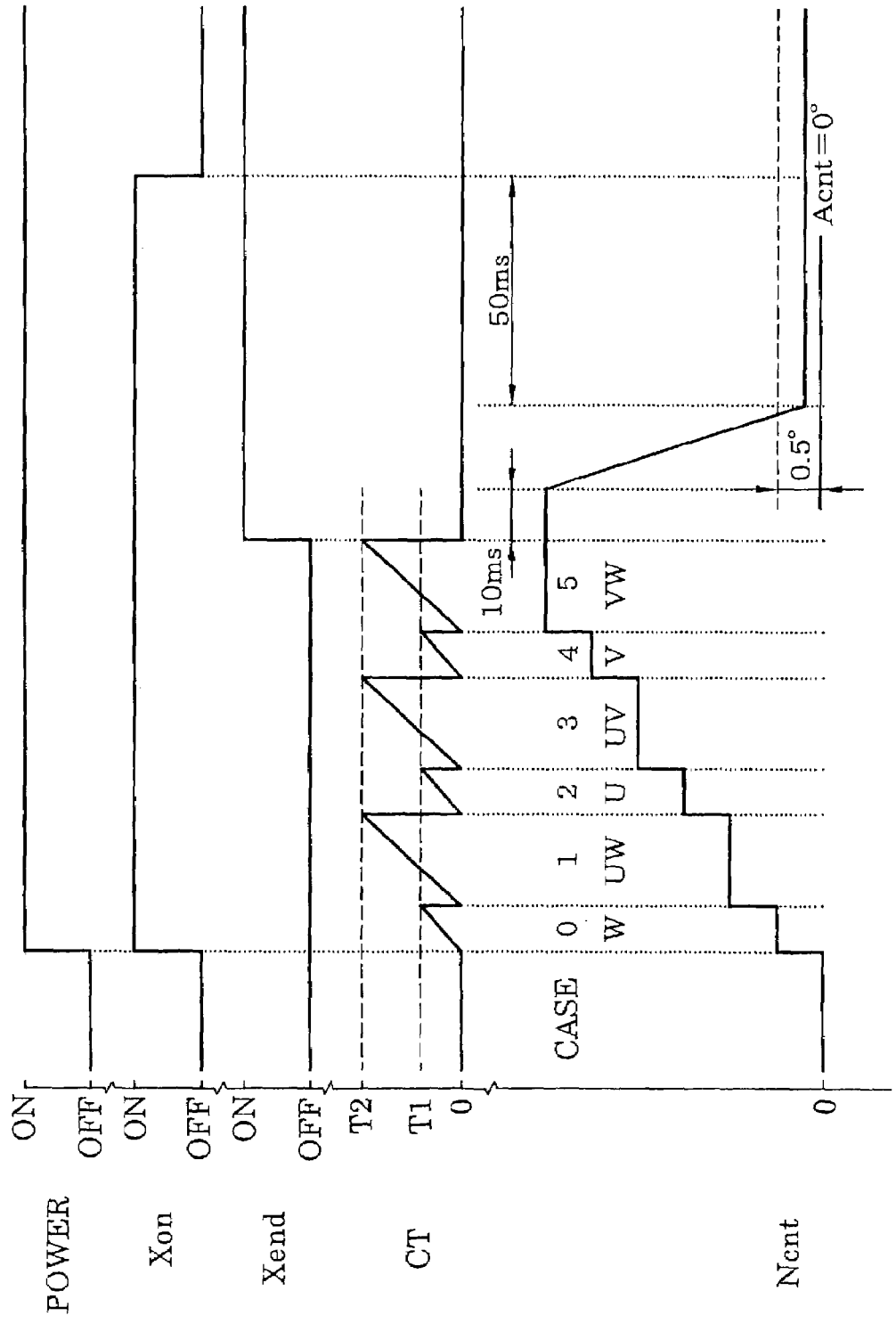
FIG. 12 is a time chart showing an exemplary control of a P-position initial drive.

The learning during an initial drive is performed in the following manner. As shown in FIG. 12, where an initial drive is performed when power is applied to the ECU 41 with the P-position set, current supply is effected for all the phases around according to a prescribed time schedule in order of W-phase→U and W-phases→U-phase→U and V-phases→V-phase→V and W-phases, for example, and the rotor 32 is driven in the normal rotation direction (i.e., the rotation direction from the P-position to the non-P-position).

On the other hand, where an initial drive is performed when power is applied to the ECU 41 with the non-P-position set, current supply is effected for all the phases around according to a prescribed time schedule in order of V-phase U and V-phases→U-phase→U and W-phases→W-phase→V and W-phases, for example, and the rotor 32 is driven in the reverse rotation direction (i.e., the rotation direction from the non-P-position to the P-position).

In the initial drive, a time T1 of one-phase current supply is set shorter than a time T2 of two-phase current supply; for example, T1 and T2 are set to 10 ms and 100 ms, respectively. In one-phase current supply which produces low torque, the rotor 32 vibrates even after synchronization has been established between the rotation position of the rotor 32 and the current supply phase during an initial drive. In view of this, the time T1 of one-phase current supply is set short so that switching is made to the next two-phase current supply as soon as possible. In this manner, vibration of the rotor 32 is stopped quickly and the output signals of the encoder 46 are stabilized.

If current supply is effected for all the phases around during an initial drive in the above manner, the rotation position of the rotor 32 and the current supply phase necessarily coincide with each other at a certain current supply phase. From this time onward, the rotor 32 rotates in synchronism with the current supply phase switching and the A-phase signal and the B-phase signal are output from the encoder 46 in synchronism with the rotation of the rotor 32.

Both of rising edges and trailing edges of the A-phase signal and the B-phase signal of the encoder 46 are counted during the initial drive. Therefore, an angle (i.e., a rotation amount) by which the rotor 32 has rotated actually in synchronism with the current supply phase switching until the end of the initial drive can be found by checking an encoder count at the end of the initial drive. In this manner, a corresponding relationship between an encoder count, a rotation position of the rotor 32, and a current supply phase at the end of the initial drive is recognized.

In the example of FIG. 12, in an initial drive, the rotor 32 starts with the first current supply phase (W-phase). The rotor rotates by 7.5° and the encoder count increases by two every time the current supply phase is switched. The encoder count reaches 12 at the end of the initial drive.

In contrast, if, for example, the rotor 32 is not rotated by the first three current supply attempts (W-phase→U and W-phases→U-phase) and is rotated by the fourth and ensuing current supply attempts (only three current supply attempts; U and V-phases→V-phase→V and W-phases) in such a manner that the rotation position of the rotor 32 and the current supply phase are synchronized with each other, the rotor 32 rotates 7.5°×3=22.5° until the end of the initial drive and the encoder count reaches 2×3=6. Therefore, an angle (i.e., a rotation amount) by which the rotor 32 has rotated actually in synchronism with the current supply phase switching until the end of the initial drive can be found by checking an encoder count at the end of the initial drive.

Whereas the last current supply phases of an initial drive are always the V and W-phases, the final encoder count need not always be 12 and may be 8 or 4, for example. In an ordinary drive that is performed after the end of an initial drive, the current supply phase is determined on the basis of the encoder count. Therefore, correct current supply phases cannot be selected unless a deviation in encoder count that has occurred in an initial drive is corrected for.

In view of the above, this embodiment makes it possible to select correct current supply phases during an ordinary drive by learning an encoder count at the end of an initial drive as an initial positional deviation learned value and correcting the encoder count using the initial positional deviation learned value during a subsequent ordinary drive. In this manner, the deviation between the encoder count and the current supply phase (i.e., the rotation position of the rotor 32) at the end of the initial drive is corrected for and correct current supply phases can be selected during the ordinary drive.

After the end of the initial drive, as shown in FIG. 12, a feedback control start position stopping and holding process (described later) is executed in which current supply is effected for the same phases as the current supply phases at the end of the initial drive (i.e., V and W-phases) for 10 ms, for example, whereby the rotor 32 is kept at the position where it existed at the end of the initial drive. Then, a feedback control (described later) is performed, whereby the rotor 32 is rotated to a target position Acnt by switching the current supply phase on the basis of an encoder count at that instant and an initial positional deviation learned value. At an instant when the rotation position (encoder count) of the rotor 32 has reached a position that is 0.5° or less, for example, short of the target position Acnt, the current supply phase switching is finished and the rotor 32 is stopped. Then, a target position stopping and holding process (described later) is executed in which current supply is effected for the same phase(s) and the rotor 32 is kept stopped for 50 ms, for example. Then current supply is stopped thereafter unless the target position Acnt is changed.

If a position switching request occurs, that is, the P-position switch 43 or the non-P-position switch 44 is manipulated, during an initial drive, a transition is made to an ordinary drive after the next two-phase current supply is effected (in two-phase current supply itself if a position switching request occurs during that two-phase current supply). And a corresponding relationship between an encoder count, a rotation position of the rotor 32, and a current supply phase at the end of the two-phase current supply is learned. In a subsequent ordinary drive, the current supply phase is determined on the basis of a learning result at the end of the two-phase current supply and the encoder count.

Producing high torque, two-phase current supply can rotate the rotor 32 to a position corresponding to the two-phase current supply even if there was some deviation from it. Therefore, the probability would be high that merely performing two-phase current supply once or twice during an initial drive establishes synchronization between the rotation position and the current supply phase. Therefore, if a position switching request occurs during an initial drive, it would be proper to make a transition to an ordinary drive after completion of the next (or current) two-phase current supply. With this measure, a transition to an ordinary drive can be made quickly after a corresponding relationship between an encoder count, a rotation position of the rotor 32, and a current supply phase is learned.

Figure 13:
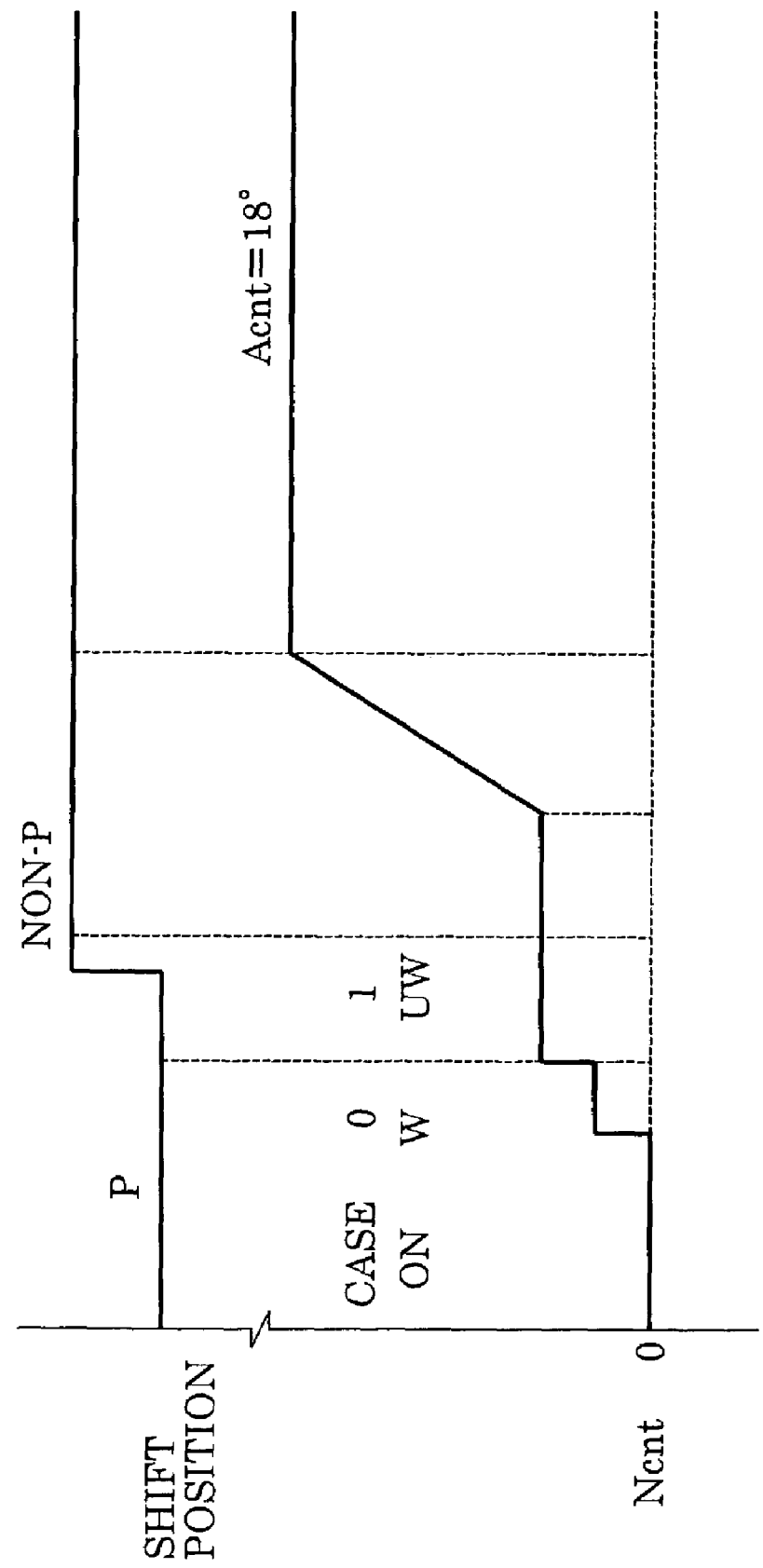
FIG. 13 is a time chart showing an exemplary control in a case that a position switching manipulation is performed during an initial drive.

For example, as shown in a time chart of FIG. 13, if a position switching request from the P-position to the non-P-position occurs during a second current supply attempt (U and W-phases) in an initial drive, the initial drive is finished with the current supply for the U and W-phases and a transition is made to an ordinary drive and a corresponding relationship between an encoder count, a rotation position of the rotor 32, and a current supply phase at the end of the current supply for the U and W-phases is learned. In this embodiment, even in the case where a transition is made to an ordinary drive before completion of an initial drive, an encoder count that would be obtained at the end of the initial drive is estimated with an assumption that the initial drive has been completed as scheduled and an estimate value is employed as an initial positional deviation learned value.

For example, in a case that the initial drive is finished after two current supply attempts for the W-phase and the U and W-phases as shown in FIG. 13, that is, the initial drive is finished without performing four current supply attempts that are supposed to be performed thereafter, it is assumed that the four current supply attempts (U-phase→U and V-phases→V-phase→V and W-phases) have been performed and an initial positional deviation learned value is calculated by adding a count increase (2×4=8) corresponding to a rotation angle of the four current supply attempts to an encoder count at the end of the current supply for the U and W-phases.

In the conventional position switching control, every time the instructed shift position (target position) is switched from the P-position to the non-P-position or in the opposite direction, a feedback control is performed in which the rotor 32 is rotated to the target position by sequentially switching the current supply phase of the SR motor 12 on the basis of the encoder count and the current supply of the SR motor 12 is then turned off.

In this case, after the end of the feedback control, the rotor 12 can be kept at the target position by electromagnetic force by continuing to energize the windings of A-phase corresponding to the target position. However, in this configuration, if the rotor 32 is stopped for a long time, the windings of the same phase continue to be energized for a ling time and hence may overheat and burn. To prevent the windings from overheating or burning, the windings are not energized while the rotor 32 is stopped.

However, if the rotor 32 is not energized while it is stopped, there is no electromagnetic force for keeping the rotor 32 at the target position (i.e., the position at the end of the feedback control) and hence the rotor 32 may deviate from the target position. In this embodiment, the mechanical stopping and holding mechanism is provided that keeps the rotor 32 at a target position by spring force of the detent spring 23. However, even in this case, the rotor 32 may deviate from the target position due to play amount in the stopping and holding mechanism, variations in manufacture, etc.

In the conventional position switching control, to start a feedback control, a first current supply phase is determined by using an encoder count at the end of the preceding feedback control. The feedback control is started as soon as the first current supply phase is determined.

Therefore, in the conventional position switching control, if the position of the rotor 32 deviates while it is stopped, a feedback control is started with a current supply phase that is different from A-phase for which current supply should be effected first. In this case, the rotor 32 may not be rotated normally to a target position; for example, a loss of synchronization occurs at the start of the feedback control to cause a failure of starting or the rotor 32 is rotated away from the target position.

If the rotor 32 deviates only slightly while it is stopped and hence the position of the rotor 32 stays within a range corresponding to an encoder count at the end of the preceding feedback control, A-phase for which current supply is effected first is a current supply phase at the end of the preceding feedback control. In this case, even the conventional position switching control has no problems about the first current supply phase.

However, a feedback control is performed by using, as a reference, a position of the rotor 32 for current supply. Therefore, even if the deviation of the rotor 32 is so small that its position stays within a range corresponding to an encoder count at the end of the preceding feedback control, a loss of synchronization may still occur at the start of a feedback control to cause a failure of starting if the feedback control is started after current supply is effected for A-phase for which current supply should be effected first and before the rotor 32 is moved to a position for current supply and kept there.

Figure 18:
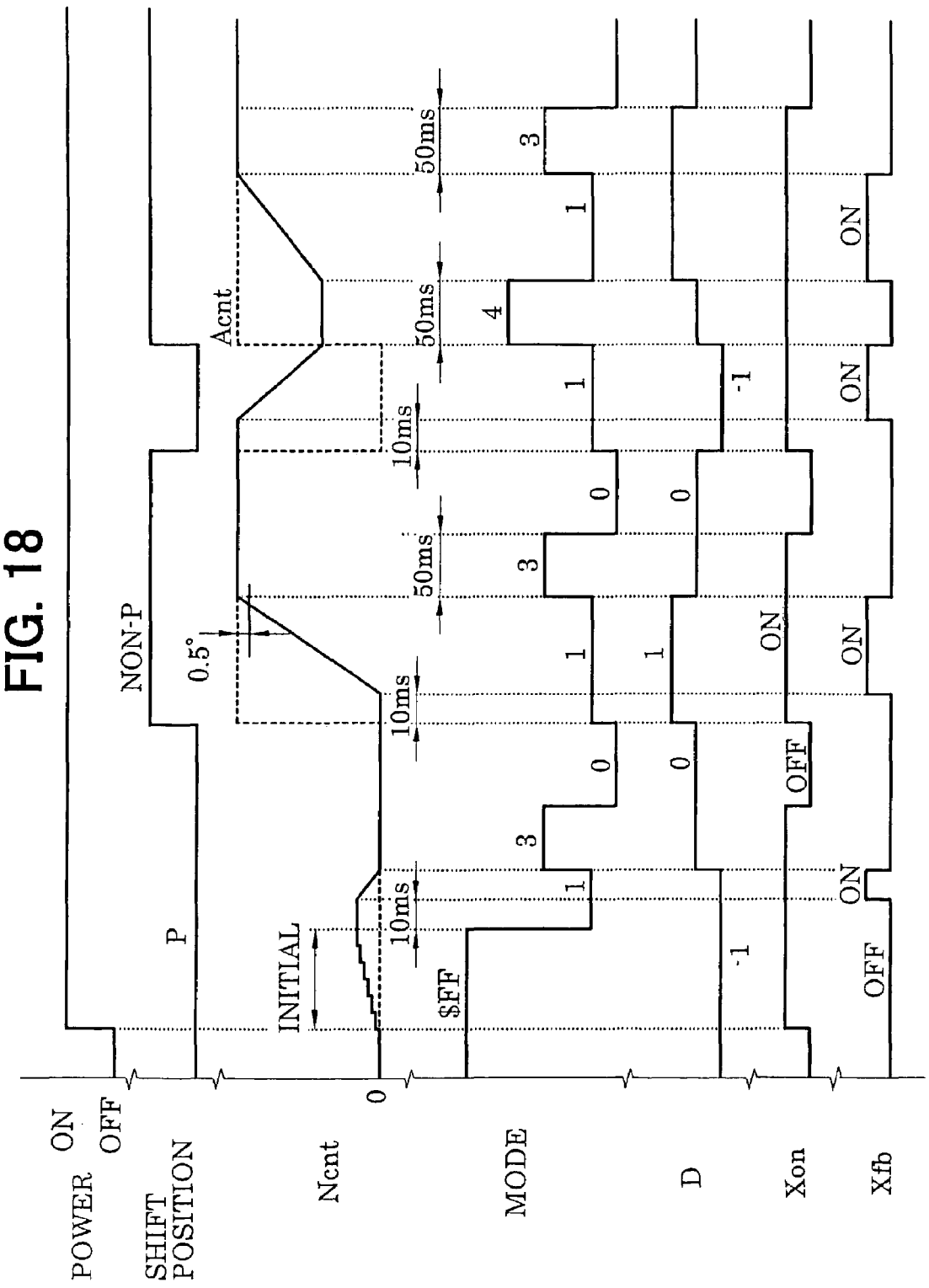
FIG. 18 is a time chart showing an exemplary control on the SR motor.
Figure 19:
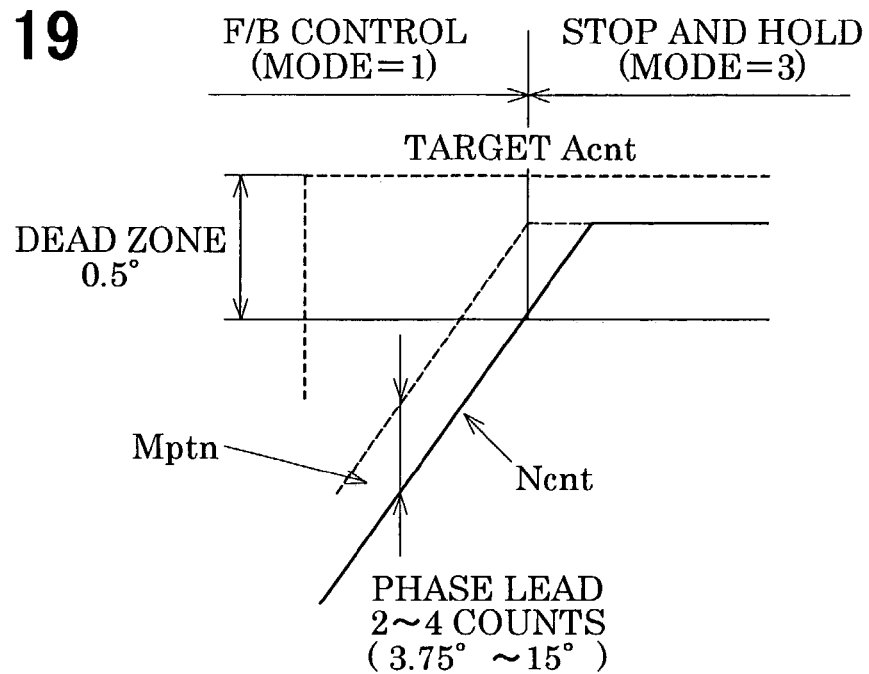
FIG. 19 is a time chart showing timing of a transition from a feedback control to a target position stopping and holding process.

As a countermeasure against the above problem, in this embodiment, as shown in FIG. 18, to start a feedback control from a state that the SR motor 12 is not energized, a process (hereinafter referred to as "feedback control start position stopping and holding process") in which current supply phases are selected on the basis of a current encoder count and the rotor 32 is stopped and kept at a stop position by two-phase current supply is executed for a prescribed time (e.g., 10 ms). The feedback control is then performed to rotate the rotor 32 to a target position.

With this measure, even if the rotor 32 deviated in a period when it should be stopped, the positional deviation of the rotor 32 is corrected for by the feedback control start position stopping and holding process immediately before a start of a feedback control, whereby a position of the rotor 32 at the start of the feedback control can be determined correctly. Therefore, the position of the rotor 32 and the current supply phase (i.e., encoder count) can reliably be synchronized with each other from the first current supply phase at the start of a feedback control. It becomes possible to prevent a loss of synchronization and prevent the rotor 32 from rotating away from a target position at the start of a feedback control, to allow the rotor 32 to reliably rotate to a target position with a stable feedback control, and to perform a position switching control (positioning control) that is highly stable and reliable.

To increase the response speed of the position switching control, the time that is taken by the rotor 32 to reach a target position is shorted by increasing its rotation speed. As a result, immediately after reaching a target position, the rotor 32 has not stopped completely but is vibrating. If the current supply is turned off in such a state, inertia may cause the rotor 32 to stop at a position that greatly deviates from a target position. If the rotor 32 has too large a positional deviation at the end of a feedback control, the positional deviation may not be corrected for even if a feedback control start position stopping and holding process is executed immediately before the next feedback control is started.

As a countermeasure against this problem, in this embodiment, the current supply of the SR motor 12 is turned off after a process for stopping the rotor 32 at a position where it existed at the end of a feedback control and keeping the rotor 32 there by two-phase current supply (hereinafter referred to as "target position stopping and holding process") is executed for a prescribed time (e.g., 50 ms) after the end of the feedback control. With this measure, the current supply can be turned off after the rotor 32 has reached a target position and its vibration has stopped, whereby the rotor 32 is prevented from stopping at a position deviating greatly from the target position due to inertia. This makes it possible to satisfy the requirement of increase in the response speed of the position switching control while maintaining high stability and reliability of the position switching control.

In this embodiment, if the instructed shift position (target position) is changed during a feedback control to necessitate reversing the rotation direction of the rotor 32, a process for stopping the rotor 32 at a reversing position and keeping it there by two-phase current supply (hereinafter referred to as "reversing position stopping and holding process") is executed for a prescribed time (e.g., 50 ms). The feedback control is then restarted to rotate the rotor 32 to a new target position. With this measure, when the instructed shift position (target position) is changed during a feedback control, a reversing operation can be performed stably by stopping the rotor 32 at a reversing position and keeping the it there. This prevents an event that deviation of a reversing position causes a loss of synchronization (i.e., deviation of current supply phases) and makes it possible to rotate the rotor 32 to a new target position reliably.

In this embodiment, a feedback control is finished and a transition is made to a target position stopping and holding process when the difference between the encoder count and a target count that corresponds to a target position has become smaller than or equal to a prescribed value (e.g., a count corresponding to A-phase lead of the current supply phase) during the feedback control. To rotate the rotor 32, it is necessary to cause the phase of the current supply phase to lead the actual position of the rotor 32 by 2 to 4 counts (3.75° to 15° in terms of the rotation angle of the rotor 32).

Therefore, if a feedback control is finished when the difference between the encoder count and a target count has become equal to, for example, a count corresponding to A-phase lead of the current supply phase, the last current supply phase of the feedback control should coincide with a current supply phase with which to stop the rotor 32 at the target position and keep it there. Therefore, after a transition is made to a target position stopping and holding process, the current supply for the last current supply phase of the feedback control can be continued; the transition from the feedback control to the target position stopping and holding process can be made smoothly.

To generate torque for rotating the rotor 32, it is necessary to cause the phase of the current supply phase to lead the rotation phase of the rotor 32. As the rotation speed of the rotor 32 increases after a start of a feedback control, the variation rate of the encoder count increases and the current supply phase switching becomes faster. However, torque is generated actually with a delay corresponding to the inductance of the windings 33 or 34 of a current supply phase from a start of current supply of the windings 33 or 34. Therefore, if the rotation speed of the rotor 32 is too high, the rotor 32 rotates by a considerable angle from a start of current supply of the windings 33 or 34 of the current supply phase to actual generation of torque, that is, the generation of torque of the current supply phase delays from the actual rotation phase of the rotor 32. In this state, the driving torque decreases and the rotation speed of the rotor 32 lowers. A requirement of increase in position switching rate (i.e., increase in the rotation speed of the rotor 32) cannot be satisfied.

One countermeasure against this problem would be setting the phase lead of the current supply phase to a large value in advance. However, if the phase lead of the current supply phase is large at a start of a feedback control (i.e., at starting), the starting torque becomes low and the starting of the SR motor 12 becomes unstable or results in a failure.

Further, if the phase lead of the current supply phase is set large and the rotation speed of the rotor 32 is thereby increased, the rotor 32 tends to pass a target position due to inertia at an end of a feedback control (occurrence of an overshoot), that is, it is difficult to stop the rotor 32 at the target position correctly.

In view of the above, in this embodiment, the phase lead of the current supply phase with respect to the rotation phase of the rotor 32 is corrected in accordance with the rotation speed of the rotor 32 during a feedback control. And when it becomes necessary to decrease the rotation speed of the rotor 32 (e.g., because the rotor 32 comes close to a target position), the phase lead of the current supply phase is corrected in the decreasing direction. Specifically, correcting the phase lead of the current supply phase in the decreasing direction at a start of a feedback control can increase starting torque and thereby raise the rotation speed of the rotor 32 quickly. Correcting the phase lead of the current supply phase in the increasing direction as the rotation speed of the rotor 32 increases can maintain the synchronized relationship between the generation of torque of the current supply phase and the actual rotation phase of the rotor 32 even during high-speed rotation, and hence makes it possible to rotate the rotor 32 stably at high speed. This makes it possible to attain both of good starting performance and good high-speed rotation performance.

When the rotor 32 comes close to the target position afterwards, the phase lead of the current supply phase is corrected in the decreasing direction, whereby a state that the generation of torque of the current supply phase is delayed from the actual rotation phase of the rotor 32 is established. In this manner, the driving torque can be decreased or torque (braking torque) can be generated in the direction opposite to the rotation direction of the rotor 32, whereby the rotation speed of the rotor 32 can be decreased reliably and the rotor 32 can be stopped at the target position correctly. This makes it possible to perform a feedback control that is superior in starting performance, high-speed rotation performance, and stop performance (deceleration performance).

The rotation amount (i.e., rotation angle) of the rotor 32 is converted into the manipulated variable for the position switching mechanism 11 (i.e., the slide length of the parking rod 18) via the rotation transmission system that is composed of the speed-reducing mechanism 26, the output shaft 13, the detent lever 15, etc. and the constituent parts of the rotation transmission system has play amount. For example, backlash exists between the gears of the speed-reducing mechanism 26. In a structure in which a connecting portion having a non-circular cross-section that is formed at the tip of the rotary shaft of the motor 12 is fitted into a fitting hole of the output shaft 13, a certain clearance is needed to facilitate work of fitting the former into the latter.

Figure 35:
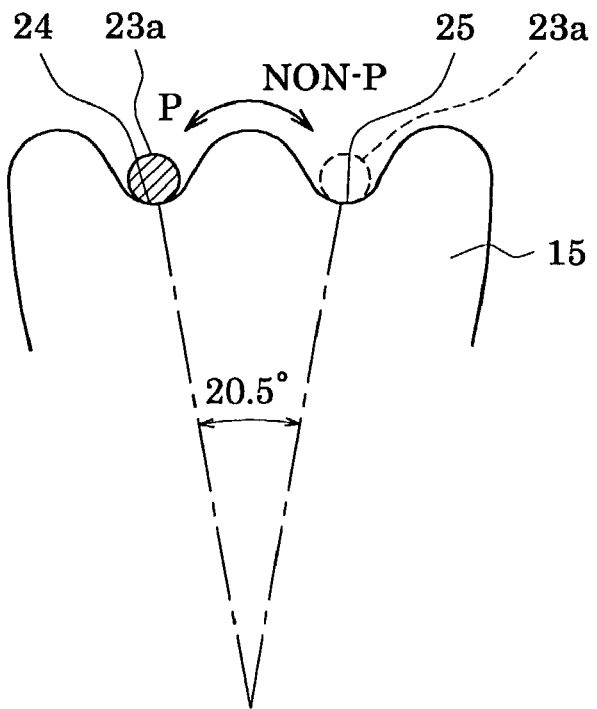
FIG. 35 illustrates a relationship between an engaging portion of a detent spring and each of a P-position holding recess and a non-P-position holding recess of a detent lever.

Further, as shown in FIG. 35, when the engaging portion 23a of the detent spring 23 goes into the P-position holding recess 24 or the non-P-position holding recess 25 of the detent lever 15, a slight gap (play amount) exists between the engaging portion 23a and the side walls of the holding recess 24 or 25. As exemplified above, play amount such as backlash and gaps between parts exist in the rotation transmission system for converting the rotation amount of the rotor 32 into the manipulated variable for the position switching mechanism 11 (i.e., the slide length of the parking rod 18). Even if the rotation amount of the rotor 32 can be controlled correctly on the basis of the encoder count, the manipulated variable for the position switching mechanism 11 has an error corresponding to the play amount in the rotation transmission system; the manipulated variable for the position switching mechanism 11 cannot be controlled accurately.

In view of the above, this embodiment is provided with a function of learning an amount of play amount in the rotation transmission system. Specifically, to learn an amount of play amount in the rotation transmission system, a P-position-side butting control (i.e., a first-direction butting control) for rotating the rotor 32 until the engaging portion 23a of the detent spring 23 butts against a side wall of the P-position holding recess 24 as a P-position-side limit position of the movable range of the position switching mechanism 11 and a non-P-position-side butting control (i.e., a second-direction butting control) for rotating the rotor 32 until the engaging portion 23a of the detent spring 23 butts against a side wall of the non-P-position holding recess 25 as a non-P-position-side limit position are performed, whereby an increase or decrease of the encoder count corresponding to the range from the P-position-side limit position to the non-P-position-side limit position is determined as an actual measurement value of the movable range of the position switching mechanism 11.

The difference between this actual measurement value of the movable range and its design value is learned as a play amount of the rotation transmission system. When the rotor 32 is rotated to a target position afterwards, the target position is set by taking the learned play amount of the rotation transmission system into consideration. This makes it possible to set, even if the rotation transmission system has play amount, a target value taking the play amount into consideration and to thereby control the manipulated variable for the position switching mechanism 11 accurately.

If there is a sufficient time to learn a play amount of the rotation transmission system from application of power (i.e., turning-on of the ignition switch) to the ECU 41 which controls the SR motor 12 to a start of a control on the position switching mechanism 11, a play amount of the rotation transmission system may be learned after application of power to the ECU 41 and before a start of a control on the position switching mechanism 11 by performing a P-position-side butting control and a non-P-position-side butting control successively. However, where it is necessary to quickly start a control on the position switching mechanism 11 after application of power to the ECU 41, there may not be a sufficient time to learn a play amount of the rotation transmission system after application of power to the ECU 41.

In view of the above, in this embodiment, after a control on the position switching mechanism 11 was started without learning a play amount, in a state that the rotor 32 is stopped at the P-position, a P-position-side butting control is performed and an encoder count when the engaging portion 23a is in contact with the side wall of the P-position holding recess 24 is stored in the RAM of the ECU 41. In a state that the rotor 32 is stopped at the non-P-position, a non-P-position-side butting control is performed and an encoder count when the engaging portion 23a is in contact with the side wall of the non-P-position holding recess 25 is stored in the RAM of the ECU 41. The difference between the encoder counts obtained by the P-position-side butting control and the non-P-position-side butting control is calculated as an actual measurement value of the movable range of the position switching mechanism 11. The difference between the actual measurement value of the movable range and its design value is learned as a play amount.

With this measure, even if there was not a sufficient time to learn a play amount of the rotation transmission system from application of power to the ECU 41 to a start of a control on the position switching mechanism 11 and hence a control on the position switching mechanism 11 was started without learning a play amount of the rotation transmission system, a play amount can be learned by performing butting controls when the rotor 32 is stopped at the P-position and the non-P-position. In this case, the same control as in the conventional case that does not take a play amount of the rotation transmission system into consideration may be performed before completion of learning of a play amount. Alternatively, the control object may be controlled by using a preset, average play amount or a storage value of a learned play amount of the preceding learning. In the following description, the abbreviated term "butting control" means either of a P-position-side butting control and a non-P-position-side butting control.

In this embodiment, when a butting control is performed, the torque of the SR motor 12 is made lower than in an ordinary drive by making the current supply duty ratio (i.e., current supply factor) of the SR motor 12 smaller than in an ordinary drive. The torque of the SR motor 12 is set so strong that the engaging portion 23a of the detent spring 23 can reliably go over the projection between the two holding recesses 24 and 25 of the detent lever 15 at the time of position switching. However, in the butting control, the torque of the SR motor 12 causes the engaging portion 23a of the detent spring 23 to butt against the holding recess 24 or 25 of the detent lever 15. Therefore, if the torque of the SR motor 12 is too strong, the parts of the rotation transmission system such as the engaging portion 23a of the detent spring 23 may be deformed or damaged gradually to lower the durability and reliability as the number of times of butting controls increases.

As a countermeasure against this problem, the torque of the SR motor 12 is reduced during a butting control, whereby the force of butting of the engaging portion 23a of the detent spring 23 against the side wall of the holding recess 24 or 25 can be weakened. This makes it possible to prevent butting controls from deforming or damaging the parts of the rotation transmission system such as the engaging portion 23a of the detent spring 23 and to thereby secure high durability and reliability. In the butting control of this embodiment, the engaging portion 23a of the detent spring 23 need not go over the projection between the two holding recesses 24 and 25 of the detent lever 15. Therefore, even if the torque of the SR motor 12 is decreased during a butting control, the butting control can be performed normally as long as the torque is higher than a minimum value necessary to cause the engaging portion 23a of the detent spring 23 to butt against the side wall of each of the holding recesses 24 and 25.

In this embodiment, during a butting control, the phase lead of the current supply phase is corrected so as to decrease the rotation speed of the rotor 32. If the rotation speed of the rotor 32 is too high during butting controls, the engaging portion 23a of the detent spring 23 collides with the side walls of the holding recesses 24 and 25 of the detent lever 15 at high speed and resulting impact gradually deforms or damages the parts of the rotation transmission system such as the engaging portion 23a of the detent spring 23. Decreasing the rotation speed of the rotor 32 during butting controls lowers the speed at which the engaging portion 23a of the detent spring 23 collides with the side walls of the holding recesses 24 and 25 of the detent lever 15 during butting controls and hence can weaken resulting impact. This makes it possible to prevent butting controls from deforming or damaging the parts of the rotation transmission system such as the engaging portion 23a of the detent spring 23 and to thereby secure high durability and reliability.

In this embodiment, during a butting control, an angle (i.e., a ride correction value) by which the engaging portion 23a of the detent spring 23 slightly rides the side wall of the holding recess 24 or 25 of the detent lever 15 in a state that the engaging portion 23a is in contact with the side wall is inferred on the basis of the battery voltage as a power source voltage for the SR motor 12. And an actual measurement value of the movable range of the position switching mechanism 11 is corrected by the inferred value. The angle (i.e., ride correction value) by which the engaging portion 23a of the detent spring 23 rides the side wall of the holding recess 24 or 25 of the detent lever 15 during a butting control increases as the torque of the SR motor 12 increases. In general, the torque of the SR motor 12 varies with the power source voltage therefor (i.e., battery voltage) and hence a correlation exists between the power source voltage and the torque of the SR motor 12. The power source voltage can be used as replacement information for the torque of the SR motor 12. Therefore, an actual measurement value of the movable range of the position switching mechanism 11 can be determined accurately by inferring an angle (i.e., a ride correction value) by which the engaging portion 23a of the detent spring 23 rides the side wall of the holding recess 24 or 25 of the detent lever 15 during a butting control on the basis of the power source voltage (i.e., battery voltage) as replacement information for the torque of the SR motor 12 and correcting an actual measurement value of the movable range of the position switching mechanism 11 by the inferred value.

During the feedback control, for instance, if the A-phase signal or the B-phase signal of the encoder 46 temporarily misses, if noise pulse superimposed on the signal line of the encoder 46 is erroneously taken as the normal pulse signal or if the motor rotates out of phase for some reason, the energized phase (encoder count value) and the rotational phase of the rotor 32 are not synchronized. As a result, the rotor 32 cannot be driven normally. Thus, the rotor 32 stops or rotates in reverse, and becomes uncontrollable because the feedback control cannot be continued.

Figure 47:
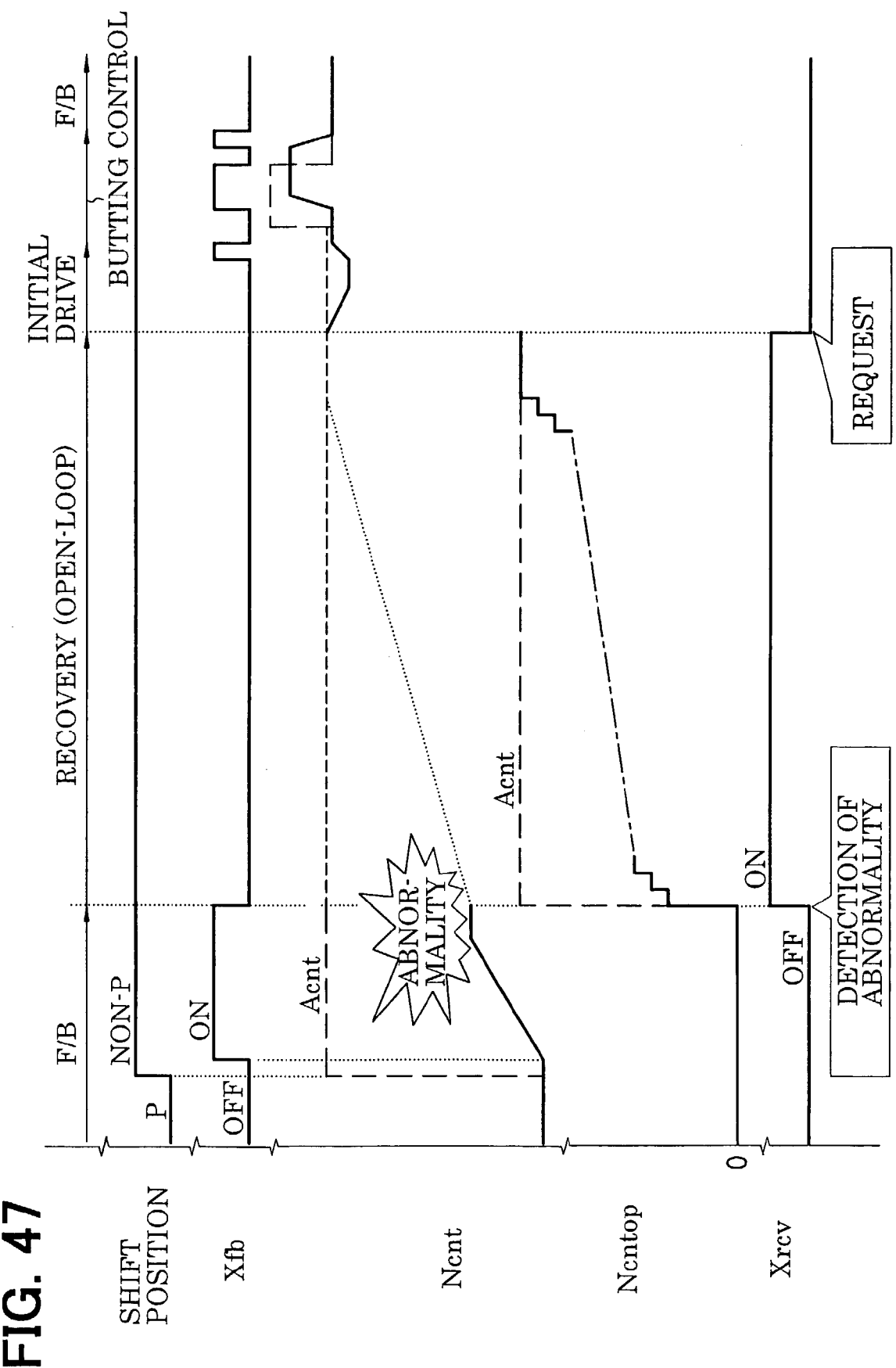
FIG. 47 is a time chart illustrating an exemplary recovery process.

In view of the above, in this embodiment, whether the state of a feedback control (i.e., the rotation state of the rotor 32) is normal or abnormal is monitored during the feedback control. As soon as an abnormality is detected, switching is made from the feedback control to an open-loop control and a recovery process is started. A recovery process execution example shown in FIG. 47 is such that switching is made to an open-loop control from a feedback control for switching the shift position from the P-position to the non-P-position and a recovery process is started as soon as an abnormality has occurred in the feedback control state and the rotor 32 or an encoder count Ncnt counting operation has made an abnormal stop during the feedback control.

During the open-loop control (i.e., recovery process), the rotor 32 is rotated by sequentially switching the current supply phase without feeding back information of the encoder count Ncnt. The position count Ncntop of the open-loop control is incremented (or decremented) every time the current supply phase is switched during the open-loop control. As soon as the position count Ncntop has reached a target count Acnt, it is determined that the rotor 32 has reached a target position. The open-loop control (i.e., recovery process) is finished and the feedback control is restarted. As a result, according to this embodiment, even if an abnormality in the encoder count Ncnt, a loss of synchronization or the like occurs in a feedback control to temporarily render the feedback control state (i.e., the rotation state of the rotor 32) abnormal, the rotor 32 can be rotated to a target position by an open-loop control.

One, two, or all of the following three abnormality detection methods (1)-(3) may be used as a feedback control state abnormality detection method(s):

[Abnormality Detection Method (1):]

Figure 48:
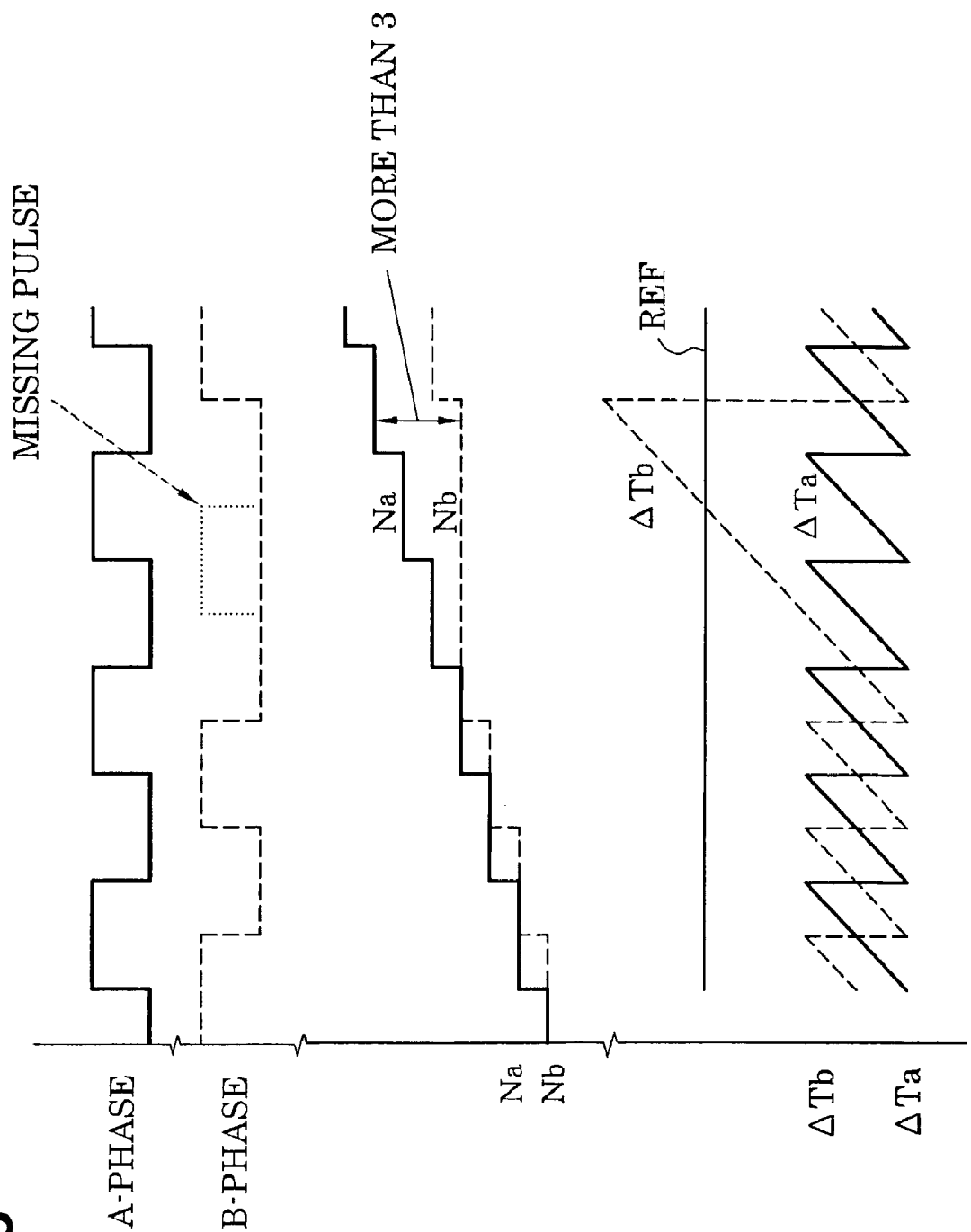
FIG. 48 illustrates methods for detecting an abnormality in an A-phase signal and a B-phase signal of the encoder.

As shown in FIG. 48, during a feedback control, edges of an A-phase signal and edges of a B-phase signal are counted separately. Whether an abnormality has occurred in the feedback control state is determined (monitored) on the basis of whether the difference |Na−Nb| between the count Na of the A-phase signal and the count Na of the B-phase signal is greater than or equal to an abnormality determination value (e.g., 3). The difference between the count Nb of the A-phase signal and the count Nb of the B-phase signal is 0 or 1 during a feedback control as long as the A-phase signal and the B-phase signal are output normally.

Therefore, if the difference |Na−Nb| between the counts Na and Nb is greater than or equal to "2," it is determined that one of the A-phase signal and the B-phase signal has been lost temporarily, the circuit has been influenced by a noise pulse, or a like phenomenon has occurred. If such a state occurs, the encoder count Ncnt and the rotation position of the rotor 32 are no longer synchronized with each other and the rotation state of the rotor 32 (i.e., the feedback control state) becomes abnormal. Whether an abnormality has occurred in the rotation state of the rotor 32 (i.e., the feedback control state) can thus be determined on the basis of the difference |Na−Nb| between the counts Na and Nb.

[Abnormality Detection Method (2)]

As shown in FIG. 48, an edge interval ΔTa of an A-phase signal and an edge interval ΔTb of a B-phase signal are measured during a feedback control. Whether an abnormality has occurred in the feedback control state is determined (monitored) on the basis of whether the edge interval ΔTa or the edge interval ΔTb is longer than or equal to an abnormality determination value REF (e.g., 10 times an average value of ΔTa and ΔTb).

As another version of the abnormality detection method (2), an abnormality may be detected by monitoring the rotation speed of the rotor 32, for example, the number of output pulses per unit time of the encoder 46.

[Abnormality Detection Method (3)]

Figure 49:
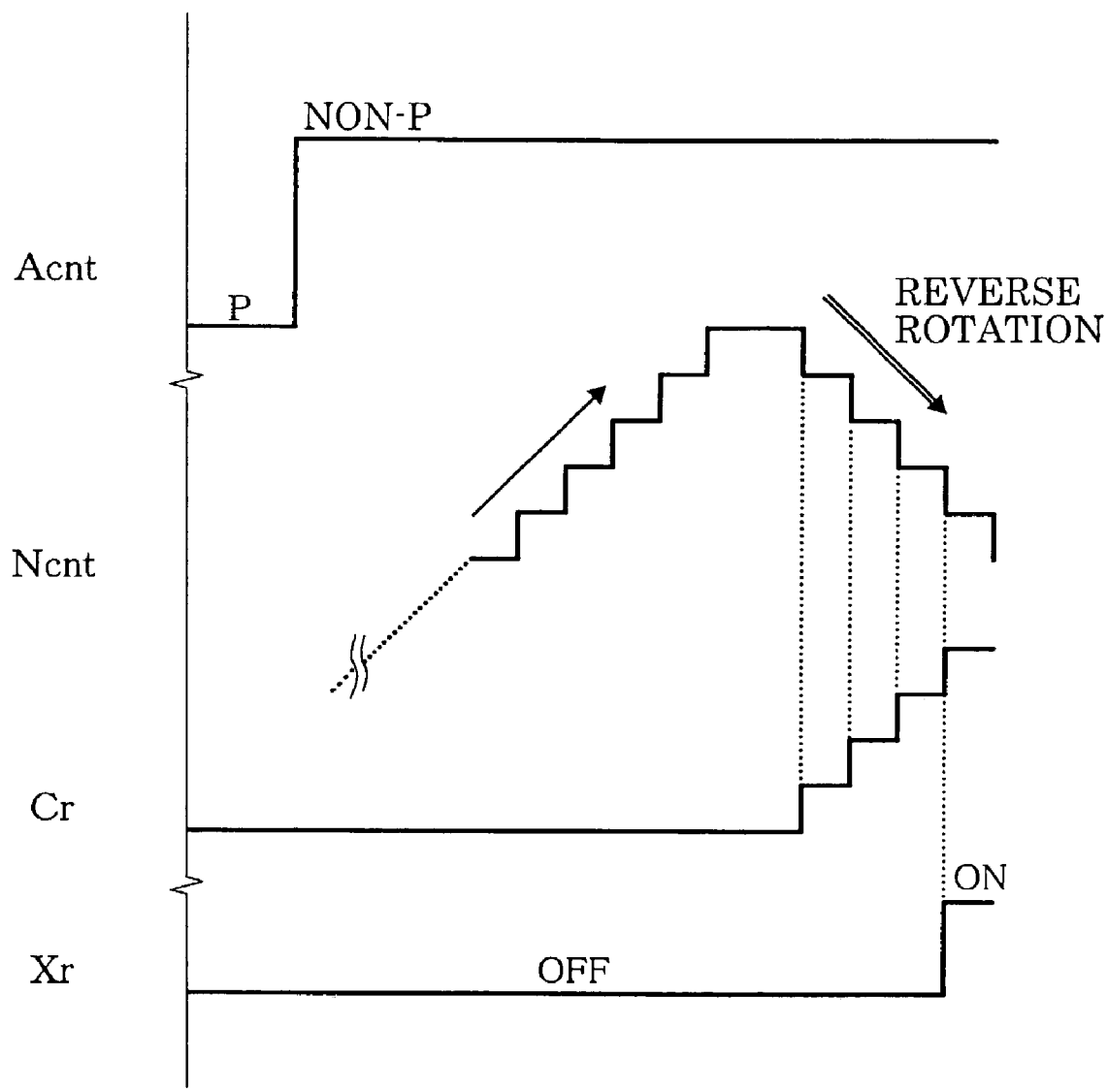
FIG. 49 illustrates a method for detecting reversing of the rotor during a feedback control.

As shown in FIG. 49, during a feedback control, the rotation direction of the rotor 32 is monitored on the basis of the variation direction of the encoder count Ncnt. Whether an abnormality has occurred in the feedback control state (i.e., the rotation state of the rotor 32) is determined (monitored) on the basis of whether the rotation direction of the rotor 32 has reversed from a rotation direction toward a target position. In this embodiment, the number of times (i.e., a count Cr) the encoder count Ncnt is updated consecutively in the direction opposite to the direction toward the target is counted. Whether an abnormality has occurred in the feedback control state (i.e., the rotation state of the rotor 32) is determined on the basis of whether the count Cr is greater than or equal to an abnormality determination value (e.g., 4). That is, if the encoder count Ncnt has been updated four or more times consecutively in the direction opposite to the direction toward the target, it is determined that the rotation direction of the rotor 32 has reversed and the reversing detection flag Xr is switched to "on."

Figure 50:
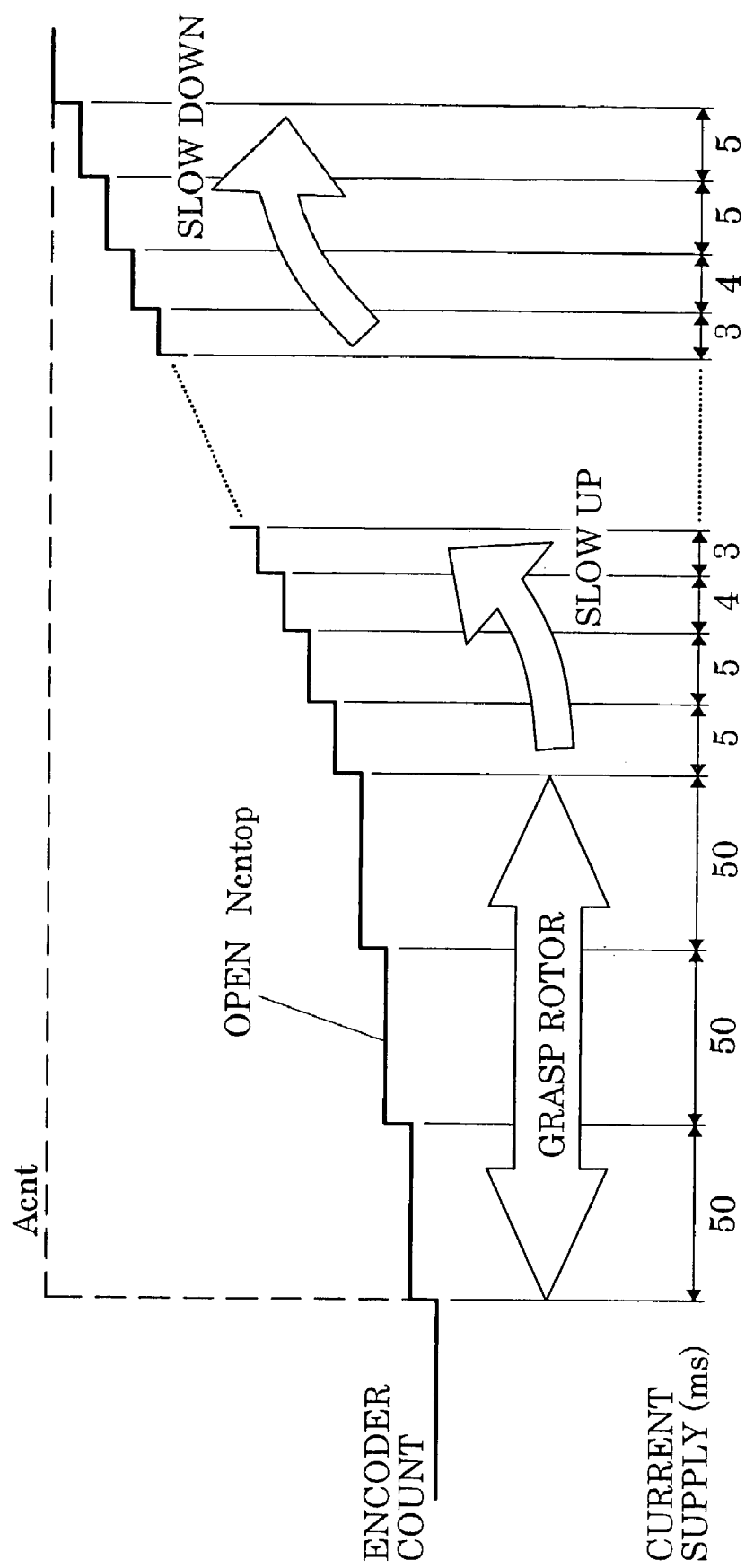
FIG. 50 is a time chart illustrating an exemplary open-loop control.

Further, in this embodiment, the current supply method in an open-loop control is set to the one/two-phase current supply method and the first current supply at the start of the open-loop control is made two-phase current supply. Further, as shown in FIG. 50, the current supply time of each of current supply phases of three steps, for example, from the start of the open-loop control is set to a longest time (e.g., 50 ms) to get a sure grasp of the rotor 32 and reliably synchronize the rotation phase and the current supply phase with each other. Thereafter, the current supply time is made much shorter; the rotation speed of the rotor 32 is increased gently by shortening the current supply time gradually as the rotation speed of the rotor 32 increases.

To infer a rotation position of the rotor 32 during the open-loop control, an initial position (i.e., an initial value of the position count Ncntop) of the rotor 32 at the start of the open-loop control is calculated on the basis of an output signal of the output shaft sensor 14. Each time the current supply phase is switched afterwards, the position count Ncntop is incremented (or decremented) and a rotation position of the rotor 32 is inferred on the basis of a resulting position count Ncntop. When the difference between this position count Ncntop and a target count Acnt has become smaller than or equal to a prescribed value, it is determined that the rotation position has entered a deceleration region. The current supply time is increased gradually to decrease the rotation speed of the rotor 32 gently. When the position count Ncntop has reached the target count Acnt, it is determined that the rotor 32 has reached the target position, whereupon the open-loop control is finished and the feedback control is restarted.

Here, if a pulse to be output from the encoder 46 is lost or noise is mixed, a deviation may occur in the relationship between the encoder count Ncnt and the rotation position of the rotor 32 (i.e., the manipulated variable for the position switching mechanism 11) or the relationship between the encoder count Ncnt and the current supply phase.

In view of this, in this embodiment, an initial drive and butting controls are performed again in a recovery from an open-loop control to a feedback control. Even if a deviation occurs during the open-loop control in the relationship between the encoder count Ncnt and the rotation position of the rotor 32 (i.e., the manipulated variable for the position switching mechanism 11) or the relationship between the encoder count Ncnt and the current supply phase, the deviation can accurately be corrected for by the initial drive and the butting controls.

In this embodiment, during a period when the rotor 32 is rotated to a target position by an open-loop control, a manipulation signal of the P-position switch 43 or the non-P-position switch 44 is disregarded even if it is manipulated. During an open-loop control, the rotor rotation speed is low and hence a motor drive time for a position switching operation is long. Therefore, it is likely that the P-position switch 43 or the non-P-position switch 44 is manipulated during the open-loop control. Since rotation positions of the rotor 32 cannot be detected correctly during an open-loop control, if the target position (i.e., instructed shift position) is switched and the rotational drive direction of the rotor 32 is thereby reversed during an open-loop control, a deviation may occur in the synchronous relationship between the rotation phase of the rotor 32 and the current supply phase and the SR motor 12 becomes prone to a loss of synchronization; there may occur a case that the rotor 32 cannot be driven. The reliability of the open-loop control can be increased by disregarding a manipulation signal even if the P-position switch 43 or the non-P-position switch 44 is manipulated during an open-loop control.

Here, even if the feedback control system fails to cause a situation that the SR motor 12 cannot be driven normally by a feedback control, it is still probable that switching to an open-loop control enables normal driving on the SR motor 12. For example, even if the encoder 46 fails or one of the two systems of motor energizing sections 35 and 36 (windings 33 and 34) of the SR motor 12 or one of the two systems of motor drivers 37 and 38 fails to lower the driving force of the SR motor 12, switching to an open-loop control may enable normal driving on the SR motor 12.

Figure 56:
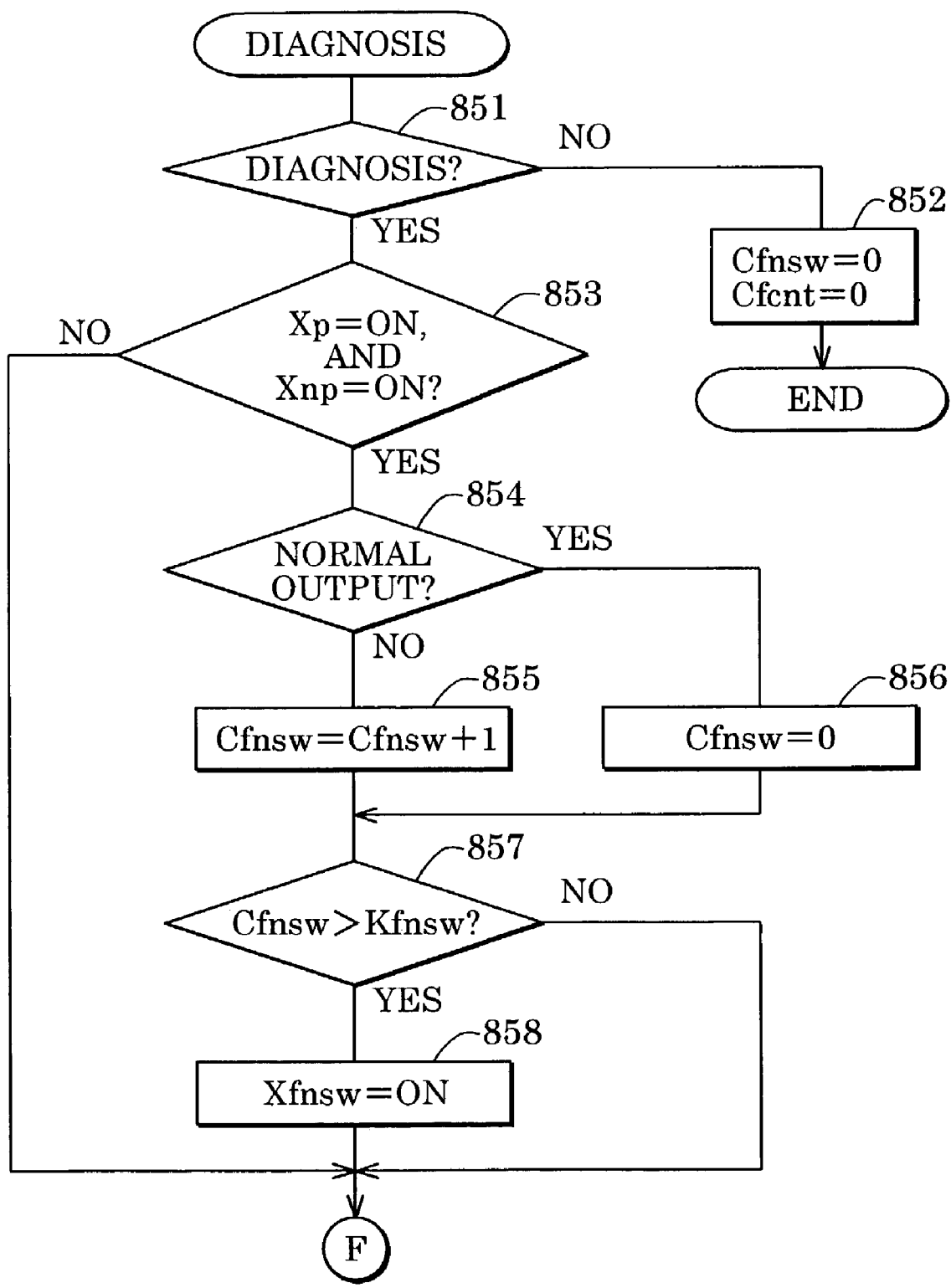
FIGS. 56 and 57 are flowcharts showing a system abnormality diagnosis routine.
Figure 57:
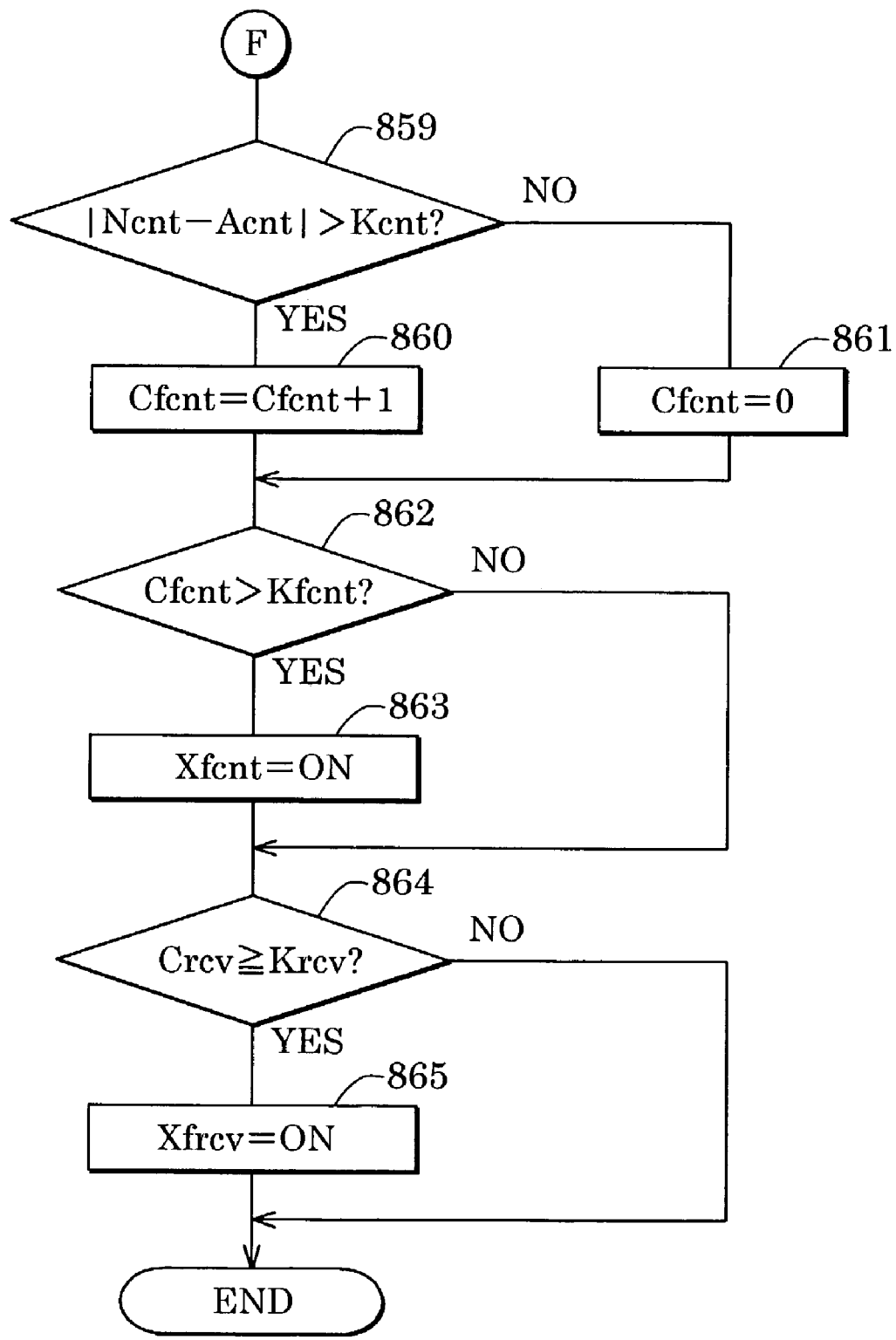
Figure 58:
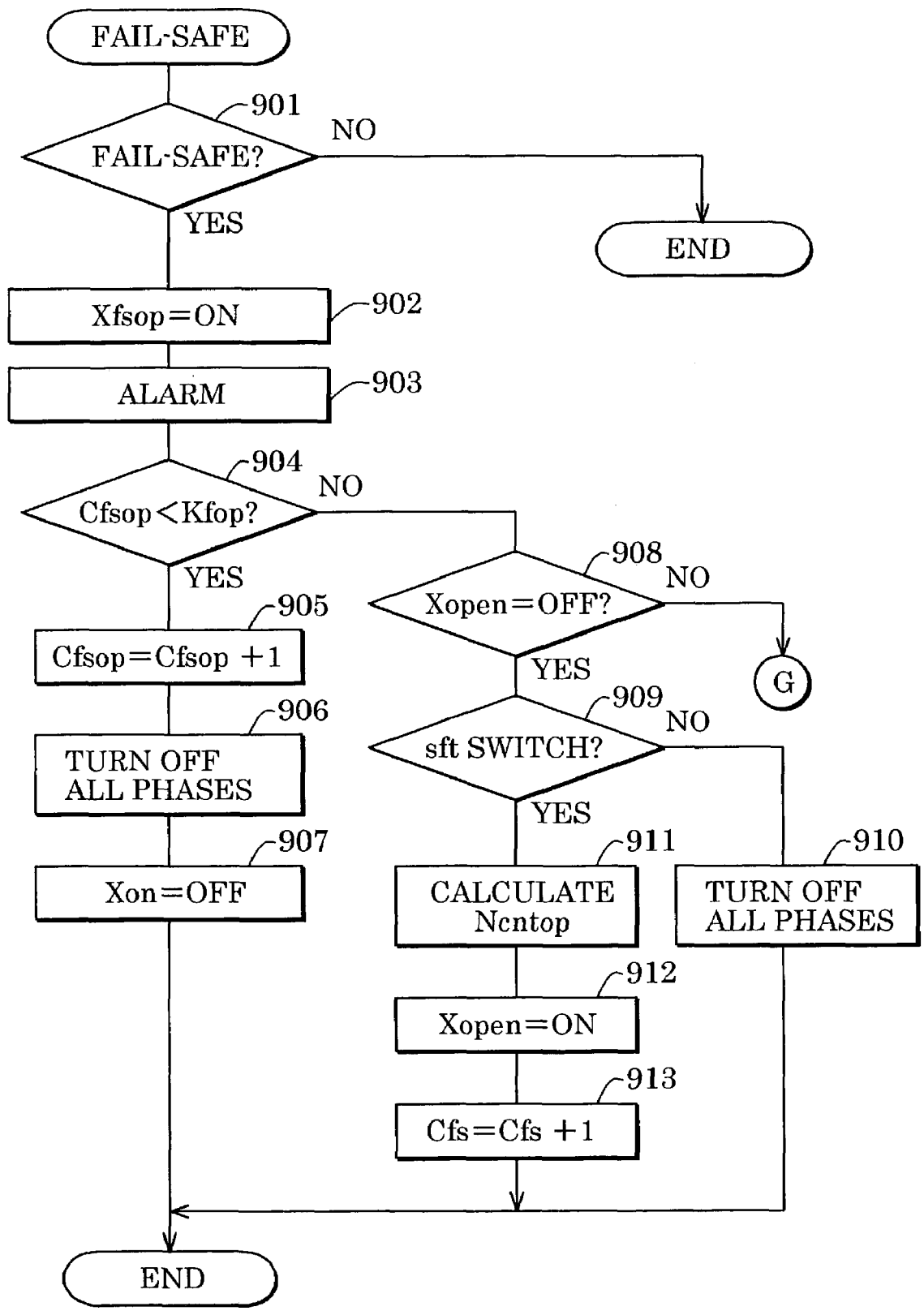
FIGS. 58 and 59 are flowcharts showing a fail-safe processing routine.
Figure 59:
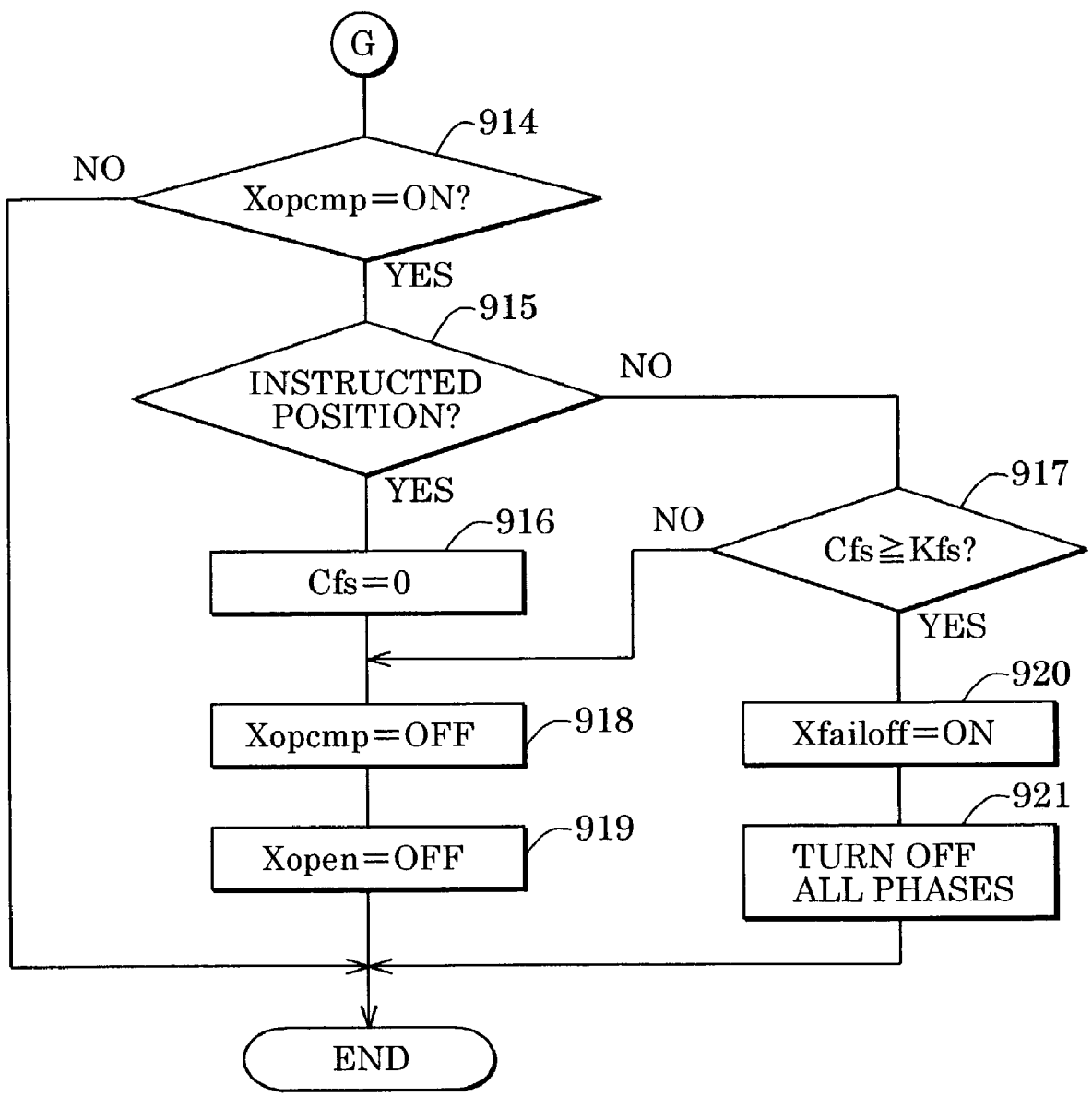

In view of the above, in this embodiment, when a failure in the feedback control system (i.e., a system abnormality) is detected by a system abnormality diagnosis routine shown in FIGS. 56 and 57, the SR motor 12 is driven by making switching to an open-loop control of a fail-safe process by means of a fail-safe processing routine shown in FIGS. 58 and 59. The open-loop control of fail-safe processing is the same as the above open-loop control of a recovery process.

If the SR motor 12 cannot be driven normally even if such fail-safe processes (open-loop controls) are executed a number of times, it should be determined that the SR motor 12 is uncontrollable because the SR motor 12 or its drive control system is in complete failure. Therefore, in this embodiment, if motor driving by a fail-safe process (open-loop control) has failed three times or more, for example, consecutively, it is determined that even the open-loop control cannot control the SR motor 12 and the current supply of the SR motor 12 is turned off. With this measure, repeated execution of open-loop controls can be avoided after it is determined that even the open-loop control cannot control the SR motor 12. The power consumption can be reduced accordingly.

In this embodiment, during an open-loop control, (i.e., during a fail-safe process or a recovery process), whether an A-phase or B-phase disconnection exists in the encoder 46 is determined by comparing the encoder count Ncnt (i.e., the count of an A-phase signal and a B-phase signal of the encoder 46) and the position count Ncntop (i.e., the count of a motor drive signal) with each other. Specifically, whether an A-phase or B-phase disconnection exists in the encoder 46 is determined on the basis of whether the difference between variations of the encoder count Ncnt and the position count Ncntop from the start of an open-loop control to its end is greater than or equal to a determination value.

For example, if both of an A-phase disconnection and a B-phase disconnection exist in the encoder 46, the encoder count Ncnt does not vary at all even if the rotor 32 is rotated during an open-loop control. If one of an A-phase disconnection and a B-phase disconnection exists in the encoder 46, the variation of the position count Ncntop inn the open-loop control becomes a half of that in a normal state. If the SR motor 12 is driven normally in an open-loop control, the variation of the encoder count Ncnt becomes a value corresponding to a rotation amount (rotation angle) of the rotor 32 in the open-loop control. Therefore, whether an A-phase or B-phase disconnection exists in the encoder 46 can be determined by comparing the encoder count Ncnt and the position count Ncntop during the open-loop control.

Further, in this embodiment, to determine whether an abnormality exists in a Z-phase signal of the encoder 46 during an open-loop control, an output interval between Z-phase signal pulses is measured on the basis of a variation of the encoder count Ncnt (i.e., a rotation angle of the rotor 32) from output of one Z-phase signal pulse to output of the next Z-phase signal pulse. Whether an abnormality exists in the Z-phase signal is determined on the basis of the measured output interval of the Z-phase signal. That is, if a variation of the encoder count Ncnt (i.e., a rotation angle of the rotor 32) from output of one Z-phase signal pulse to output of the next Z-phase signal pulse is equal to a value corresponding to the interval (in this embodiment, 45°) between the reference rotation positions of the rotor 32, the Z-phase signal is determined normal.

A state that no Z-phase signal pulse is output even if the interval between the reference rotation positions of the rotor 32 is passed has occurred several times, it is determined that a Z-phase disconnection (abnormality) exists in the encoder 46. Conversely, if a Z-phase signal pulse is output before the interval between the reference rotation positions of the rotor 32 is reached, it is determined that it is erroneous detection of a Z-phase signal pulse (i.e., an abnormality) due to noise or the like.

Whether an A-phase, B-phase, or Z-phase abnormality exists in the encoder 46 is determined in the above manner during an open-loop control. If an A-phase or B-phase disconnection (abnormality) is detected, a return from the open-loop control to a feedback control is prohibited. If the A-phase signal or the B-phase signal of the encoder 46 is abnormal, the encoder count Ncnt becomes abnormal and hence the SR motor 12 cannot be driven normally even if a feedback control in which the encoder count Ncnt is fed back is performed. Therefore, in this case, useless execution of a feedback control can be avoided by prohibiting a return to a feedback control and the rotor 32 can be rotated to a target position by the open-loop control.

If an abnormality is detected in the Z-phase signal of the encoder 46 during an open-loop control, the Z-phase correction is prohibited. This prevents an erroneous Z-phase correction at the occurrence of an abnormality in the Z-phase signal.

If a disconnection occurs in only one of the two systems of drive coils 35 and 36 of the SR motor 12 (windings 33 and 34), an open-loop control is continued by using the drive coil 35 or 36 of one system where no disconnection exists. In this case, a disconnection in the drive coil 35 or 36 is detected according to a drive coil disconnection detecting routine shown in FIG. 80 by reading voltage levels (i.e., disconnection detection signals) of input ports of the ECU 41 to which the connecting points of the resistors 61 and 62 of disconnection detection circuits 60 of the respective phases are connected.

The above position switching is performed by the ECU 41 of the position switching controller 42 according to the following routines, each of which will be described below in detail.

[Initial Drive]

Figure 8:
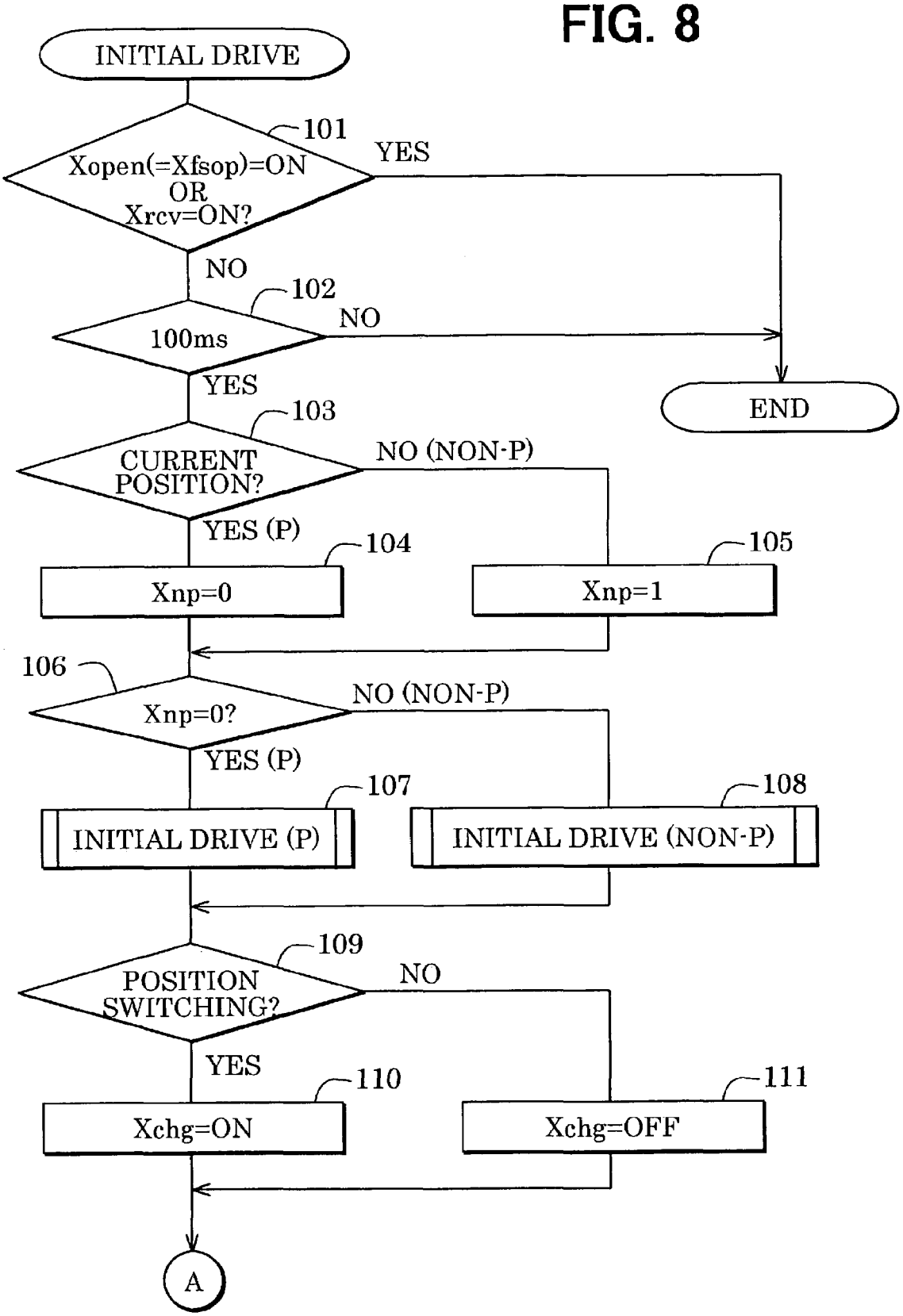
FIGS. 8 and 9 are flowcharts showing an initial drive routine.
Figure 9:
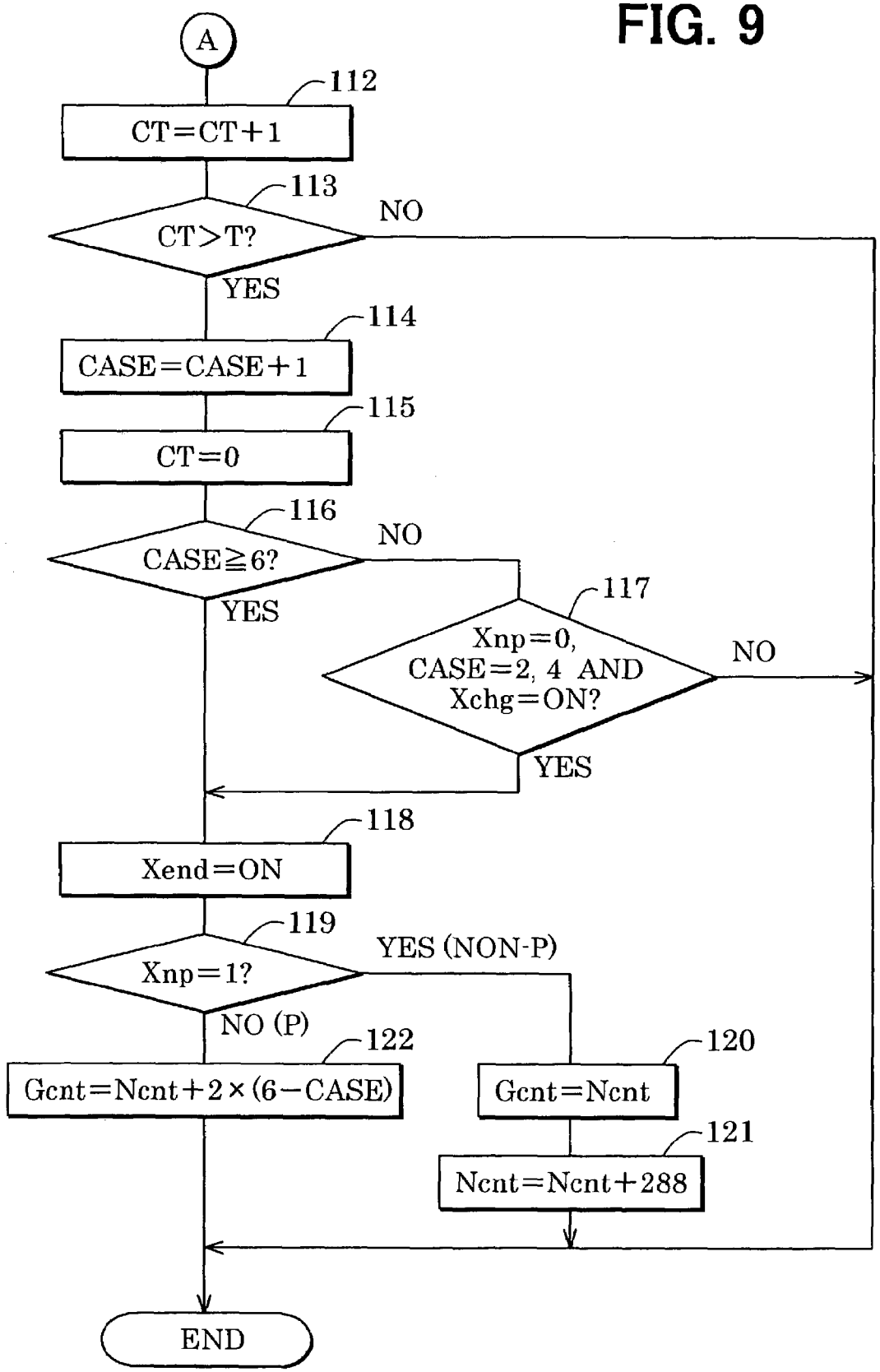

An initial drive is performed according to an initial drive routine shown in FIGS. 8 and 9. This routine is executed in a prescribed cycle (e.g., every 1 ms) until an end of the initial drive immediately after application of power to the ECU 41 (i.e., immediately after manipulation of the ignition switch from the OFF position to the ACC position).

Upon activation of this routine, at step 101, it is determined whether an open-loop control execution flag Xopen is "on" or a recovery process execution flag Xrcv is "on." The open-loop control execution flag Xopen is a flag indicating whether an open-loop control (fail-safe process) to be executed when the encoder 46 or the SR motor 12 has failed is being executed. The open-loop control execution flag Xopen being "on" means that the open-loop control is being executed. The recovery process execution flag Xrcv is a flag indicating whether a recovery process (open-loop control) to be executed temporarily upon occurrence of a temporal operation abnormality has occurred is being executed. The recovery process execution flag Xrcv being "on" means that the recovery process is being executed.

If the determination result at step 101 is "yes," this routine is finished without executing the remaining steps. If the determination result at step 101 is "no," the routine proceeds to step 102, where it is determined whether a prescribed time (e.g., 100 ms) that is a waiting time from initialization of the ECU 41 to stabilization of the output voltage of the output shaft sensor 14 has elapsed. When the prescribed time has elapsed from the initialization of the ECU 41, the routine proceeds to step 103, where an output voltage of the output shaft sensor 14 is read. Whether the current range is the P-position or the non-P-position is determined on the basis of whether the output voltage is lower than or equal to a range determination value. If the current range is the P-position, the routine proceeds to step 104, where a range determination flag Xnp is set to "0" that means the P-position. If the current range is the non-P-position, the routine proceeds to step 105, where the range determination flag Xnp is set to "1" that means the non-P-position.

Then, the routine proceeds to step 106, where it is determined whether the range determination flag Xnp is "0" (P-position). If the range determination flag Xnp is "0" (P-position), the routine proceeds to step 107, where a P-position initial drive routine shown in FIG. 10 is executed.

Figure 11:
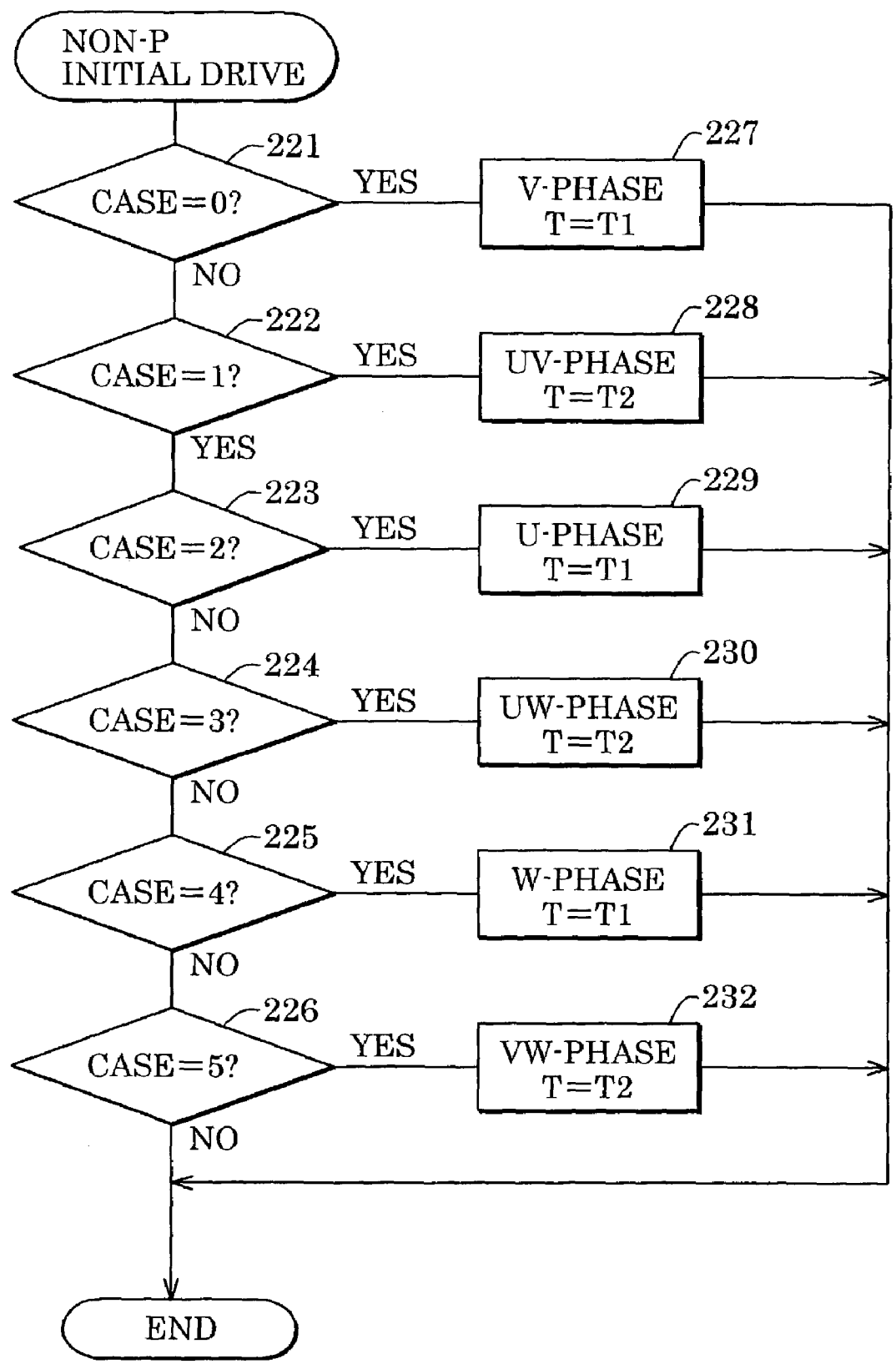
FIG. 11 is a flowchart showing a non-P-position initial drive routine.

If the range determination flag Xnp is "1" (non-P-position), the routine proceeds to step 108, where a non-P-position initial drive routine shown in FIG. 11 is executed.

Figure 10:
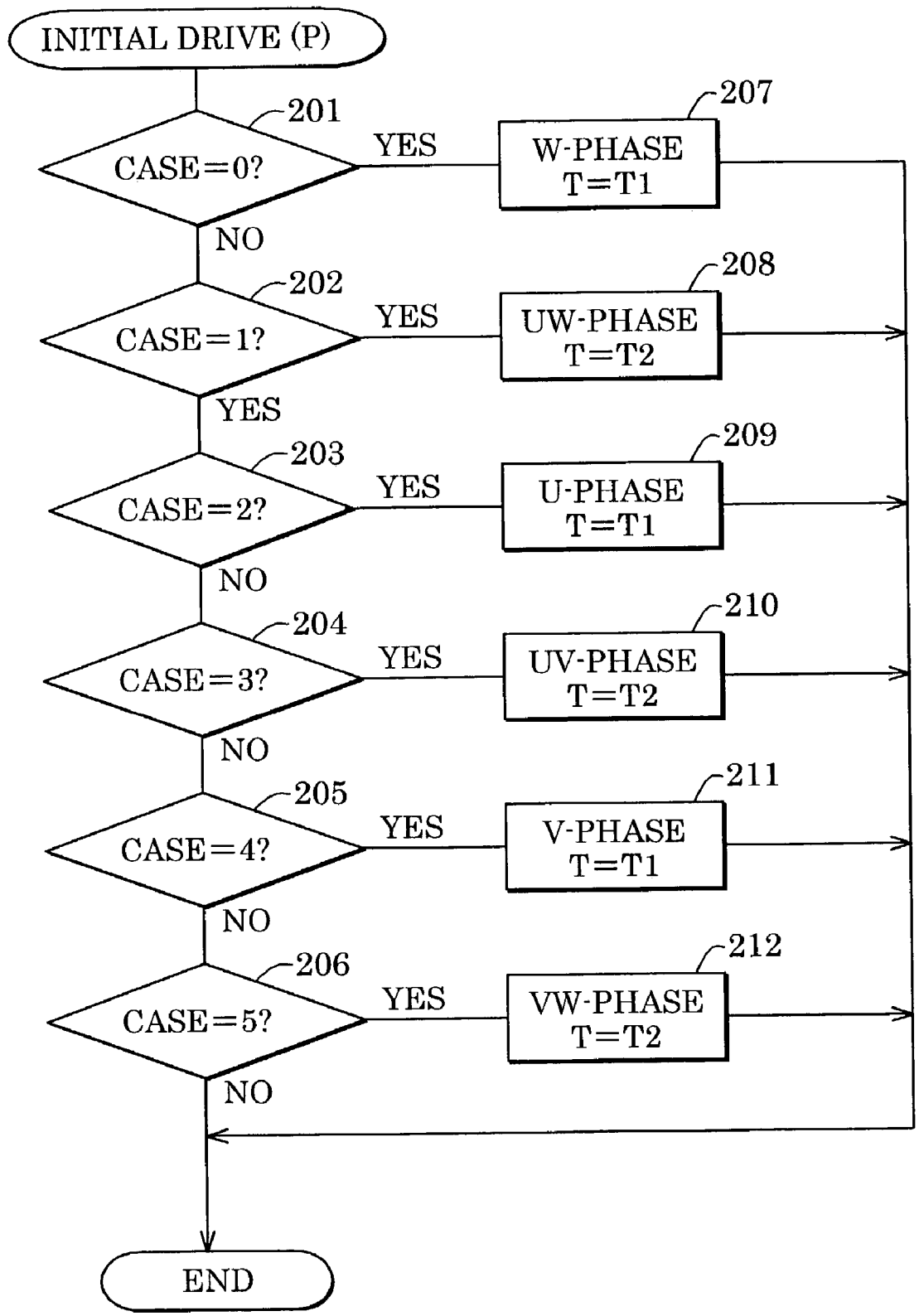
FIG. 10 is a flowchart showing a P-position initial drive routine.

If the P-position initial drive routine of FIG. 10 is activated at step 107, it is determined at steps 201-206 which of "0" to "5" the count CASE of a current-supply counter that counts the current-supply during an initial drive is equal to. The count CASE of the current-supply counter has an initial value "0" that is set in the initialization processing and is incremented by one for each current supply (step 114 in FIG. 9). A current supply phase and a current supply time T are set in the following manner in accordance with a result of the determination of the count CASE.

If CASE=0 (first current supply), the routine proceeds to step 207, where W-phase current supply is selected and the current supply time T is set to Ti (e.g., 10 ms).

If CASE=1 (second current supply), the routine proceeds to step 208, where U/W-phase current supply is selected and the current supply time T is set to T2 (e.g., 100 ms).

If CASE=2 (third current supply), the routine proceeds to step 209, where U-phase current supply is selected and the current supply time T is set to T1 (e.g., 10 ms).

If CASE=3 (fourth current supply), the routine proceeds to step 210, where U/V-phase current supply is selected and the current supply time T is set to T2 (e.g., 100 ms).

If CASE=4 (fifth current supply), the routine proceeds to step 211, where V-phase current supply is selected and the current supply time T is set to T1 (e.g., 10 ms).

If CASE=5 (sixth current supply), the routine proceeds to step 212, where V/W-phase current supply is selected and the current supply time T is set to T2 (e.g., 100 ms).

With the above steps, in the case where the initial drive should be performed with the P-position, current supply is effected all the phases around in order of W-phase U and W-phases U-phase→U and V-phases→V-phase→V and W-phases, whereby the rotor 32 is driven in the normal rotation direction (i.e., the rotation direction from the P position to the non-P-position). In this case, the one-phase current supply time T1 is set shorter than the two-phase current supply time T2.

On the other hand, if the non-P-position initial drive routine of FIG. 11 is activated at step 108, it is determined at steps 221-226 which of "0" to "5" the count CASE of the current-supply counter is equal to. A current supply phase and a current supply time T are set in the following manner in accordance with a result of the determination of the count CASE.

If CASE=0 (first current supply), the routine proceeds to step 227, where V-phase current supply is selected and the current supply time T is set to T1 (e.g., 10 ms).

If CASE=1 (second current supply), the routine proceeds to step 228, where U/V-phase current supply is selected and the current supply time T is set to T2 (e.g., 100 ms).

If CASE=2 (third current supply), the routine proceeds to step 229, where U-phase current supply is selected and the current supply time T is set to T1 (e.g., 10 ms).

If CASE=3 (fourth current supply), the routine proceeds to step 230, where U/W-phase current supply is selected and the current supply time T is set to T2 (e.g., 100 ms).

If CASE=4 (fifth current supply), the routine proceeds to step 231, where W-phase current supply is selected and the current supply time T is set to T1 (e.g., 10 ms).

If CASE=5 (sixth current supply), the routine proceeds to step 232, where V/W-phase current supply is selected and the current supply time T is set to T2 (e.g., 100 ms).

With the above steps, in the case where the initial drive should be performed with the non-P-position, current supply is effected all the phases around in order of V-phase→U and V-phases→U-phase→U and W-phases→W-phase→V and W-phases, whereby the rotor 32 is driven in the reverse rotation direction (i.e., the rotation direction from the non-P position to the P-position). Also in this case, the one-phase current supply time T1 is set shorter than the two-phase current supply time T2.

After the P-position initial drive routine of FIG. 10 or the non-P-position initial drive routine of FIG. 11 is executed in the above manner, the routine proceeds to step 109 shown in FIG. 8, where it is determined whether a position switching manipulation (i.e., a manipulation on the P-position switch 43 or the non-P-position switch 44) has been performed during the initial drive. If a position switching manipulation has been performed during the initial drive, the routine proceeds to step 110, where a position switching manipulation flag Xchg is set to "on." If no position switching manipulation has been performed, the routine proceeds to step 111, where the position switching manipulation flag Xchg is set to "off."

Then, the routine proceeds to step 112 shown in FIG. 9, where the count CT of a counter that counts the current supply time of the current supply phase is incremented. At the next step 113, it is determined whether the current supply time CT of the current supply phase has exceeded the current supply time T that was set in the routine of FIG. 10 or 11. If the current supply time CT has not exceeded the current supply time T, this routine is finished without executing the remaining steps. In this manner, current supply is continued for the current supply phase until the current supply time CT of the current supply phase exceeds the current supply time T (=T1 or T2) that was set in the routine of FIG. 10 or 11.

Then, at an instant when the current supply time CT of the current supply phase has exceeded the current supply time T (=T1 or T2) that was set in the routine of FIG. 10 or 11, the routine proceeds to step 114, where the count CASE of the current-supply counter is incremented by one and the current supply phase is switched to the next phase. At the next step 115, the count CT of the current supply time counter is reset. At the next step 116, it is determined whether the count CASE of the current-supply counter has reached "6" meaning that the initial drive should be finished. If the count CASE has reached "6," the routine proceeds to step 118, where an initial drive end flag Xend is set to "on" meaning that the initial drive should be finished.

If the count CASE has not reached "6" yet, that is, if the initial drive should be continued, the routine proceeds to step 117, where it is determined whether a condition for terminating the initial drive halfway is satisfied. Whether the condition for terminating the initial drive halfway is satisfied is determined according to the following three criteria:

(1) The range determination flag Xnp is "0" (P-position).

(2) The count CASE of the current-supply is equal to 2 or 4, that is, two-phase current supply has finished.

(3) The position switching manipulation flag Xchg is "on," that is, a position switching manipulation has been performed during the initial drive.

If at least one of the criteria (1) to (3) is not met, the condition for terminating the initial drive halfway is not satisfied and hence the initial drive is continued. In contrast, if all the three criteria (1) to (3) are met, the condition for terminating the initial drive halfway is satisfied and the routine proceeds to step 118, where the initial drive end flag Xend is set to "on" meaning that the initial drive should be finished.

Then, the routine proceeds to step 119, where it is determined whether the range determination flag Xnp is "1" (i.e., whether the initial drive has been performed with the non-P-position). If the range determination flag Xnp is "1," the routine proceeds to step 120, where an encoder count Ncnt at the end of the initial drive is stored as an initial positional deviation learned value Gcnt. At the next step 121, the encoder count Ncnt is corrected to a value having the non-P position as a reference according to the following equation:

$$Ncnt=Ncnt+288$$

In this embodiment, if the encoder count Ncnt is increased starting from the P-position holding position that is the zero-count position, the encoder count Ncnt becomes 288, for example, when the rotor 32 has rotated to the non-P-position holding position. Therefore, if the initial drive is performed with the non-P-position, an encoder count Ncnt at the end of the initial drive is corrected to a value having the non-P position as a reference by adding 288 to it.

On the other hand, if it is determined at step 119 that the range determination flag Xnp is "0" (the initial drive has been performed with the P-position), the routine proceeds to step 122, where an initial positional deviation learned value Gcnt is calculated according to the following equation by using the encoder count Ncnt at the end of the initial drive:

$$Gcnt=Ncnt+2\times(6-CASE)$$

If the initial drive has finished without being terminated halfway, the count CASE should be equal to 6 because of the repeated execution of step 114 and an encoder count at the end of the initial drive is employed as an initial positional deviation learned value Gcnt as it is. However, where the initial drive is performed with the P-position, if a position switching manipulation is performed during the initial drive, a transition is made to an ordinary drive after completion of the next two-phase current supply (after completion of the current two-phase current supply if a position switching request occurs during the current two-phase current supply). Therefore, an encoder count Ncnt that would be obtained if the initial drive were finished without being terminated halfway is inferred and an inferred value is employed as an initial positional deviation learned value Gcnt. The term "$2\times(6-CASE)$" is a count increase (hereinafter referred to as "Ncnt correction value") corresponding to a rotation angle of current supply attempts that were not made.

Figure 14:
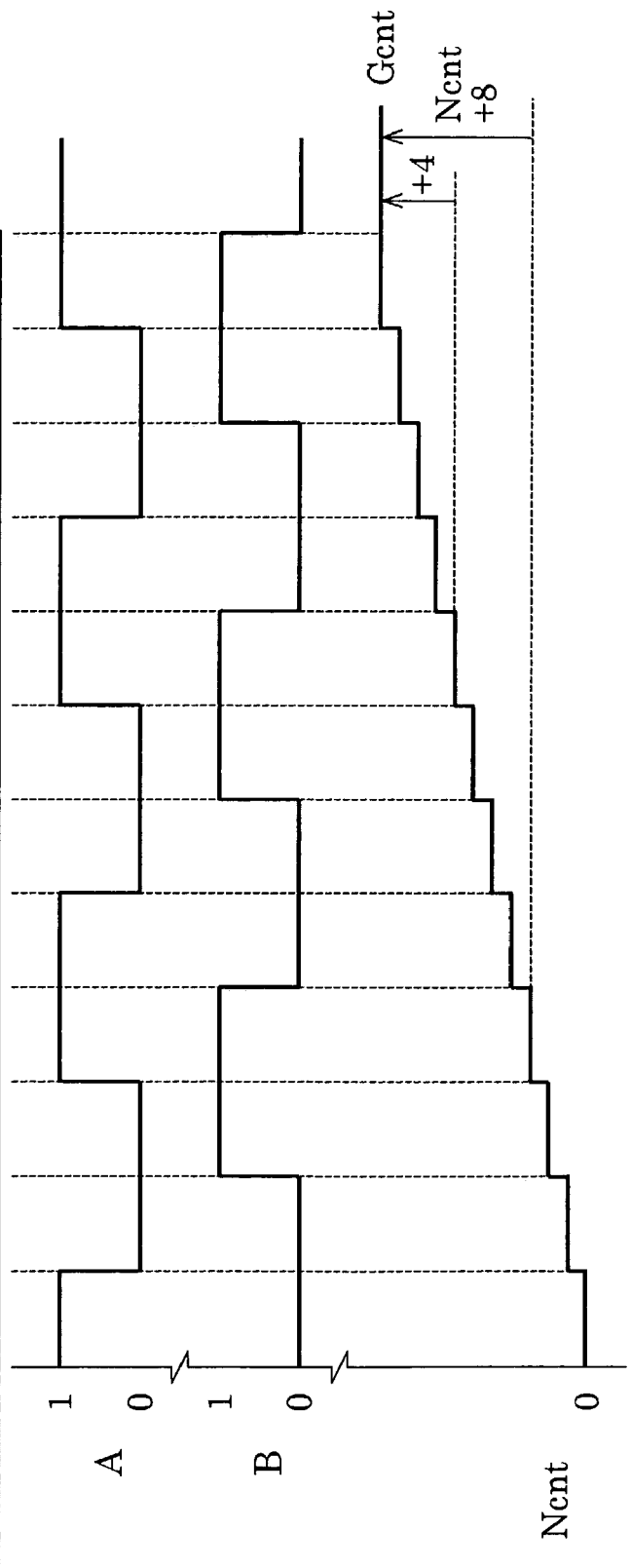
FIG. 14 is a time chart illustrating an initial positional deviation learning method in a case that a position switching manipulation is performed during an initial drive.

FIG. 14 is a time chart illustrating a relationship among the count CASE of the current-supply counter, the Ncnt correction value, the current supply phase, the A-phase signal, the B-phase signal, and the encoder count Ncnt in an initial drive. For example, when an initial drive is finished at the end of U/W-phase current supply (the count CASE of the current-supply counter changes from 1 to 2), the Ncnt correction value becomes $2\times(6-CASE)=2\times(6-2)=8$. When an initial drive is finished at the end of U/V-phase current supply (the count CASE of the current-supply counter changes from 3 to 4), the Ncnt correction value becomes $2\times(6-CASE)=2\times(6-4)=4$.

[Encoder Counter]

Figures 15, 16:
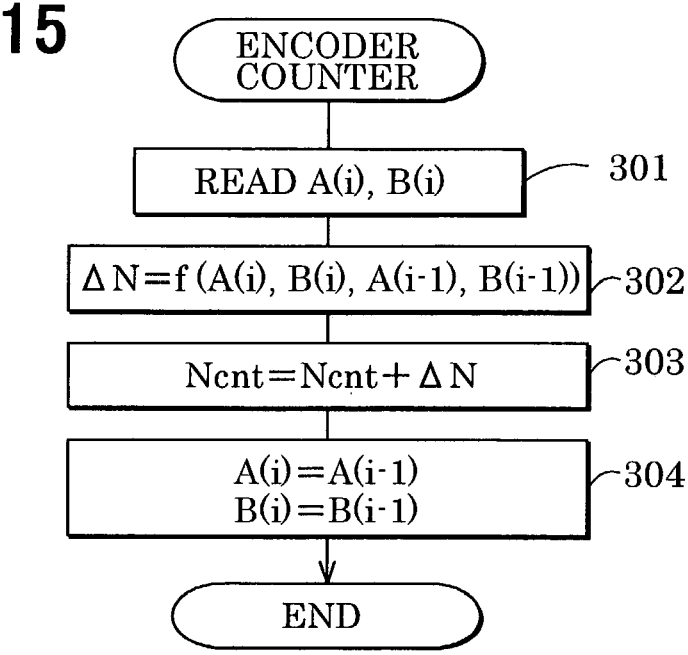
FIG. 15 is a flowchart showing an encoder counter routine.
FIG. 16 shows an exemplary count increment $\Delta N$ calculation map.

Next, the details of an encoder counter routine shown in FIG. 15 will be described. This routine is activated by A/B-phase interruption processing in synchronism with both of rising edges and trailing edges of an A-phase signal and a B-phase signal and counts both of rising edges and trailing edges in the following manner. Upon activation of this routine, at step 301, a value A(i) of the A-phase signal and a value B(i) of the B-phase signal are read. At the next step 302, a count increment $\Delta N$ corresponding to the current values A(i) and B(i) and preceding values A(i−1) and B(i−1) of the A-phase signal and the B-phase signal is calculated by searching a count increment ΔN calculation map shown in FIG. 16.

Figure 17:
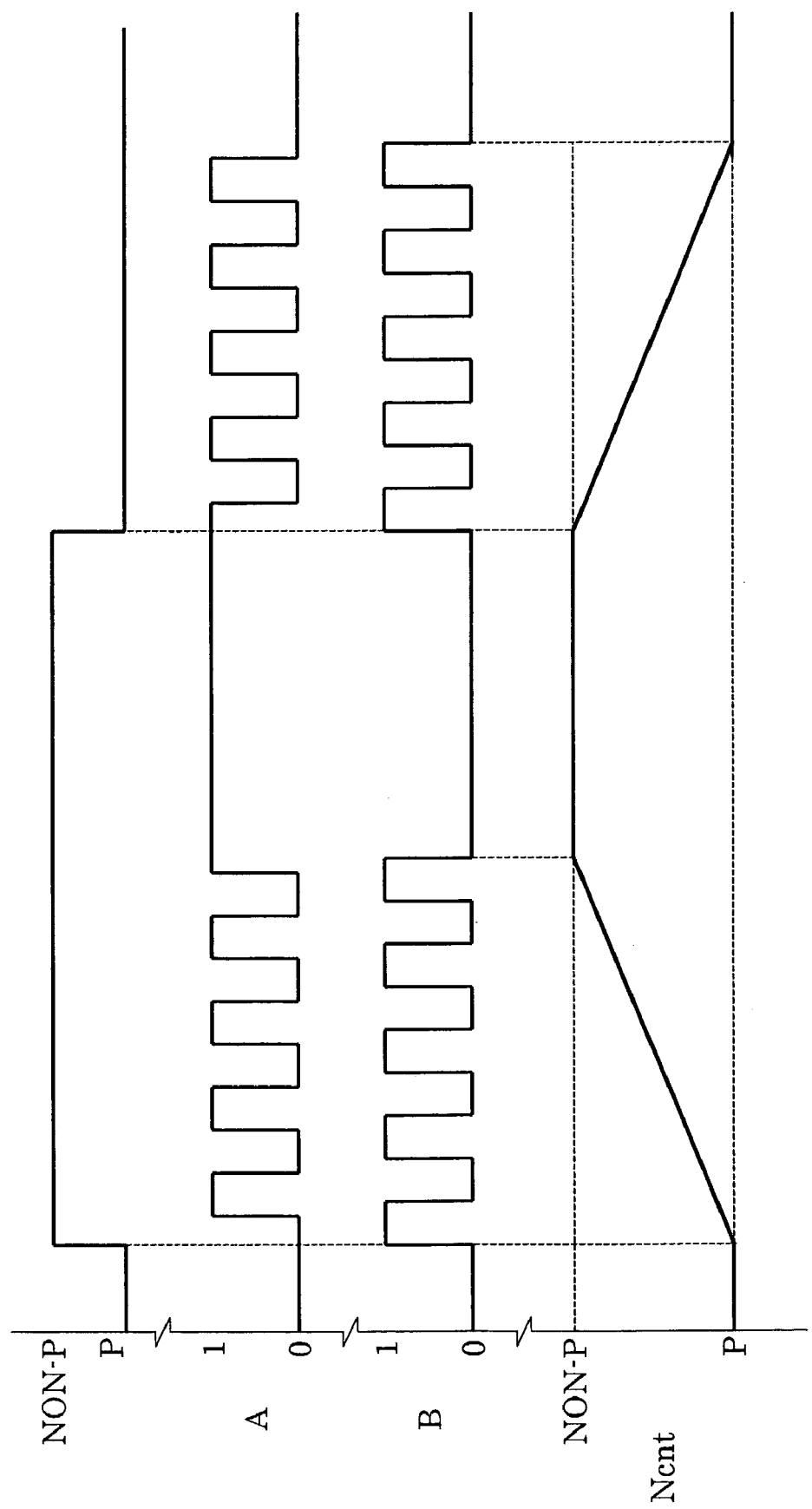
FIG. 17 is a time chart showing a relationship between an instructed shift position, an A-phase signal, a B-phase signal, and an encoder count.

The reason for using the current values A(i) and B(i) and the preceding values A(i−1) and B(i−1) of the A-phase signal and the B-phase signal is to determine a rotation direction of the rotor 32 on the basis of order of occurrence of the A-phase signal and the B-phase signal. As shown in FIG. 17, in the case of normal rotation (i.e., the rotation direction from the P-position to the non-P-position), the encoder count Ncnt is increased by giving the plus sign to the count increment ΔN. In the case of reverse rotation (i.e., the rotation direction from the non-P-position to the P-position), the encoder count Ncnt is decreased by giving the minus sign to the count increment ΔN.

After the calculation of the count increment ΔN, the routine proceeds to step 303, where a new encoder count Ncnt is calculated by adding the count increment ΔN as calculated at step 302 to the preceding encoder count Ncnt. At the next step 304, for the next counting processing, the current values A(i) and B(i) of the A-phase signal and the B-phase signal are stored as values A(i−1) and B(i−1), respectively.

[Control Mode Setting]

Figure 20:
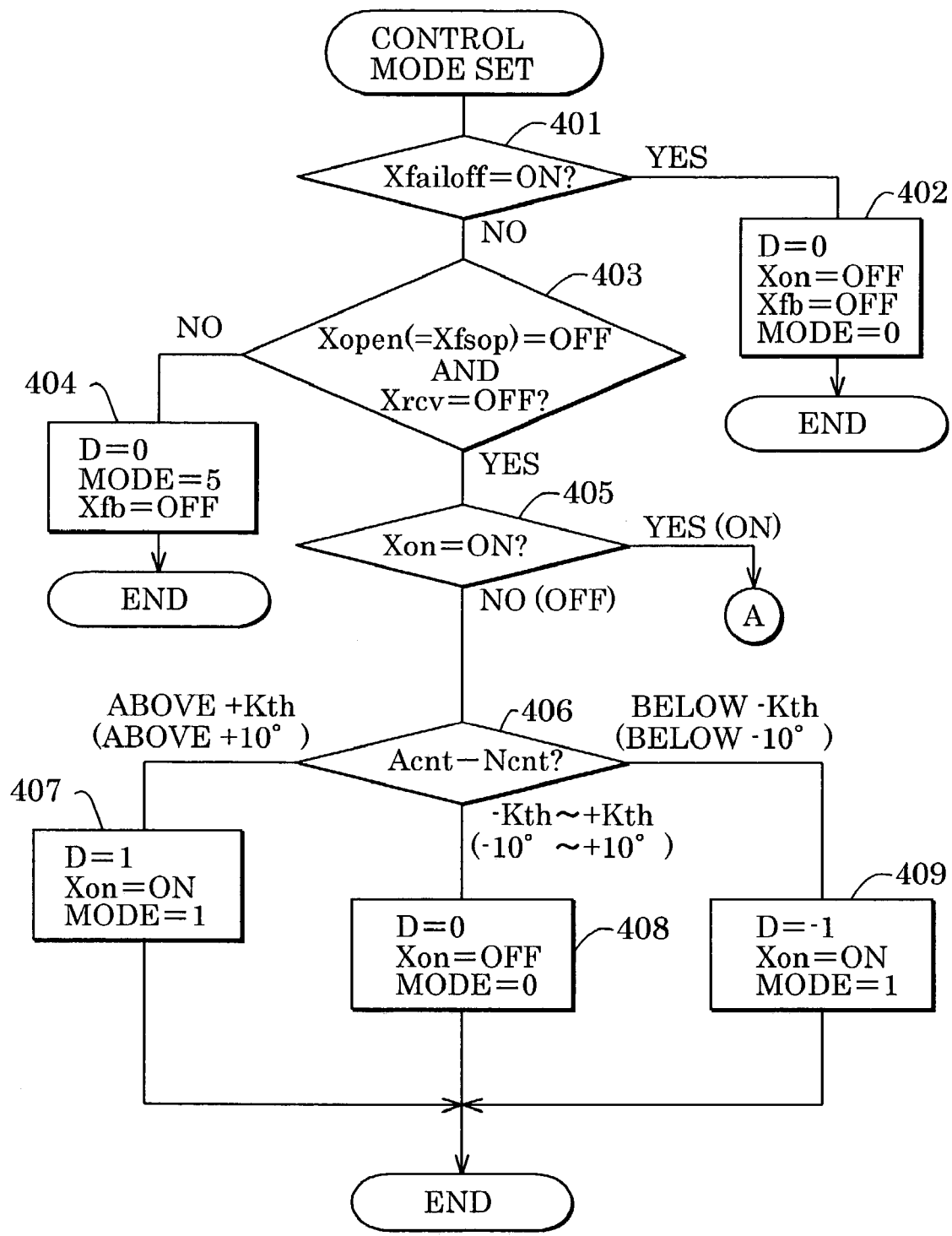

A control mode setting routine shown in FIGS. 20-22, which is executed every predetermined time (e.g., every 1 ms) after the end of an initial drive, specifies a control mode in the following manner by setting a control mode determination value "mode" to one of 0, 1, 3, 4, and 5.

| | |
|---|---|
| mode = 0: | current supply off (standby) |
| mode = 1: | ordinary drive (feedback control start position stopping and holding process and feedback control) |
| mode = 3: | target position stopping and holding process |
| mode = 4: | reversing position stopping and holding process |
| mode = 5: | open-loop control |

Upon activation of the control mode setting routine, at step 401, it is determined whether a system failure flag Xfailoff is set to "on" meaning that the position switching control apparatus 42 is in failure. If the flag Xfailoff is "on," the routine proceeds to step 402, where a process for keeping the SR motor 12 in a current supply-off state is executed, whereupon the following settings are made: a rotation direction instruction value D=0 (stop), a current supply flag Xon=off (current supply off), a feedback permission flag Xfb=off (a feedback control prohibited), and the control mode determination value "mode"=0 (current supply off).

On the other hand, if the system failure flag Xfailoff is "off" (no failure), the routine proceeds from step 401 to step 403, where it is determined whether a fail-safe process execution flag Xfsop is "off" and the recovery process execution flag Xrcv is "off." If one or both of the fail-safe process execution flag Xfsop and the recovery process execution flag Xrcv are "on," the routine proceeds to step 404, where the following settings are made to execute an open-loop control: the rotation direction instruction value D=0 (stop), the control mode determination value "mode"=5 (open-loop control), and the feedback permission flag Xfb=off (a feedback control prohibited).

If both of the fail-safe process execution flag Xfsop and the recovery process execution flag Xrcv are "off," the routine proceeds to step 405, where it is determined whether the current supply flag Xon is "on" (current supply on). If the current supply flag Xon is "off" (current supply off), the routine proceeds to step 406, where the difference between a target count Acnt and an encoder count Ncnt (i.e., the difference between a target position and a position of the rotor 32) is calculated and it is determined on the basis of the difference Acnt−Ncnt which of normal rotation (i.e., rotation from the P-position position to the non-P-position position), reverse rotation (i.e., rotation from the non-P-position position to the P-position position), and a stop the current rotation mode is. At this time, a value as corrected by using an initial positional deviation learned value Gcnt that was learned in the initial drive routine of FIGS. 8 and 9 is used as the encoder count Ncnt:

Ncnt=Ncnt−Gcnt

Figure 45:
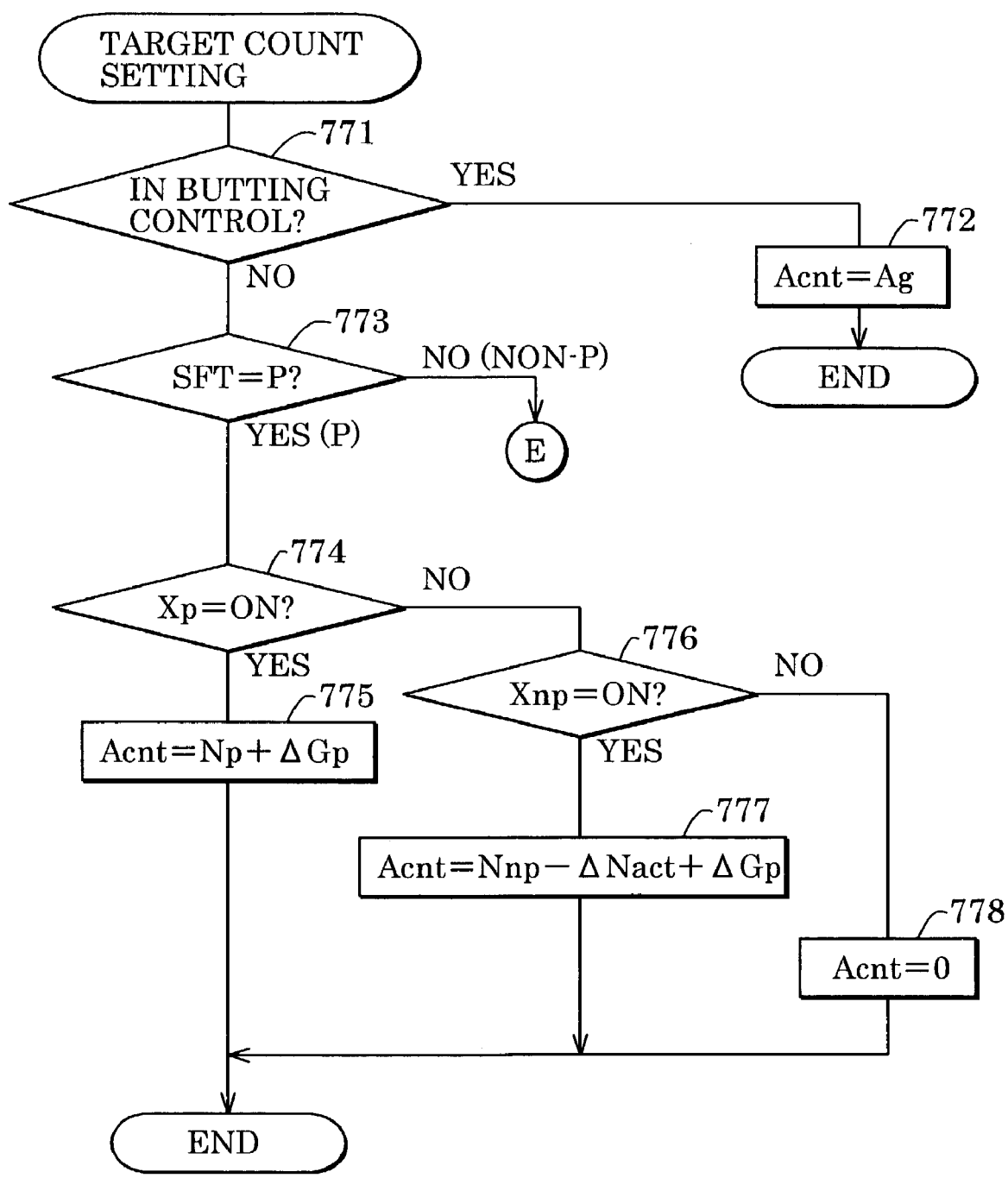
FIGS. 45 and 46 are a flowchart showing a target count setting routine.
Figure 46:
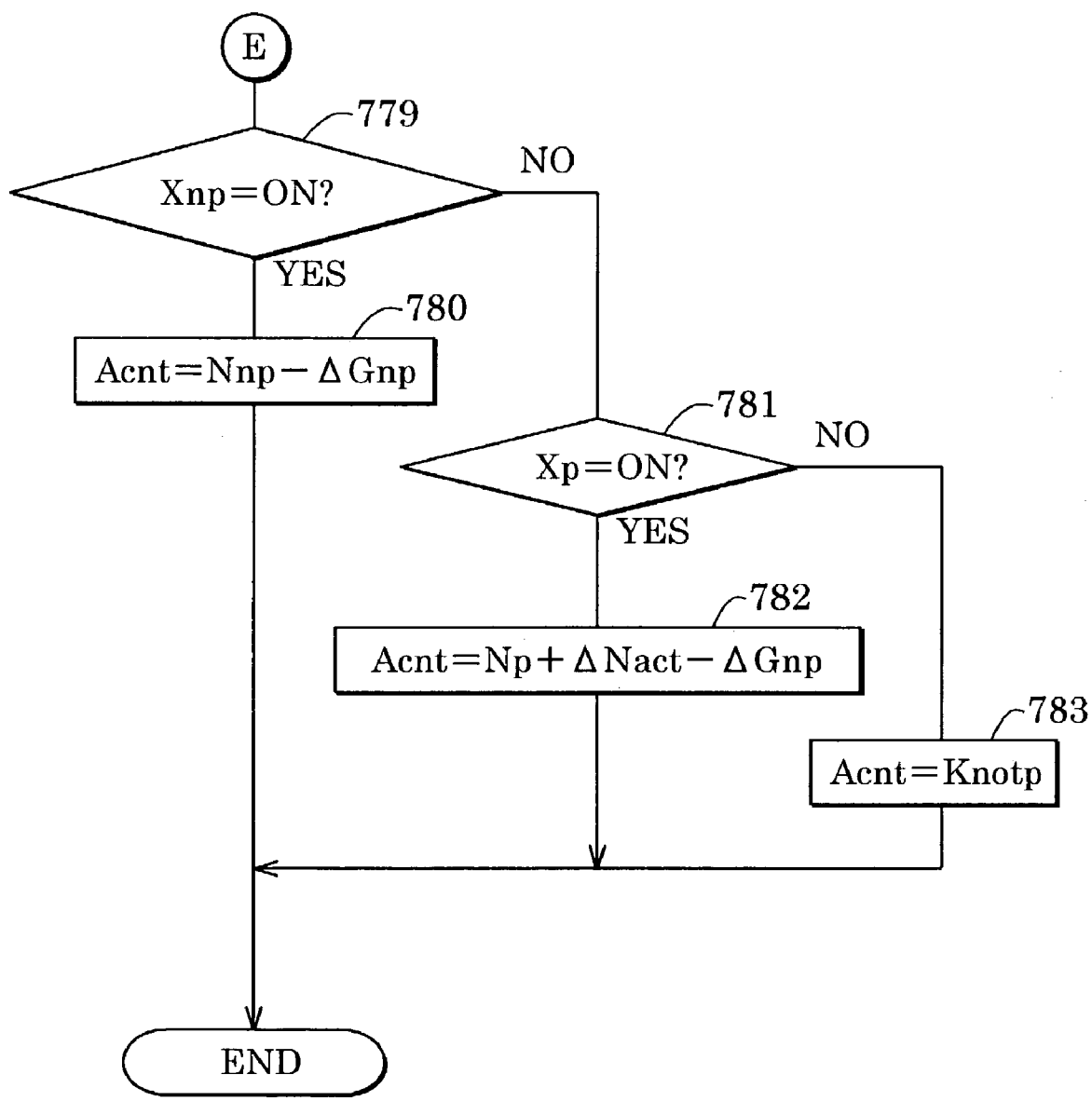

The target count Acnt is set by a target count setting routine shown in FIGS. 45 and 46.

If the difference Acnt−Ncnt between the target count Acnt and the encoder count Ncnt is greater than or equal to +Kth (e.g., +10°), it is determined that the rotor 32 needs to be rotated in the normal direction (i.e., the rotation direction from the P-position position to the non-P-position position). The routine proceeds to step 407, where the following settings are made: the rotation direction instruction value D=1 (normal rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is smaller than or equal to −Kth (e.g., −10°), it is determined that the rotor 32 needs to be rotated in the reverse direction (i.e., the rotation direction from the non-P-position position to the P-position position). The routine proceeds to step 409, where the following settings are made: the rotation direction instruction value D=−1 (reverse rotation), the current supply flag Xon=on (current supply on), and the control mode determination value "mode"=1 (feedback control start position stopping and holding process and feedback control).

If the difference Acnt−Ncnt between the target count Acnt and the encoder count Ncnt is in a range of −Kth to +Kth (e.g., −10° to +10°), it is determined that the rotor 32 can be kept at the target position by spring force of the detent spring 23 (i.e., it is not necessary to energize the SR motor 12). The routine proceeds to step 408, where the following settings are made to keep the SR motor 12 in a current supply-off state: the rotation direction instruction value D=0 (stop), the current supply flag Xon=of f (current supply off), and the control mode determination value "mode"=0 (current supply off).

Figure 21:
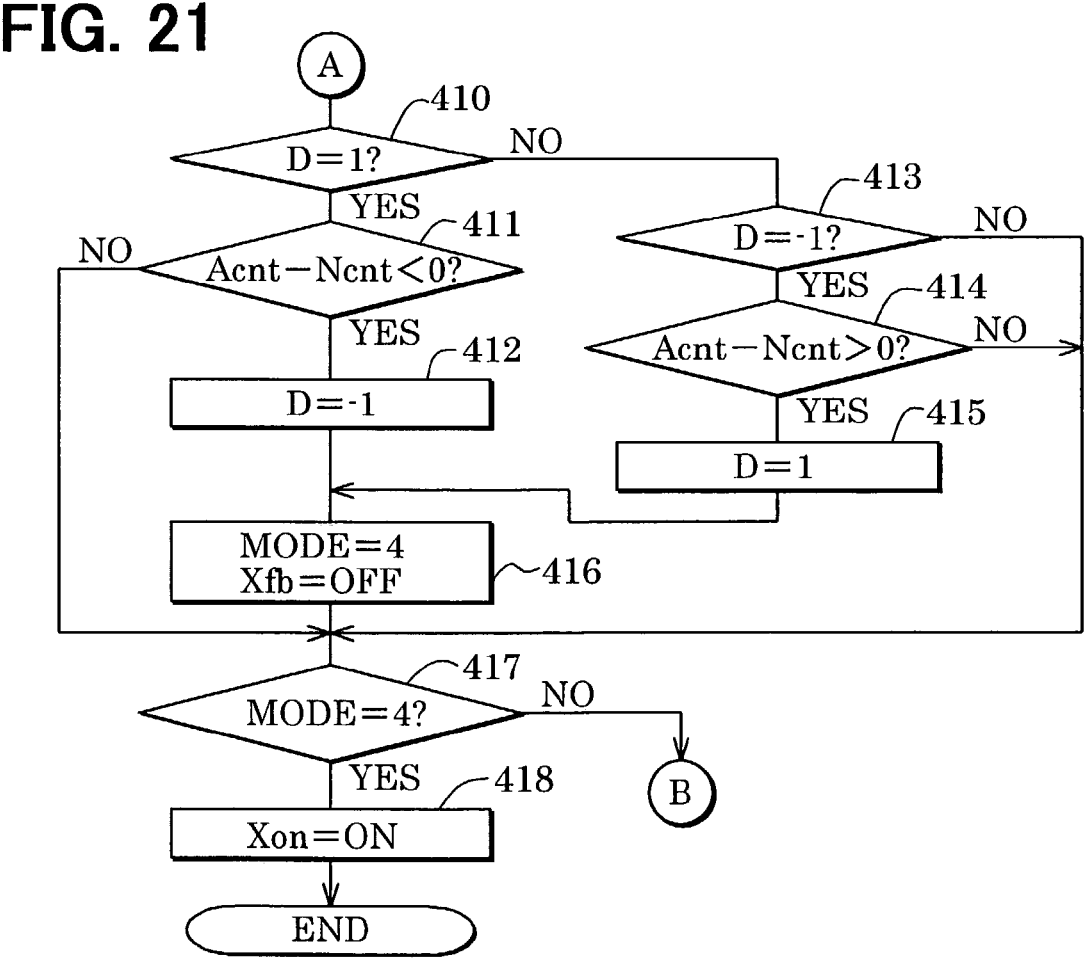
FIGS. 20-22 are flowcharts showing a control mode setting routine.

On the other hand, if it is determined at step 405 that the current supply flag Xon is "on" (current supply on), steps 410-415 shown in FIG. 21 are executed, whereby it is determined whether the instructed shift position (target position) has been reversed and, if the instructed shift position has been reversed, the rotation direction instruction value D is reversed.

More specifically, first, it is determined at step 410 whether the rotation direction instruction value D is equal to "1" (normal rotation). If the rotation direction instruction value D is equal to "1" (normal rotation), the routine proceeds to step 411, where whether it is necessary to change the rotation direction of the rotor 32 from the normal direction to the reverse direction is determined on the basis of whether the difference Acnt−Ncnt between the target count Acnt and the encoder count Ncnt has a negative value.

If it is necessary to change the rotation direction of the rotor 32 that way, the routine proceeds to step 412, where the rotation direction instruction value D is set to "−1" (reverse rotation).

In contrast, if it is determined at step 410 that the rotation direction instruction value D is not equal to "1" (normal rotation), that is, if it is determined that the value D is equal to "0" or "−1," the routine proceeds to step 413, where it is determined whether the rotation direction instruction value D is equal to "−1" (reverse rotation). If the value D is equal to "−1" (reverse rotation), the routine proceeds to step 414, where whether it is necessary to change the rotation direction of the rotor 32 from the reverse direction to the normal direction is determined on the basis of whether the difference Acnt−Ncnt between the target count Acnt and the encoder count Ncnt has a positive value. If it is necessary to change the rotation direction of the rotor 32 that way, the routine proceeds to step 415, where the rotation direction instruction value D is set to "1" (normal rotation).

If the rotation direction instruction value D has been reversed in the above manner, the routine proceeds to step 416, where the following settings are made to reverse the rotation direction of the rotor 32: the control mode determination value "mode"=4 (reversing position stopping and holding process) and the feedback permission flag Xfb=off (feedback control prohibited). Then, the routine proceeds to step 417. On the other hand, if the rotation direction instruction value D has not been reversed, the routine proceeds to step 417 skipping step 416.

At step 417, it is determined whether the control mode determination value "mode" is equal to "4" (reversing position stopping and holding process). If the determination result is "yes," the routine proceeds to step 418, where the current supply flag Xon is set to "on" (current supply on), whereupon a reversing position stopping and holding process is executed.

Figure 22:
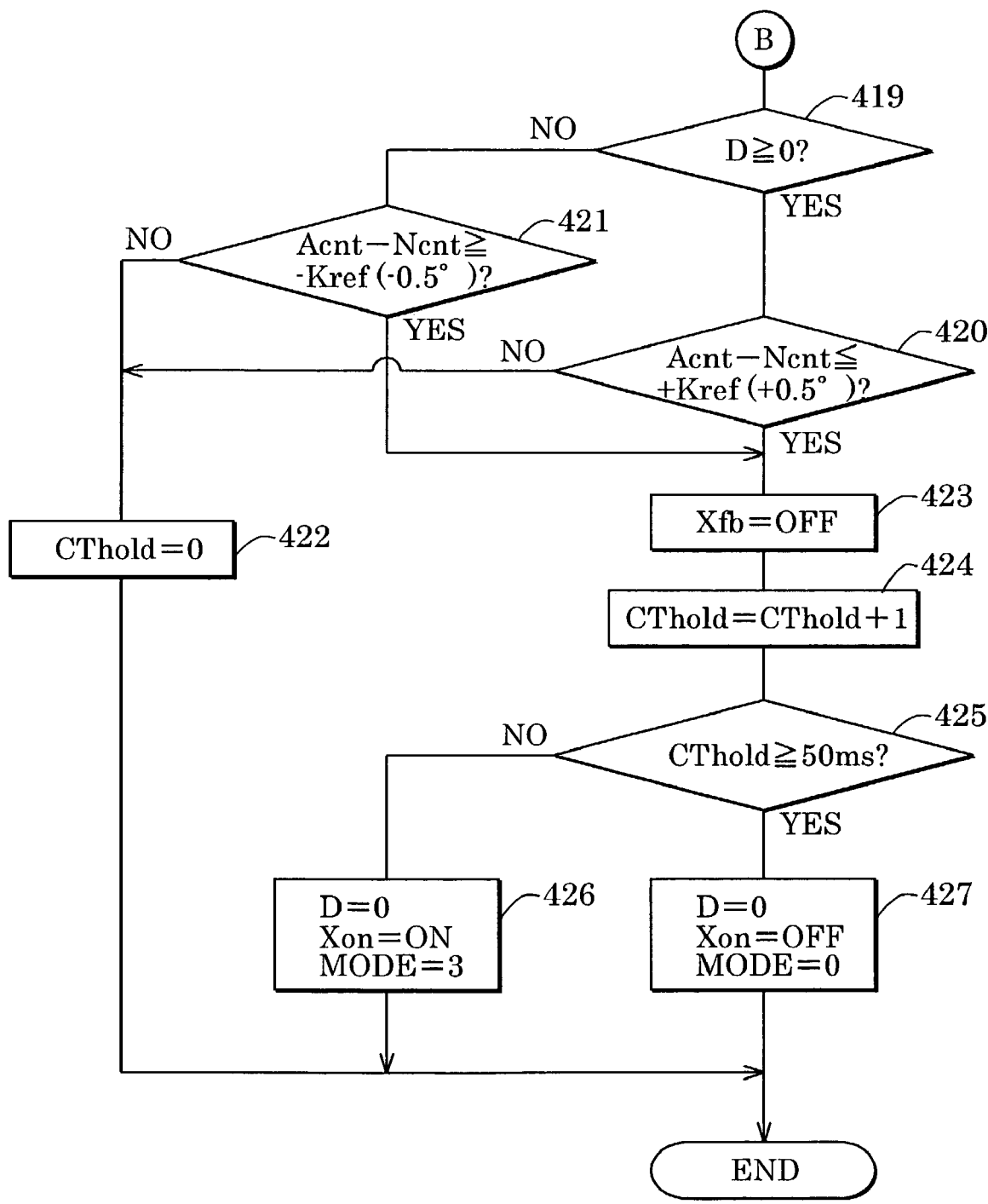

On the other hand, if the determination result at step 417 is "no" (i.e., a reversing position stopping and holding process is not be executed), steps 419-421 shown in FIG. 22 are executed, whereby it is determined whether the feedback control should be finished. Specifically, it is determined at step 419 whether the rotation direction instruction value D is greater than or equal to "0" (normal rotation or a stop). If the value D≧0, the routine proceeds to step 420, where whether the feedback control should be finished is determined on the basis of whether the difference Acnt−Ncnt between the target count Acnt and the encoder count Ncnt is smaller than or equal to +Kref (e.g., +0.5°). If the rotation direction instruction value D is equal to "−1" (reverse rotation), the routine proceeds to step 421, where whether the feedback control should be finished is determined on the basis of whether the difference Acnt−Ncnt between the target count Acnt and the encoder count Ncnt is greater than or equal to −Kref (e.g., −0.5°).

That is, by setting the feedback control end determination value Kref to the phase lead (e.g., 2 to 4 counts) of the current supply phase, the feedback control is finished at an instant that precedes, by a time corresponding to the phase lead of the current supply phase, an instant that is determined by the target count Acnt. With this measure, the last current supply phase of the feedback control comes to coincide with a current supply phase with which the rotor 32 is to be stopped and kept at the target position (target count Acnt).

If the determination result at step 420 or 421 is "no" (i.e., the feedback control should not be finished), the routine proceeds to step 422, where the count CThold of a stopping and holding time counter for counting the time of a target position stopping and holding process is reset.

On the other hand, if the determination result at step 420 or 421 is "yes" (i.e., the feedback control should be finished), the routine proceeds to step 423, where the feedback permission flag Xfb is set to "off" (feedback control prohibited), whereupon the feedback control is finished and a transition is made to a target position stopping and holding process. At the next step 424, the count CThold of the stopping and holding time counter is incremented to count the time of the target position stopping and holding process.

Then, at step 425, it is determined whether the time CThold of the target position stopping and holding process has reached a prescribed time (e.g., 50 ms). If the time CThold has not reached the prescribed time (e.g., 50 ms) yet, the routine proceeds to step 426, where the following settings are maintained to continue the target position stopping and holding process: the rotation direction instruction value D=0 (stop), the current supply flag Xon=on (current supply on), and the control mode determination value "mode"=3 (target position stopping and holding process).

When the time CThold of the target position stopping and holding process has reached the prescribed time (e.g., 50 ms), the routine proceeds to step 427, where the following settings are made to turn off the current supply of the SR motor 12: the rotation direction instruction value D=0 (stop), the current supply flag Xon=off (current supply off), and the control mode determination value "mode"=0 (current supply off).

[Time-synchronous Motor Control]

Figure 23:
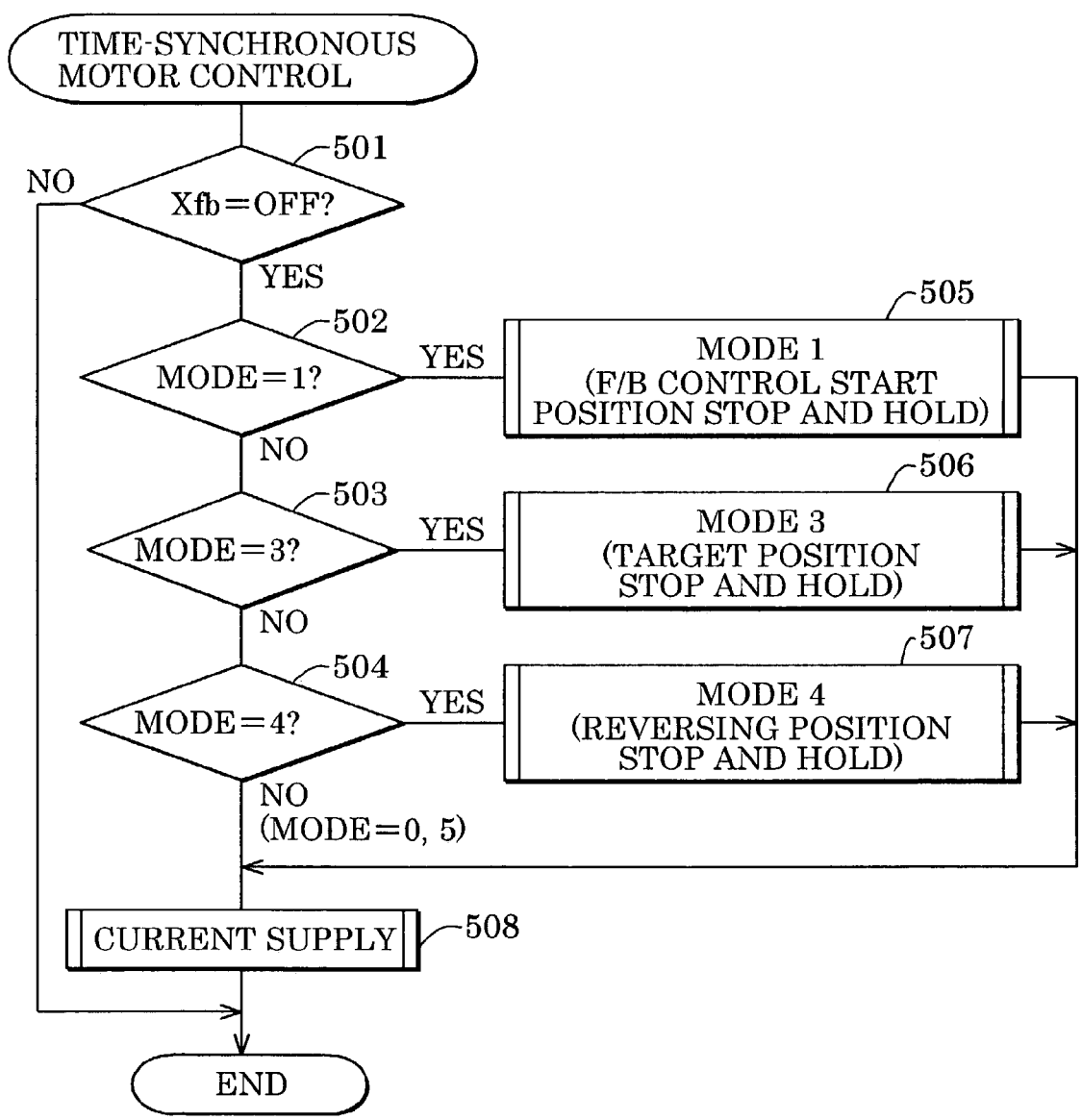
FIG. 23 is a flowchart showing a time-synchronous motor control routine.

A time-synchronous motor control routine shown in FIG. 23 is activated in a prescribed cycle (e.g., every 1 ms) after the end of an initial drive. A feedback control start position stopping and holding process, a target position stopping and holding processing, or a reversing position stopping and holding process is executed in this routine.

Upon activation of this routine, at step 501, it is determined whether the feedback permission flag Xfb is "off" (feedback control prohibited). If the feedback permission flag Xfb is "on" (feedback control permitted), the routine is finished without executing the remaining steps. In this case, current supply phase setting and current supply processing are performed by a feedback control routine (described later) shown in FIG. 30.

Figure 24:
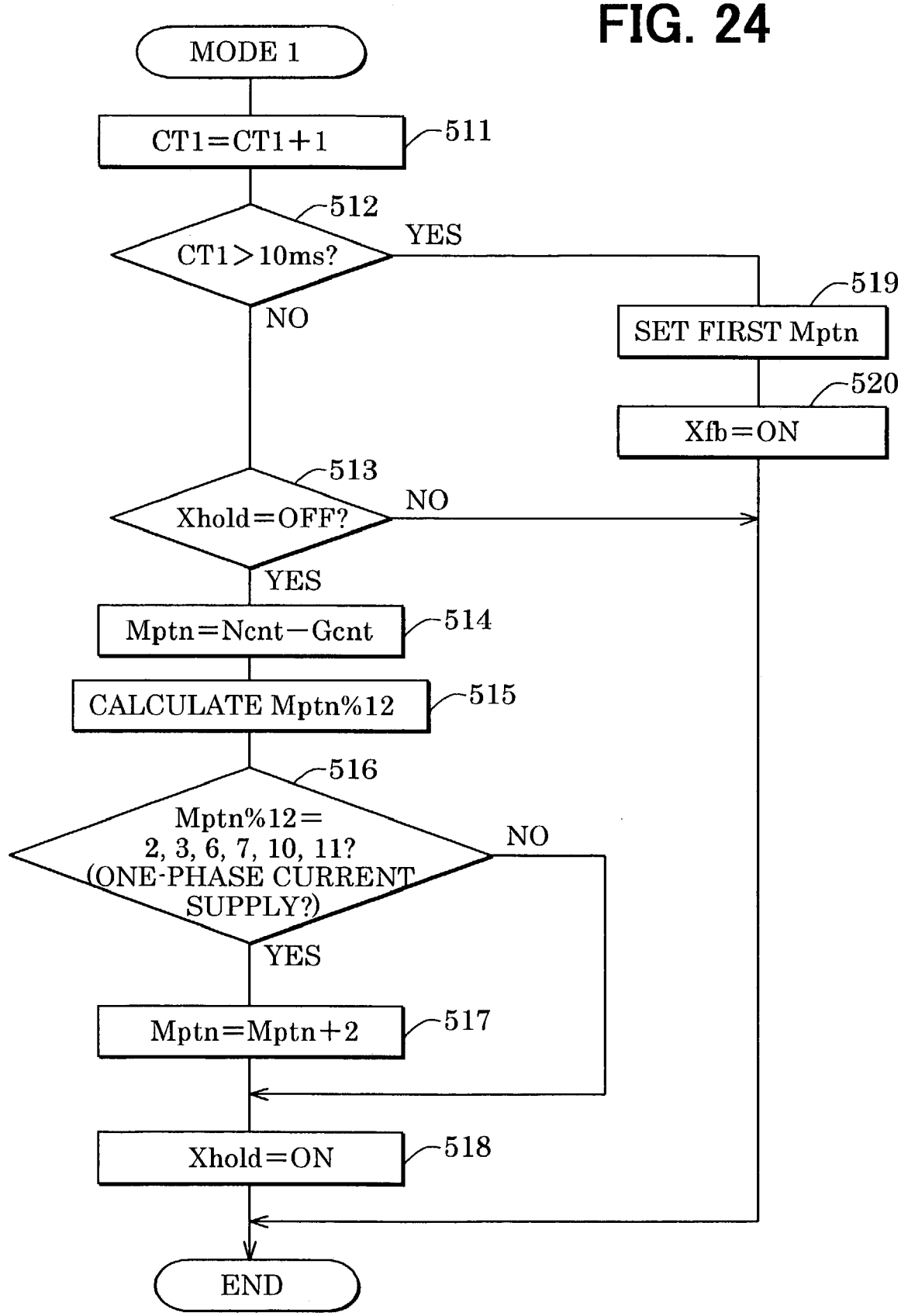
FIG. 24 is a flowchart showing a mode-1 routine.

On the other hand, if it is determined at step 501 that the feedback permission flag Xfb is "off" (feedback control prohibited), it is determined at steps 502-504 whether the control mode determination value "model is equal to 1, 3, or 4. If the control mode determination value "mode" is equal to "1" (feedback control start position stopping and holding process and feedback control), the routine goes from step 502 to step 505, where a mode-1 routine (described later) shown in FIG. 24 is executed, whereby a current supply phase determination value Mptn indicating a current supply phase with which to execute a feedback control start position stopping and holding process is calculated.

Figure 25:
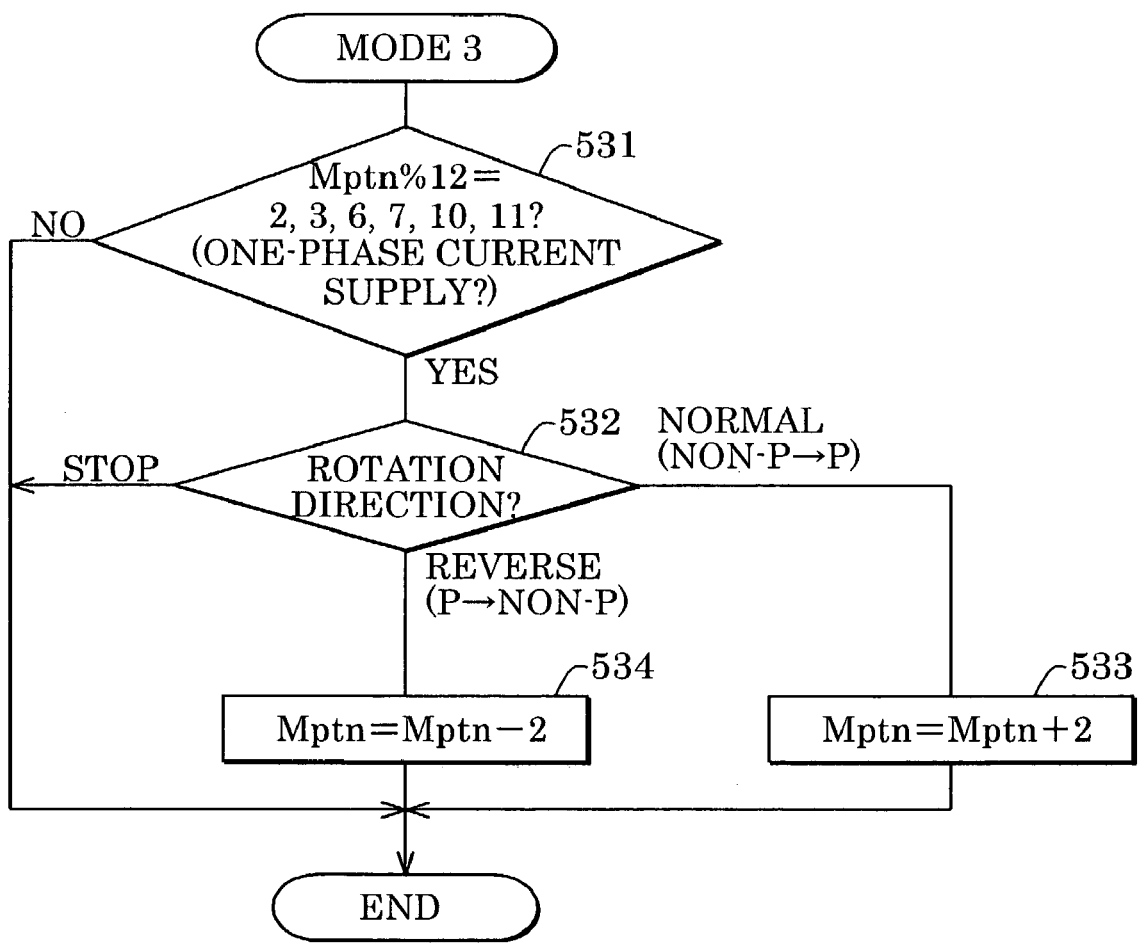
FIG. 25 is a flowchart showing a mode-3 routine.

If the control mode determination value "mode" is equal to "3" (target position stopping and holding process), the routine goes from step 503 to step 506, where a mode-3 routine (described later) shown in FIG. 25 is executed, whereby a current supply phase determination value Mptn indicating a current supply phase with which to execute a target position stopping and holding process is calculated.

Figure 26:
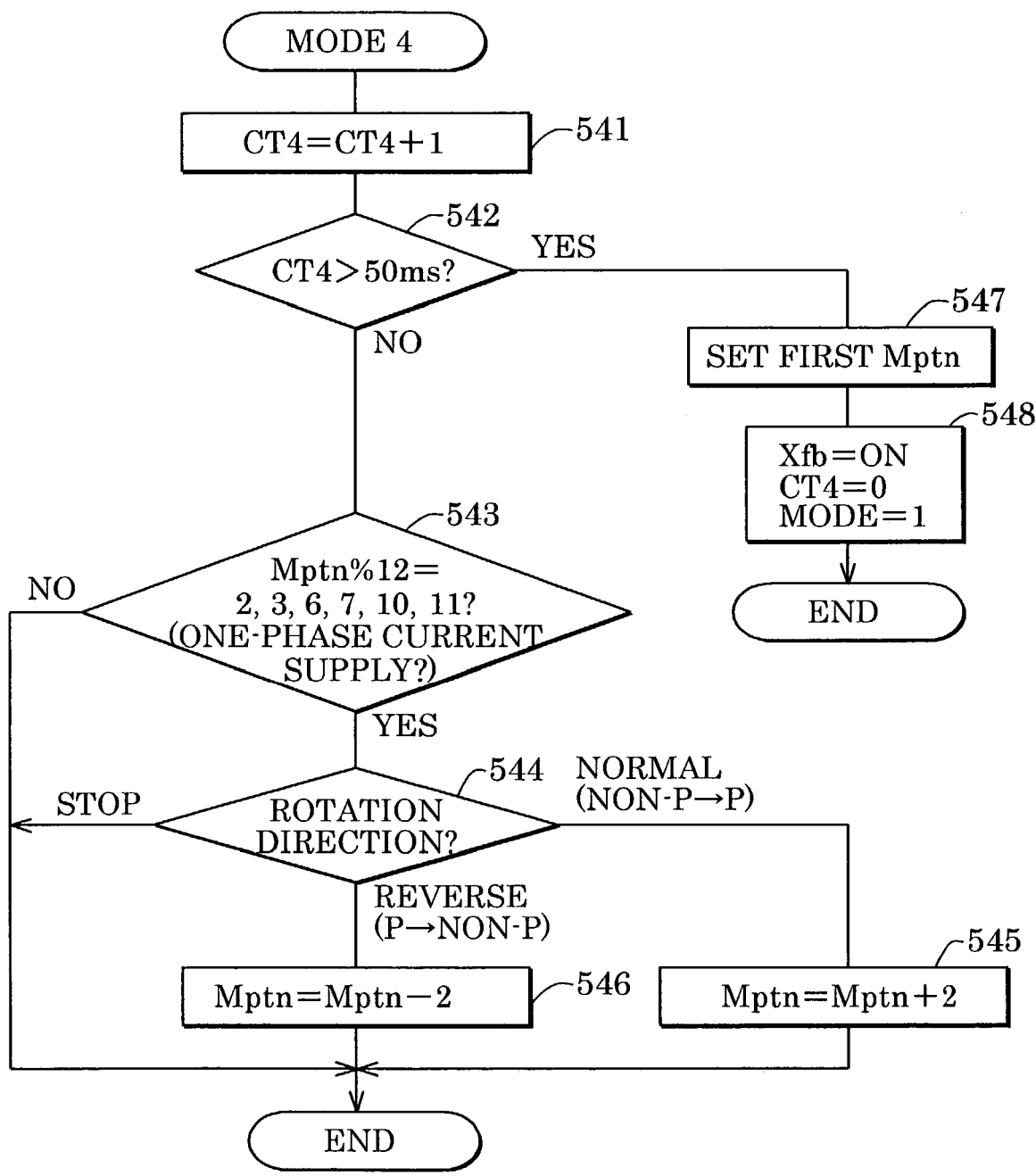
FIG. 26 is a flowchart showing a mode-4 routine.

If the control mode determination value "mode" is equal to "4" (reversing position stopping and holding process), the routine goes from step 504 to step 507, where a mode-4 routine (described later) shown in FIG. 26 is executed, whereby a current supply phase determination value Mptn indicating a current supply phase with which to execute a current supply position stopping and holding process is calculated.

Figure 27:
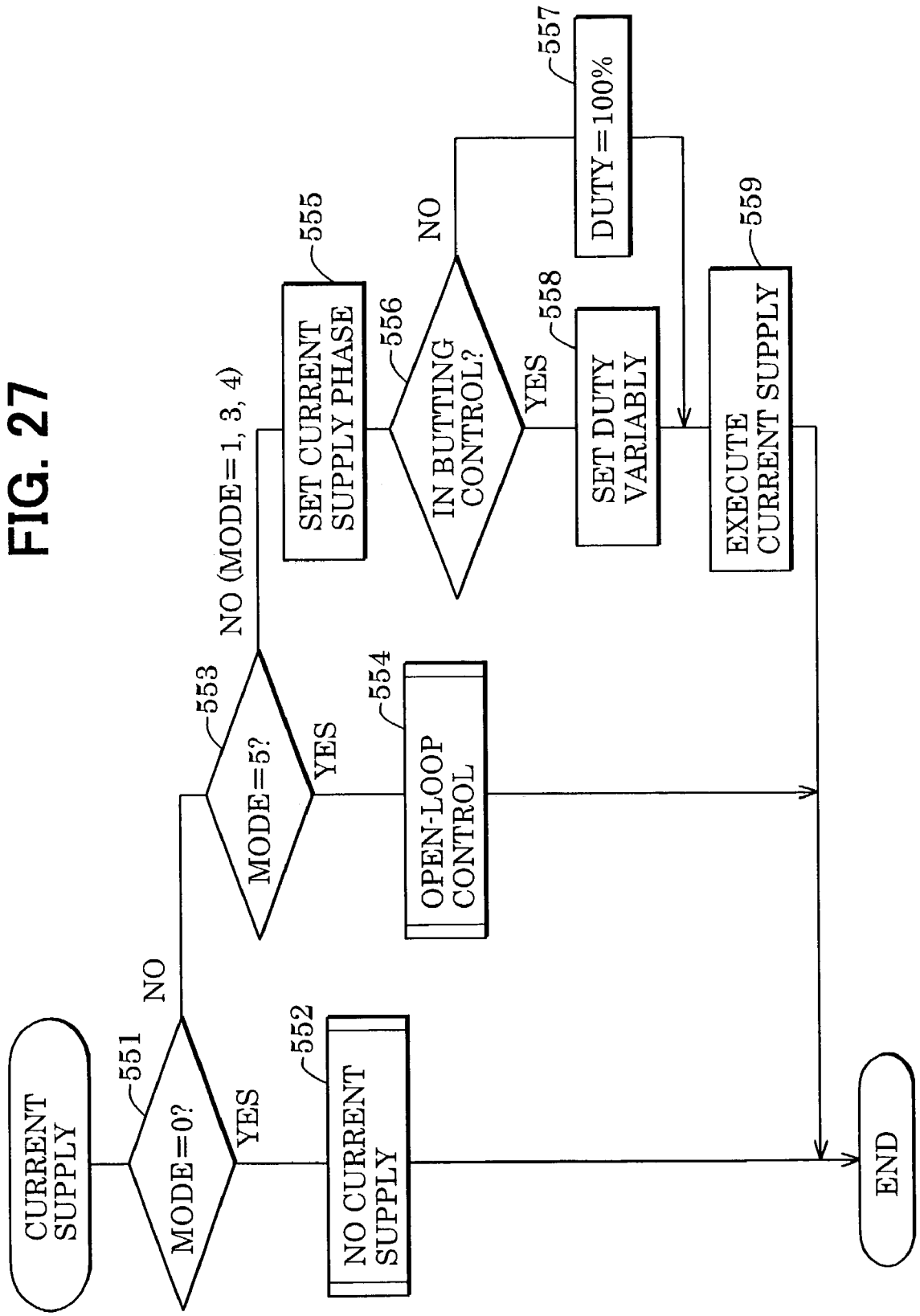
FIG. 27 is a flowchart showing a current supply processing routine.

As described above, if the control mode determination value "mode" is equal to 1, 3, or 4, a current supply phase determination value Mptn is calculated and the routine proceeds to step 508, where a current supply processing routine shown in FIG. 27 is executed, that is, a feedback control start position stopping and holding process, a target position stopping and holding processing, or a reversing position stopping and holding process is executed.

On the other hand, if the determination results at all of steps 502-504 are "no," that is, if the control mode determination value "mode" is equal to 0 or 5, the routine directly proceeds to step 508, where the current supply processing routine shown in FIG. 27 is executed, that is, the current supply is turned off or an open-loop control is performed.

[Mode-1]

The mode-1 routine shown in FIG. 24 is a subroutine that is activated at step 505 of the time-synchronous motor control routine of FIG. 23. In the mode-1 routine, a current supply phase determination value Mptn (current supply phase) for a feedback control start position stopping and holding process is set in the following manner.

Upon activation of this routine, at step 511, the count CT1 of a current supply time counter that counts the time of a feedback control start position stopping and holding process is incremented. At the next step 512, it is determined whether the time CT1 of the feedback control start position stopping and holding process has exceeded a prescribed time (e.g., 10 ms).

If the time CT1 of the feedback control start position stopping and holding process has not exceeded the prescribed time (e.g., 10 ms), the routine proceeds to step 513, where it is determined whether a stopping and holding current supply phase storage flag Xhold is "off" (not stored), that is, whether the present instant is immediately before a start of the feedback control start position stopping and holding process. If the stopping and holding current supply phase storage flag Xhold is "off," the routine proceeds to step 514, where a current position count Ncnt−Gcnt is set as a current supply phase determination value Mptn for the feedback control start position stopping and holding process:

$Mptn = Ncnt - Gcnt$

The current position count Ncnt−Gcnt is an encoder count Ncnt as corrected by using an initial positional deviation learned value Gcnt, and represents a current position of the rotor 32 correctly.

Then, the routine proceeds to step 515, where the current supply phase determination value Mptn is divided by 12 and a remainder Mptn%12 is obtained. The number "12" is an increase or decrease of the encoder count Ncnt (current supply phase determination value Mptn) that occurs when current supply is effected for all the phases around. A current supply phase is determined according to a conversion table shown in FIG. 28 on the basis of the value Mptn%12.

At step 516, whether one-phase current supply (U-phase, V-phase, or W-phase) is going to be performed is determined on the basis of whether the value Mptn%12 is equal to 2, 3, 6, 7, 10, or 11. If one-phase current supply is going to be performed, the routine proceeds to step 517, where the current supply phase determination value Mptn is incremented by 2 that corresponds to one step so that two-phase current supply (U and V-phases, V and W-phases, or U and W-phases) will be performed. Executing the feedback control start position stopping and holding process with two-phase current supply which produces higher torque than one-phase current supply does prevents the rotor 32 from vibrating in the vicinity of a feedback control start position and hence can reliably stop and keep the rotor 32 at the feedback control start position.

The stopping and holding current supply phase storage flag Xhold is set to "on" (stored) at the next step 518, Then this routine is finished. When this routine is activated later, the determination result at step 513 should become "no" and hence steps 514-518 are not executed. That is, the process of setting a current supply phase determination value Mptn (current supply phase) for the feedback control start position stopping and holding process is set is performed only once immediately before a start of the feedback control start position stopping and holding process.

Then, when the time CT1 of the feedback control start position stopping and holding process has exceeded the prescribed time (e.g., 10 ms), the determination result at step 512 becomes "yes," whereupon the feedback control start position stopping and holding process is finished and a transition is made to a feedback control. First, at step 519, a first current supply phase determination value Mptn with which to start the feedback control is set by adding or subtracting, in accordance with a rotation direction, a count (e.g., 4 or 3) corresponding to A-phase lead of the current supply phase to or from the current supply phase determination value Mptn for the feedback control start position stopping and holding process, whereupon driving for rotating the rotor 32 is started. Then, the routine proceeds to step 520, where the feedback permission flag Xfb is set to "on" (feedback control permitted).

Figure 32:
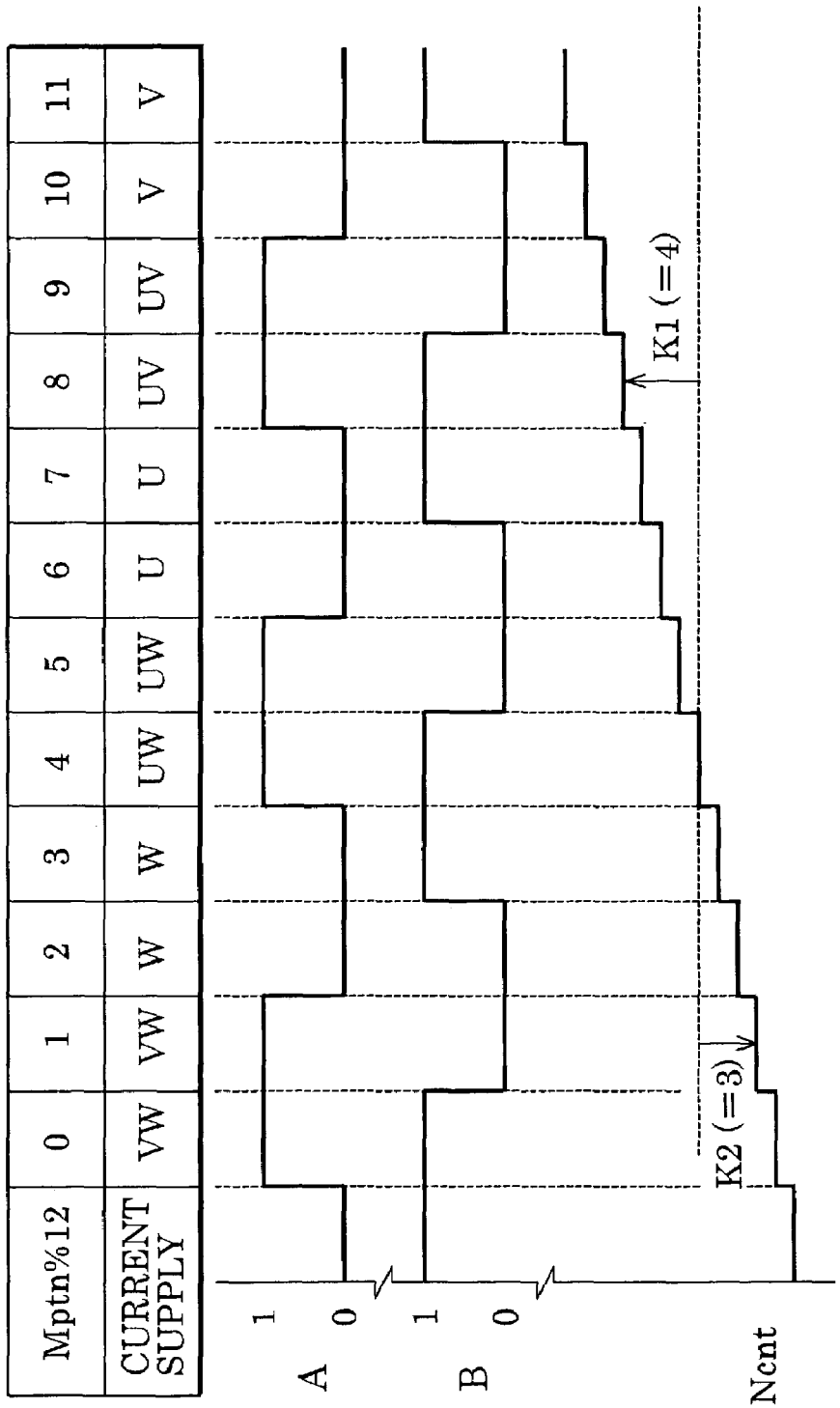
FIG. 32 is a flowchart illustrating a current supply process in which rotation is started from a state corresponding to U and W-phases.

FIG. 32 is a time chart illustrating A-phase for which current supply is effected first in the case where rotation is started from a state corresponding to the U and W-phases. In this case, to start normal rotation (i.e., rotation from the P-position to the non-P-position), a current supply phase determination value Mptn is calculated according to the following equation by using an encoder count Ncnt, an initial positional deviation learned value Gcnt, and a normal rotation direction phase lead K1:

$Mptn = Ncnt - Gcnt + K1$

If the normal rotation direction phase lead K1 is equal to 4, for example, a current supply phase determination value Mptn is calculated according to the following equation:

$Mptn = Ncnt - Gcnt + 4$

To start normal rotation from a state corresponding to the U and W-phases, mod(Ncnt−Gcnt) is 4 and hence Mptn%12 is equal to 8 (=4+4). The U and V-phases are set as first current supply phases.

On the other hand, to start reverse rotation (i.e., rotation from the non-P-position to the P-position) from a state corresponding to the U and W-phases, if a reverse rotation direction phase lead K2 is equal to 3, for example, a current supply phase determination value Mptn is calculated according to the following equation:

$$Mptn = Ncnt - Gcnt - K2$$
$$= Ncnt - Gcnt - 3$$

To start reverse rotation from a state corresponding to the U and W-phases, Mptn%12 is equal to 1 (=4–3). The V and W-phases are set as first current supply phases.

In this manner, by setting the normal rotation direction phase lead K1 and the reverse rotation direction phase lead K2 to 4 and 3, respectively, current supply phase switching patterns for the normal rotation direction and the reverse rotation direction can be made symmetrical. In either of the normal rotation direction and the reverse rotation direction, rotation can be started by effecting current supply first for A-phase of a position that is two steps deviated from the current position of the rotor 32.

[Mode-3]

The mode-3 routine shown in FIG. 25 is a subroutine that is activated at step 506 of the time-synchronous motor control routine of FIG. 23. In the mode-3 routine, a current supply phase determination value Mptn (current supply phase) for a target position stopping and holding process is set in the following manner.

Upon activation of this routine, at step 531, whether the current supply phase at the end of the feedback control is one phase (U-phase, V-phase, or W-phase) is determined on the basis of whether the value Mptn%12 is equal to 2, 3, 6, 7, 10, or 11. If it is one-phase, steps 532-534 are executed, whereby the current supply phase determination value Mptn is incremented or decremented by 2 in accordance with the rotation direction of the feedback control performed so far and the current supply phase is thereby changed to two phases next to the current one phase.

In doing so, at step 532 the rotation direction is determined in the following manner. The rotation direction instruction value D is set to "0" (stop) at step 426 in FIG. 22 immediately before this routine is activated (i.e., when the feedback control has finished). Therefore, the rotation directing cannot be determined by checking the rotation direction instruction value D. In view of this, in this embodiment, with attention paid to the fact that the current supply phase determination value Mptn at the end of the feedback control and the position count Ncnt–Gcnt are different from each other by the phase lead K1 or K2 of the current supply phase, the rotation direction is determined in the following manner in accordance with a magnitude relationship between the current supply phase determination value Mptn at the end of the feedback control and the position count Ncnt–Gcnt.

If Mptn>(Ncnt–Gcnt), the rotation direction is determined to be normal rotation (i.e., the rotation direction from the P-position to the non-P-position). The routine proceeds to step 533, where the current supply phase determination value Mptn is incremented by 2 to as to effect two-phase current supply.

On the other hand, if Mptn<(Ncnt–Gcnt), the rotation direction is determined to be reverse rotation (i.e., the rotation direction from the non-P-position to the P-position). The routine proceeds to step 534, where the current supply phase determination value Mptn is decremented by 2 to as to effect two-phase current supply. If Mptn=(Ncnt–Gcnt), it is determined that the rotor 32 is stopped and hence the current supply phase is not changed.

As described above, like the feedback control start position stopping and holding process, the target position stopping and holding process is executed with two-phase current supply which produces higher torque than one-phase current supply does. This makes it possible to prevent the rotor 32 from vibrating in the vicinity of a target position and hence to reliably stop and keep the rotor 32 at the target position.

[Mode-4]

The mode-4 routine shown in FIG. 26, which is a subroutine that is activated at step 507 of the time-synchronous motor control routine of FIG. 23, sets a current supply phase determination value Mptn for a reversing position stopping and holding process in the following manner.

Upon activation of this routine, at step 541, the count CT4 of a current supply time counter that counts the time of a reversing position stopping and holding process. At the next step 542, it is determined whether the time CT4 of the reversing position stopping and holding process has exceeded a prescribed time (e.g., 50 ms).

If the time CT4 of the reversing position stopping and holding process has not exceeded the prescribed time (e.g., 50 ms), the routine proceeds to step 543, where whether the current supply phase is one phase (U-phase, V-phase, or W-phase) is determined on the basis of whether the value Mptn%12 is equal to 2, 3, 6, 7, 10, or 11. If the current supply phase is one phase, steps 544-546 are executed, whereby the current supply phase determination value Mptn is incremented or decremented by 2 in accordance with the rotation direction of the feedback control performed so far and the current supply phase is thereby changed to two phases next to the current one phase. Steps 543-546 are the same as steps 531-534 of the above mode-3 routine of FIG. 25.

As described above, like the feedback control start position stopping and holding process and the target position stopping and holding process, the reversing position stopping and holding process is executed with two-phase current supply which produces higher torque than one-phase current supply does. This makes it possible to prevent the rotor 32 from vibrating in the vicinity of a reversing position and hence to reliably stop the rotor 32 at the reversing position and keep it there.

Then, when the time CT4 of the reversing position stopping and holding process has exceeded the prescribed time (e.g., 50 ms), the determination result at step 542 becomes "yes," whereupon the reversing position stopping and holding process is finished and the feedback control is restarted. First, at step 547, a first current supply phase determination value Mptn for the new feedback control is set by adding or subtracting, in accordance with a rotation direction, a count (e.g., 4 or 3) corresponding to A-phase lead of the current supply phase to or from the current supply phase determination value Mptn for the reversing position stopping and holding process, whereupon driving for rotating the rotor 32 is started. Then, the routine proceeds to step 548, where the following settings are made: the feedback permission flag Xfb=on (feedback control permitted), the current supply time count CT4=0, and the control mode determination value "mode"=1 (ordinary drive). Then this routine is finished.

[Current Supply Process]

The current supply processing routine shown in FIG. 27 is a subroutine that is activated at step 508 of the time-synchronous motor control routine of FIG. 23. This routine is also activated at step 603 of the feedback control routine (described later) shown in FIG. 30.

Upon activation of the current supply processing routine of FIG. 27, at step 551, it is determined whether the control mode determination value "mode" is equal to "0" (current supply off). If the control mode determination value "mode" is equal to "0" (current supply off), the routine proceeds to step 552, where all the phases are rendered in a current supply-off state to establish a standby state.

On the other hand, if the determination result at step 551 is "no," the routine proceeds to step 553, where it is determined whether the control mode determination value "mode" is equal to "5" (open-loop control). If the control mode determination value "mode" is equal to "5" (open-loop control), he routine proceeds to step 554, where an open-loop control is performed. In the open-loop control, the rotor 32 is rotated to a target position by setting current supply phases by time-synchronous processing having a cycle of 1 ms, for example, when the encoder 46 has failed or an operation abnormality has occurred in the SR motor 12.

Figures 28, 29, 30:
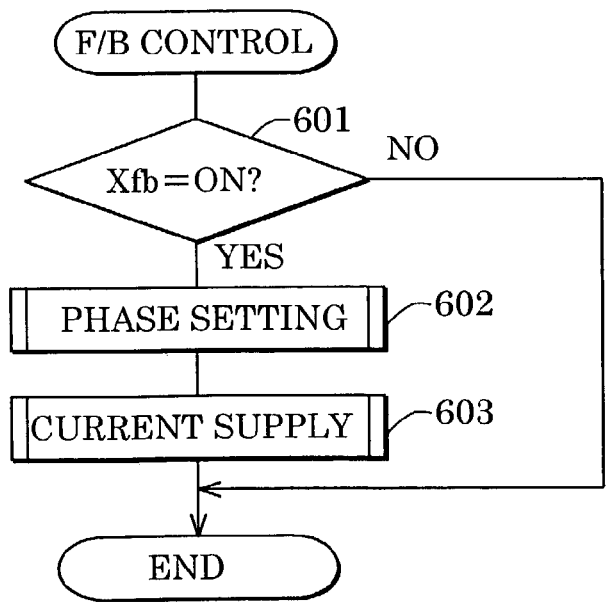
FIG. 28 shows an exemplary conversion table to be used for converting a value Mptn%12 into a current supply phase in the case of a one/two-phase current supply method.
FIG. 29 shows an exemplary table to be used for setting a current supply duty ratio in accordance with a battery voltage during a butting control.
FIG. 30 is a flowchart showing a feedback control routine.

If the determination results at both of steps 551 and 553 are "no," that is, if the control mode determination value "mode" is equal to 1 (feedback control start position stopping and holding process and feedback control), 3 (target position stopping and holding process), or 4 (reversing position stopping and holding process), the routine proceeds to step 555, where a current supply phase is set in accordance with a value Mpt%12 using the conversion table of FIG. 28.

Then, the routine proceeds to step 556, where it is determined whether a butting control is being performed (i.e., whether a P-position-side butting control flag Xexp or a non-P-position-side butting control flag Xexnp is "on"). If no butting control is being performed, the routine proceeds to step 557, where the current supply duty ratio of the SR motor 12 is set to 100%. If a butting control is being performed, the routine proceeds to step 558, where the current supply duty ratio of the SR motor 12 is set to 10% to 30%, for example, in accordance with a battery voltage as a power source voltage for the SR motor 12 by using a table of FIG. 29. As a result, during a butting control, the torque of the SR motor 12 is made much lower than in an ordinary drive.

In the exemplary table of FIG. 29, in view of the characteristic that the torque of the SR motor 12 increases as the power source voltage for the SR motor 12 (i.e., the battery voltage) increases, the current supply duty ratio is set smaller as the power source voltage for the SR motor 12 (i.e., the battery voltage) increases. This makes the torque of the SR motor 12 approximately constant irrespective of whether the power source voltage (i.e., the battery voltage) is high or low, and thereby allows the SR motor 12 to always generate minimum torque that is necessary for a butting control.

After the current supply duty ratio has been set in the above manner, the routine proceeds to step 559, where the ECU 41 outputs control signals to the motor drivers 37 and 38, whereby the windings of the current supply phase that was set at step 555 are energized with the current supply duty ratio that was set at step 557 or 558 and the SR motor 12 is thereby driven.

[Feedback Control]

Next, the details of the feedback control routine shown in FIG. 30 will be described. This routine is executed by A/B-phase interruption processing. In this routine, in a state that the feedback control execution conditions are satisfied after the end of an initial drive, the rotor 32 is rotated until its rotation position (Ncnt–Gcnt) reaches a position that is 0.5°, for example, short of a target position (target count Acnt) by switching the current supply phase on the basis of the encoder count Ncnt and an initial positional deviation learned value Gcnt.

Upon activation of the feedback control routine of FIG. 30, at step 601, it is determined whether the feedback permission flag Xfb is "on" (i.e., whether the feedback control execution conditions are satisfied). If the feedback permission flag Xfb is "off" (i.e., the feedback control execution conditions are not satisfied), this routine is finished without executing the remaining steps.

Figure 31:
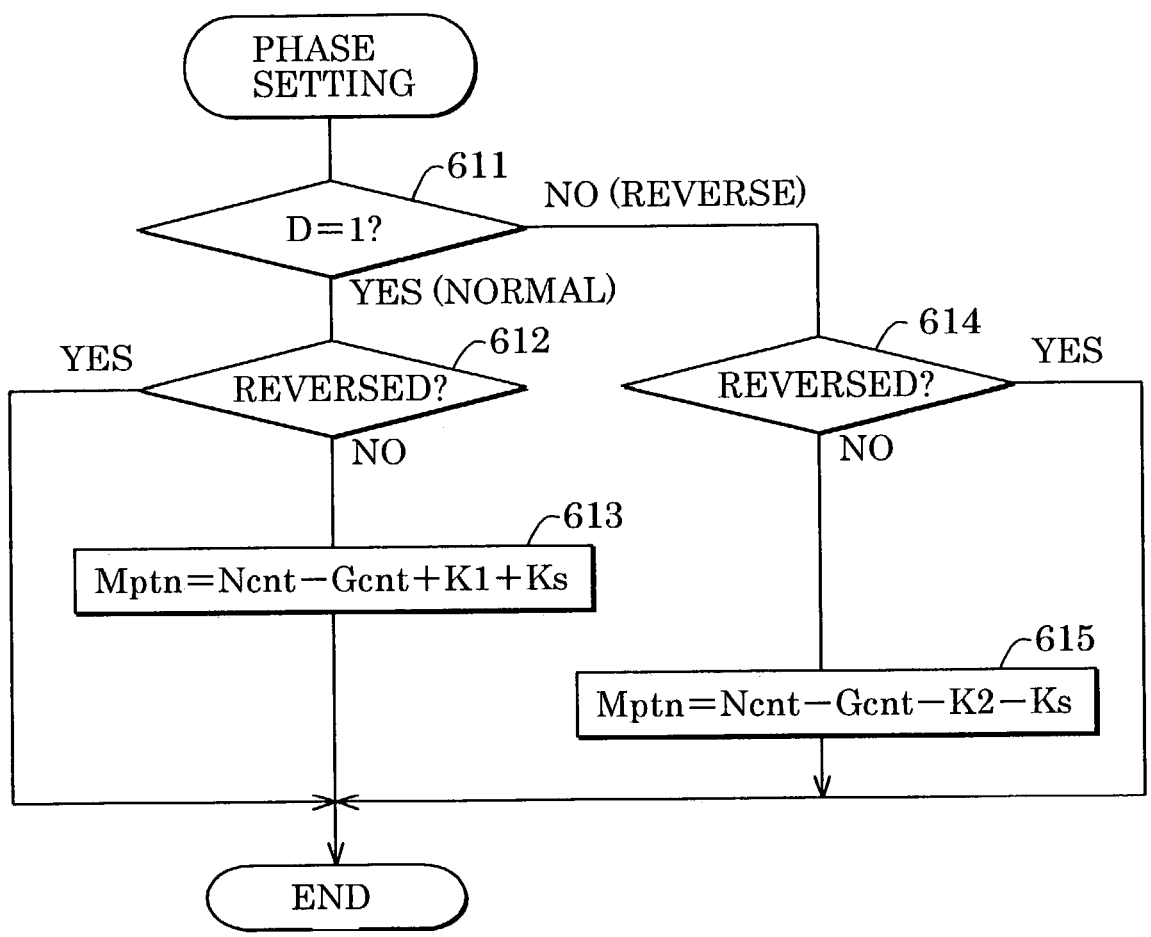
FIG. 31 is a flowchart showing a current supply phase setting routine.

On the other hand, if the feedback permission flag Xfb is "on," the routine proceeds to step 602, where a current supply phase setting routine (described later) shown in FIG. 31 is executed, whereby a current supply phase is set on the basis of a current encoder count Ncnt and an initial positional deviation learned value Gcnt. At the next step 603, the current supply processing routine of FIG. 27 is executed.

[Current Supply Phase Setting]

The current supply phase setting routine of FIG. 31 is a subroutine that is activated at step 602 of the feedback control routine of FIG. 30. Upon activation of this routine, at step 611, it is determined whether the rotation direction instruction value D indicating a rotation direction toward a target position is equal to "1" that means the normal rotation direction (i.e., the rotation direction from the P-position to the non-P-position). If it is determined that the rotation direction instruction value D is equal to "1" (normal rotation), the routine proceeds to step 612, where it is determined whether the rotation direction of the rotor 32 has reversed (i.e., whether the encoder count Ncnt has decreased) contrary to the rotation direction instruction. If the rotation direction has not reversed, the routine proceeds to step 613, where the current supply phase determination value Mptn is updated according to the following equation by using a current encoder count Ncnt, an initial positional deviation learned value Gcnt, a normal rotation direction phase lead K1, and a speed phase lead correction amount Ks:

$$Mptn = Ncnt - Gcnt + K1 + Ks$$

The normal rotation direction phase lead K1 is A-phase lead of the current supply phase that is necessary to rotate the rotor 32 in the normal direction (i.e., A-phase lead of the current supply phase with respect to the current rotation phase of the rotor 32), and is set to "4," for example.

The speed phase lead correction amount Ks is A-phase lead correction amount that is set in accordance with a rotation speed of the rotor 32, and is set by a speed phase lead correction amount setting routine (described later) shown in FIG. 34. For example, the speed phase lead correction amount Ks is set to "0" in a low-speed range and is increased to "1" or "2," for example, as the rotation speed increases. As a result, the current supply phase determination value Mptn is corrected so as to indicate a current supply phase that is suitable for a rotation speed of the rotor 32.

On the other hand, if it is determined at step 612 that the rotation direction of the rotor 32 has reversed contrary to the rotation direction instruction, the current supply phase determination value Mptn is not updated to prevent progress of the reversed rotation. In this case, current supply is effected for the phase for which current supply was effected immediately before the reversing (i.e., the preceding current supply phase), whereby braking torque is generated in such a direction as to suppress the reversed rotation.

If it is determined at step 611 that the rotation direction instruction value D is equal to "−1" (the reverse rotation direction, i.e., the rotation direction from the non-P-position to the P-position), the routine proceeds to step 614, where it is determined whether the rotation direction of the rotor 32 has reversed (i.e., whether the encoder count Ncnt has increased) contrary to the rotation direction instruction. If the rotation direction has not reversed, the routine proceeds to step 615, where the current supply phase determination value Mptn is updated according to the following equation by using a current encoder count Ncnt, an initial positional deviation learned value Gcnt, a reverse rotation direction phase lead K2, and a speed phase lead correction amount Ks:

$$Mptn=Ncnt-Gcnt-K2-Ks$$

The reverse rotation direction phase lead K2 is A-phase lead of the current supply phase that is necessary to rotate the rotor 32 in the reverse direction (i.e., A-phase lead of the current supply phase with respect to the current rotation phase of the rotor 32), and is set to "3," for example. As in the case of the normal rotation, the speed phase lead correction amount Ks is set by the speed phase lead correction amount setting routine (described later) shown in FIG. 34.

On the other hand, if it is determined at step 614 that the rotation direction of the rotor 32 has reversed contrary to the rotation direction instruction, the current supply phase determination value Mptn is not updated to prevent progress of the reversed rotation (i.e., normal rotation). In this case, current supply is effected for the phase for which current supply was effected immediately before the reversing (i.e., the preceding current supply phase), whereby braking torque is generated in such a direction as to suppress the reversed rotation (i.e., normal rotation).

After the current supply phase determination value Mptn has been determined in the above manner, the current supply processing routine of FIG. 27 is executed. While the feedback control is being performed, a current supply phase corresponding to a value Mptn%12 is selected at step 555 by searching the conversion table of FIG. 28 and current supply is effected for the selected current supply phase.

[Rotor Rotation Speed Calculation]

Figure 33:
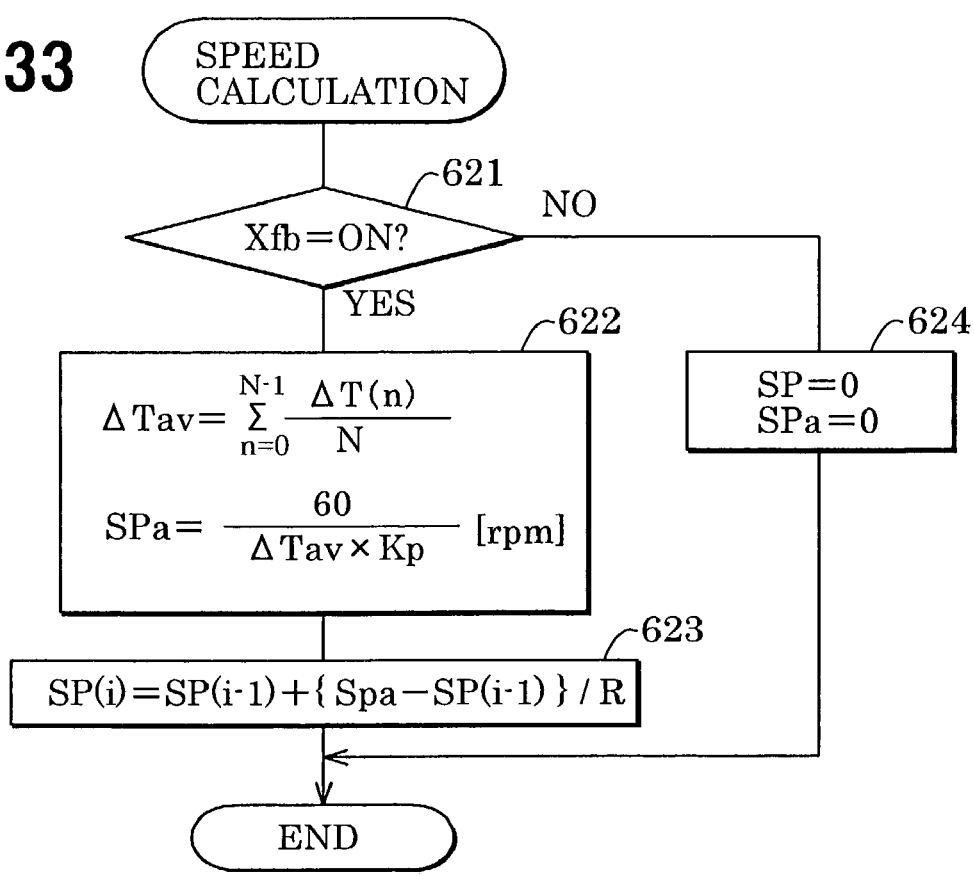
FIG. 33 is a flowchart showing a rotor rotation speed calculation routine.

A rotor rotation speed calculation routine shown in FIG. 33, which is executed by A/B-phase interruption processing, calculates a rotation speed SP of the rotor 32 in the following manner. Upon activation of this routine, at step 621, it is determined whether the feedback permission flag Xfb is "on" (a feedback control is being performed). If the feedback permission flag Xfb is "off" (feedback prohibited), no correction is performed on A-phase lead of the current supply phase in accordance with a rotation speed SP of the rotor 32 and hence the routine proceeds to step 624, where stored rotation speeds SP and SPa of the rotor 32 are reset. Then this routine is finished.

On the other hand, if the feedback permission flag Xfb is "on" (a feedback control is being performed), a rotation speed SP of the rotor 32 is calculated in the following manner. First, at step 622, time intervals ΔT(n) between rising/trailing edges of an A-phase signal and a B-phase signal of the encoder 46 (i.e., time interval at which the encoder count increases or decreases) are measured and an average of past n time intervals ΔT(n) is calculated. And a rotation speed calculation value SPa is calculated according to the following equation:

$$SPa=60/(\Delta Tav \times Kp)[rpm]$$

In the above equation, Kp is the number of time intervals ΔT(n) per one rotation of the rotor 32 (i.e., a variation of the encoder count per one rotation of the rotor 32). In the case of the rotor 32 having the structure of FIG. 5, Kp is equal to 96. And ΔTav×Kp is a time [sec] that is required for the rotor 32 to make one rotation.

Then, the routine proceeds to step 623, where a rotation speed SP of the rotor 32 is calculated through smoothing according to the following equation by using the rotation speed calculation value SPa:

$$SP(i)=SP(i-1)+\{SPa-SP(i-1)\}/R$$

where SP(i) is a current rotation speed, SP(i−1) is a preceding rotation speed, and R is a smoothing coefficient.

[Setting of Speed Phase Lead Correction Amount]

Figure 34:
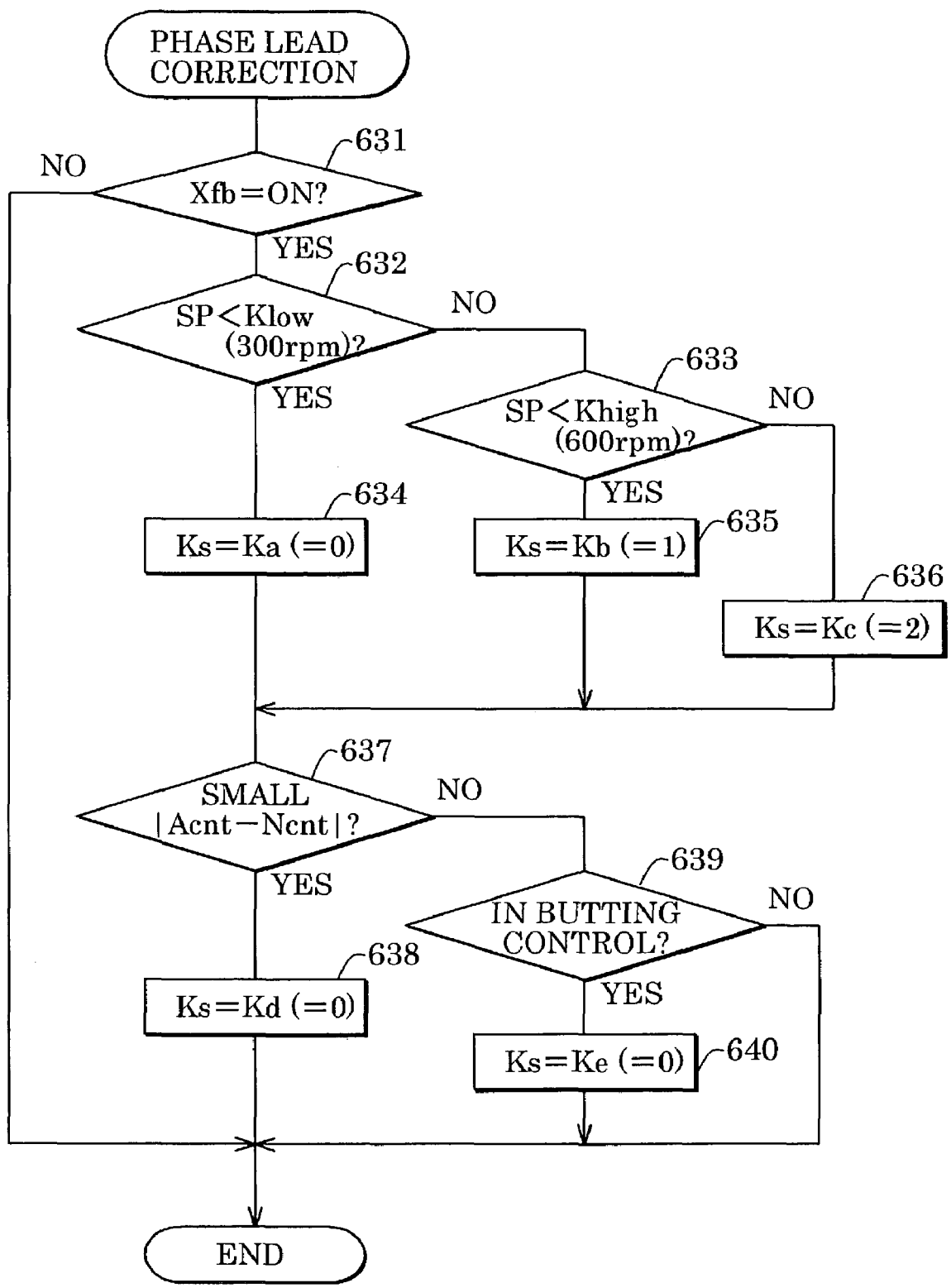
FIG. 34 is a flowchart showing a speed phase lead correction amount setting routine.

The speed phase lead correction amount setting routine shown in FIG. 34, which is activated in a prescribed cycle (e.g., every 1 ms), sets a speed phase lead correction amount Ks in accordance with a rotation speed SP of the rotor 32. Upon activation of this routine, at step 631, it is determined whether the feedback permission flag Xfb is "on" (a feedback control is being performed). If the feedback permission flag Xfb is off (feedback control prohibited), no correction of A-phase lead of the current supply phase is necessary and hence this routine is finished without executing the remaining steps.

On the other hand, if the feedback permission flag Xfb is "on" (a feedback control is being performed), steps 632-636 are executed, whereby a speed phase lead correction amount Ks is set in the following manner in accordance with the rotation speed SP of the rotor 32 that was calculated by the rotor rotation speed calculation routine of FIG. 33.

If it is determined at step 632 that the rotation speed SP of the rotor 32 is lower than a prescribed value Klow (e.g., 300 rpm), the routine proceeds to step 634, where the speed phase lead correction amount Ks is set to a minimum value Ka (e.g., 0). If it is determined at step 633 that the rotation speed SP of the rotor 32 is higher than a prescribed value Khigh (e.g., 600 rpm), the routine proceeds to step 636, where the speed phase lead correction amount Ks is set to a maximum value Kc (e.g., 2). If the rotation speed SP of the rotor 32 is between Klow and Khigh, the routine proceeds to step 635, where the speed phase lead correction amount Ks is set to an intermediate value Kb (e.g., 1). In this manner, the speed phase lead correction amount Ks is set larger as the rotation speed SP of the rotor 32 increases.

Then, the routine proceeds to step 637, where whether the rotation position of the rotor 32 has come close to a target position (i.e., has entered a deceleration range for a stop) is determined on the basis of whether the absolute value of the difference between a target count Acnt and an encoder count Ncnt, |Acnt−Ncnt|, is smaller than a prescribed value.

If |Acnt−Ncnt| is greater than or equal to the prescribed value, the routine proceeds to step 639, where it is determined whether a butting control is being performed (i.e., whether the P-position-side butting control flag Xexp or the non-P-position-side butting control flag Xexnp is "on"). If no butting control is being performed, the speed phase lead correction amount Ks that was set in one of steps 634-636 is used as it is. If a butting control is being performed, the routine proceeds to step 640, where the speed phase lead correction amount Ks is set to a small value Ke (e.g., 0 or −1) to decrease the rotation speed of the rotor 32.

On the other hand, if |Acnt−Ncnt| is smaller than the prescribed value, it is determined that the rotation position of the rotor 32 is in a deceleration range and the routine goes from step 637 to step 638, where the speed phase lead correction amount Ks is set to a small value Kd (e.g., 0 or −1).

Although in this routine the speed phase lead correction amount Ks is switched between three levels in accordance with the rotation speed SP of the rotor 32, it may be switched between two levels or four or more levels.

[Play Amount Learning]

Figure 36:
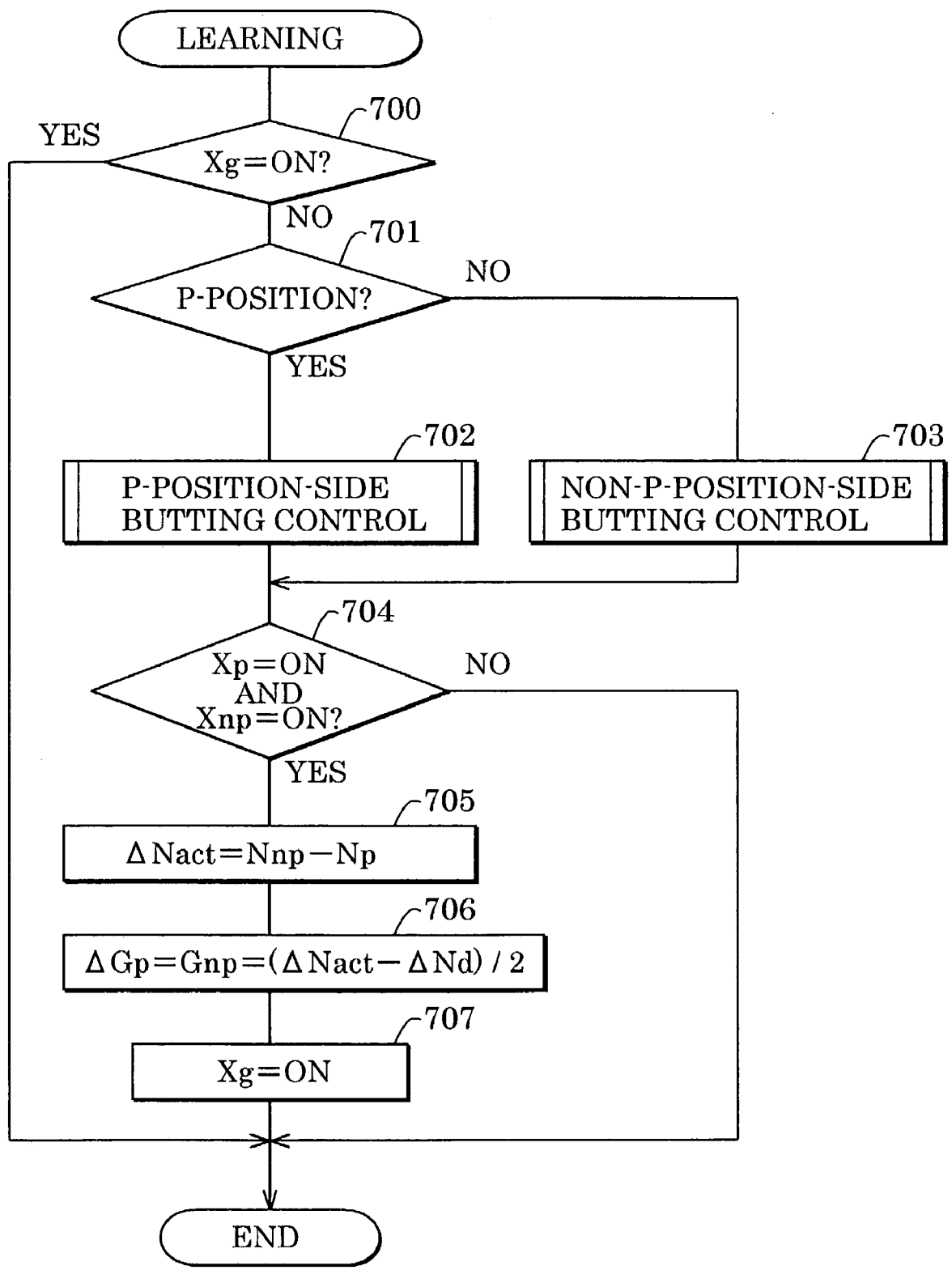
FIG. 36 is a flowchart showing a play amount learning routine.

A play amount learning routine shown in FIG. 36 is executed in a prescribed cycle (e.g., every 8 ms) after the end of an initial drive. Upon activation of this routine, at step 700, it is determined whether a play amount learning completion flag Xg is "on" (i.e., play amount learning completed). If the play amount learning completion flag Xg is "on," this routine is finished without executing the remaining steps. As a result, play amount learning is performed only once during an ignition switch on-period. The play amount learning completion flag Xg is set to "off" by an initialization processing routine (not shown) that is executed immediately after the ignition switch is turned on.

Figure 39:
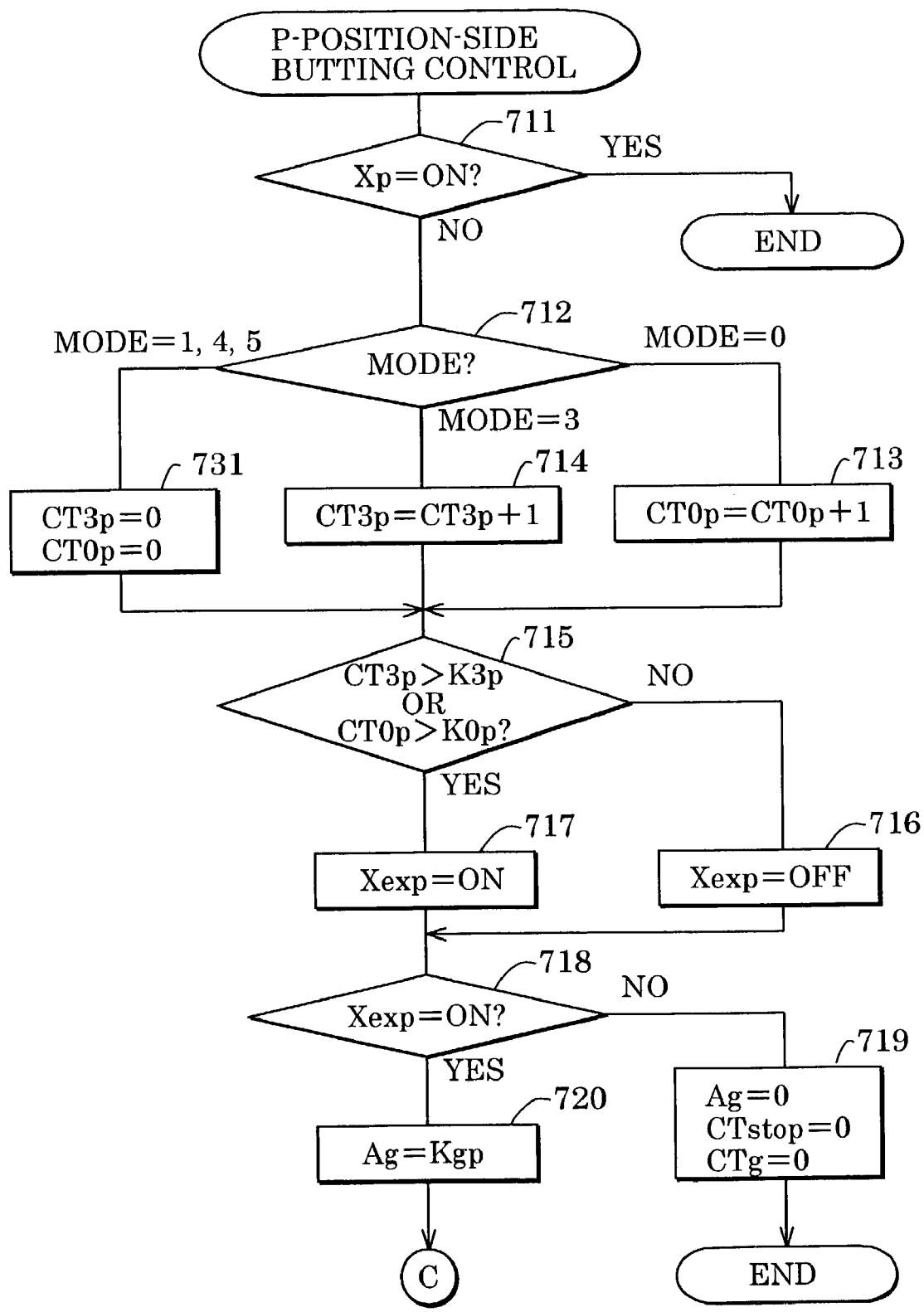
FIGS. 39 and 40 are flowcharts showing a P-position-side butting control routine.
Figure 40:
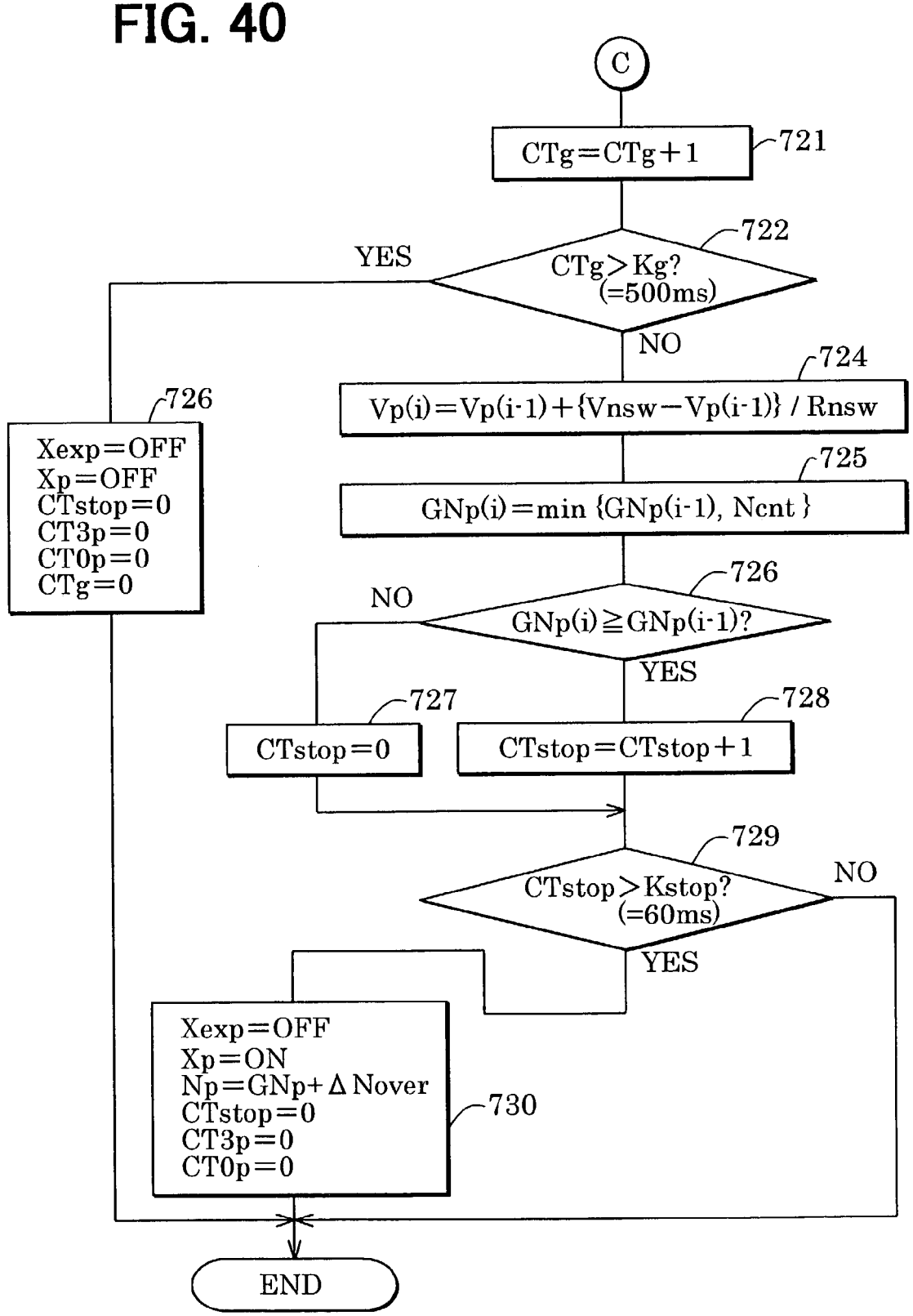
Figure 42:
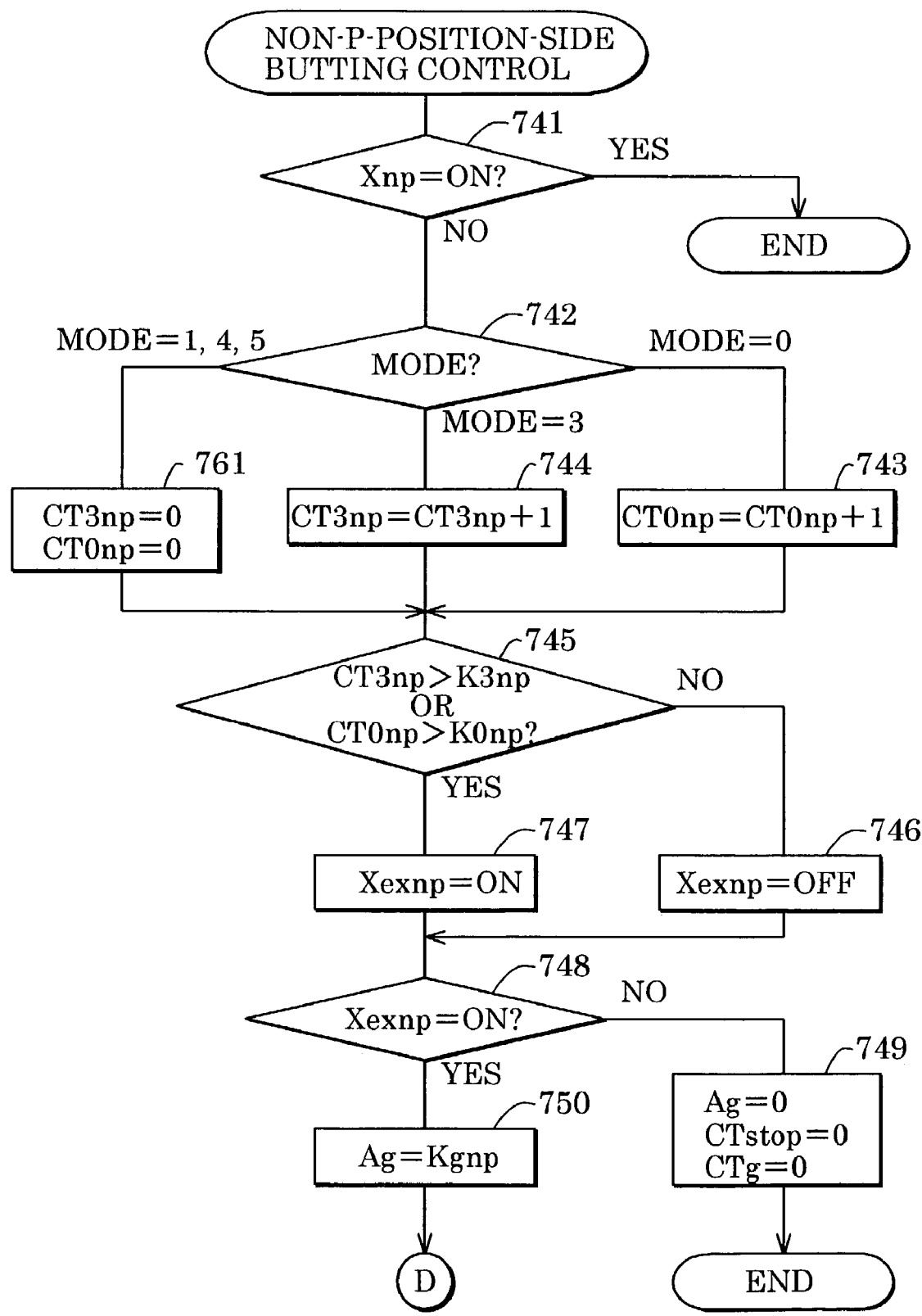
FIGS. 42 and 43 are flowcharts showing a non-P-position-side butting control routine.
Figure 43:
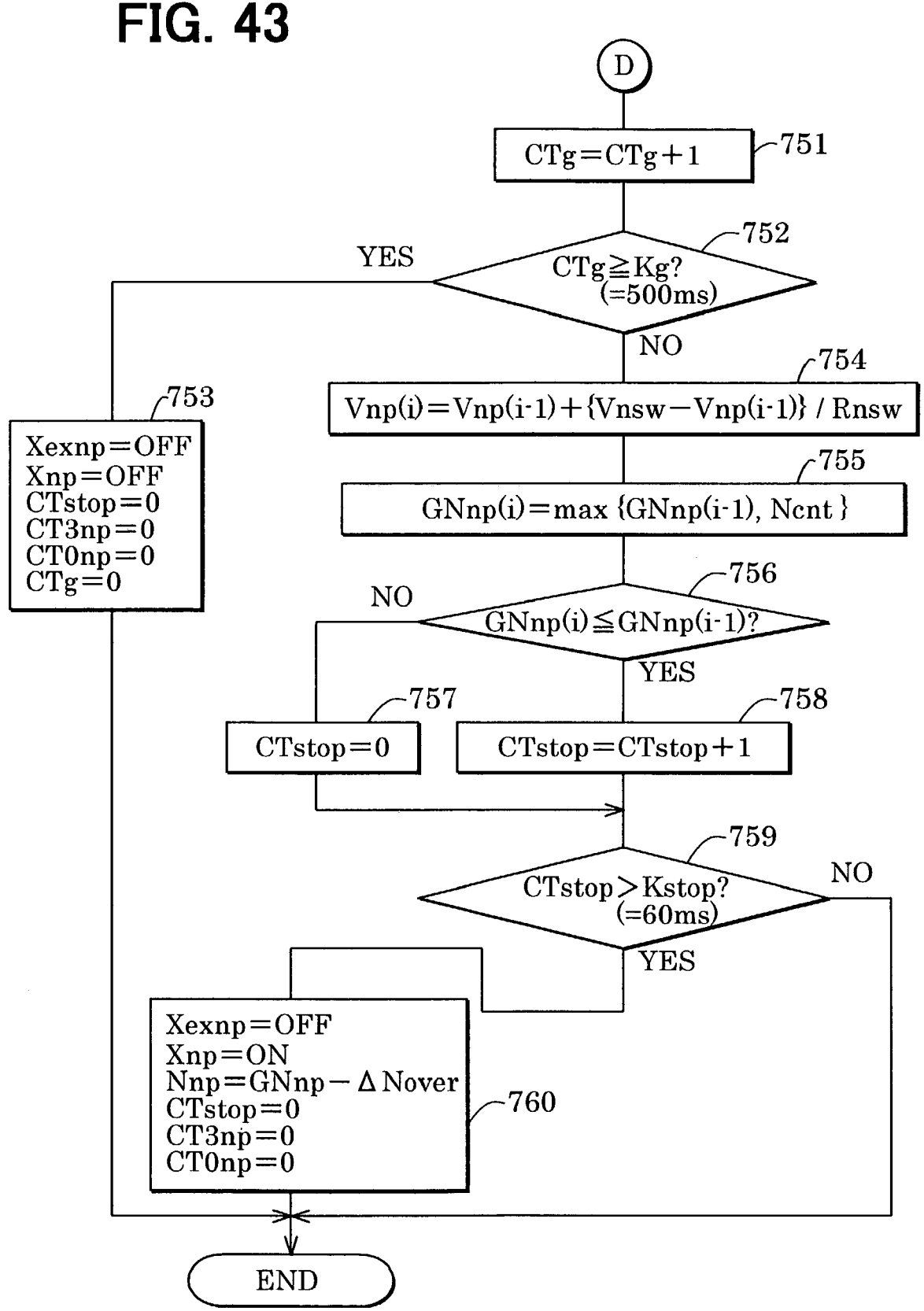

On the other hand, if it is determined at step 700 that the play amount learning completion flag Xg is "off" (i.e., play amount learning has not completed), the routine proceeds to step 701, where it is determined whether the instructed shift position is the P-position. If it is the P-position, the routine proceeds to step 702, where a P-position-side butting control routine of FIGS. 39 and 40 is executed and an encoder count Np at the time of P-position-side butting is stored in the RAM of the ECU 41. On the other hand, if the instructed shift position is the non-P-position, the routine proceeds to step 703, where a non-P-position-side butting control routine of FIGS. 42 and 43 is executed and an encoder count Nnp at the time of non-P-position-side butting is stored in the RAM of the ECU 41.

Then, the routine proceeds to step 704, where it is determined whether both of P-position-side and non-P-position-side butting controls have completed (i.e., both of a P-position-side butting control completion flag Xp and a non-P-position-side butting control completion flag Xnp are "on"). If at least one of P-position-side and non-P-position-side butting controls has not completed yet, this routine is finished without executing the remaining steps.

On the other hand, if both of P-position-side and non-P-position-side butting controls have completed the routine proceeds to step 705, where an actual measurement value ΔNact of the movable range of the rotor 32 (i.e., the movable range of the detent lever 15) from the P-position-side limit position (i.e., the side wall of the P-position holding recess 24) to the non-P-position-side limit position (i.e., the side wall of the non-P-position holding recess 25) is calculated according to the following equation:

$$\Delta Nact = Nnp - Np$$

In the above equation, Nnp is an encoder count at the time of non-P-position-side butting and is set to a value GNnp that is learned by the non-P-position-side butting control routine (described later) of FIGS. 42 and 43. And Np is an encoder count at the time of P-position-side butting and is set to a value GNp that is learned by the P-position-side butting control routine (described later) of FIGS. 39 and 40.

Figures 37, 38:
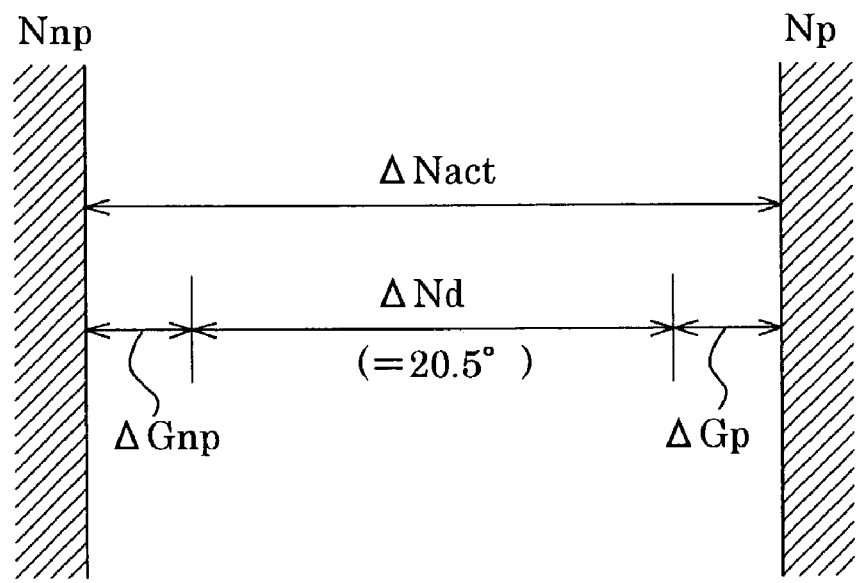
FIG. 37 is an exemplary table to be used for setting a ride correction value $\Delta \text{Vover}$ in accordance with a battery voltage.
FIG. 38 illustrates a relationship between an actual measurement value $\Delta \text{Nact}$ and a design value $\Delta \text{Nd}$ of the movable range of the rotor and play amounts $\Delta \text{Gp}$ and $\Delta \text{Gnp}$.

After the calculation of the actual measurement value ΔNact of the movable range, the routine proceeds to step 706, where a P-position-side play amount ΔGp and a non-P-position-side play amount ΔGnp are calculated according to the following equation using the actual measurement value ΔNact and a design value ΔNd of the movable range taking a relationship of FIG. 38 into consideration:

$$\Delta Gp = \Delta Gnp = (\Delta Nact - \Delta Nd)/2$$

The design value ΔNd of the movable range may be calculated in advance on the basis of design data or set to a center value of varied movable ranges in manufacture of mass-production devices (i.e., an actual measurement value of the movable range of a standard device).

As shown in FIG. 38, the difference ΔNact−ΔNd between the actual measurement value ΔNact and the design value ΔNd corresponds to the sum ΔGp+ΔGnp of the P-position-side play amount ΔGp and the non-P-position-side play amount ΔGnp. Since the P-position-side play amount ΔGp and the non-P-position-side play amount ΔGnp generally coincide with each other, each of them can be calculated according to the above equation.

After the calculation of the play amounts ΔGp and ΔGnp, the routine proceeds to step 707, where the play amount learning completion flag Xg is set to "on" that means completion of play amount learning. Then, this routine is finished.

The actual measurement value ΔNact and the play amounts ΔGp and ΔGnp that have been calculated at steps 705 and 706 are stored, with updating, in a nonvolatile memory (not shown) such as an SRAM of the ECU 41 and the stored values are held even after turning-off of the ignition switch. After the ignition switch is turned on next time, a target count Acnt is set by a target count setting routine (described later) shown in FIGS. 45 and 46 by using the actual measurement value ΔNact of the movable range and the play amounts ΔGp and ΔGnp that are stored in the nonvolatile memory of the ECU 41.

[P-position-side Butting Control]

The P-position-side butting control routine shown in FIGS. 39 and 40 is a subroutine that is executed at step 702 of the play amount learning routine of FIG. 36 when the instructed shift position is the P-position. Upon activation of this routine, at step 711, it is determined whether the P-position-side butting completion flag Xp is "on" (i.e., a P-position-side butting control has finished). If a P-position-side butting control has already finished, this routine is finished without executing the remaining steps. As a result, a P-position-side butting control is performed only once during an ignition switch on-period.

On the other hand, if it is determined at step 711 that the P-position-side butting completion flag Xp is "off" (a P-position-side butting control has not finished), the routine proceeds to step 712, where it is determined whether the control mode determination value "mode" is equal to 0 or 3. The control mode determination value "mode" being "0" means "current supply off" (standby), and the control mode determination value "mode" being "3" means "target position stopping and holding process."

In this routine, a P-position-side butting control is performed when the control mode determination value "mode" is equal to 0 or 3 so that it is performed in a state that the rotor 32 is stopped at the P-position.

If the control mode determination value "mode" is equal to "0" (current supply off), the routine proceeds to step 713, where the count CT0p of a mode-0 time counter that counts the time during which the value "mode" is kept at "0" with the P-position is incremented. If the control mode determination value "mode" is equal to "3" (target position stopping and holding process), the routine proceeds to step 714, where the count CT3p of a mode-3 time counter that counts the time during which the value "mode" is kept at "3" with the P-position is incremented. The above two time counters are used for waiting until vibration of the rotor 32 settles and the rotor 32 is stopped at the P-position.

If the control mode determination value "mode" is equal to "1" (ordinary drive), "4" (reversing position stopping and holding process), or "5" (open-loop control), the rotor 32 is not stopped at the P-position and hence the routine proceeds to step 731, where the counts CT0*p* and CT3*p* of the respective time counters are cleared.

Then, at step 715, it is determined whether the count CT0*p* of the mode-0 time counter has exceeded a stop determination value K0*p* or the count CT3*p* of the mode-3 time counter has exceeded a stop determination value K3*p*. The stop determination value K0*p* corresponds to a time that is necessary for settlement of vibration of the rotor 32 in a state that the shift position is the P-position and the control mode determination value mode" is equal to "0" (current supply off). The stop determination value K3*p* corresponds to a time that is necessary for settlement of vibration of the rotor 32 in a state that the shift position is the P-position and the control mode determination value "mode" is equal to "3" (target position stopping and holding process).

If the determination result at step 715 is "no," it is determined that vibration of the rotor 32 has not settled yet. The routine proceeds to step 716, where the P-position-side butting control flag Xexp is set to "off." In this case, a P-position-side butting control is not started.

On the other hand, if the determination result at step 715 is "yes," it is determined that vibration of the rotor 32 has settled at the P-position. The routine proceeds to step 717, where the P-position-side butting control flag Xexp is set to "on."

Then, the routine proceeds to step 718, where it is determined whether the P-position-side butting control flag Xexp is "on." If the flag Xexp is "off," the routine proceeds to step 719, where all of a butting target count Ag, the count CTstop of a stop time counter, and the count CTg of a butting control time counter are set to "0." Then this routine is finished.

On the other hand, if the P-position-side butting control flag Xexp is "on," the routine proceeds to step 720, where the butting target count Ag is set to a prescribed value Kgp. The butting target count Ag (Kgp) is set to such a value that a P-position-side butting control can cause the engaging portion 23*a* of the detent spring 23 to reliably butt against the side wall of the P-position holding recess 24 of the detent lever 15.

Figure 41:
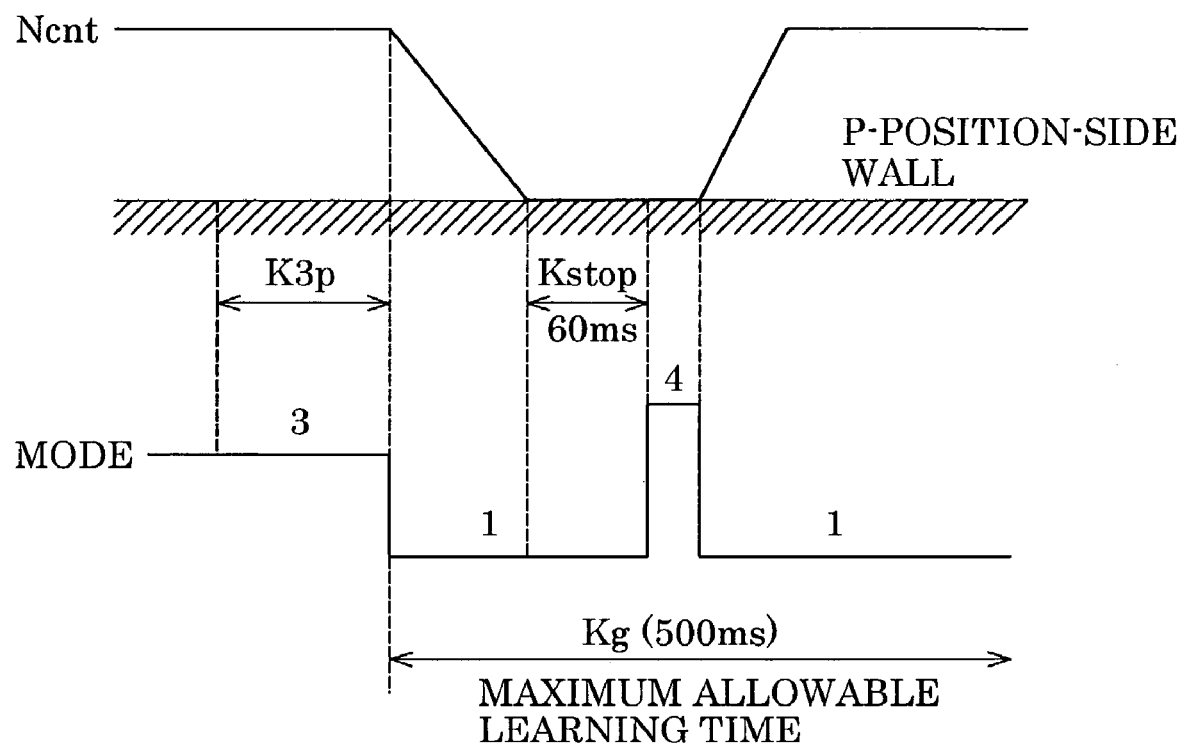
FIG. 41 is a time chart showing an exemplary P-position-side butting control.

If the P-position-side butting control flag Xexp is "on," the target count Acnt is set to the target count Ag (i.e., Kgp) by a target count setting routine (described later) shown in FIG. 45. Therefore, a P-position-side butting control is performed as shown in FIG. 41, whereby the engaging portion 23*a* of the detent spring 23 butts against the side wall of the P-position holding recess 24 of the detent lever 15.

During the P-position-side butting control, the count CTg of the butting control time counter is incremented at step 721 in FIG. 40 to measure the execution time of the p-position-side butting control. At the next step 722, it is determined whether the execution time CTg of the P-position-side butting control has exceeded a maximum allowable learning time Kg (e.g., 500 ms). If the P-position-side butting control is performed normally, the engaging portion 23*a* of the detent spring 23 should butt against the side wall of the P-position holding recess 24 of the detent lever 15 in a time that is shorter than the maximum allowable learning time Kg, whereupon learning of an encoder count Np at the time of P-position-side butting (i.e., the P-position-side butting control) is finished.

Therefore, if the P-position-side butting control is not finished even after a lapse of the maximum allowable learning time Kg, some system abnormality such as a failure in the SR motor 12 or the encoder 46 should have happened.

Therefore, in such a case, to finish the P-position-side butting control forcibly, the routine proceeds to step 723, where the following settings are made: the P-position-side butting control flag Xexp =off, the P-position-side butting completion flag Xp=off, the stop time count CTstop=0, the mode-3 time count CT3*p*=0, the mode-0 time count CT0*p*=0, and the butting control time count CTg=0. Then, this routine is finished.

On the other hand, if the execution time CTg of the P-position-side butting control has not exceeded the maximum allowable learning time Kg, the routine proceeds to step 724, where a learned value Vp of the P-position output of the output shaft sensor 14 is updated according to the following equation:

$$Vp(i)=Vp(i-1)+\{Vnsw-Vp(i-1)\}/Rnsw$$

where Vp (i) is a current P-position output learned value, Vp (i−1) is a preceding P-position output learned value, Vnsw is a current output of the output shaft sensor 14, and Rnsw is a smoothing coefficient.

At the next step 725, a learned value of the encoder count at the time of P-position-side butting (hereinafter referred to as "P-position-side butting learned value") GNp is updated according to the following equation:

$$GNp(i)=\min\{GNp(i-1), Ncnt\}$$

In the above equation, GNp(i) is a current P-position-side butting learned value, GNp(i−1) is a preceding P-position-side butting learned value, and Ncnt is a current encoder count. The function "min" is a function of choosing a smaller one of GNp(i−1) and Ncnt. The encoder count Ncnt is set to a value that has been corrected by using an initial positional deviation learned value Gcnt that was learned by the initial drive routine of FIGS. 8 and 9.

Then, the routine proceeds to step 726, where whether a state that the engaging portion 23*a* of the detent spring 23 is in contact with the side wall of the P-position holding recess 24 of the detent lever 15 has been established is determined on the basis of whether the current P-position-side butting learned value GNp(i) is the same as the preceding P-position-side butting learned value GNp(i−1).

As shown in FIG. 41, until a state that the engaging portion 23*a* of the detent spring 23 is in contact with the side wall of the P-position holding recess 24 of the detent lever 15 is established, the rotor 32 rotates and the encoder count Ncnt decreases gradually and hence the current P-position-side butting learned value GNp(i) should be smaller than the preceding P-position-side butting learned value GNp(i−1). Once a state that the engaging portion 23*a* of the detent spring 23 is in contact with the side wall of the P-position holding recess 24 of the detent lever 15 is established afterwards, the rotor 32 stops rotating and the encoder count Ncnt oscillates or no longer varies. Since the learned value GNp(i) is no longer updated, the current P-position-side butting learned value GNp(i) should be greater than or equal to the preceding P-position-side butting learned value GNp (i−1).

If the determination result at step 726 in FIG. 40 is "no," a state that the engaging portion 23*a* of the detent spring 23 is in contact with the side wall of the P-position holding recess 24 of the detent lever 15 is not established and hence the routine proceeds to step 727, where the count CTstop of the stop time counter is reset.

On the other hand, if the determination result at step 726 in FIG. 40 is "yes," it is determined that the engaging portion 23*a* of the detent spring 23 may have butted against the side wall of the P-position holding recess 24 of the detent lever 15 and the routine proceeds to step 728, where the count CTstop of the stop time counter that counts the time of a contact state is incremented.

Then, the routine proceeds to step 729. The P-position-side butting control is continued until the count CTstop of the stop time counter exceeds a prescribed time Kstop (e.g., 60 ms) at step 729. At an instant when the state that the determination result at step 726 is "yes" has continued for the prescribed time Kstop or more, it is determined that occurrence of a contact state has been confirmed and the routine proceeds to step 730. At step 730, the following settings are made to finish the P-position-side butting control: the P-position-side butting control flag Xexp=off, the P-position-side butting completion flag Xp=on, the P-position-side butting encoder count Np=GNp+ΔNover (ΔNover is a ride correction value), the stop time count CTstop=0, the mode-3 time count CT3p=0, and the mode-0 time count CT0p=0. Then, this routine is finished.

The ride correction value ΔNover is an angle by which the engaging portion 23a of the detent spring 23 slightly rides the side wall of the holding recess 24 or 25 of the detent lever 15 in a state that the engaging portion 23a is in contact with the side wall during a butting control. The ride correction value ΔNover is set in accordance with a battery voltage as a power source voltage for the SR motor 12 by using the table of FIG. 37.

The angle (i.e., ride correction value ΔNover) by which the engaging portion 23a of the detent spring 23 rides the side wall of the holding recess 24 or 25 of the detent lever 15 during a butting control increases as the torque of the SR motor 12 increases. In general, the torque of the SR motor 12 varies with the power source voltage therefor (i.e., battery voltage) and hence a correlation exists between the power source voltage and the torque of the SR motor 12. The power source voltage can be used as replacement information for the torque of the SR motor 12. Therefore, an actual measurement value of the movable range of the rotor 32 can be determined accurately by calculating an angle (i.e., a ride correction value ΔNover) by which the engaging portion 23a of the detent spring 23 rides the side wall of the holding recess 24 or 25 of the detent lever 15 during a butting control on the basis of the power source voltage (i.e., battery voltage) as replacement information for the torque of the SR motor 12 and correcting an actual measurement value of the movable range of the rotor 32 by the ride correction value ΔNover.

If the side wall of each of the holding recesses 24 and 25 of the detent lever 15 is formed so as not to be rideed by the engaging portion 23a of the detent spring 23, it is not necessary to use the ride correction value ΔNover and hence a relationship ΔNact=Nnp−Np holds.

[Non-P-Position-Side Butting Control]

The non-P-position-side butting control routine shown in FIGS. 42 and 43 is a subroutine that is executed at step 703 of the play amount learning routine of FIG. 36 when the instructed shift position is the non-P-position. Upon activation of this routine, at step 741, it is determined whether the non-P-position-side butting completion flag Xnp is "on" (i.e., a non-P-position-side butting control has finished). If a P-position-side butting control has already finished, this routine is finished without executing the remaining steps. As a result, a non-P-position-side butting control is performed only once during an ignition switch on-period.

On the other hand, if it is determined at step 741 that the non-P-position-side butting completion flag Xnp is "off" (a non-P-position-side butting control has not finished), the routine proceeds to step 742, where it is determined whether the control mode determination value "mode" is equal to 0 (current supply off) or 3 (target position stopping and holding process). In this routine, a non-P-position-side butting control is performed when the control mode determination value "mode" is equal to 0 or 3 so that it is performed in a state that the rotor 32 is stopped at the non-P-position.

If the control mode determination value "mode" is equal to "0" (current supply off), the routine proceeds to step 743, where the count CT0np of a mode-0 time counter that counts the time during which the value "mode" is kept at "0" with the non-P-position is incremented. If the control mode determination value "mode" is equal to "3" (target position stopping and holding process), the routine proceeds to step 744, where the count CT3np of a mode-3 time counter that counts the time during which the value "mode" is kept at "3" with the non-P-position is incremented. The above two time counters are used for waiting until vibration of the rotor 32 settles and the rotor 32 is stopped at the P-position.

If the control mode determination value "mode" is equal to "1" (ordinary drive), "4" (reversing position stopping and holding process), or "5" (open-loop control), the rotor 32 is not stopped at the non-P-position and hence the routine proceeds to step 761, where the counts CT0np and CT3np of the respective time counters are cleared.

Then, at step 745, it is determined whether the count CT0np of the mode-0 time counter has exceeded a stop determination value K0np or the count CT3np of the mode-3 time counter has exceeded a stop determination value K3np. The stop determination value K0np corresponds to a time that is necessary for settlement of vibration of the rotor 32 in a state that the shift position is the non-P-position and the control mode determination value "mode" is equal to "0" (current supply off). The stop determination value K3np corresponds to a time that is necessary for settlement of vibration of the rotor 32 in a state that the shift position is the non-P-position and the control mode determination value "mode" is equal to "3" (target position stopping and holding process).

If the determination result at step 745 is "no," it is determined that vibration of the rotor 32 has not settled yet and the routine proceeds to step 746, where the non-P-position-side butting control flag Xexnp is set to "off." In this case, a non-P-position-side butting control is not started.

On the other hand, if the determination result at step 745 is "yes," it is determined that vibration of the rotor 32 has settled at the non-P-position and the routine proceeds to step 747, where the non-P-position-side butting control flag Xexnp is set to "on."

Then, the routine proceeds to step 748, where it is determined whether the non-P-position-side butting control flag Xexnp is "on." If the flag Xexnp is "off," the routine proceeds to step 749, where all of the butting target count Ag, the count CTstop of the stop time counter, and the count CTg of the butting control time counter are set to "0." Then this routine is finished.

On the other hand, if the non-P-position-side butting control flag Xexnp is "on," the routine proceeds to step 750, where the butting target count Ag is set to a prescribed value Kgnp. The butting target count Ag (Kgnp) is set to such a value that a non-P-position-side butting control can cause the engaging portion 23a of the detent spring 23 to reliably butt against the side wall of the non-P-position holding recess 25 of the detent lever 15.

If the non-P-position-side butting control flag Xexnp is "on," the target count Acnt is set to the target count Ag (i.e., Kgnp) by a target count setting routine (described later) shown in FIG. 45. Therefore, a non-P-position-side butting control is performed, whereby the engaging portion 23a of the detent spring 23 butts against the side wall of the non-P-position holding recess 25 of the detent lever 15.

During the non-P-position-side butting control, the count CTg of the butting control time counter is incremented at step 751 in FIG. 43 to measure the execution time of the non-P-position-side butting control. At the next step 752, it is determined whether the execution time CTg of the non-P-position-side butting control has exceeded the maximum allowable learning time Kg (e.g., 500 ms). If the non-P-position-side butting control is performed normally, the engaging portion 23a of the detent spring 23 should butt against the side wall of the P-position holding recess 24 of the detent lever 15 in a time that is shorter than the maximum allowable learning time Kg, whereupon learning of an encoder count Nnp at the time of non-P-position-side butting (i.e., the non-P-position-side butting control) is finished.

Therefore, if the non-P-position-side butting control is not finished even after a lapse of the maximum allowable learning time Kg, some system abnormality such as a failure in the SR motor 12 or the encoder 46 should have happened. Therefore, in such a case, to finish the non-P-position-side butting control forcibly, the routine proceeds to step 753, where the following settings are made: the non-P-position-side butting control flag Xexnp=off, the non-P-position-side butting completion flag Xnp=off, the stop time count CTstop=0, the mode-3 time count CT3$np$=0, the mode-0 time count CT0$np$=0, and the butting control time count CTg=0. Then, this routine is finished.

On the other hand, if the execution time CTg of the non-P-position-side butting control has not exceeded the maximum allowable learning time Kg, the routine proceeds to step 754, where a learned value Vnp of the non-P-position output of the output shaft sensor 14 is updated according to the following equation:

$$Vnp(i)=Vnp(i-1)+\{Vnsw-Vnp(i-1)\}/Rnsw$$

where Vnp(i) is a current non-P-position output learned value, Vnp(i−1) is a preceding non-P-position output learned value, Vnsw is a current output of the output shaft sensor 14, and Rnsw is a smoothing coefficient.

At the next step 755, a learned value of the encoder count at the time of non-P-position-side butting (hereinafter referred to as "non-P-position-side butting learned value") GNnp is updated according to the following equation:

$$GNnp(i)=\max\{GNnp(i-1), Ncnt\}$$

In the above equation, GNnp(i) is a current non-P-position-side butting learned value, GNnp(i−1) is a preceding non-P-position-side butting learned value, and Ncnt is a current encoder count. The function "max" is a function of choosing a larger one of GNnp(i−1) and Ncnt. The encoder count Ncnt is set to a value that has been corrected by using an initial positional deviation learned value Gcnt that was learned by the initial drive routine of FIGS. 8 and 9.

Then, the routine proceeds to step 756, where whether a state that the engaging portion 23a of the detent spring 23 is in contact with the side wall of the non-P-position holding recess 25 of the detent lever 15 has been established is determined on the basis of whether the current non-P-position-side butting learned value GNnp(i) is the same as the preceding non-P-position-side butting learned value GNnp(i−1).

Until a state that the engaging portion 23a of the detent spring 23 is in contact with the side wall of the non-P-position holding recess 25 of the detent lever 15 is established, the rotor 32 rotates and the encoder count Ncnt increases gradually and hence the current non-P-position-side butting learned value GNnp(i) should be greater than the preceding non-P-position-side butting learned value GNnp(i−1). Once a state that the engaging portion 23a of the detent spring 23 is in contact with the side wall of the non-P-position holding recess 25 of the detent lever 15 is established afterwards, the rotor 32 stops rotating and the encoder count Ncnt oscillates or no longer varies. Since the learned value GNnp(i) is no longer updated, the current non-P-position-side butting learned value GNnp(i) should be greater than or equal to the preceding non-P-position-side butting learned value GNnp(i−1).

If the determination result at step 756 in FIG. 43 is "no," a state that the engaging portion 23a of the detent spring 23 is in contact with the side wall of the non-P-position holding recess 25 of the detent lever 15 is not established and hence the routine proceeds to step 757, where the count CTstop of the stop time counter is reset.

On the other hand, if the determination result at step 756 is "yes," it is determined that the engaging portion 23a of the detent spring 23 may have butted against the side wall of the non-P-position holding recess 25 of the detent lever 15 and the routine proceeds to step 758, where the count CTstop of the stop time counter that counts the time of a contact state is incremented.

Then, the routine proceeds to step 759. The non-P-position-side butting control is continued until the count CTstop of the stop time counter exceeds the prescribed time Kstop (e.g., 60 ms) at step 759. At an instant when the state that the determination result at step 756 is "yes" has continued for the prescribed time Kstop or more, it is determined that occurrence of a contact state has been confirmed and the routine proceeds to step 760. At step 760, the following settings are made to finish the non-P-position-side butting control: the non-P-position-side butting control flag Xexnp=off, the non-P-position-side butting completion flag Xnp=on, the non-P-position-side butting encoder count Nnp=GNnp−ΔNover (ΔNover is the ride correction value), the stop time count CTstop=0, the mode-3 time count CT3$np$=0, and the mode-0 time count CT0$np$=0. Then, this routine is finished.

Figure 44:
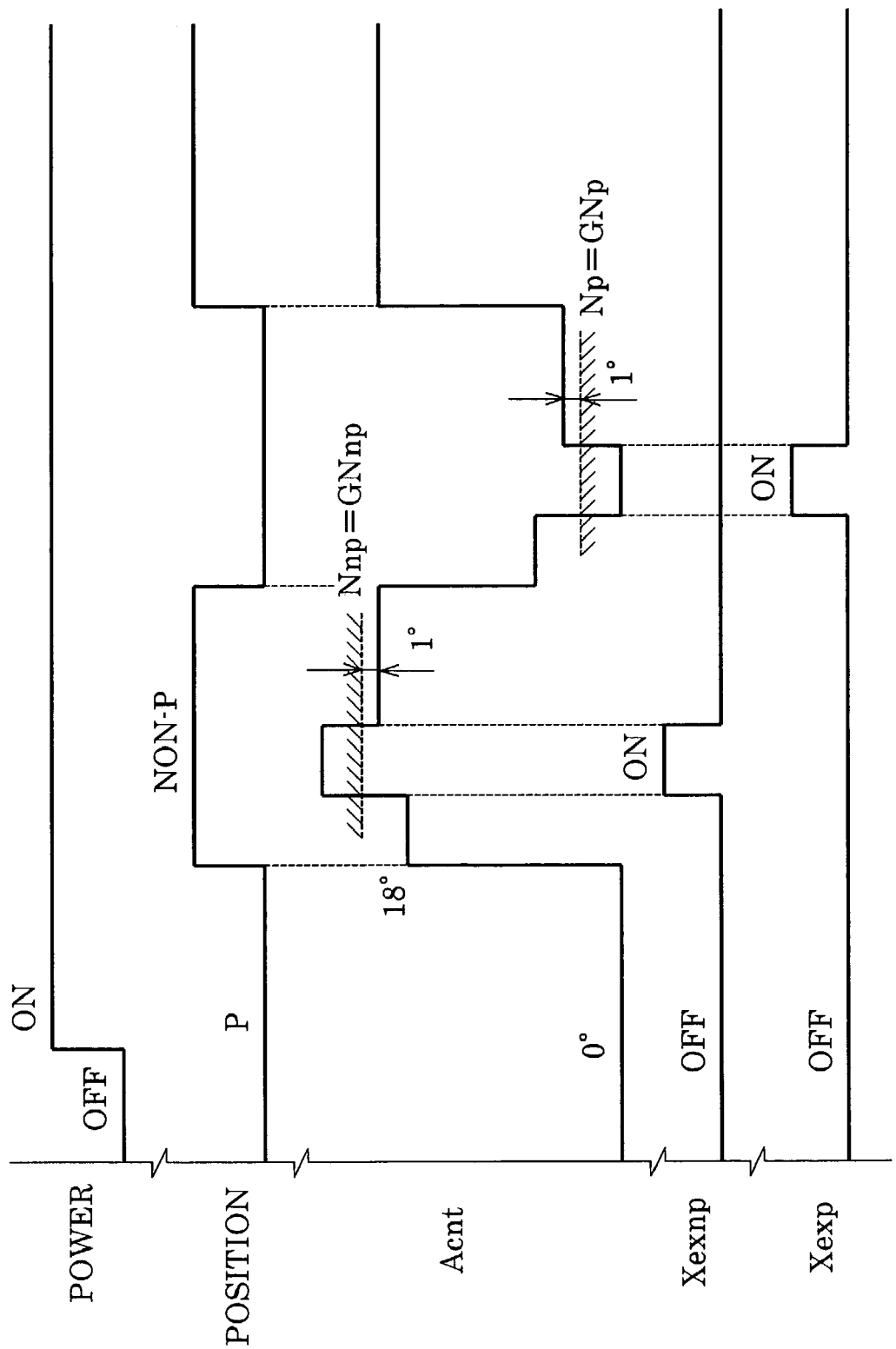
FIG. 44 is a time chart illustrating exemplary execution timing of a P-position-side butting control and a non-P-position-side butting control.

FIG. 44 is a time chart showing exemplary execution timing of a P-position-side butting control and a non-P-position-side butting control. In the example of FIG. 44, when the instructed shift position is switched from the P-position to the non-P-position some time after an on-manipulation on the ignition switch (i.e., application of power), the target count Acnt is set to a temporary target count (e.g., 18°) for the non-P-position. The temporary target count (e.g., 18°) corresponds to a rotation angle at which the engaging portion 23a of the detent spring 23 has reliably gone over the projection between the holding recesses 24 and 25 of the detent lever 15.

Therefore, after being rotated to a position corresponding to the temporary target count (e.g., 18°) by a feedback control, the rotor 32 is rotated to the non-P-position target position (i.e., the bottom of the non-P-position holding recess 25) by utilizing momentum of the engaging portion 23a of the detent spring 23 being dropped toward the bottom along the inclined side wall of the non-P-position holding recess 25 of the detent lever 15 by elastic force of the detent spring 23.

Then, when the non-P-position-side butting control flag Xexnp is set to "on," the target count Acnt is set to a non-P-position-side butting target count Ag (i.e., Kgnp) and a non-P-position-side butting control is started. An encoder count Nnp (i.e., GNnp) is learned when the engaging portion 23a of the detent spring 23 butts against the side wall of the non-P-position holding recess 25 of the detent lever 15. After the learning of the encoder count Nnp, the non-P-position-side butting control flag Xexnp is set to "off" and the non-P-position-side butting control is finished.

Then, when the instructed shift position is switched from the non-P-position to the P-position, the target count Acnt is set to a temporary target count (e.g., 0°) for the P-position. After being rotated to a position corresponding to the temporary target count (e.g., 0°) by a feedback control, the rotor 32 is rotated to the P-position target position (i.e., the bottom of the P-position holding recess 24) by utilizing momentum of the engaging portion 23a of the detent spring 23 being dropped toward the bottom along the inclined side wall of the P-position holding recess 24 of the detent lever 15 by elastic force of the detent spring 23.

Then, when the P-position-side butting control flag Xexp is set to "on," the target count Acnt is set to a non-P-position-side butting target count Ag (i.e., Kgp) and a P-position-side butting control is started. An encoder count Np (i.e., GNp) is learned when the engaging portion 23a of the detent spring 23 butts against the side wall of the P-position holding recess 24 of the detent lever 15. After the learning of the encoder count Np, the P-position-side butting control flag Xexp is set to "off" and the P-position-side butting control is finished.

[Target Count Setting]

The target count setting routine shown in FIGS. 45 and 46 is executed in a prescribed cycle (e.g., every 8 ms) after the end of an initial drive. Upon activation of this routine, at step 771, it is determined whether a butting control is being performed (i.e., whether the P-position-side butting control flag Xexp or the non-P-position-side butting control flag Xexnp is "on"). If a butting control is being performed, the routine proceeds to step 772, where the target count Acnt is set to a butting target count Ag. The butting target count Ag is set at step 720 in FIG. 39 or step 750 in FIG. 42.

On the other hand, if no butting control is being performed, the routine proceeds to step 773, where it is determined whether an instructed shift position sft that is stored in the RAM of the ECU 41 is the P-position. If it is the P-position, the routine proceeds to step 774, where it is determined whether a P-position-side butting control has completed (i.e., whether the P-position-side butting completion flag Xp is "on"). If a P-position-side butting control has completed, the routine proceeds to step 775, a P-position target count Acnt is calculated according to the following equation:

$Acnt = Np + \Delta Gp$

In the above equation, Np is an encoder count at the time of P-position-side butting and is a value GNp that was learned by the P-position-side butting control routine of FIGS. 39 and 40. And ΔGp is a learned value of the P-position-side play amount, and is a preceding value that is stored in the nonvolatile memory of the ECU 41 until it is updated by a current (i.e., newly calculated) learned value ΔGp of the play amount at step 706 of the play amount learning routine of FIG. 36.

On the other hand, if a P-position-side butting control has not completed, the determination result at step 774 is "no" and hence the routine proceeds to step 776, where it is determined whether a non-P-position-side butting control has completed (i.e., whether the non-P-position-side butting completion flag Xnp is "on"). If a non-P-position-side butting control has completed, the routine proceeds to step 777, where a P-position target count Acnt is calculated according to the following equation:

$Acnt = Nnp - \Delta Nact + \Delta Gp$

In the above equation, Nnp is an encoder count at the time of non-P-position-side butting and is a value GNnp that was learned by the non-P-position-side butting control routine of FIGS. 42 and 43. And ΔNact is an actual measurement value of the movable range of the rotor 32, and is a preceding value that is stored in the nonvolatile memory of the ECU 41 until it is updated by a current (i.e., newly calculated) actual measurement value ΔNact of the movable range at step 705 of the play amount learning routine of FIG. 36.

If neither a P-position-side butting control nor a non-P-position-side one has completed (i.e., both of the P-position-side and non-P-position-side butting completion flags Xp and Xnp are "off"), the target count Acnt cannot be corrected by using a play amount ΔGp or ΔGnp because neither an encoder count Np at the time of P-position side butting nor an encoder count Nnp at the time of non-P-position side butting has been learned. Therefore, in this case, the routine proceeds to step 778, where the P-position target count Acnt is set to a temporary P-position target count "0."

On the other hand, if it is determined at step 773 that the instructed shift position sft is the non-P-position, the routine proceeds to step 779 in FIG. 46, where it is determined whether a non-P-position-side butting control has completed (i.e., whether the non-P-position-side butting completion flag Xnp is "on"). If a non-P-position-side butting control has completed the routine proceeds to step 780, where a non-P-position target count Acnt is calculated according to the following equation:

$Acnt = Nnp - \Delta Gnp$

In the above equation, ΔGnp is a learned value of the non-P-position-side play amount, and is a preceding value that is stored in the nonvolatile memory of the ECU 41 until it is updated by a current (i.e., newly calculated) learned value ΔGnp of the play amount at step 706 of the play amount learning routine of FIG. 36.

On the other hand, if a non-P-position-side butting control has not completed, the determination result at step 779 is "no" and hence the routine proceeds to step 781, where it is determined whether a P-position-side butting control has completed (i.e., whether the P-position-side butting completion flag Xp is "on"). If a P-position-side butting control has completed, the routine proceeds to step 782, where a non-P-position target count Acnt is calculated according to the following equation:

$Acnt = Np + \Delta Nact - \Delta Gnp$

If neither a P-position-side butting control nor a non-P-position-side one has completed (i.e., both of the P-position-side and non-P-position-side butting completion flags Xp and Xnp are "off"), the routine proceeds to step 783, where the non-P-position target count Acnt is set to a temporary non-P-position target count Knotp "e.g., 18.5°."

In setting a target count Acnt in this routine, preceding values stored in the nonvolatile memory of the ECU 41 are used as play amount learned values ΔGp and ΔGnp and a movable range actual measurement value ΔNact until the former are updated. Alternatively, the target count Acnt may be set to a temporary target count (0 or Knotp) until values stored in the nonvolatile memory are updated.

[Recovery Process]

A recovery processing routine shown in FIG. 51, which is activated every predetermined time (e.g., every 1 ms), executes a recovery process in the following manner when the feedback control state has become abnormal. Upon activation of this routine, at step 801, it is determined whether the recovery process execution flag Xrcv is "off." If the recovery process execution flag xrcv is "off" (i.e., a recovery process is not being executed), the routine proceeds to step 802, where it is determined whether the following recovery process execution criteria (1)-(4) are met:

(1) All of an A-phase signal and a B-phase signal of the encoder 46 and an output signal of the output shaft sensor 14 are normal.

(2) All of abnormality detection flags Xfnsw, Xfcnt, and Xfrcv that are set in a system abnormality diagnosis routine shown in FIGS. 56 and 57 are "off" (no abnormality).

(3) The feedback permission flag Xfb is on (a feedback control is being performed).

Figure 53:
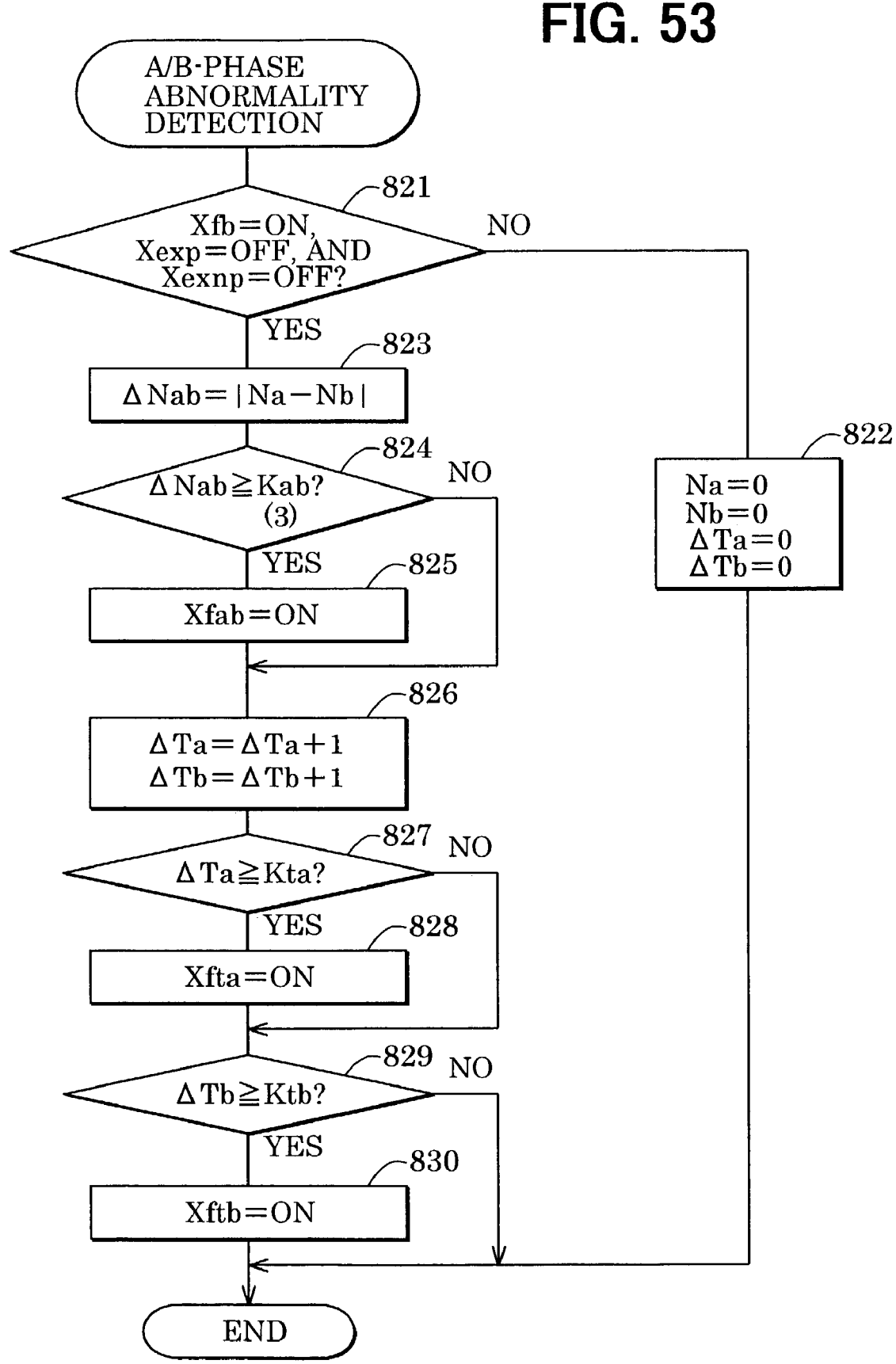
FIG. 53 is a flowchart showing an A/B-phase signal abnormality detection routine.
Figure 55:
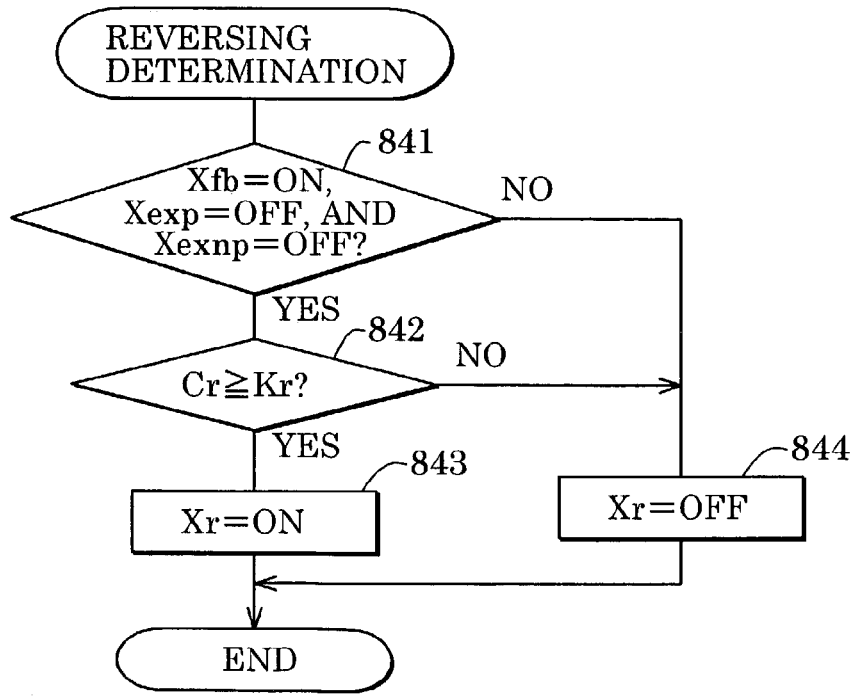
FIG. 55 is a flowchart showing a reversing determination routine.

(4) One of three abnormality detection flags Xfab, Xfta, and Xftb that relate to the A-phase signal and the B-phase signal and are set in an A/B-phase signal abnormality detection routine shown in FIG. 53 is "on" (abnormal) or a reversing detection flag Xr that is set in a reversing determination routine shown in FIG. 55 is "on" (reversing instructed).

The recovery process execution condition is not satisfied. Then, this routine is finished without executing the remaining steps if even one of the four criteria (1)-(4) is not met.

Figure 52:
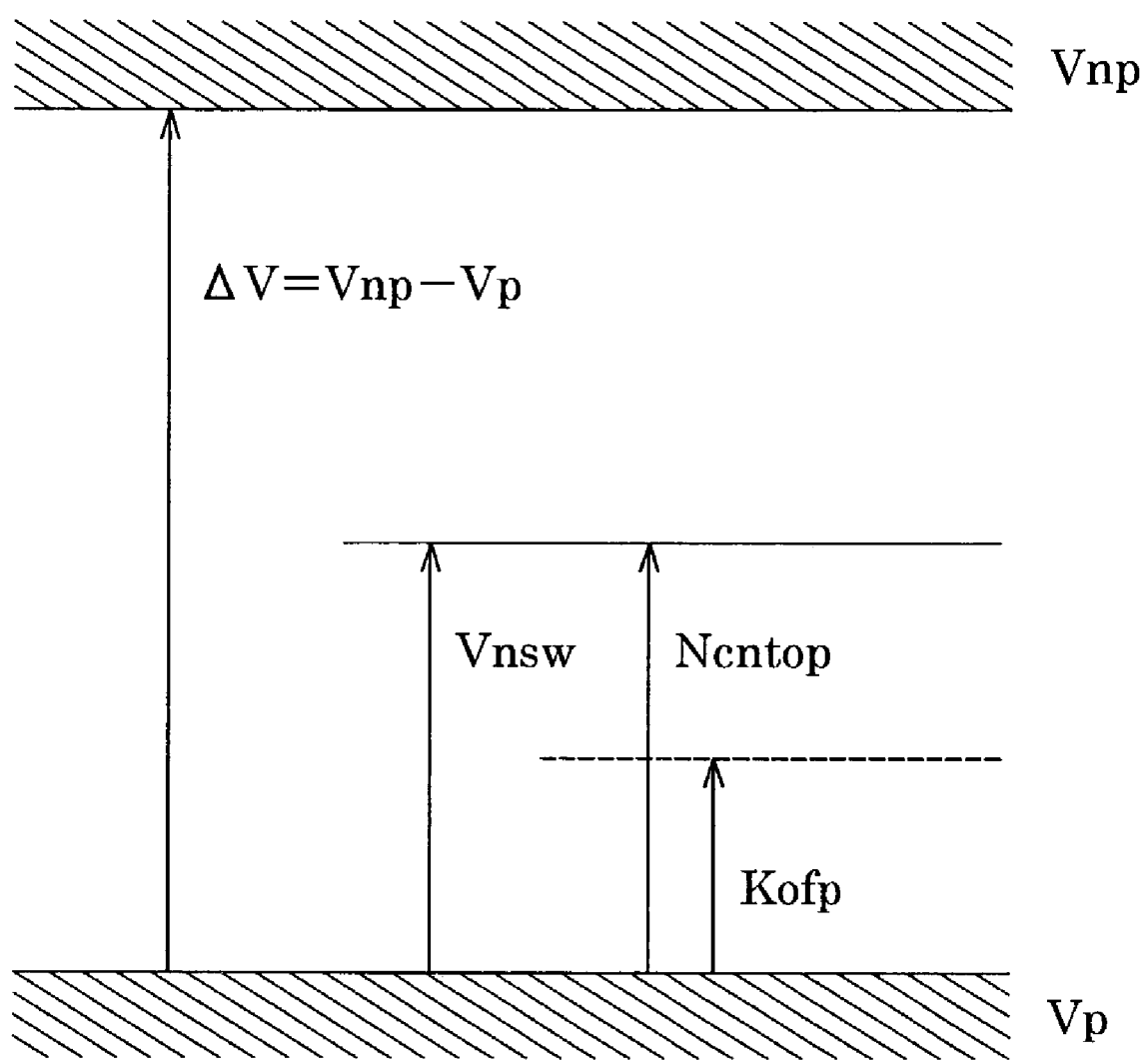
FIG. 52 illustrates a method of calculating an initial value of a position count Ncnt at the start of an open-loop control.

On the other hand, if all of the above criteria (1)-(4) are met, the recovery process execution condition is satisfied and the routine proceeds from step 802 to step 803, where the recovery process execution flag Xrcv is set to "on." At the next step 804, a current position count Ncntop is calculated according to the following equations on the basis of a relationship shown in FIG. 52 by using a current output signal value Vnsw of the output shaft sensor 14:

$$Ncntop = INT[\{\{(Vnsw - Vp)/\Delta V\} \times Kop \times 61/3.75 - Kofp\} \times 1/2] \times 2$$

$$\Delta V = Vnp - Vp$$

where INT is a function of extracting the integer part of a numerical value inside the brackets [ ], Vp is a P-position output learned value of the output shaft sensor 14, Vnp is a non-P-position output learned value of the output shaft sensor 14, Kop is a maximum rotation angle of the detent lever 15, and Kofp is a P-position-side offset value. The first equation is formulated so that the position count Ncntop becomes a multiple of 2.

The maximum rotation angle Kop of the detent lever 15 is a rotation angle by which the detent lever 15 rotates from the side wall of the P-position holding recess 24 of the detent lever 15 to the side wall of its non-P-position holding recess 25, and is calculated by adding a P-position-side play amount $\Delta Gp$ to a design value $\Delta Nd$ of the movable range of the detent lever 15 on the basis of the relationship shown in FIG. 38. In this embodiment, $\Delta Nd$ and $\Delta GP$ are set to 20.5° and 3°, respectively.

$$Kop = \Delta Nd + \Delta Gp = 20.5° + 3° = 23.5°$$

In the equations for calculating the position count Ncntop, Kop×61/3.75 is a value of the maximum rotation angle Kop of the detent lever 15 as converted to the number of motor drive steps (i.e., the current supply counter) in which the number "61" is a reduction ratio of the speed-reducing mechanism 26 and the number "3.75" is a rotation angle of the rotor 32 per step (i.e., per current supply). This position count Ncntop is used as an initial position count Ncntop at the start of an open-loop control.

After the calculation of the position count Ncntop, the routine proceeds to step 805, where the count Crcv of a number-of-execution-times-of-recovery-process counter that counts the number of times of execution of recovery processes is incremented. At the next step 806, the open-loop control execution flag Xopen is set to "on," whereby an open-loop control is performed according to an open-loop control routine shown in FIG. 60.

During execution of a recovery process (i.e., open-loop control), a determination result "no" is produced at step 801 every time this routine is activated. The routine proceeds to step 807, where it is determined whether an open-loop control completion flag Xopcmp is "on" that means completion of an open-loop control. If the open-loop control completion flag Xopcmp is "off," this routine is finished without executing any other step to continue the open-loop control.

When the open-loop control has completed afterwards, the routine proceeds to step 808, where the following settings are made to perform an initial drive again: the initial drive end flag Xend=off (an initial drive has not finished), the position switching manipulation flag Xchg=off (no position switching manipulation), the current supply time count CT=0, the current supply counter count CASE=0, the encoder count Ncnt=0, and the initial positional deviation learned value Gcnt=0. Then, at step 809, to perform butting controls again, the P-position-side butting completion flag Xp is set to "off" (a P-position-side butting control has not finished) and the non-P-position-side butting completion flag Xnp is set to "off" (a non-P-position-side butting control has not finished).

At the next step 810, the control mode determination value "mode" is set to an initial value "$FF." The routine proceeds to step 811, where the open-loop control execution flag Xopen is set to "off" meaning that the open-loop control (i.e., recovery process) has finished. At the next step 812, all of the recovery process execution flag Xrcv, the A/B-phase signal abnormality detection flags Xfab, Xfta, and Xftb, and a third abnormality detection flag Xfrcv (described later) are set to "off."

[A/B-Phase Signal Abnormality Detection]

The A/B-phase signal abnormality detection routine shown in FIG. 53, which is activated every predetermined time (e.g., every 1 ms), determines whether an abnormality exists in an A-phase signal or a B phase signal of the encoder 46 in the following manner. Upon activation of this routine, at step 821, it is determined whether the feedback permission flag Xfb is "on," the P-position-side butting control flag Xexp="off," and the non-P-position-side butting control flag Xexnp="off," that is, whether the present status is such that a feedback control is being performed and no butting control is being performed.

If the determination result at step 821 is "no," that is, the feedback permission flag Xfb is "off," the P-position-side butting control flag Xexp="on," and the non-P-position-side butting control flag Xexnp="on," the routine proceeds to step 822, where all of the A-phase signal count Na, the B-phase signal count Nb, an A-phase signal edge interval count $\Delta Ta$, and a B-phase signal edge interval count $\Delta Tb$ are set to "0" (i.e., they are reset). Then, this routine is finished.

On the other hand, if the determination result at step 821 is "yes," the A/B-phase signal abnormality determination execution condition is satisfied The routine proceeds to step 823, where the difference ΔNab between the A-phase signal count Na and the B-phase signal count Nb is calculated:

$$\Delta Nab = |Na - Nb|$$

where the A-phase signal count Na and the B-phase signal count Nb are values obtained by counting edges of the A-phase signal and edges of the B-phase signal separately.

At the next step 824, the A/B-phase signal count difference ΔNab is compared with an abnormality determination value Kab (e.g., 3). If the A/B-phase signal count difference ΔNab is greater than or equal to the abnormality determination value Kab, it is determined that either the A-phase signal count Na or the B-phase signal count Nb is abnormal. The routine proceeds to step 825, where the A/B-phase signal abnormality detection flag Xfab is set to "on" (abnormal) The routine proceeds to the next step 826.

On the other hand, if the A/B-phase signal count difference ΔNab is smaller than the abnormality determination value Kab, the A/B-phase signal abnormality detection flag Xfab is set to "off" (no abnormality) the routine proceeds to the next step 826.

If the A-phase signal and the B-phase signal are being output normally in the feedback control, the difference ΔNab between the A-phase signal count Na and the B-phase signal count Nb becomes 0 or 1. Therefore, the A/B-phase signal count difference ΔNab being greater than or equal to "12" indicates that a pulse of the A-phase signal or the B-phase signal has been lost or a noise pulse has been mixed (FIG. 48). Therefore, whether an abnormality exists in the A-phase signal or the B-phase signal can be determined on the basis of whether A/B-phase signal count difference ΔNab is greater than or equal to the abnormality determination value Kab. Although in this embodiment the abnormality determination value Kab is set to "3," it may be set to "2," "4," or a value greater than "4."

After the abnormality determination process using the A/B-phase signal count difference ΔNab has been executed in the above manner, the routine proceeds to step 826, where the A-phase signal edge interval countΔTa and the B-phase signal edge interval count ΔTb are incremented. Then, the routine proceeds to step 827, where the A-phase signal edge interval ΔTa is compared with an abnormality determination value Kta (e.g., 10 times an average value of ΔTa). If the A-phase signal edge intervalΔTa is greater than or equal to the abnormality determination value Kta, it is determined that the A-phase signal is abnormal. The routine proceeds to step 828, where the A-phase signal abnormality detection flag Xfta is set to "on" (abnormal) The routine proceeds to the next step 829.

On the other hand, if the A-phase signal edge interval ΔTa is smaller than Kta, the routine proceeds to the next step 829 with the A-phase signal abnormality detection flag Xfta kept "off" (no abnormality). At step 829, where the B-phase signal edge interval ΔTb is compared with an abnormality determination value Ktb (e.g., 10 times an average value of ΔTb). If the B-phase signal edge interval ΔTb is greater than or equal to the abnormality determination value Ktb, it is determined that the B-phase signal is abnormal. The routine proceeds to step 830, where the B-phase signal abnormality detection flag Xftb is set to "on" (abnormal) Then, this routine is finished.

On the other hand, if the B-phase signal edge interval ΔTb is smaller than Ktb, this routine finished with the B-phase signal abnormality detection flag Xftb kept "off" (no abnormality) and the routine is finished.

The A-phase signal edge interval ΔTa and the B-phase signal edge interval ΔTb vary with the rotor rotation speed. Therefore, the edge interval ΔTa or ΔTb being too long during the feedback control indicates that the rotor 32 has made an abnormal stop, its rotation speed has decreased abnormally, or a pulse loss has occurred (see FIG. 48). Whether an abnormality exists in the A-phase signal or the B-phase signal can be determined on the basis of whether the edge interval ΔTa or ΔTb is greater than or equal to Kta or Ktb (e.g., 10 times an average value of ΔTa and ΔTb).

If the edge interval ΔTa or ΔTb is too short, a noise pulse may erroneously be recognized as a regular pulse signal. In view of this, whether an abnormality exists in the A-phase signal or the B-phase signal may be determined on the basis of whether the edge interval ΔTa or ΔTb is shorter than or equal to a prescribed abnormality determination value.

Alternatively, only one of the abnormality determination process (i.e., steps 823-825) using the A/B-phase signal count difference ΔNab and the abnormality determination process (i.e., steps 826-830) using the edge intervals ΔTa and ΔTb may be executed (the other process is omitted).

[Reversing Counter]

A reversing counter routine shown in FIG. 54, which is executed by A/B-phase interruption processing, counts, in the following manner, the number of times the rotation direction of the rotor 32 is reversed consecutively contrary to a rotation direction instruction. Upon activation of this routine, at step 831, it is determined whether the rotation direction instruction value D is equal to "1" (the rotation direction from the P-position direction to the non-P-position direction), "0" (stop), or "−1" (the rotation direction from the non-P-position direction to the P-position direction). If the rotation direction instruction value D is equal to "0" (stop), this routine is finished without executing the remaining steps.

If the rotation direction instruction value D is equal to "1" (the rotation direction from the P-position direction to the non-P-position direction), the routine proceeds to step 832, where whether the rotation direction of the rotor 32 has reversed (i.e., the encoder count Ncnt has decreased) contrary to the rotation direction instruction is determined on the basis of whether a preceding encoder count Ncnt(i−1) minus a current encoder count Ncnt(i) is greater than or equal to "1." If the rotation direction of the rotor 32 has reversed, the routine proceeds to step 834, where the count Cr of a reversing counter that counts the number of times of reversing is incremented. If the rotation direction of the rotor 32 has not reversed, the routine proceeds to step 835, where the count Cr is reset to "0."

If the rotation direction instruction value D is equal to "−1" (the rotation direction from the non-P-position direction to the P-position direction), the routine proceeds to step 833, where whether the rotation direction of the rotor 32 has reversed (i.e., the encoder count Ncnt has increased) contrary to the rotation direction instruction is determined on the basis of whether a preceding encoder count Ncnt(i−1) minus a current encoder count Ncnt(i) is smaller than or equal to "−1." If the rotation direction of the rotor 32 has reversed, the routine proceeds to step 836, where the count Cr is incremented. If the rotation direction of the rotor 32 has not reversed, the routine proceeds to step 835, where the count Cr is reset to "0."

[Reversing Determination]

A reversing determination routine shown in FIG. 55 is activated every predetermined time (e.g., every 1 ms). Upon activation of this routine, at step 841, it is determined whether the feedback control flag Xfb is "on," the P-position-side butting control flag Xexp is "off," and the non-P-position-side butting control flag Xexnp is "off," that is, whether the current status is such that a feedback control is being performed and no butting controls are being performed. If the determination result at step 841 is "no," that is, the feedback control flag Xfb is "off," the P-position-side butting control flag Xexp is "on," or the non-P-position-side butting control flag Xexnp is "on," the routine proceeds to step 844, where the reversing detection flag Xr is set to "off." Then, this routine is finished.

Figure 54:
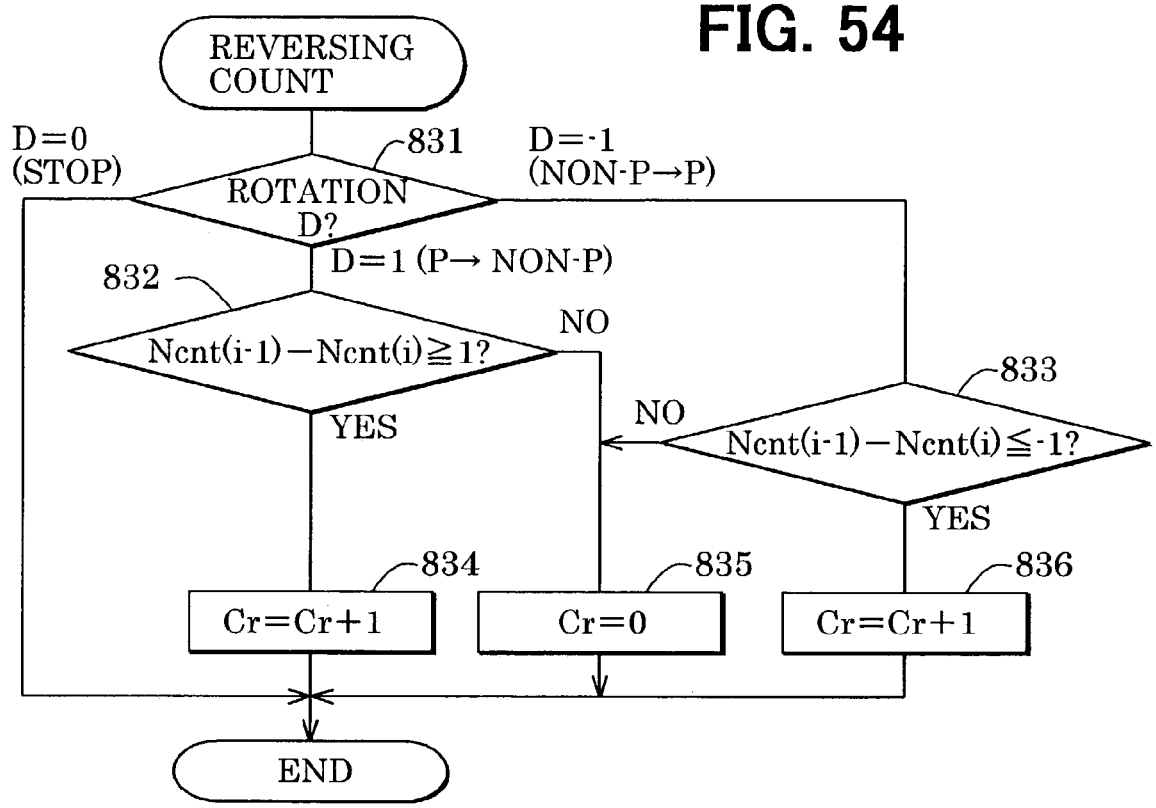
FIG. 54 is a flowchart showing a reversing counter routine.

On the other hand, if determination result at step 841 is "yes," the reversing determination execution condition is satisfied The routine proceeds to step 842, where whether the rotor 32 continues to rotate in a direction contrary to a rotation direction instruction is determined on the basis of whether a reversing count Cr that was determined in the reversing counter routine of FIG. 54 is greater than or equal to an abnormality determination value Kr (e.g., 4).

If the reversing count Cr is greater than or equal to the abnormality determination value Kr, the routine proceeds to step 843, where the reversing detection flag Xr is set to "on" to decide on the reversing determination. If the reversing count Cr is smaller than the abnormality determination value Kr, the routine proceeds to step 844, where the reversing detection flag Xr is kept "off."

[System Abnormality Diagnosis]

A system abnormality diagnosis routine shown in FIGS. 56 and 57, which is activated every predetermined time (e.g., every 8 ms), serves as the failure monitoring means in the claims. Upon activation of this routine, at step 851, it is determined whether the following abnormality diagnosis execution criteria (1)-(3) are met:

(1) A prescribed time (e.g., 1 s) has elapsed from application of power to the ECU 41 in response to a manipulation on the ignition switch (not shown).

(2) No butting controls are being performed (i.e., the P-position-side butting control flag Xexp is "off" and the non-P-position-side butting flag Xexnp is "off").

(3) No recovery process is being executed (i.e., the recovery process execution flag Xrcv is "off").

If even one of the three criteria (1)-(3) is not met, the abnormality diagnosis execution condition is not satisfied The routine proceeds to step 852, where the counts Cfnsw and Cfcnt of tentative abnormal state continuation time counters (described later) are reset to "0." Then, this routine is finished.

On the other hand, if all of the criteria (1)-(3) are met, the abnormality diagnosis execution condition is satisfied and the routine proceeds from step 851 to step 853, where it is determined whether butting controls have completed (i.e., the P-position-side butting completion flag Xp is "on" and the non-P-position-side butting completion flag Xnp is "on"). If it is determined that butting controls have completed, the routine proceeds to step 854, where it is determined whether the output shaft sensor 14 is normal and an instructed shift position coincides with a position detected from an output signal Vnsw of the output shaft sensor 14. If the determination result is "yes," the routine proceeds to step 856, where the count Cfnsw of a first tentative abnormal state continuation time counter is reset to "0."

On the other hand, if the determination result at step 854 is "no," the routine proceeds to step 855, where the count Cfnsw of the first tentative abnormal state continuation time counter is incremented to measure the time of continuation of the state that the range of the output signal Vnsw of the output shaft sensor 14 does not coincide with the instructed shift position. At the next step 857, it is determined whether the count Cfnsw is greater than an abnormality determination value Kfnsw, which is set to a time (e.g., 10 s) that is sufficiently longer than a longest time that a normal position switching operation takes.

Therefore, if the count Cfnsw is greater than the abnormality determination value Kfnsw, which means a state that a position switching operation is non-Performed normally, it is determined that an abnormality exists in the system The routine proceeds to step 858, where the first abnormality detection flag Xfnsw is set to "on." If the determination result at step 857 is "no," the first abnormality detection flag Xfnsw is kept "off" (no abnormality).

After the first abnormality diagnos is using the output signal Vnsw of the output shaft sensor 14 has been performed in the above manner, the routine proceeds to step 859 of FIG. 57, where it is determined whether the difference |Ncnt−Acnt| between an encoder count Ncnt and a target count Acnt is greater than a prescribed value Kcnt (e.g., a value corresponding to 5°). If the count difference |Ncnt−Acnt| is smaller than or equal to the prescribed value Kcnt, the routine proceeds to step 861, where the count Cfcnt of a second tentative abnormal state continuation time counter is reset to "0."

On the other hand, if the determination result at step 859 is "yes," the routine proceeds to step 860, where the count Cfcnt of the second tentative abnormal state continuation time counter is incremented to measure the time of continuation of the state that count difference |Ncnt−Acnt| is greater than the prescribed value Kcnt. At the next step 862, it is determined whether the count Cfcnt is greater than an abnormality determination value Kfcnt, which is set to a time (e.g., 10 s) that is sufficiently longer than a longest time that a normal position switching operation takes.

Therefore, if the count Cfcnt is greater than the abnormality determination value Kfcnt, which means a state that a position switching operation is non-Performed normally, it is determined that an abnormality exists in the system The routine proceeds to step 863, where the second abnormality detection flag Xfcnt is set to "on." If the determination result at step 862 is "no," the second abnormality detection flag Xfcnt is kept "off" (no abnormality).

Figure 51:
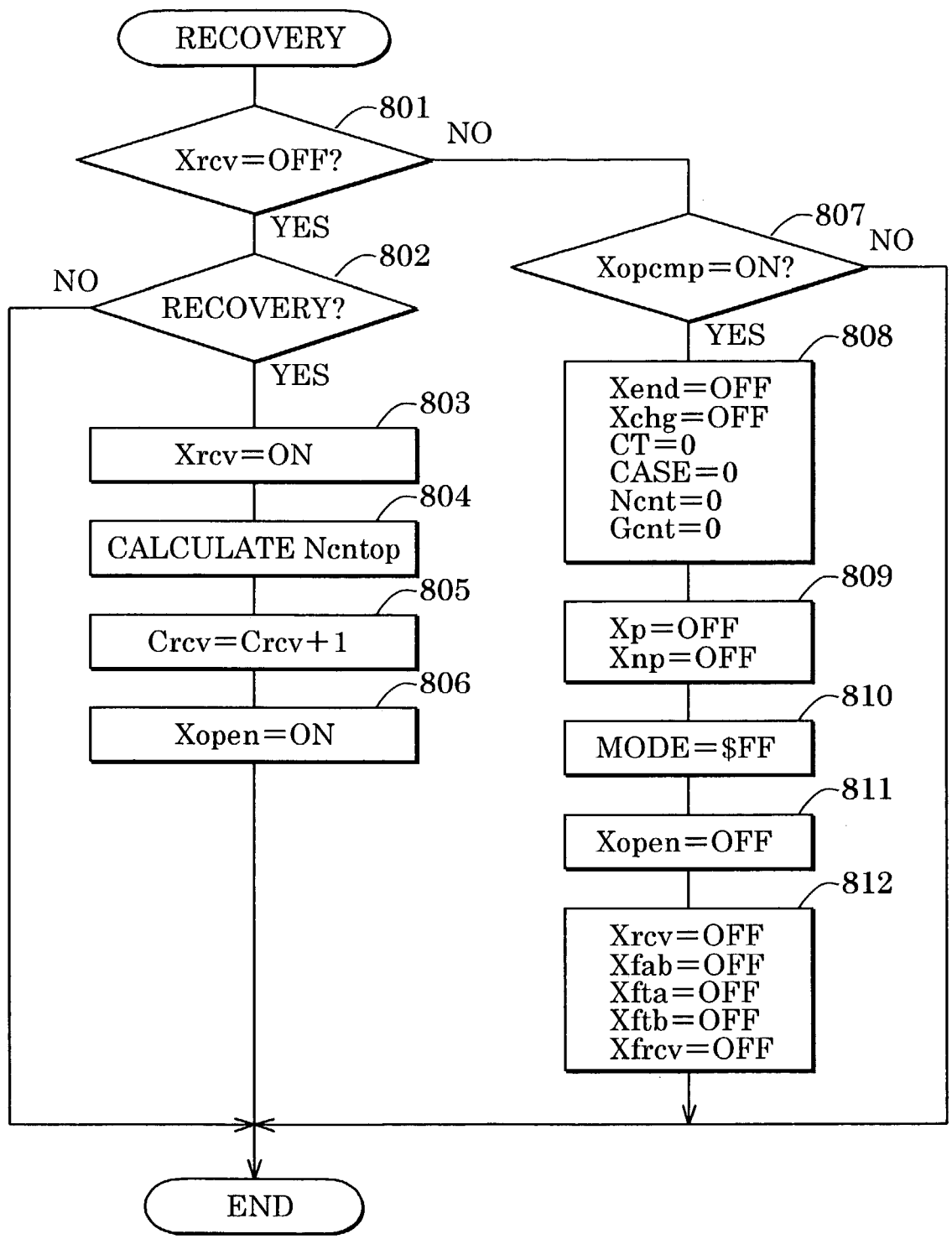
FIG. 51 is a flowchart showing a recovery processing routine.

After the second abnormality diagnosis using the count difference |Ncnt−Acnt| has been performed in the above manner, the routine proceeds to step 864, where it is determined whether the a number-of-execution-times-of-recovery-process count Crcv that was obtained at step 805 of the recovery processing routine of FIG. 51 is greater than or equal to an abnormality determination value Kcrv (e.g., 3). If the recovery process count Crcv is greater than or equal to the abnormality determination value Kcrv, it is determined that an abnormality exists in the system The routine proceeds to step 865, where a third abnormality detection flag Xfrcv is set to "on." Then, this routine is finished. That is, it is determined that the system has an abnormality if recover processes are executed consecutively abnormality determination value Kcrv times (e.g., three times) or more, which means a state that the feedback system is not functioning normally.

On the other hand, if the recovery process count Crcv is smaller than the abnormality determination value Kcrv, this routine is finished with the third abnormality detection flag Xfrcv kept "off" (no abnormality).

[Fail-safe Process]

A fail-safe processing routine shown in FIGS. 58 and 59, which is activated every predetermined time (e.g., every 8 ms), serves as the fail-safe means in the claims. Upon activation of this routine, at step 901, it is determined whether the following fail-safe process execution criteria (1) and (2) are met:

(1) The current state is such that position switching can be made by an open-loop control (i.e., the system failure flag Xfailoff is "off").

(2) At least one of the three abnormality detection flags Xfn and Xsw, Xfcnt, and Xfrcv that are set in the system abnormality diagnosis routine of FIG. 56 is "on" (abnormal).

If even one of the two criteria (1) and (2) is not met, the fail-safe process execution condition is not satisfied Then, this routine is finished without executing the remaining steps.

On the other hand, if both of the criteria (1) and (2) are met, the fail-safe process execution condition is satisfied and the routine proceeds from step 901 to 902, where a fail-safe process execution flag Xfsop is set to "on." At the next step 903, an alarm is given to the driver by turning on an alarm lamp or making an alarm display on an information display portion or the like of a meter panel.

Then, the routine proceeds to step 904, where it is determined whether the count Cfsop of a fail-safe process interval counter that measures the elapsed time from the end of a preceding fail-safe process is smaller than a prescribed value Kfsop. The prescribed value Kfsop is set to a time (e.g., 500 ms) that is somewhat longer than a time that is taken by the engaging portion 23a of the detent spring 23 to slide down to the bottom of the holding recess 24 or 25 of the detent lever 15 along its inclined side wall due to elastic force of the detent spring 23 after the end of a preceding fail-safe process.

If the count Cfsop of the fail-safe process interval counter (i.e., the elapsed time from the end of the preceding fail-safe process) is smaller than a prescribed value Kfsop, the routine proceeds to step 905, where the count Cfsop is incremented to count the elapsed time from the end of the preceding fail-safe process. Then, the routine proceeds to step 906, where the state that current supply is effected for no phases is maintained. At the next step 907, the current supply flag Xon is set to "off" (current supply off). Then, this routine is finished. As a result, the state that current supply is effected for no phases is maintained until the elapsed time from the end of the preceding fail-safe process exceeds the time corresponding to the prescribed value Kfsop.

When the fail-safe process interval count Cfsop has thereafter become greater than or equal to the prescribed value Kfsop (i.e., the value corresponding to the elapsed time from the end of the preceding fail-safe process), the routine proceeds from step 904 to step 908, where it is determined whether the open-loop control execution flag Xopen is "off." If the flag Xopen is "off," the routine proceeds to step 909, where it is determined whether the instructed shift position sft has been switched. If it is determined that the instructed shift position sft has not been switched, the routine proceeds to step 910, where the state that current supply is effected for no phases is maintained.

On the other hand, if it is determined at step 909 that the instructed shift position sft has been switched, the routine proceeds to step 911, where a current position count Ncntop is calculated by using a current output signal value Vnsw of the output shaft sensor 14 in the same manner as at step 804 of the recovery processing routine of FIG. 51. The calculated position count Ncntop is used as an initial value of the position count Ncntop at the start of an open-loop control.

Figure 60:
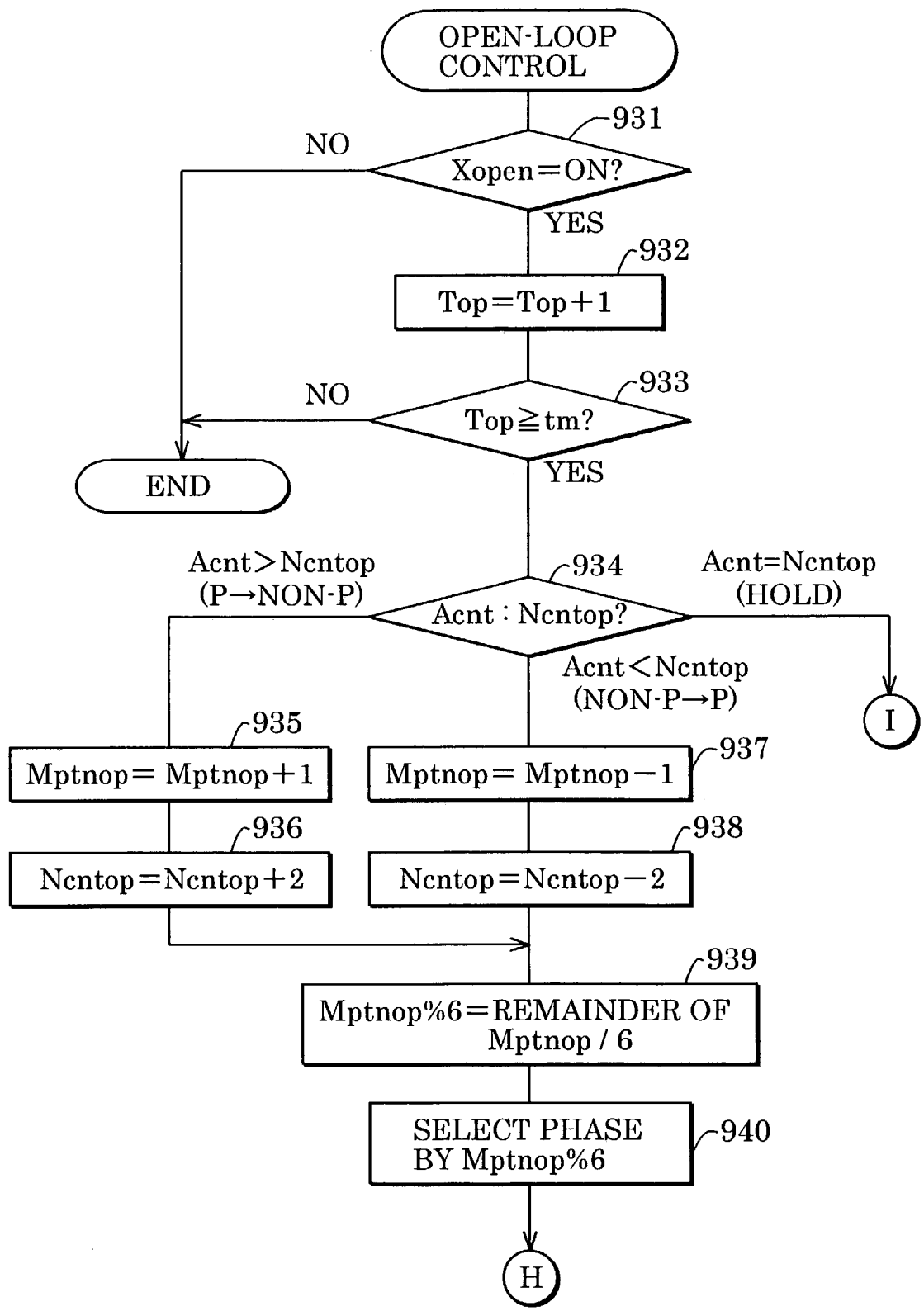
FIGS. 60-62 are flowcharts showing an open-loop control routine.
Figure 61:
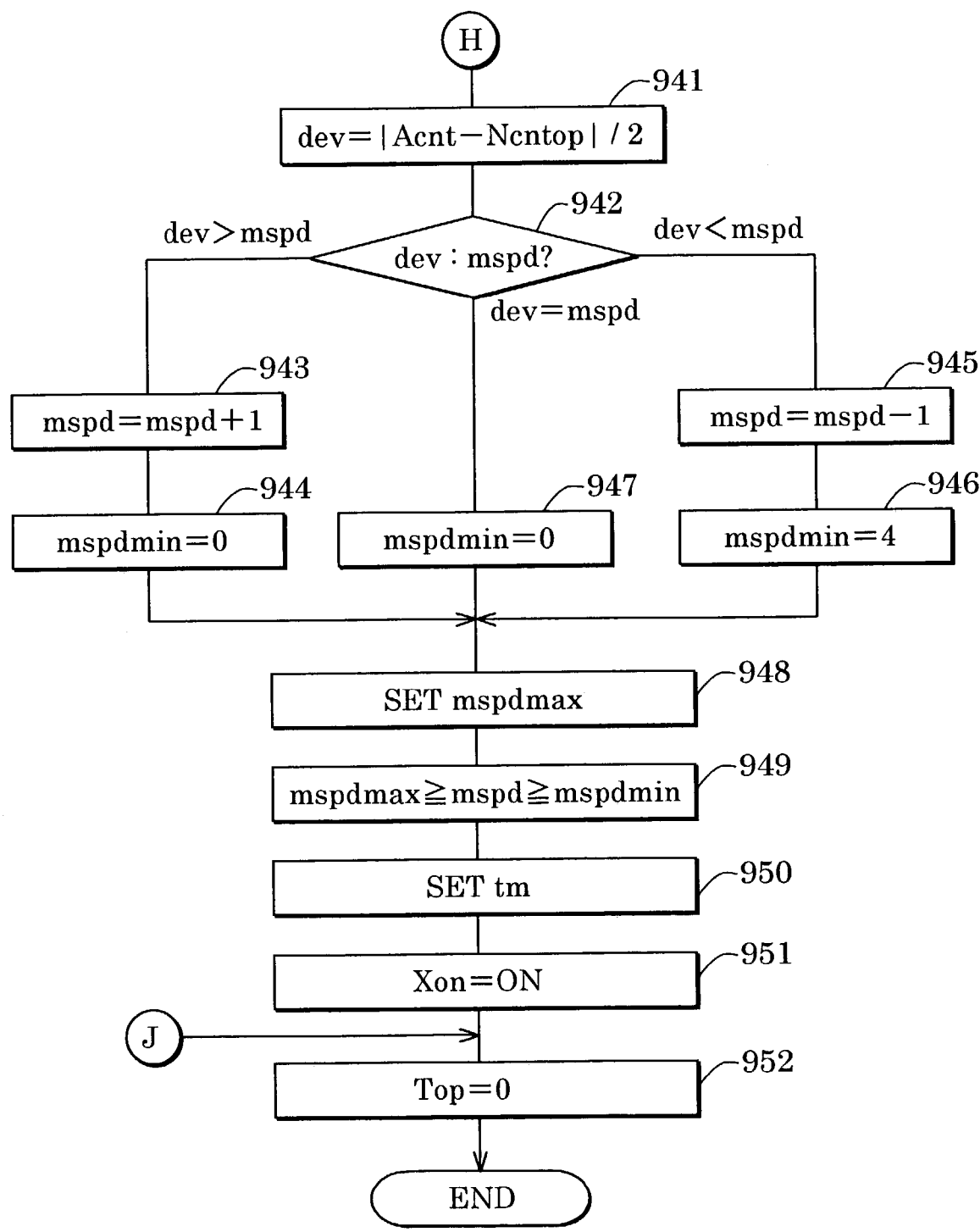
Figure 62:
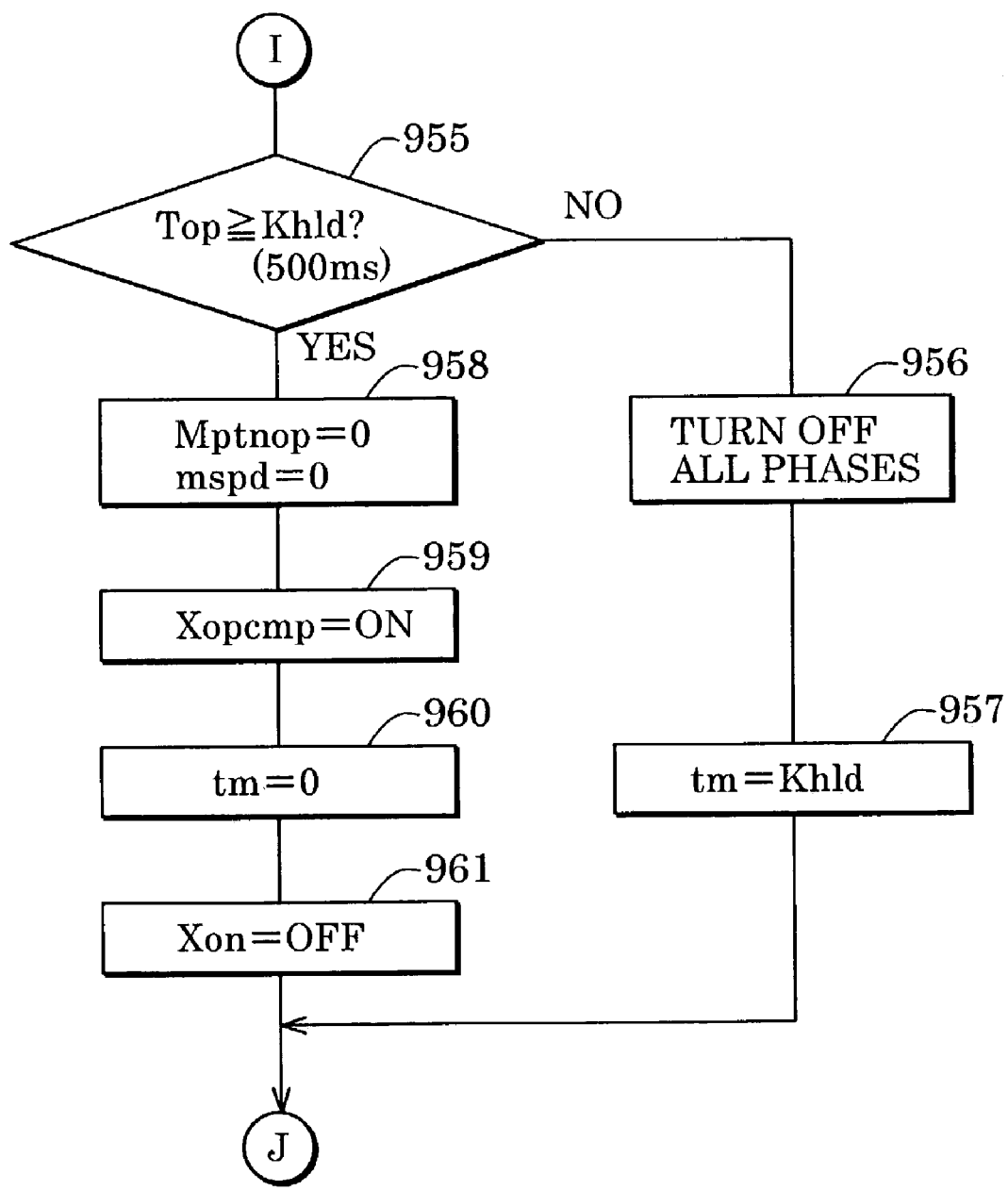

Then, the routine proceeds to step 912, where the open-loop control execution flag Xopen is set to "on" and an open-loop control is performed according to an open-loop control routine shown in FIGS. 60-62. At the next step 913, the count Cfs of a number-of-execution-times-of-fail-safe process counter that counts the number of times of execution of fail-safe processes is incremented. Then, this routine is finished.

If it is determined at step 908 that the open-loop control execution flag Xopen is "on," the routine proceeds to step 914 of FIG. 59, where it is determined whether an open-loop control completion flag Xopcmp is "on" (open-loop control completed). If the flag Xopcmp is "off," this routine is finished without executing the remaining steps.

On the other hand, if it is determined at step 914 that the open-loop control completion flag Xopcmp is "on," the routine proceeds to step 915, where it is determined whether an instructed shift position does not coincide with a position detected from an output signal value Vnsw of the output shaft sensor 14. If the determination result is "yes," the routine proceeds to step 916, where the fail-safe process count Cfs is reset to "0." The open-loop control completion flag Xopcmp is set to "off" at step 918 and the open-loop control execution flag Xopen is set to "off" at step 919. Then, this routine is finished.

If it is determined at step 915 that the instructed shift position coincides with the position detected from the output signal value Vnsw of the output shaft sensor 14, the routine proceeds to step 917, where it is determined whether the fail-safe process count Cfs is greater than or equal to a failure determination value (e.g., 3). If the count Cfs is smaller than the failure determination value, a determination result "failure" is non-Produced here yet. Instead, the open-loop control completion flag Xopcmp is set to "off" at step 918 and the open-loop control execution flag Xopen is set to "off" at step 919. Then, this routine is finished.

If the fail-safe process count Cfs thereafter becomes greater than or equal to the failure determination value (e.g., 3), now it is determined that the system is in failure (i.e., the system is in a state that position switching cannot be performed even by an open-loop control) and the routine proceeds from step 917 to step 920, where the system failure flag Xfailoff is set to "on." At the next step 921, the current supply is turned off for all the phases. Then, this routine is finished.

[Open-loop Control]

An open-loop control is performed in the following manner according to the open-loop control routine shown in FIGS. 60-62, which is activated every predetermined time (e.g., every 1 ms). Upon activation of this routine, at step 931, it is determined whether the open-loop control execution flag Xopen is "on." If the flag Xopen is "off," this routine is finished without executing the remaining steps.

On the other hand, if the open-loop control execution flag Xopen is "on," the routine proceeds from step 931 to step 932, where the count Top of a time counter that counts time is incremented. At the next step 933, it is determined whether the count Top of the time counter has become greater than or equal to a current supply time tm of a current supply phase. If the time count Top is smaller than the current supply time tm, this routine is finished without executing the remaining steps. With this measure, step 934 and the following steps are executed every current supply time tm.

When the time count Top has thereafter become greater than or equal to the current supply time tm of the current supply phase, the routine proceeds from step 933 to step 934, where a driving direction of the rotor 32 is determined by comparing a current position count Ncntop with a target count Acnt. If the current position count Ncntop is smaller than the target count Acnt, it is determined that the driving direction of the rotor 32 is the rotation direction from the P-position side to the non-P-position side (i.e., the normal rotation direction). The routine proceeds to step 935, where a current supply phase determination value Mptnop is incremented by 1. At the next step 936, the position count Ncntop is incremented by 2, because the rotor 32 is rotated by an angle (3.75°) corresponding to two counts by a single current supply attempt.

On the other hand, if the current position count Ncntop is greater than the target count Acnt, it is determined that the driving direction of the rotor 32 is the rotation direction from the non-P-position side to the P-position side (i.e., the reverse rotation direction). The routine proceeds to step 937, where the current supply phase determination value Mptnop is decremented by 1. At the next step 938, the position count Ncntop is decremented by 2.

Then, the routine proceeds to step 939, where a remainder Mptnop%6 is calculated by dividing the current supply phase determination value Mptnop by "6." The number "6" corresponds to an increase or decrease of the current supply phase determination value Mptnop that occurs when current supply is effected for all the phases around in an open-loop control.

Figures 63, 64, 65, 66:
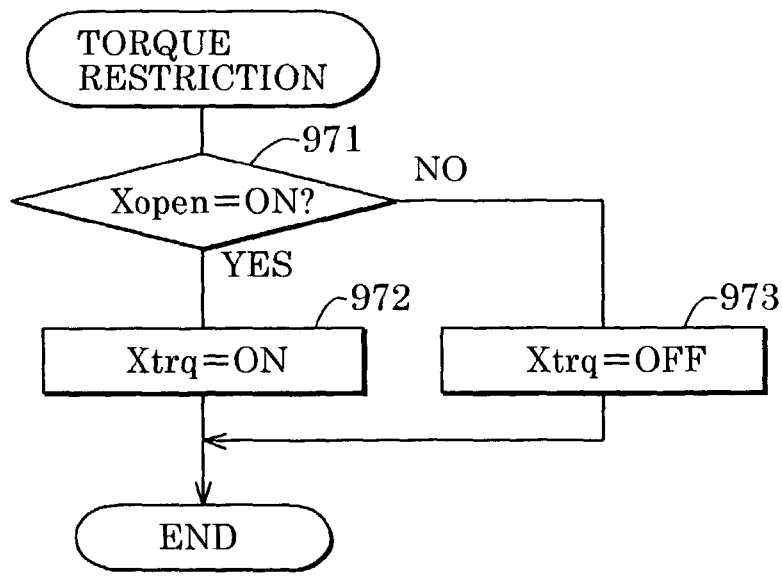
FIG. 63 shows an exemplary conversion table to be used for converting a value Mptnop%6 into a current supply phase.
FIG. 64 shows an exemplary table to be used for determining a value of a maximum rotation speed parameter mspdmax on the basis of a battery voltage.
FIG. 65 shows an exemplary table to be used for determining a current supply time tm on the basis of a rotation speed parameter mspd.
FIG. 66 is a flowchart showing an engine torque restriction routine that is executed during an open-loop control.

After the calculation of the value Mptnop%6, the routine proceeds to step 940, where a current supply phase is selected in accordance with the value Mptnop%6 by using a table shown in FIG. 63 and current supply is effected for that phase. In this embodiment, current supply phases are selected so that the rotor 32 is driven by the one/two-phase current supply method during an open-loop control and the initial value of the current supply phase determination value Mptnop is set so that the open-loop control is started with two-phase current supply (W and U-phases, U and V-phases, or V and W-phases), that is, so that the value Mptnop%6 becomes 1, 3 or 5.

Then, the routine proceeds to step 941 in FIG. 61, where a position deviation dev is calculated according to the following equation:

$$dev=|Acnt-Ncntop|/2$$

As is apparent from this equation, the position deviation dev is ½ of the absolute value of the difference between the target count Acnt and the current position count Ncntop.

At the next step 942, the position deviation dev is compared with a rotation speed parameter mspd, which is increased or decreased in accordance with the position deviation dev. The rotation speed and the acceleration/deceleration of the rotor 32 are controlled by setting the current supply time tm in accordance with the rotation speed parameter mspd by using a table shown in FIG. 65. In this case, as the target rotation speed increases, the rotation speed parameter mspd increases and the current supply time tm is set shorter. The initial value of the rotation speed parameter mspd is "0."

If it is determined at step 942 that the position deviation dev is greater than the rotation speed parameter mspd, the routine proceeds to step 943, where the rotation speed parameter mspd is incremented by 1. At the next step 944, a minimum rotation speed parameter mspdmin is set to "0." The minimum rotation speed parameter mspdmin is a parameter (lower limit guard value) for limiting the minimum value of the rotation speed parameter mspd. In this manner, the minimum rotation speed parameter mspdmin is set to "0" if the position deviation dev is greater than the rotation speed parameter mspd, whereby the current supply time tm can be set at a longest time (e.g., 50 ms) in a period from the start of the open-loop control to a start of rotation of the rotor 32.

On the other hand, if it is determined at step 942 that the position deviation dev is smaller than the rotation speed parameter mspd, the routine proceeds to step 945, where the rotation speed parameter mspd is decremented by 1. At the next step 946, the minimum rotation speed parameter mspdmin is set to "4." This makes it possible to restrict the current supply time tm to 5 ms, for example, or less after a start of rotation of the rotor 32.

If it is determined at step 942 that the position deviation dev is equal to the rotation speed parameter mspd, the routine proceeds to step 947 without changing the rotation speed parameter mspd. At step 947, the minimum rotation speed parameter mspdmin is set to "0."

After the rotation speed parameter mspd and the minimum rotation speed parameter mspdmin have been set in the above manner, the routine proceeds to step 948, where a maximum rotation speed parameter mspdmax is set in accordance with a battery voltage (power source voltage) by using a table of FIG. 64. The maximum rotation speed parameter mspdmax is a parameter (upper limit guard value) for restricting the maximum value of the rotation speed parameter mspd. As the battery voltage increases, the maximum rotation speed parameter mspdmax is increased, whereby the rotation speed of the rotor 32 can be increased.

At the next step 949, guard processing is performed so that the rotation speed parameter mspd falls within the range from the minimum rotation speed parameter mspdmin to the maximum rotation speed parameter mspdmax. For example, if the rotation speed parameter mspd as updated at step 943 or 945 is smaller than the minimum rotation speed parameter mspdmin, the rotation speed parameter mspd is set equal to the minimum rotation speed parameter mspdmin. If the rotation speed parameter mspd as updated is greater than the maximum rotation speed parameter mspdmax, the rotation speed parameter mspd is set equal to the maximum rotation speed parameter mspdmax. If mspdmin≦mspd≦mspdmax, the rotation speed parameter mspd as updated is used as it is.

Then, the routine proceeds to step 950, where a current supply time tm is set in accordance with the rotation speed parameter mspd by using the table of FIG. 65. In the example of FIG. 65, if the rotation speed parameter mspd is a range of 0 to 3, the current supply time tm is set to the longest time (e.g., 50 ms) so that the rotation phase of the rotor 32 and the current supply phase can be synchronized with each other reliably at starting. As the rotation speed parameter mspd increases from 4 to 9, the current supply time tm is decreased in three steps from 5 ms to 3 ms, for example, so that the rotation speed of the rotor 32 can be adjusted in three steps. The current supply time tm may be switched in one step, two steps or four or more steps.

After the setting of the current supply time tm, the routine proceeds to step 951, where the current supply flag Xon is set to "on." At the next step 952, the time count Top is cleared. Then, this routine is finished.

If it is determined at step 934 in FIG. 60 that the current position count Ncntop is equal to the target count Acnt, the routine proceeds to step 955 in FIG. 62, where it is determined whether the measurement time of the time counter has become longer than or equal to a prescribed time Khld (e.g., 500 ms). If it is determined that the measurement time of the time counter is shorter than the prescribed time Khld, the routine proceeds to step 956, where the current supply is turned off for all the steps. At the next step 957, the current supply time tm is set to the prescribed time Khld (e.g., 500 ms). Then, the routine proceeds to step 952 of FIG. 61, where the time count Top is cleared. Then, this routine is finished.

With this measure, step 934 in FIG. 60 and the following steps will not be executed and hence the next open-loop control will not be started until the prescribed time Khld (e.g., 500 ms) elapses from the end of the open-loop control. This is to wait, after the end of the open-loop control, until the engaging portion 23a of the detent spring 23 slides down to the bottom of the holding recess 24 or 25 of the detent lever 15 along its inclined side wall due to elastic force of the detent spring 23 after the end of a preceding fail-safe process.

If it is determined at step 955 in FIG. 62 that the time count Top has become greater than or equal to the prescribed value Khld, the routine proceeds to step 958, where the current supply phase determination value Mptnop is set to "0" and the rotation speed parameter mspd is set to "0." At the next step 959, the open-loop control completion flag Xopcmp is set to "on." Then, the routine proceeds to step 960, where the current supply time tm is set to "0." After the current supply flag Xon is set to "off" at the next step 961, the routine proceeds to step 952 in FIG. 61, where the time count Top is cleared. Then, this routine is finished.

In the above routine, the one/two-phase current supply method is employed in an open-loop control and the open-loop control is started with two-phase current supply. Further, as shown in FIG. 50, the current supply time tm of the current supply phase of each of three steps, for example, after the start of the open-loop control is set to the longest time (e.g., 50 ms), to thereby get a sure grasp of the rotor 32 and reliably synchronize the rotation phase of the rotor 32 and the current supply phase with each other. The current supply time tm is thereafter shortened steeply, and then it is shortened gradually as the rotation speed of the rotor 32 increases. As a result, the rotation speed of the rotor 32 increased gently.

To infer a rotation speed of the rotor 32 during the open-loop control, an initial position of the rotor 32 (i.e., an initial value of the position count Ncntop) at the start of the open-loop control is calculated on the basis of an output signal value of the output shaft sensor 14. Then, the position count Ncntop is incremented (or decremented) by 2 every time the current supply phase is switched, and a rotation position of the rotor 32 is inferred on the basis of a resulting position count Ncntop. When the difference between the position count Ncntop and a target count Acnt has become small to some extent, it is determined that the rotation position has entered a deceleration range. The current supply time tm is elongated gradually to decelerate the rotation speed of the rotor 32 gently. When the position count Ncntop has reached the target count Acnt, it is determined that the rotor 32 has reached the target position and the open-loop control is finished.

Although in the above routine the current supply time tm is set in accordance with the rotation speed parameter mspd, it may be set on the basis of at least one of the rotation amount after a start of driving, the elapsed time after the start of driving, the rotation amount to a target position, and the load torque.

Although in the above routine the first current supply is two-phase current supply at the start of the open-loop control, it may be one-phase current supply. Further, the current supply method to be employed in an open-loop control is not limited to the one/two-phase current supply; it may be the one-phase current supply method or the two-phase current supply method.

[Engine Torque Restriction During Open-loop Control]

An engine torque restriction routine shown in FIG. 66 to be executed during an open-loop control is activated every predetermined time (e.g., every 1 ms). Upon activation of this routine, at step 971, it is determined whether the open-loop control execution flag Xopen is "on" (an open-loop control is being performed). If the open-loop control execution flag Xopen is "on," the routine proceeds to step 972, where an engine torque restriction flag Xtrq is set to "on." If the open-loop control execution flag Xopen is "off," the routine proceeds to step 973, where the engine torque restriction flag Xtrq is set to "off." This information of the engine torque restriction flag Xtrq is sent from the ECU 41 for position switching control to an ECU (not shown) for engine control.

When receiving the information of the engine torque restriction flag Xtrq being "on," the engine control ECU controls engine control parameters in such directions as to lower the engine torque so that the position switching operation by the open-loop control is performed in a state that the engine torque is lowered.

The engine control parameters to be controlled in such directions as to lower the engine torque may be at least one of control parameters of the air system, fuel system, and the ignition system. In the case of the air system, a current throttle position may be maintained by prohibiting the throttle valve from being driven in the opening direction or driving the throttle valve in the closing direction to such an extent as not to obstruct vehicle driving. In the case of the fuel system, the fuel injection amount may be restricted to such an extent as not to obstruct vehicle driving. In the case of the ignition system, delayed ignition timing may be set in such a manner as not to obstruct vehicle driving.

[Setting of Instructed Shift Position]

Figure 67:
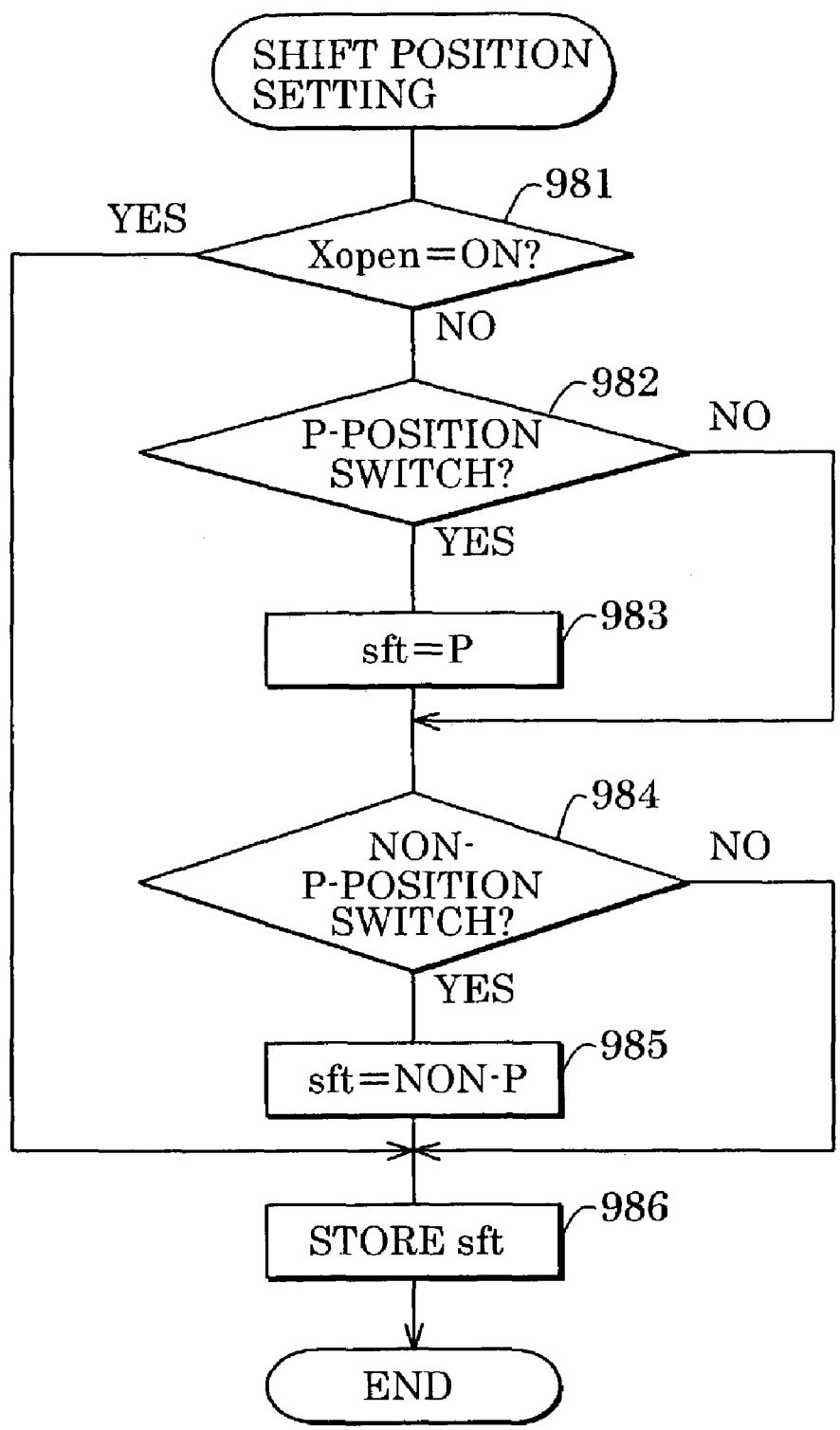
FIG. 67 is a flowchart showing an instructed shift position setting routine.

An instructed shift position setting routine shown in FIG. 67 is activated every predetermined time (e.g., every 8 ms). Upon activation of this routine, at step 981, it is determined whether the open-loop control execution flag Xopen is "on" (an open-loop control is being performed). If the open-loop control execution flag Xopen is "on," switching of the instructed shift position sft is prohibited by disregarding a manipulation signal even if the P-position switch 43 or the non-P-position switch 44 is manipulated.

On the other hand, if it is determined that the open-loop control execution flag Xopen is "off," the routine proceeds to step 982, where it is determined whether the P-position switch 43 has been manipulated. If the P-position switch 43 has been manipulated, the routine proceeds to step 983, where the instructed shift position sft is set to the P-position.

If the P-position switch 43 has not been manipulated, the routine proceeds to step 984, where it is determined whether the non-P-position switch 44 has been manipulated. If the non-P-position switch 44 has been manipulated, the routine proceeds to step 985, where the instructed shift position sft is set to the non-P-position.

Figure 68:
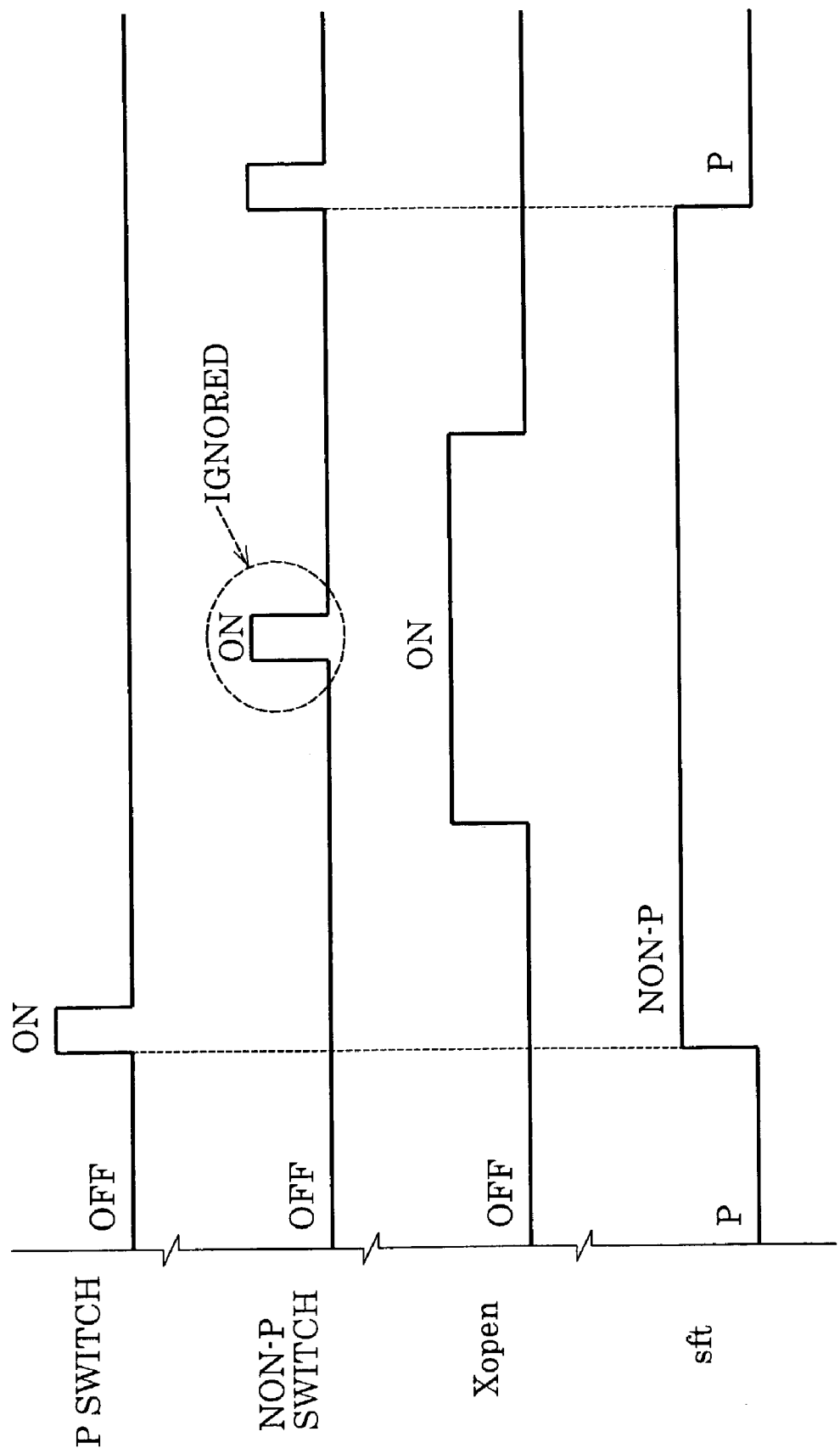
FIG. 68 is a time chart illustrating a relationship between switching of an instructed shift position sft and an open-loop control.

In short, as shown in FIG. 68, if no open-loop control is being performed (i.e., Xopen=off), the instructed shift position sft is immediately switched to the range corresponding to a manipulation signal in response to a manipulation on the P-position switch 43 or the non-P-position switch 44. However, if an open-loop control is being performed (i.e., Xopen=on), the instructed shift position sft is not switched by disregarding a manipulation signal even if the P-position switch 43 or the non-P-position switch 44 is manipulated.

At step 986 that is the last step of this routine, the current instructed shift position sft is stored in the nonvolatile memory such as an SRAM of the ECU 41. The instructed shift position sft stored in the nonvolatile memory is used as information of the shift position sft when the CPU of the ECU 41 is reset for a certain reason during vehicle driving and the storage data of the RAM are thereby initialized. With this measure, even if the CPU of the ECU 41 is reset for a certain reason during vehicle driving and the storage data of the RAM are thereby initialized, upon the resetting the shift position can be controlled so as to become a range that was selected immediately before the resetting, which prevents an event that after the resetting the shift position is switched contrary to the intention of the driver.

Next, a recovery process execution example in which the state of a feedback control becomes abnormal temporarily will be described with reference to a time chart of FIG. 47. FIG. 47 shows an exemplary control that is performed in a case that the state of a feedback control goes abnormal while switching the shift position from the P-position to the non-P-position and the rotor 32 makes an abnormal stop or an operation of counting the encoder count Ncnt makes an abnormal stop.

In a feedback control for switching the shift position from the P-position to the non-P-position, whether the state of the feedback control is normal or abnormal is monitored. When an abnormality has been detected, the recovery process execution flag Xrcv is switched from "off" to "on," whereupon switching is made from the feedback control to an open-loop control and a recovery process is started.

At the start of the open-loop control (recovery process), an initial value of the position count Ncntop is calculated by using an output signal value Vnsw of the output shaft sensor 14. During the open-loop control (recovery process), the rotor 32 is rotated by sequentially switching the current supply phase without feeding back the information of the encoder count Ncnt. Every time the current supply phase is switched during the open-loop control, the position count Ncntop is incremented (or decremented)by 2. When the position count Ncntop has reached a target count Acnt, it is determined that the rotor 32 has reached a target position and the recover process execution flag Xrcv is switched from "on" to "off," whereupon the open-loop control (recovery process) is finished and a return is made to the feedback control.

With the above process, even if during a feedback control an abnormality in the encoder count Ncnt, a loss of synchronization, or the like renders the feedback control state (the rotation state of the rotor 32) abnormal temporarily, the rotor 32 can be rotated to a target position by switching from the feedback control to an open-loop control. The reliability of the motor control (i.e., position switching control) can thus be increased.

When a return is made to a feedback control, an initial drive and first-direction and second-direction butting controls are performed again. With this measure, even if a deviation occurs in the relationship between the encoder count Ncnt and the rotation position of the rotor 32 (i.e., the manipulated variable for the position switching mechanism 11) in the open-loop control, the deviation can be corrected for accurately by the initial drive and the first-direction and second-direction butting controls.

Figure 69:
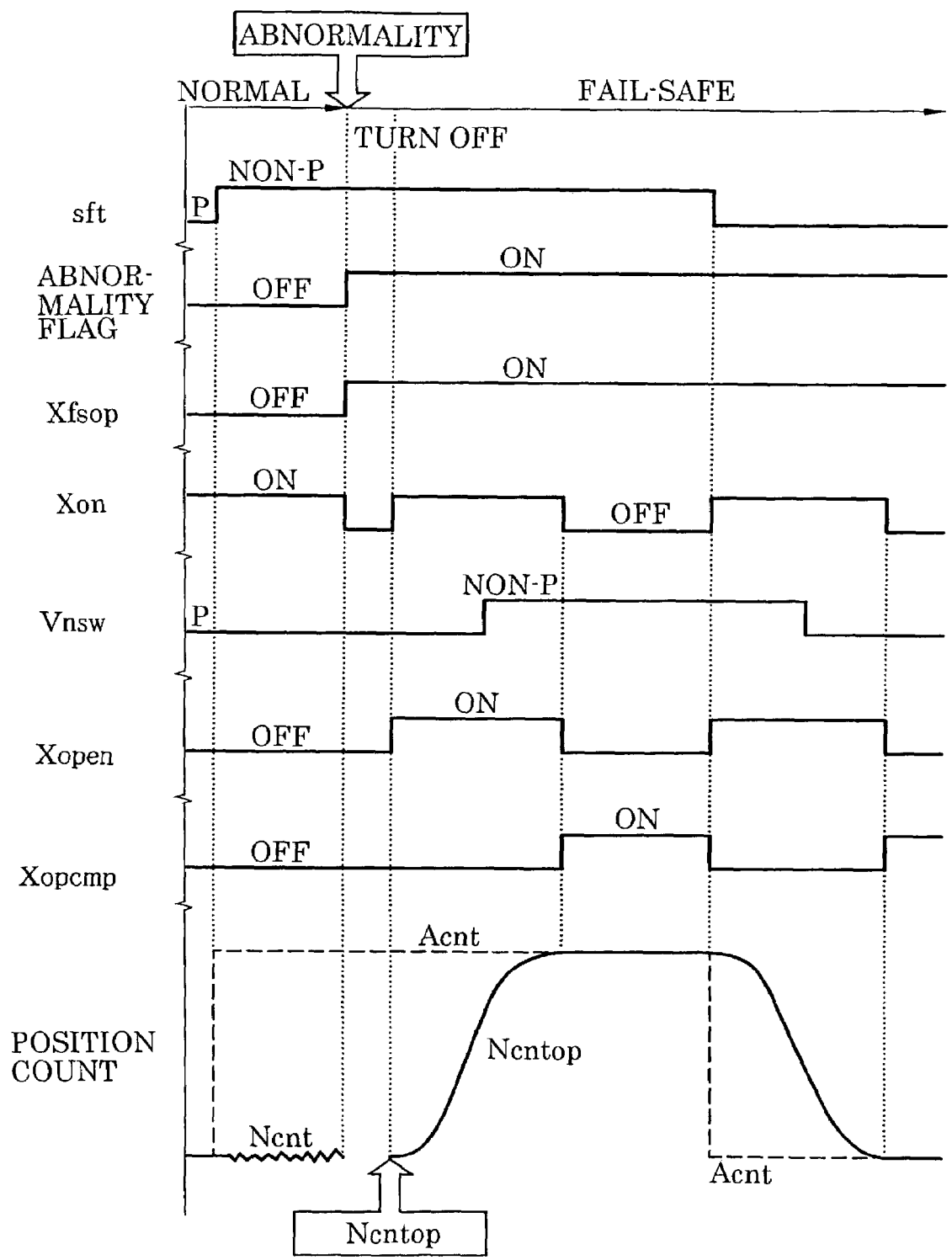
FIG. 69 is a time chart showing a control example in which a fail-safe process is executed when an abnormality occurs in switching from the P-position to the non-P-position (an open-loop control succeeds)
Figure 70:
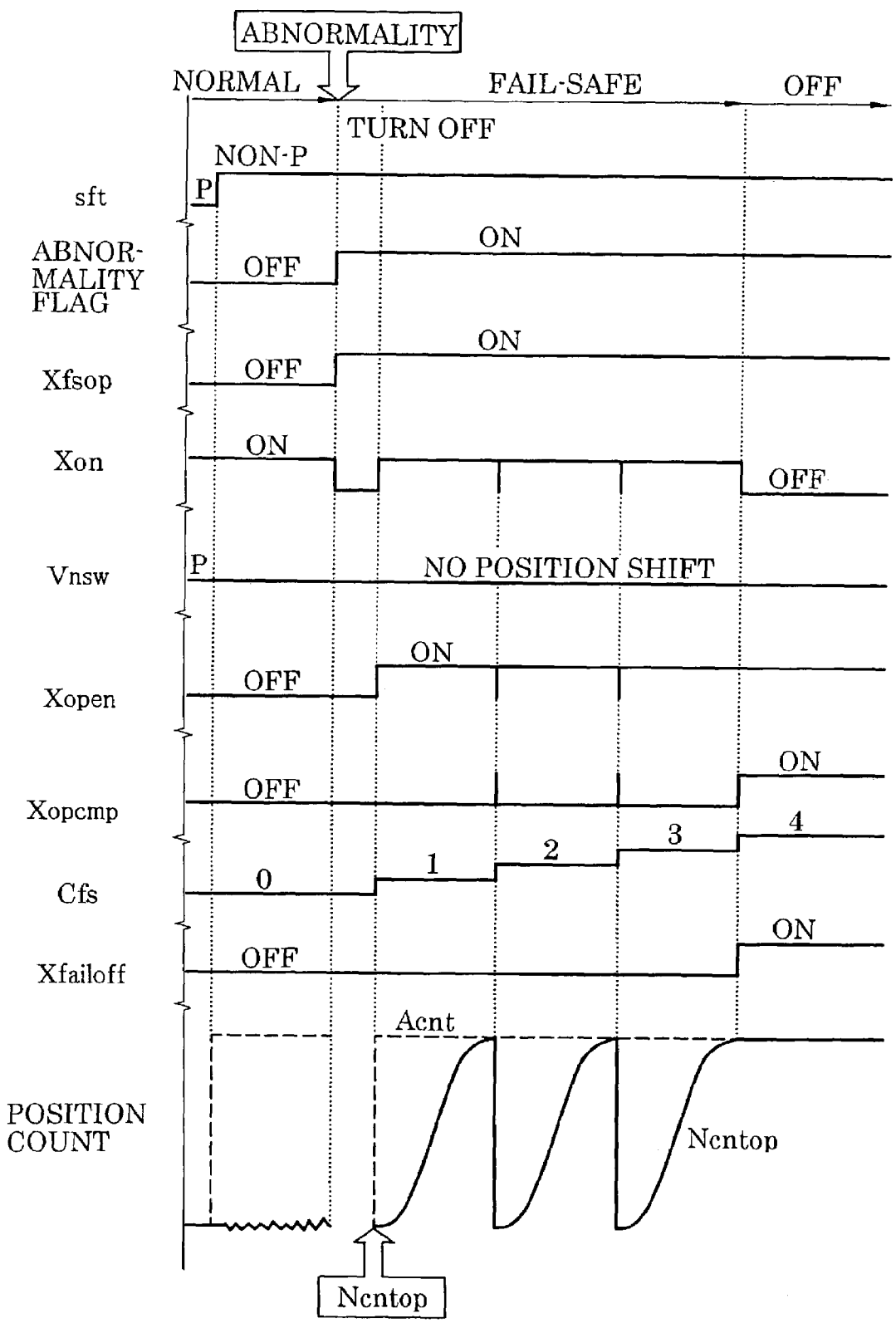
FIG. 70 is a time chart showing a control example in which a fail-safe process is executed when an abnormality occurs in switching from the P-position to the non-P-position (an open-loop control fails)

Next, a fail-safe process execution example in which a failure occurs in the feedback control system will be described with reference to time charts of FIGS. 69 and 70. FIG. 69 shows a control example in which a fail-safe process (i.e., an open-loop control) is executed and position switching succeeds when a failure occurs in the feedback control system (i.e., a system abnormality) in switching the shift position from the P-position to the non-P-position. On the other hand, FIG. 70 shows a control example in which position switching by a fail-safe process (i.e., an open-loop control) fails.

Whereas the above recovery process and the fail-safe processes are the same in that they are performed as an open-loop control, they are different from each other in the following point. Since the recovery process is executed when a feedback control becomes abnormal temporarily, a return is made to a feedback control when the rotor 32 has been rotated to a target point by the recovery process (open-loop control). In contrast, since the fail-safe process is executed when a failure in the feedback control system renders the feedback control unexecutable, a return is not made to a feedback control even if the rotor 32 is rotated to a target point successfully by the fail-safe process (open-loop control) and subsequent position switching is also performed by the fail-safe process (open-loop control).

As shown in FIG. 69, as soon as a failure is detected in the feedback control system (i.e., a system abnormality) in switching the shift position from the P-position to the non-P-position, the fail-safe process execution flag Xfsop is switched from "off" to "on" and a fail-safe process (open-loop control) is started.

That part of the fail-safe process (open-loop control) which rotates the rotor 32 to a target point is the same as that of the recovery process (open-loop control). When the position count Ncntop has reached a target count Acnt, it is determined that the rotor 32 has reached the target point. Not only is the open-loop control execution flag Xopen switched to "off" but also the open-loop control completion flag Xopcmp is switched to "on." The motor driving by the open-loop control is finished.

As soon as the instructed shift position sft is thereafter switched from the non-P-position to the P-position, the open-loop control execution flag Xopen is switched to "on" and the open-loop control completion flag Xopcmp is switched to "off." Further, the target count Acnt is set to a value corresponding to the P-position and position switching by an open-loop control is started.

As described above, once a fail-safe process is executed, subsequent position switching is also performed by a new fail-safe process. In this case, when the position count Ncntop of the new fail-safe process has reached a target count Acnt, whether the position switching by the fail-safe process has succeeded is checked on the basis of an output signal value of the output shaft sensor 14. If the position switching has failed, position switching is performed again by another fail-safe process.

FIG. 70 shows a control example in which although switching from the P-position to the non-P-position is attempted by a fail-safe process, the output signal value of the output shaft sensor 14 remains a value corresponding to the P-position (i.e., the shaft range remains the P-position). In this case, since the output signal value of the output shaft sensor 14 does not become a value corresponding to a target count Acnt even if the fail-safe process causes the position count Ncntop to reach the target count Acnt, it is determined that the position switching has failed and position switching is performed again by another fail-safe process.

The number of times of repetitive execution of fail-safe processes (i.e., the number of failures; the count Cfs) is counted by the number-of-execution-times-of-fail-safe process counter. If position switching does not succeed even if, for example, three fail-safe processes are executed repeatedly, it is determined that even an open-loop control cannot attain position switching. The system failure flag Xfailoff is set to "on," and the current supply flag Xon is switched to "off" and the current supply of the SR motor 12 is turned off.

Here, during an open-loop control, the rotor 32 is driven in such a manner that the current supply phase is selected irrespective of the encoder count Ncnt. Therefore, it is likely that during an open-loop control the encoder count Ncnt deviates from the rotation position of the rotor 32 (i.e., the manipulated variable for the position switching mechanism 11).

As a countermeasure, in this embodiment, an initial drive and first-direction and second-direction butting controls are performed again in returning from an open-loop control to a feedback control. Therefore, even if a deviation has occurred in the relationship between the encoder count Ncnt and the rotation position of the rotor 32 (i.e., the manipulated variable for the position switching mechanism 11) during the open-loop control, the deviation can be corrected for accurately by the initial drive and the first-direction and second-direction butting controls.

In the above embodiment, if a failure is detected in the feedback control system (i.e., a system abnormality), the SR motor 12 is driven by making switching to a fail-safe process (open-loop control). Therefore, even if the feedback control system fails for a certain reason, the rotor 32 can be rotated so as to come as close to a target position as possible. The reliability of the motor control can thus be increased.

Second Embodiment

A second embodiment of the invention will be described below with reference to FIGS. 71-75.

Figure 72:
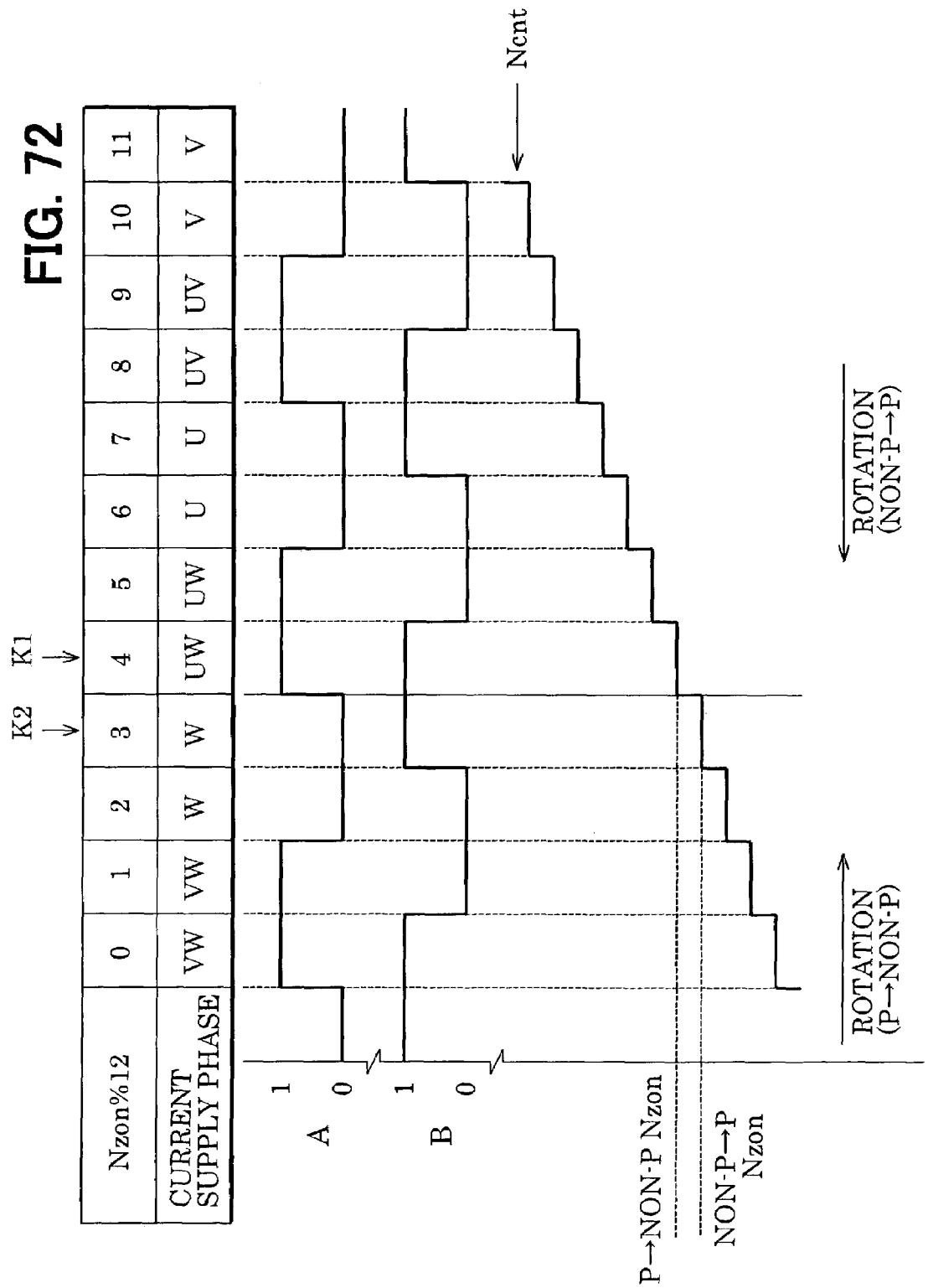
FIG. 72 is a time chart illustrating a Z-phase correction.

As shown in FIG. 72, while the SR motor 12 rotates, A-phase signal pulses and B-phase signal pulses are output alternately from the encoder 46 in synchronism with the rotation of the rotor 32 and a Z-phase signal pulse is output from the encoder 46 every time current supply is effected for all the phases around and the rotor 32 rotates by 45°. The reference rotation positions of the rotor 32 can be detected correctly by using Z-phase signal pulses. Therefore, whether the rotation position of the rotor 32 and the current supply phase (i.e., encoder count) are in a correct relationship can be checked by determining whether a current supply phase (i.e., an encoder count) that is selected when a Z-phase signal pulse is output coincides with a current supply phase (i.e., an encoder count) corresponding to a reference rotation position of the rotor 32. If a deviation is found, a Z-phase correction is performed so as to correct for the deviation. A highly reliable motor control can thereby be performed.

Figure 71:
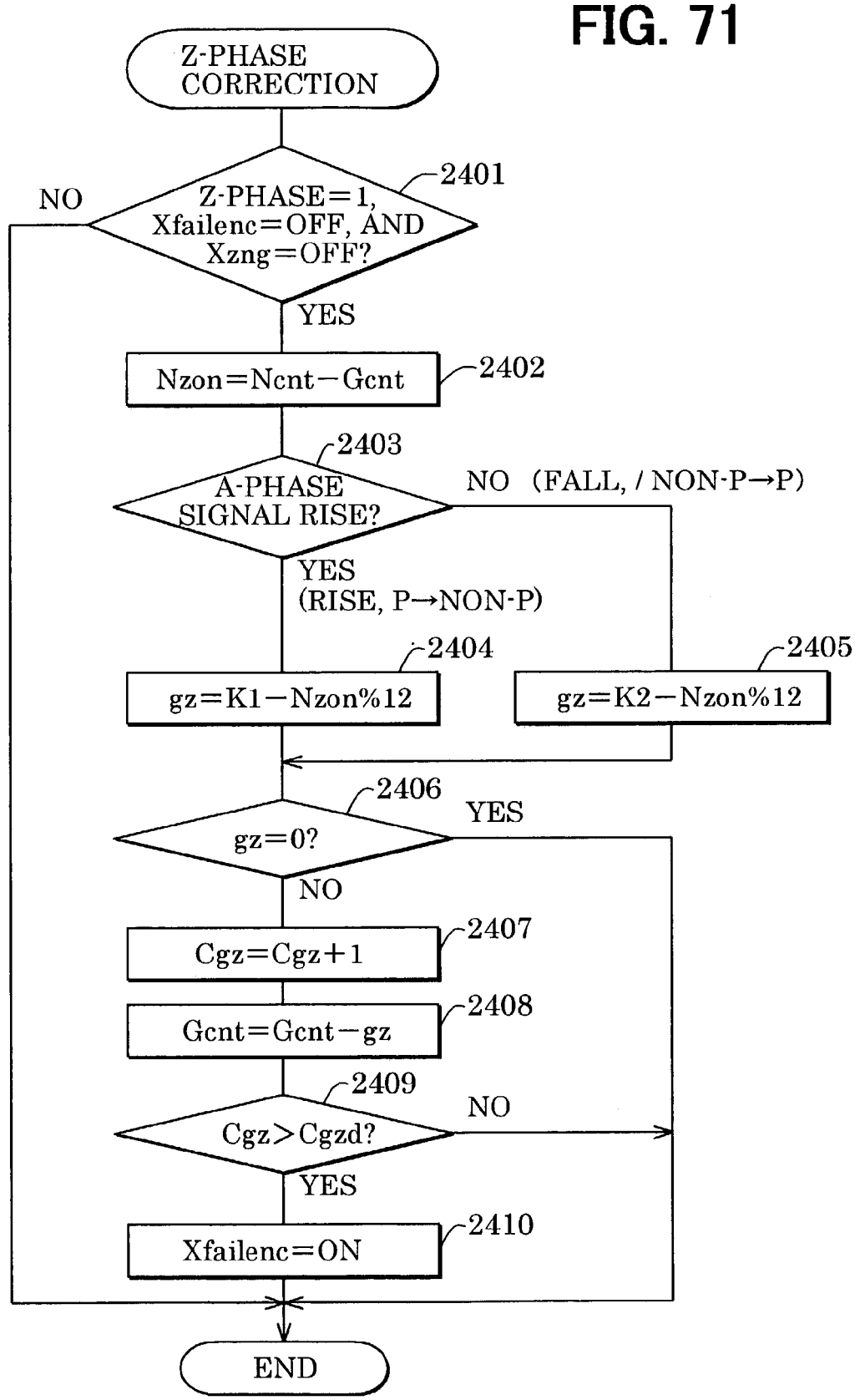
FIG. 71 is a flowchart showing a Z-phase correction routine according to a second embodiment of the invention.

Such a Z-phase correction is performed according to a Z-phase correction routine shown in FIG. 71. This routine is activated in synchronism with both of rising edges and trailing edges of an A-phase signal by A-phase interruption processing. Upon activation of this routine, at step 2401, it is determined whether the following Z-phase correction execution criteria (1)-(3) are met:

(1) The Z-phase signal value Z is "1" (high level).

(2) An encoder failure flag Xfailenc is "off" (the encoder 46 has no failure).

(3) A Z-phase correction prohibition flag Xzng is "off" (Z-phase correction permitted).

With regard to the encoder failure flag Xfailenc, when the number of times of Z-phase corrections has exceeded a determination value, the encoder 46 is determined to be in failure and the flag Xfailenc is set to "on" at step 2410 (described later). The Z-phase correction prohibition flag Xzng is set to "on" when an abnormality is detected in a Z-phase signal of the encoder 46 in a routine shown in FIG. 74 or 75.

If even one of the criteria (1)-(3) is not met, the Z-phase correction execution condition is not satisfied. Then, this routine is finished without executing the remaining steps.

On the other hand, if all of the criteria (1)-(3) are met, the Z-phase correction execution condition is satisfied The routine proceeds to step 2402, where a position detection count Nzon that is obtained when a Z-phase signal pulse is output (i.e., the Z-phase signal value Z is inverted to "1") is stored. The position detection count Nzon is obtained by correcting an encoder count Ncnt that is obtained when the Z-phase signal pulse is output by an initial positional deviation learned value Gcnt:

$$Nzon=Ncnt-Gcnt$$

A reference rotation position (i.e., a position where a Z-phase signal pulse is to be output) of the rotor 32 is detected from the position detection count Nzon.

Then, the routine proceeds to step 2403, where whether the rotation direction of the rotor 32 is the normal rotation direction (i.e., the rotation direction from the P-position position to the non-P-position position) is determined on the basis of whether the routine has been activated this time at a rise of the A-phase signal.

As shown in FIG. 72, an A-phase signal pulse and a Z-phase signal pulse that are associated with each other are output with a phase difference of 90° (electrical angle). Therefore, in the case of the normal rotation direction (i.e., the rotation direction from the P-position position to the non-P-position position), the A-phase signal rises during an output period of a Z-phase signal pulse. In the case of the reverse rotation direction (i.e., the rotation direction from the non-P-position position to the P-position position), the A-phase signal falls during an output period of a Z-phase signal pulse. Therefore, whether the current rotation direction is the normal rotation direction or the reverse rotation direction can be determined on the basis of whether the A-phase signal rises or falls during an output period of a Z-phase signal pulse.

If it is determined at step 2403 that the routine has been activated this time at a rise of the A-phase signal, that is, the rotation direction of the rotor 32 is the normal rotation direction (i.e., the rotation direction from the P-position position to the non-P-position position), the routine proceeds to step 2404, where a deviation gz between a design value and an actual measurement value of a current supply phase to be selected when the Z-phase signal pulse is output is calculated:

$$gz=K1-Nzon\%12$$

In this equation, K1 is a phase lead, in the normal rotation direction, of the current supply phase that is necessary to rotate the rotor 32 in the normal direction and K1 is set to "4," for example. And Nzon%12 is a remainder that is obtained by dividing, by "12," the position detection count Nzon that has been obtained at the time of output of the Z-phase signal pulse.

In this embodiment, as shown in FIG. 72, the system is designed in such a manner that Nzon%12 becomes "4" in the case of the normal rotation direction (i.e., the rotation direction from the P-position position to the non-P-position position). Therefore, gz=K1−Nzon%12 becomes "0" as long as the control system is operating normally.

On the other hand, if it is determined at step 2403 that the routine has been activated this time at a fall of the A-phase signal, that is, the rotation direction of the rotor 32 is the reverse rotation direction (i.e., the rotation direction from the non-P-position position to the P-position position), the routine proceeds to step 2405, where a deviation gz between a design value and an actual measurement value of a current supply phase to be selected when the Z-phase signal pulse is output is calculated:

$$gz=K2-Nzon\%12$$

where K2 is a phase lead, in the reverse rotation direction, of the current supply phase that is necessary to rotate the rotor 32 in the reverse direction and K2 is set to "3," for example.

In this embodiment, as shown in FIG. 72, the system is designed in such a manner that Nzon%12 becomes "3" in the case of the reverse rotation direction (i.e., the rotation direction from the non-P-position position to the P-position position). Therefore, gz=K2−Nzon%12 becomes "0" as long as the control system is operating normally.

After the calculation of the deviation gz between a design value and an actual measurement value, the routine proceeds to step 2406, where it is determined whether the deviation gz between a design value and an actual measurement value of the current supply phase at the output of the Z-phase signal pulse is not equal to "0." If the deviation gz between a design value and an actual measurement value is equal to "0," which means that the control system is operating normally, this routine is finished without executing the remaining steps such as a Z-phase correction step.

On the other hand, if the deviation gz between a design value and an actual measurement value of the current supply phase at the output of the Z-phase signal pulse is equal to "0," it is determined that a Z-phase correction is necessary The routine proceeds to step 2407. At step 2407, the count Cgz of a number-of-times-of-Z-phase correction counter that counts the number of times of Z-phase corrections is incremented. At the next step 2408, the deviation of the initial positional deviation learned value Gcnt is corrected for by the deviation gz between a design value and an actual measurement value:

$$Gcnt=Gcnt-gz$$

Then, it is determined whether the Z-phase correction count Cgz (i.e., the number of times of Z-phase corrections) has exceeded a determination value Cgzd. If the count Cgz is smaller than or equal to the determination value, it is not determined that the encoder 46 is in failure. If the count Cgz is greater than the determination value, it is determined that the encoder 46 is in failure. The routine proceeds to step 2410, where the encoder failure flag Xfailenc is set to "on" (the encoder 46 is in failure). This routine is then finished.

Once the encoder failure flag Xfailenc is set to "on, even if this routine is activated afterwards by A-phase interruption processing, the determination result at step 2401 is necessarily "no." The routine is finished forcibly and hence no Z-phase correction is performed.

[Detection of A/B-phase Disconnection]

Figure 73:
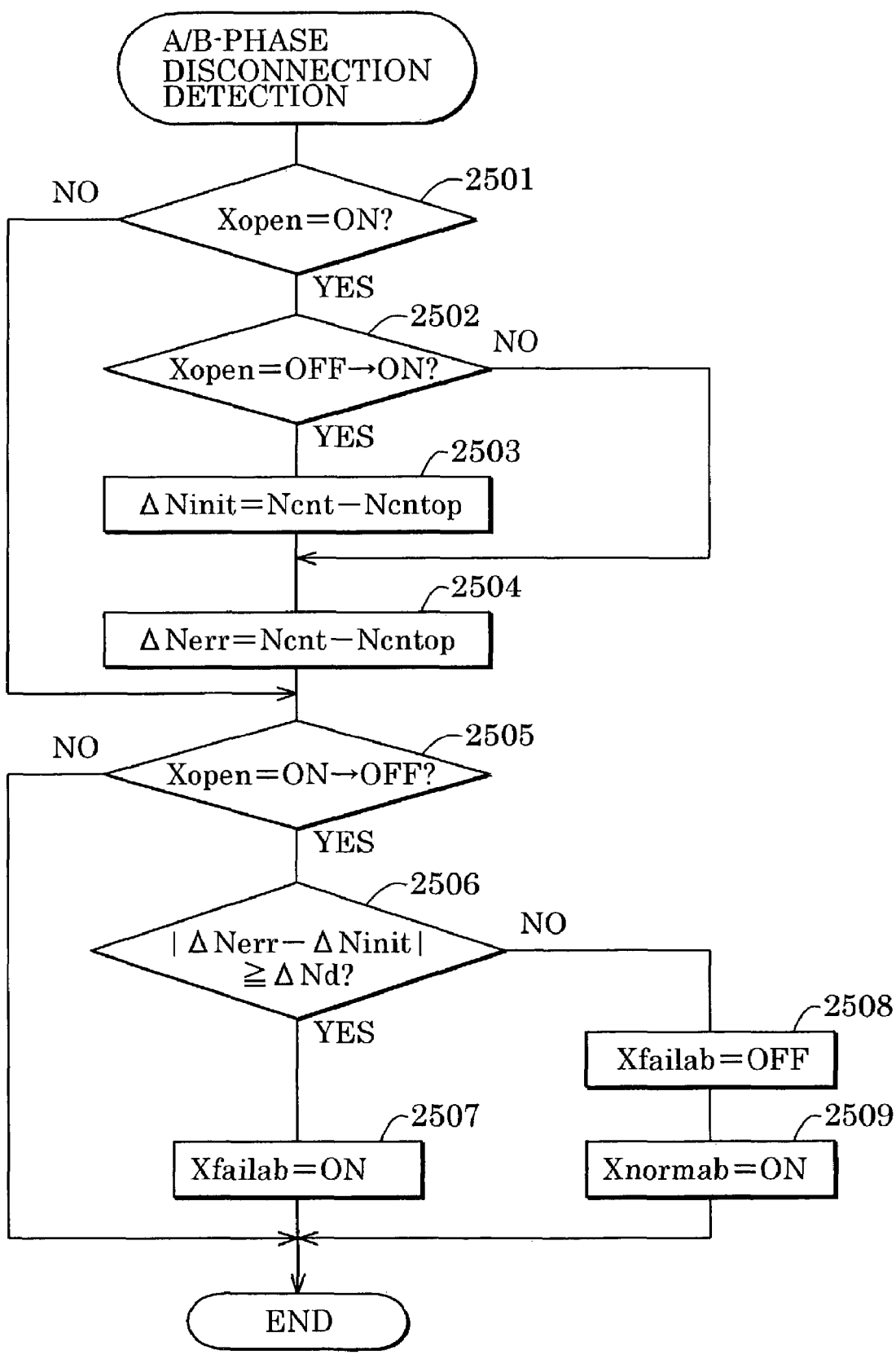
FIG. 73 is a flowchart showing an A/B-phase disconnection detection routine according to the second embodiment of the invention.

An A/B-phase disconnection detection routine shown in FIG. 73 is activated by A/B-phase interruption processing. Upon activation of this routine, at step 2501, it is determined whether the open-loop control execution flag Xopen is "on" (an open-loop control is being performed). If the open-loop control execution flag Xopen is "on," the routine proceeds to step 2504, where it is determined whether the present instant is at a start of the open-loop control (i.e., immediately after switching of the open-loop control execution flag Xopen from "off" to "on"). If it is determined that the present instant is at a start of the open-loop control, the routine proceeds to step 2503, where the difference between an encoder count Ncnt and a position count Ncntop at the start of the open-loop control is calculated as a count deviation ΔNinit at the start of the open-loop control:

$$\Delta Ninit=Ncnt-Ncntop$$

On the other hand, if the present instant is after a start of the open-loop control (i.e., during the open-loop control), the determination result at step 2502 should be "no" The routine proceeds to step 2502, where a deviation ΔNerr between an encoder count Ncnt and a position count Ncntop in the open-loop control is calculated:

$$\Delta Nerr=Ncnt-Ncntop$$

Then, the routine proceeds to step 2505, where it is determined whether the present instant is at an end of the open-loop control (i.e., immediately after switching of the open-loop control execution flag Xopen from "on" to "off"). If the present instant is not at an end of the open-loop control, this routine is finished without executing the remaining steps. If the present instant is at an end of the open-loop control, the routine proceeds to step 2506, the absolute value |ΔNerr−ΔNinit| of the difference between the count deviation ΔNerr at the end of the open-loop control and the count deviation ΔNinit at the start of the open-loop control is compared with a determination value ΔNd, whereby whether an A-phase or B-phase disconnection exists in the encoder 46 is determined.

For example, in a state that the rotor 32 is being driven normally by the open-loop control, the difference |ΔNerr−ΔNinit| between the count deviation ΔNerr at the end of the open-loop control and the count deviation ΔNinit at the start of the open-loop control should be "0" as long as no A-phase or B-phase disconnection exists in the encoder 46. If one or both of an A-phase and a B-phase disconnection exist, |ΔNerr−ΔNinit| does not become "0." Therefore, if |ΔNerr−ΔNinit| is greater than or equal to the determination value, it is determined that an A-phase or B-phase disconnection exists in the encoder 46 The routine proceeds to step 2507, where an A/B-phase disconnection detection flag Xfailab is set to "on" (A/B-phase disconnection). Then, this routine is finished.

On the other hand, if |ΔNerr−ΔNinit| is smaller than the determination value, it is determined that no A-phase or B-phase disconnection exists in the encoder 46 The routine proceeds to step 2508, where the A/B-phase disconnection detection flag Xfailab is set to "off" (no A/B-phase disconnection). At the next step 2509, an A/B-phase normal determination flag Xnormab is set to "on" (normal). Then, this routine is finished.

In this routine, the absolute value |ΔNerr−ΔNinit| of the difference between a count deviation ΔNerr at the end of an open-loop control and a count deviation ΔNinit at the start of the open-loop control is calculated. Alternatively, whether an A/B-phase disconnection exists in the encoder 46 may be determined by calculating variations of the encoder count Ncnt and the position count Ncntop from a start of an open-loop control to its end and determining whether the absolute value of their difference is greater than or equal to a determination value. This is because the absolute value |(variation of Ncnt)−(variation of Ncntop)| of the difference between a variation of the encoder count Ncnt and a variation of the position count Ncntop from a start of an open-loop control to its end is equal to |ΔNerr−ΔNinit|.

An A/B-phase disconnection in the encoder 46 can only be detected during an open-loop control. If an A-phase signal or a B-phase signal is not input to the position switching control apparatus 42 due to a disconnection during a feedback control, the current supply is suspended (because drive pulses are output in synchronism with edges of the A-phase signal and the B-phase signal) and hence whether the motor 12 has stopped can be determined. However, it cannot be determined whether the stop of the motor 12 is due to a failure in the encoder 46.

[Detection of Z-phase Disconnection]

A Z-phase disconnection detection routine shown in FIG. 74, which is activated by A/B-phase interruption processing, determines, in the following manner, whether a Z-phase disconnection exists in the encoder 46. Upon activation of this routine, at step 2511, it is determined whether the open-loop control execution flag Xopen is "on" (an open-loop control is being performed). If the open-loop control execution flag Xopen is "off," the routine proceeds to step 2512, where the count Czng of a Z-phase disconnection tentative detection counter is cleared. At the next step 2518, where the count Czon of a Z-phase signal output interval counter is cleared.

If the open-loop control execution flag Xopen is "on" (an open-loop control is being performed), the routine proceeds to step 2513, where it is determined whether the Z-phase signal value is "1" (high level). If the Z-phase signal value is "1," the routine proceeds to step 2514, where a Z-phase normal determination flag Xnormz is set to "on" (normal). At the next step 2518, the Z-phase signal output interval count Czon is cleared. The routine proceeds to step 2519.

On the other hand, if the Z-phase signal value is "0" (low level), the routine proceeds to step 2515, where the count Czon of the Z-phase signal output interval counter for measuring an output interval of Z-phase signal pulses is incremented. Since this routine is activated by A/B-phase interruption processing, like the encoder count Ncnt the Z-phase signal output interval count Czon is incremented in synchronism with both of rising edges and trailing edges of an A-phase signal and a B-phase signal.

In this embodiment, the output interval of Z-phase signal pulses (i.e., the interval between the reference rotation positions of the rotor 32) is 45° in terms of the rotor rotation angle and the edge interval of the A-phase signal and the B-phase signal is 3.75°. The output interval of Z-phase signal pulses as converted to a Z-phase signal output interval count Czon (the encoder count Ncnt) is 45°/3.75°=12. Therefore, if no Z-phase signal pulse is output even if the Z-phase signal output interval count Czon has exceeded "12," it means a loss of a Z-phase signal pulse.

In view of the above, in this routine, whether two or more Z-phase signal pulses have not been output consecutively is determined by determining at step 2516 whether the Z-phase signal output interval count Czon has exceeded "24." If it is determined that two or more Z-phase signal pulses have not been output consecutively, the routine proceeds to step 2517, where the Z-phase abnormality tentative detection count Czng is incremented. At the next step 2518, the Z-phase signal output interval count Czon is cleared. The routine proceeds to step 2519.

If it is determined at step 2516 that the Z-phase signal output interval count Czon is not greater than "24," the routine proceeds to step 2519.

At step 2519, whether it is likely that a Z-phase disconnection exists in the encoder 46 is determined on the basis of whether the Z-phase abnormality tentative detection count Czng is greater than or equal to a determination value (e.g., 3). If the Z-phase abnormality tentative detection count Czng is smaller than the determination value, it is determined that a Z-phase disconnection diagnosis is in progress. Then, this routine is finished.

On the other hand, if the Z-phase abnormality tentative detection count Czng is greater than or equal to the determination value, it is determined that a Z-phase disconnection exists in the encoder 46 or the A-phase signal or the B-phase signal is abnormal. The routine proceeds to step 2520, where whether the encoder 46 is operating normally in connection with the A phase and the B phase is determined on the basis of whether the A/B-phase normal determination flag Xnormab is "on." If it is determined that the A/B-phase normal determination flag Xnormab is "on" (i.e., the encoder 46 is operating normally in connection with the A phase and the B phase), it is determined that a Z-phase disconnection exists in the encoder 46. The routine proceeds to step 2521, where a Z-phase abnormality detection flag Xfailz is set to "on" (Z-phase disconnection (abnormal))." The routine proceeds to step 2522, where the Z-phase correction prohibition flag Xzng is set to "on". Then, this routine is finished.

If the Z-phase correction prohibition flag Xzng is set to "on," a Z-phase correction according to the Z-phase correction routine of FIG. 71 is prohibited.

[Detection of Z-phase Signal Abnormality]

A Z-phase signal abnormality detection routine shown in FIG. 75, which is activated by Z-phase interruption processing, determines, in the following manner, whether a Z-phase signal of the encoder 46 is abnormal. Upon activation of this routine, at step 2531, a Z-phase signal output interval ΔNz from a preceding Z-phase signal pulse to a current one according to the following equation:

$$\Delta Nz = |Ncnt - Ncntold|$$

where Ncnt is an encoder count at the time of output of the current Z-phase signal pulse and Ncntold is an encoder count at the time of output of the preceding Z-phase signal pulse.

At the next step 2532, it is determined whether the Z-phase signal output interval ΔNz is 0 or 12. The Z-phase signal output interval ΔNz being "0" means an A-phase or B-phase disconnection, and the Z-phase signal output interval ΔNz being "12" means that the Z-phase signal output interval ΔNz is normal.

Therefore, if it is determined at step 2532 that the Z-phase signal output interval ΔNz is 0 or 12, the routine proceeds to step 2533, where the Z-phase normal determination flag Xnormz is set to "on" (normal). The routine proceeds to step 2538, where the encoder count Ncnt at the time of output of the current Z-phase signal pulse is stored as a preceding encoder count Ncntold to enable calculation of the next Z-phase signal output interval ΔNz. Then, this routine is finished.

On the other hand, if the Z-phase signal output interval ΔNz is not equal to 0 or 12, in which case it is likely that the Z-phase signal is abnormal, the routine proceeds from step 2532 to step 2534, where the count Czonng of a Z-phase abnormality tentative detection counter is incremented. At the next step 2535, whether it is likely that the Z-phase signal of the encoder 46 is abnormal is determined on the basis of whether the Z-phase abnormality tentative detection count Czonng is greater than or equal to a determination value (e.g., 3). If the Z-phase abnormality tentative detection count Czonng is smaller than the determination value, it is determined that the Z-phase signal abnormality diagnosis is in progress. The routine proceeds to step 2538, where the encoder count Ncnt at the time of output of the current Z-phase signal pulse is stored as a preceding encoder count Ncntold. Then, this routine is finished.

On the other hand, if the Z-phase abnormality tentative detection count Czonng is greater than or equal to the determination value, it is determined that the Z-phase signal of the encoder 46 is abnormal. The routine proceeds to step 2536, where the Z-phase abnormality detection flag Xfailz is set to "on" (abnormal). The routine proceeds to step 2537, where the Z-phase correction prohibition flag Xzng is set to "on" to prohibit a Z-phase correction according to the Z-phase correction routine of FIG. 71. The routine proceeds to step 2538, where the encoder count Ncnt at the time of output of the current Z-phase signal pulse is stored as a preceding encoder count Ncntold. Then, this routine is finished.

Figure 74:
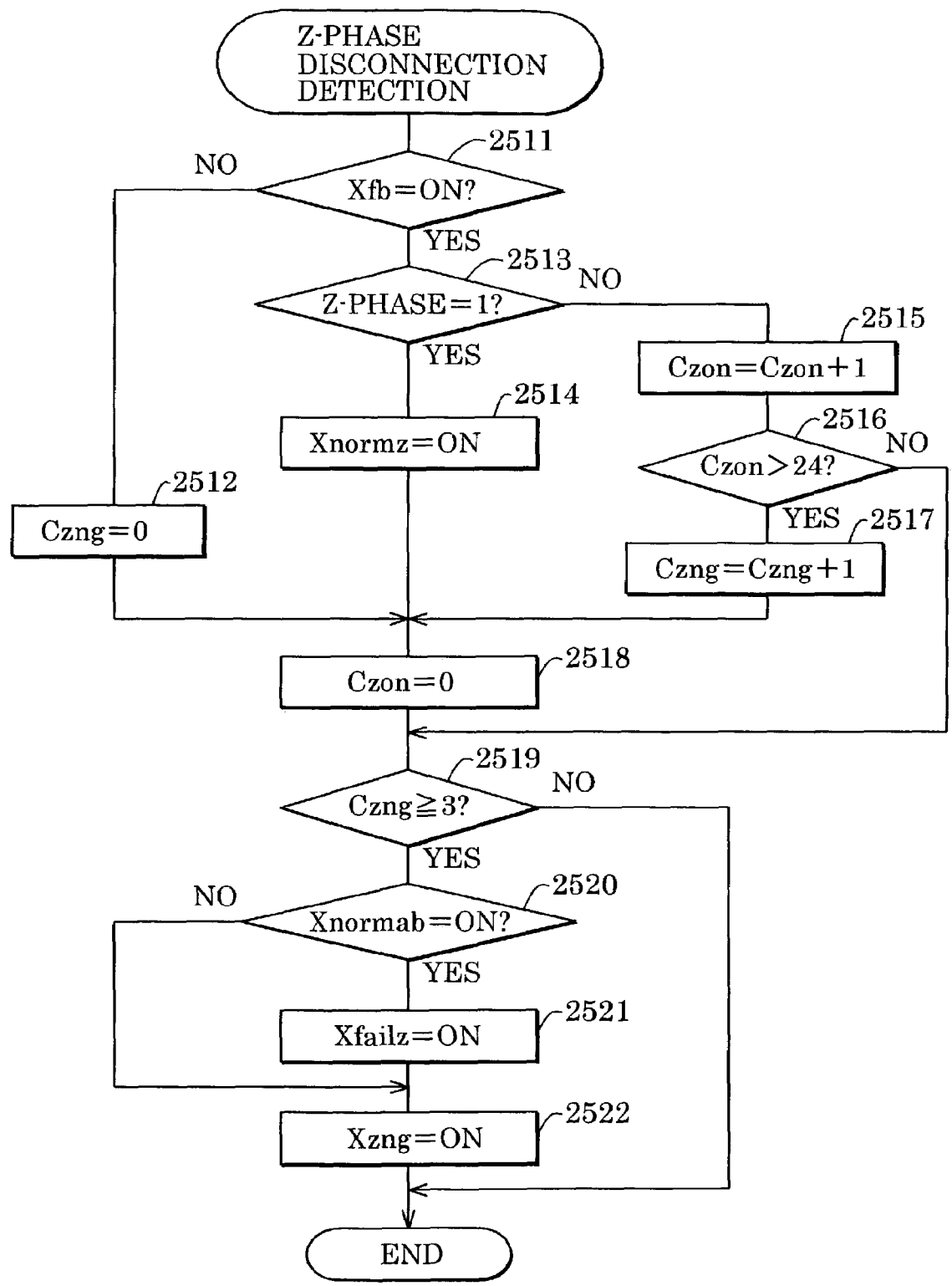
FIG. 74 is a flowchart showing a Z-phase disconnection detection routine.
Figure 75:
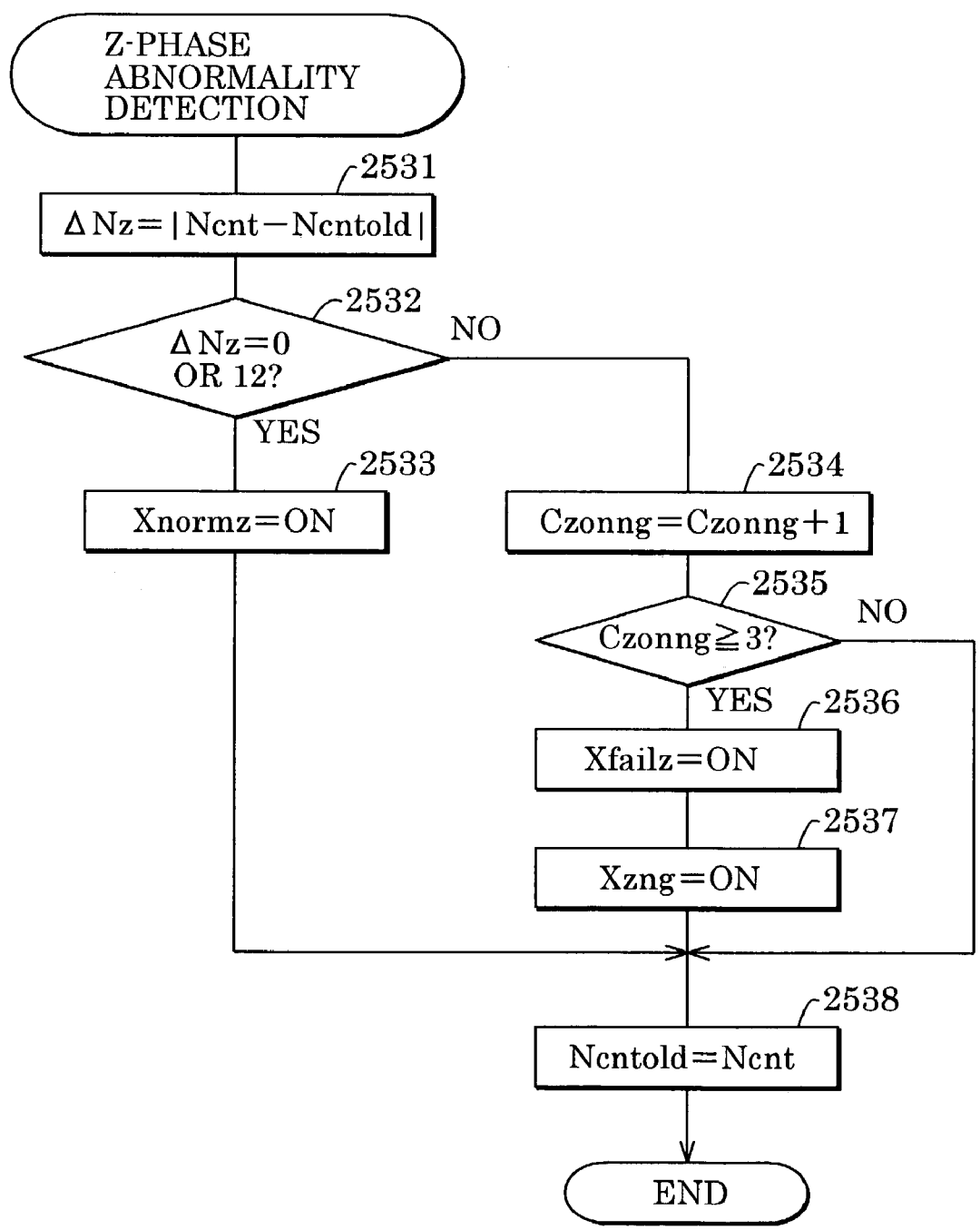
FIG. 75 is a flowchart showing a Z-phase signal abnormality detection routine.

The routines of FIGS. 73-75 serve as an abnormality diagnosis means.

In the above embodiment, whether an A-phase or B-phase disconnection exists in the encoder 46 is determined during an open-loop control (fail-safe process or recovery process) by comparing the encoder count Ncnt (i.e., the count of an A-phase signal and a B-phase signal of the encoder 46) and the position count Ncntop (i.e., the count of a motor drive signal) with each other. Therefore, if an A-phase or B-phase disconnection is detected in the encoder 46 during an open-loop control, a return from the open-loop control to a feedback control can be prohibited. This makes it possible to avoid a useless feedback control and to rotate the rotor 32 to a target position by the open-loop control.

Further, in this embodiment, whether a Z-phase signal abnormality exists in the encoder 46 is determined during an open-loop control on the basis of the Z-phase signal output interval. Therefore, a Z-phase correction can be prohibited if a Z-phase signal abnormality is detected. This makes it possible to avoid an erroneous Z-phase correction.

Third Embodiment

A third embodiment of the invention will be described below with reference to FIGS. 76-81.

[Open-loop Control]

Figure 76:
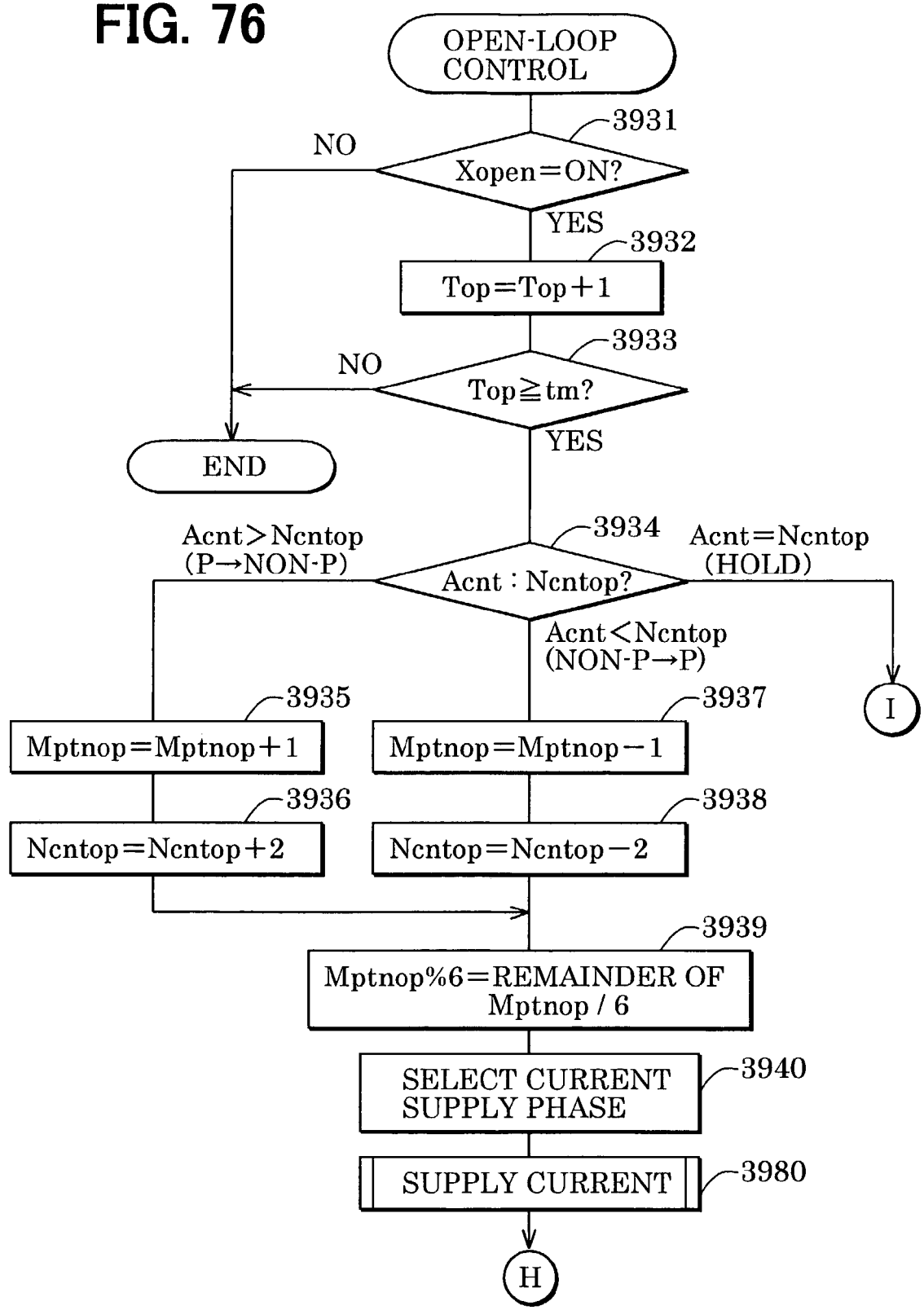
FIGS. 76-78 are flowcharts showing an open-loop control routine according to a third embodiment of the invention.
Figure 77:
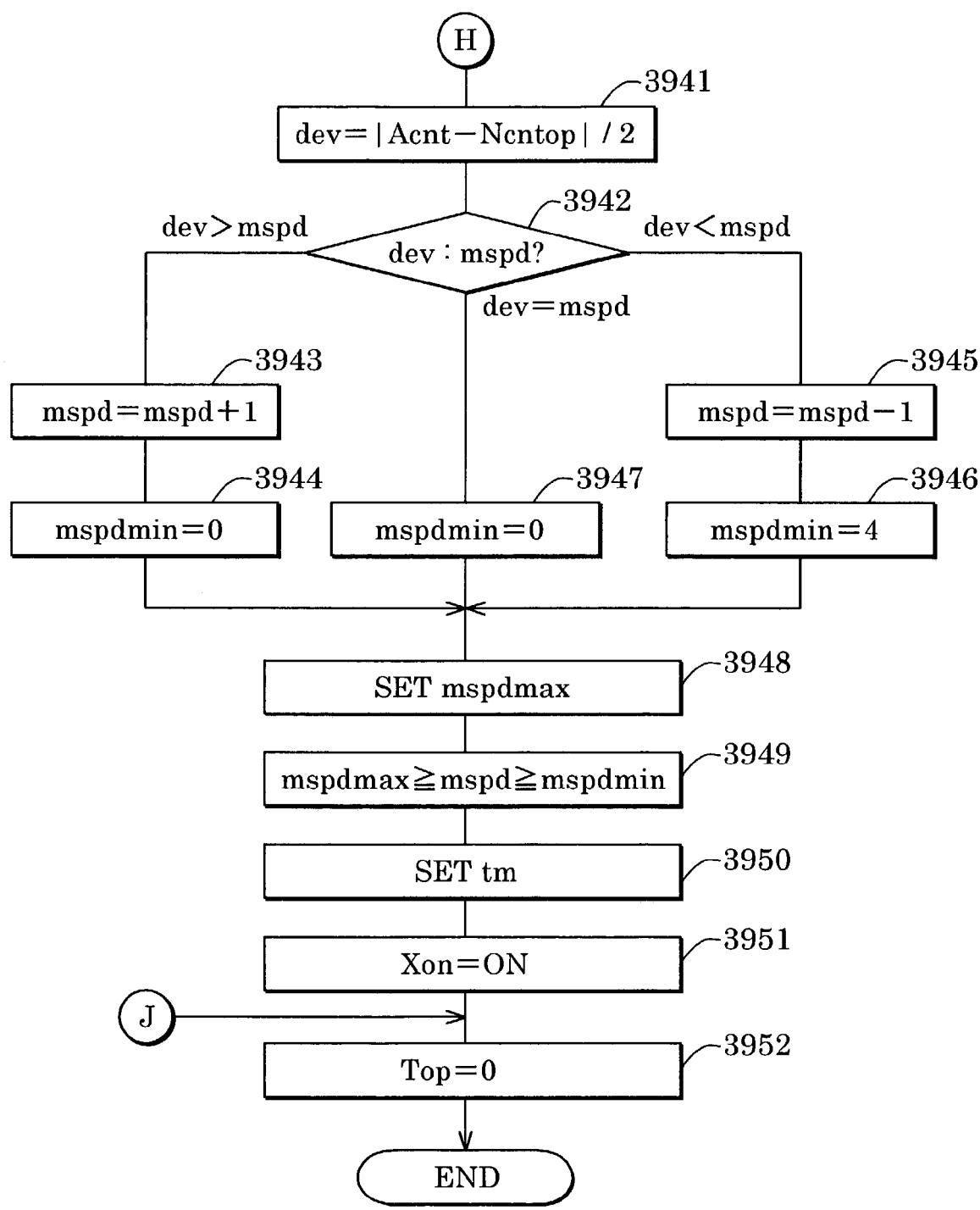
Figures 78, 79:
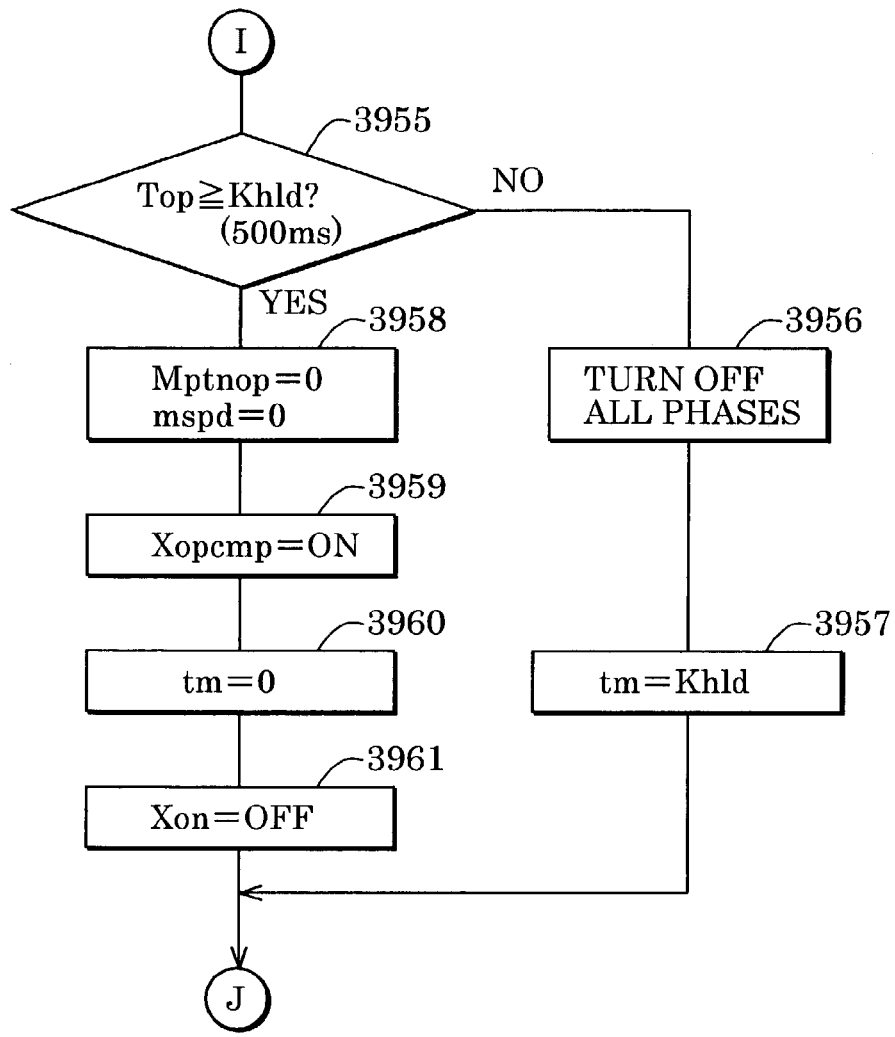
FIG. 79 shows an exemplary table to be used for determining a value of a maximum rotation speed parameter mspdmax on the basis of a battery voltage.

An open-loop control routine shown in FIGS. 76-78 is activated every predetermined time (e.g., every 1 ms). Upon activation of this routine, at step 3931, it is determined whether the open-loop control execution flag Xopen is "on." If the flag Xopen is "off," this routine is finished without executing the remaining steps.

On the other hand, if the open-loop control execution flag Xopen is "on," the routine proceeds from step 3931 to step 3932, where the count Top of a time counter that counts time is incremented. At the next step 3933, it is determined whether the count Top of the time counter has become greater than or equal to a current supply time tm of a current supply phase. If the time count Top is smaller than the current supply time tm, this routine is finished without executing the remaining steps. With this measure, step 3934 and the following steps are executed every current supply time tm.

When the time count Top has thereafter become greater than or equal to the current supply time tm of the current supply phase, the routine proceeds from step 3933 to step 3934, where a driving direction of the rotor 32 is determined by comparing a current position count Ncntop with a target count Acnt. If the current position count Ncntop is smaller than the target count Acnt, it is determined that the driving direction of the rotor 32 is the rotation direction from the P-position side to the non-P-position side (i.e., the normal rotation direction). The routine proceeds to step 3935, where a current supply phase determination value Mptnop is incremented by 1. At the next step 3936, the position count Ncntop is incremented by 2, because the rotor 32 is rotated by an angle (3.75°) corresponding to two counts by a single current supply attempt.

On the other hand, if the current position count Ncntop is greater than the target count Acnt, it is determined that the driving direction of the rotor 32 is the rotation direction from the non-P-position side to the P-position side (i.e., the reverse rotation direction). The routine proceeds to step 3937, where the current supply phase determination value Mptnop is decremented by 1. At the next step 3938, the position count Ncntop is decremented by 2.

Then, the routine proceeds to step 3939, where a remainder Mptnop%6 is calculated by dividing the current supply phase determination value Mptnop by "6." The number "6" corresponds to an increase or decrease of the current supply phase determination value Mptnop that occurs when current supply is effected for all the phases around in an open-loop control.

After the calculation of the value Mptnop%6, the routine proceeds to step 3940, where a current supply phase is selected in accordance with the value Mptnop%6 by using table data shown in FIG. 63. In this embodiment, current supply phases are selected so that the rotor 32 is driven by the one/two-phase current supply method during an open-loop control and the initial value of the current supply phase determination value Mptnop is set so that the open-loop control is started with two-phase current supply (Wand U-phases, U and V-phases, or V and W-phases), that is, so that the value Mptnop%6 becomes 1, 3 or 5.

Figure 80:
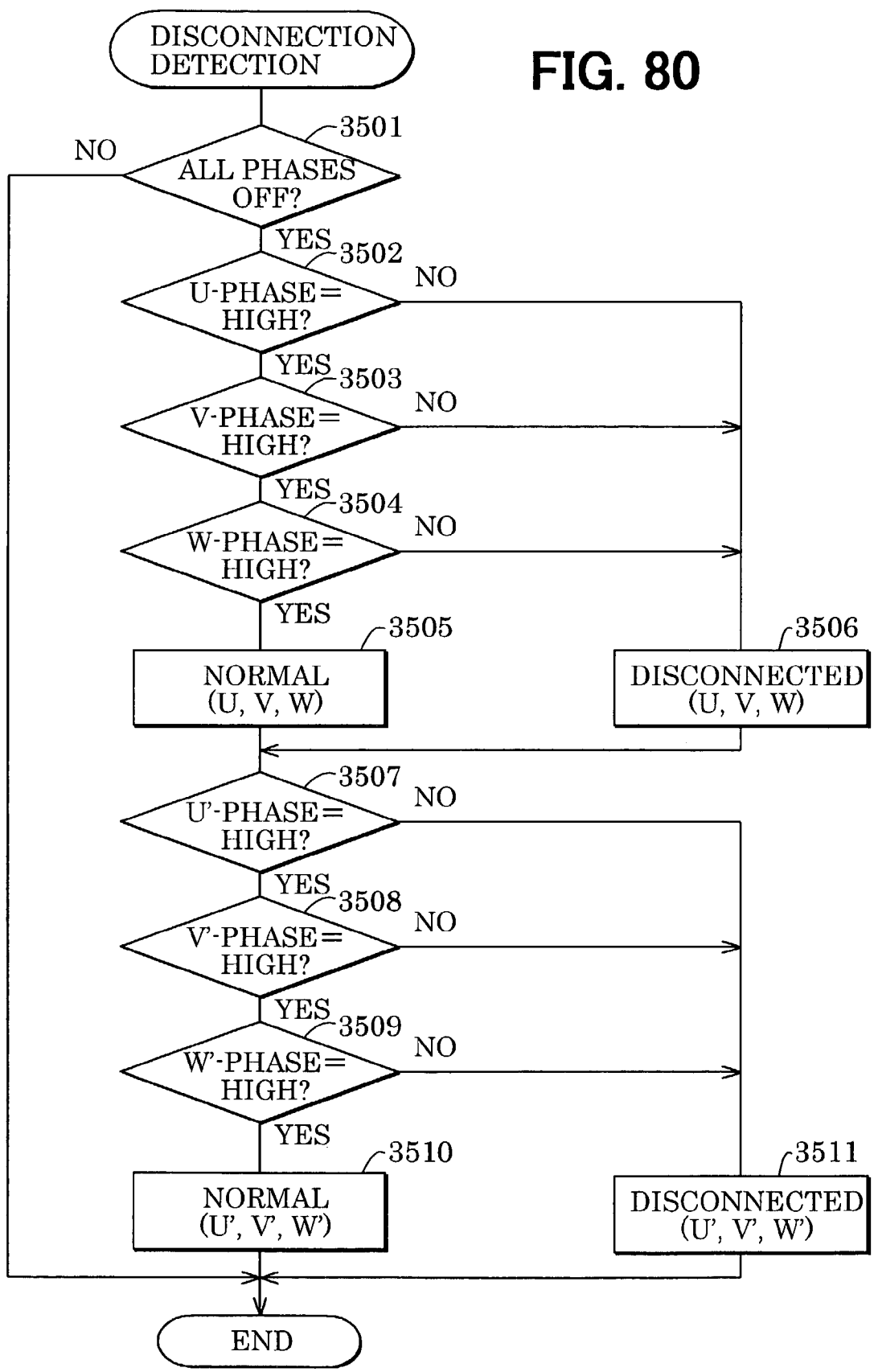
FIG. 80 is a flowchart showing a drive coil disconnection detection routine.
Figure 81:
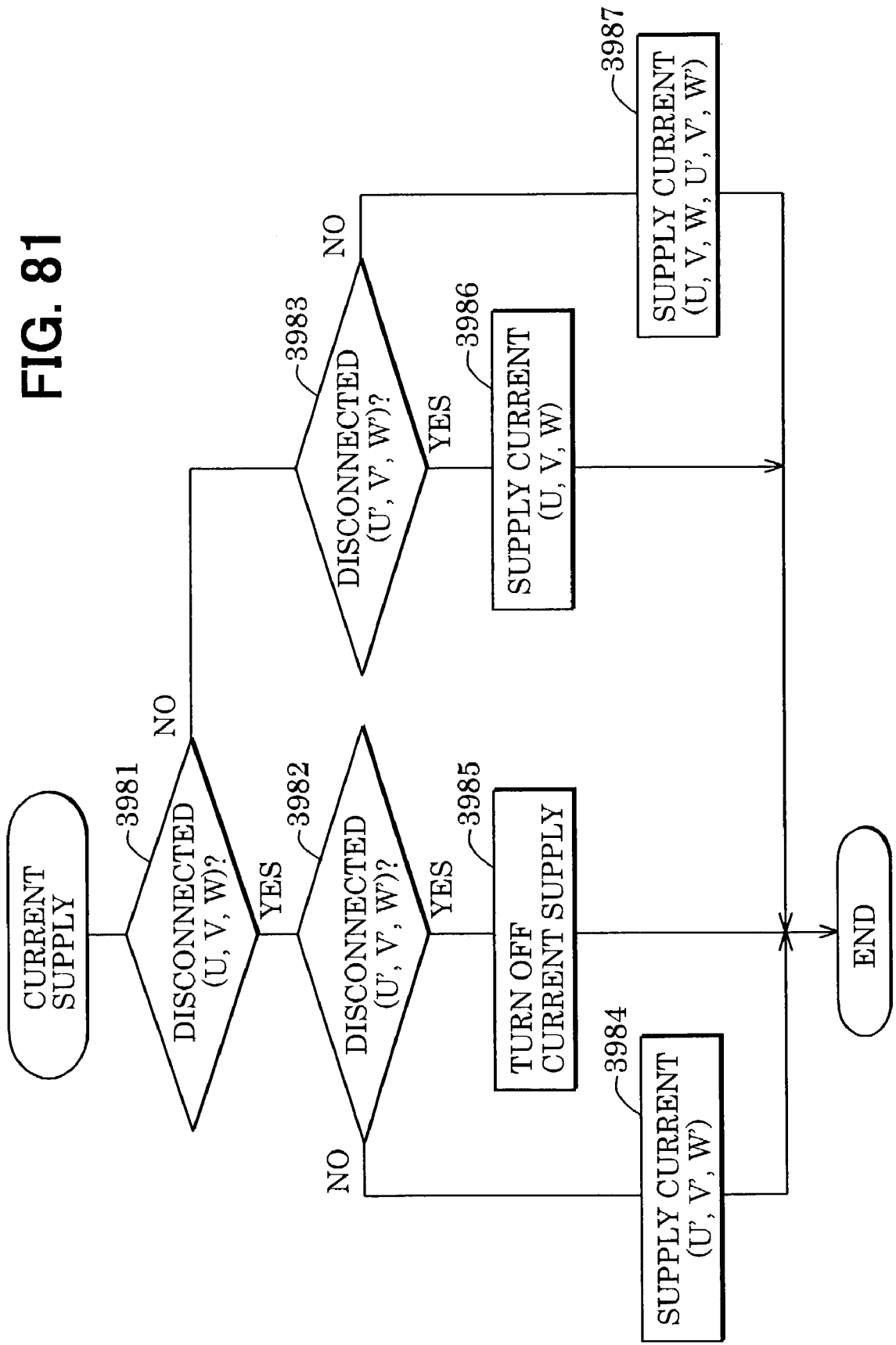
FIG. 81 is a flowchart showing a current supply processing routine.

Then, the routine proceeds to step 3980, where a current supply processing routine shown in FIG. 81 is executed, whereby current supply is effected for the phase that was selected at step 3940. In this operation, if a disconnection has been found in one of the two systems of drive coils 35 and 36 of the SR motor 12 by a drive coil disconnection detection routine of FIG. 80, the drive coil 35 or 36 of the other system that is free from disconnection is energized. If a disconnection has been found in both systems of drive coils 35 and 36, the current supply of the SR motor 12 is turned off.

Then, the routine proceeds to step 3941 in FIG. 77, where a position deviation dev is calculated according to the following equation:

$$dev = |Acnt - Ncntop|/2$$

As is apparent from this equation, the position deviation dev is ½ of the absolute value of the difference between the target count Acnt and the current position count Ncntop.

At the next step 3942, the position deviation dev is compared with a rotation speed parameter mspd, which is increased or decreased in accordance with the position deviation dev. The rotation speed and the acceleration/deceleration of the rotor 32 are controlled by setting the current supply time tm in accordance with the rotation speed parameter mspd by using table data shown in FIG. 65. In this case, as the target rotation speed increases, the rotation speed parameter mspd increases and the current supply time tm is set shorter. The initial value of the rotation speed parameter mspd is "0."

If it is determined at step 3942 that the position deviation dev is greater than the rotation speed parameter mspd, the routine proceeds to step 3943, where the rotation speed parameter mspd is incremented by 1. At the next step 3944, a minimum rotation speed parameter mspdmin is set to "0." The minimum rotation speed parameter mspdmin is a parameter (lower limit guard value) for limiting the minimum value of the rotation speed parameter mspd. In this manner, the minimum rotation speed parameter mspdmin is set to "0" if the position deviation dev is greater than the rotation speed parameter mspd, whereby the current supply time tm can be set at a longest time (e.g., 50 ms) in a period from the start of the open-loop control to a start of rotation of the rotor 32.

On the other hand, if it is determined at step 3942 that the position deviation dev is smaller than the rotation speed parameter mspd, the routine proceeds to step 3945, where the rotation speed parameter mspd is decremented by 1. At the next step 3946, the minimum rotation speed parameter mspdmin is set to "4." This makes it possible to restrict the current supply time tm to 5 ms, for example, or less after a start of rotation of the rotor 32.

If it is determined at step 3942 that the position deviation dev is equal to the rotation speed parameter mspd, the routine proceeds to step 3947 without changing the rotation speed parameter mspd. At step 3947, the minimum rotation speed parameter mspdmin is set to "0."

After the rotation speed parameter mspd and the minimum rotation speed parameter mspdmin have been set in the above manner, the routine proceeds to step 3948, where a maximum rotation speed parameter mspdmax is set in accordance with a battery voltage (power source voltage) and the presence/absence of a disconnection in the drive coils 35 and 36 by using table data of FIG. 79. The maximum rotation speed parameter mspdmax is a parameter (upper limit guard value) for restricting the maximum value of the rotation speed parameter mspd. As the battery voltage increases, the maximum rotation speed parameter mspdmax is increased, whereby the rotation speed of the rotor 32 can be increased. If a disconnection occurs in one of the two systems of drive coils 35 and 36, a driving torque becomes a half of that, therefore, the maximum rotation speed parameter mspdmax is set to a small value (about ½ of the normal-state value of the parameter mspdmax) to restrict the rotation speed of the rotor 32 to a low speed.

At the next step 3949, guard processing is performed so that the rotation speed parameter mspd falls within the range from the minimum rotation speed parameter mspdmin to the maximum rotation speed parameter mspdmax. For example, if the rotation speed parameter mspd as updated at step 3943 or 3945 is smaller than the minimum rotation speed parameter mspdmin, the rotation speed parameter mspd is set equal to the minimum rotation speed parameter mspdmin. If the rotation speed parameter mspd as updated is greater than the maximum rotation speed parameter mspdmax, the rotation speed parameter mspd is set equal to the maximum rotation speed parameter mspdmax. If mspdmin≦mspd≦mspdmax, the rotation speed parameter mspd as updated is used as it is.

Then, the routine proceeds to step 3950, where a current supply time tm is set in accordance with the rotation speed parameter mspd by using the table data of FIG. 65. In the example of FIG. 65, if the rotation speed parameter mspd is a range of 0 to 3, the current supply time tm is set to the longest time (e.g., 50 ms) so that the rotation phase of the rotor 32 and the current supply phase can be synchronized with each other reliably at starting. As the rotation speed parameter mspd increases from 4 to 9, the current supply time tm is decreased in three steps from 5 ms to 3 ms, for example, so that the rotation speed of the rotor 32 can be adjusted in three steps. The current supply time tm may be switched in one step, two steps or four or more steps.

After the setting of the current supply time tm, the routine proceeds to step 3951, where the current supply flag Xon is set to "on." At the next step 3952, the time count Top is cleared. Then, this routine is finished.

If it is determined at step 3934 in FIG. 76 that the current position count Ncntop is equal to the target count Acnt, the routine proceeds to step 3955 in FIG. 78, where it is determined whether the measurement time of the time counter has become longer than or equal to a prescribed time Khld (e.g., 500 ms). If it is determined that the measurement time of the time counter is shorter than the prescribed time Khld, the routine proceeds to step 3956, where the current supply is turned off for all the steps. At the next step 3957, the current supply time tm is set to the prescribed time Khld (e.g., 500 ms).

Then, the routine proceeds to step 3952 of FIG. 77, where the time count Top is cleared. Then, this routine is finished. With this measure, step 3934 in FIG. 76 and the following steps will not be executed and hence the next open-loop control will not be started until the prescribed time Khld (e.g., 500 ms) elapses from the end of the open-loop control. This is to wait, after the end of the open-loop control, until the engaging portion 23a of the detent spring 23 slides down to the bottom of the holding recess 24 or 25 of the detent lever 15 along its inclined side wall due to elastic force of the detent spring 23.

If it is determined at step 3955 in FIG. 78 that the time count Top has become greater than or equal to the prescribed value Khld, the routine proceeds to step 3958, where the current supply phase determination value Mptnop is set to "0" and the rotation speed parameter mspd is set to "0." At the next step 3959, the open-loop control completion flag Xopcmp is set to "on." Then, the routine proceeds to step 3960, where the current supply time tm is set to "0." After the current supply flag Xon is set to "off" at the next step 3961, the routine proceeds to step 3952 in FIG. 77, where the time count Top is cleared. Then, this routine is finished.

In the above routine, the one/two-phase current supply method is employed in an open-loop control and the open-loop control is started with two-phase current supply. Further, as shown in FIG. 50, the current supply time tm of the current supply phase of each of three steps, for example, after the start of the open-loop control is set to the longest time (e.g., 50 ms), to thereby get a sure grasp of the rotor 32 and reliably synchronize the rotation phase of the rotor 32 and the current supply phase with each other. The current supply time tm is thereafter shortened steeply, and then it is shortened gradually as the rotation speed of the rotor 32 increases. As a result, the rotation speed of the rotor 32 increased gently.

To infer a rotation speed of the rotor 32 during the open-loop control, an initial position of the rotor 32 (i.e., an initial value of the position count Ncntop) at the start of the open-loop control is calculated on the basis of an output signal value of the output shaft sensor 14. Then, the position count Ncntop is incremented (or decremented) by 2 every time the current supply phase is switched, and a rotation position of the rotor 32 is inferred on the basis of a resulting position count Ncntop. When the difference between the position count Ncntop and a target count Acnt has become small to some extent, it is determined that the rotation position has entered a deceleration range. The current supply time tm is elongated gradually to decelerate the rotation speed of the rotor 32 gently. When the position count Ncntop has reached the target count Acnt, it is determined that the rotor 32 has reached the target position and the open-loop control is finished.

Although in the above routine the current supply time tm is set in accordance with the rotation speed parameter mspd, it may be set on the basis of at least one of the rotation amount after a start of driving, the elapsed time after the start of driving, the rotation amount to a target position, and the load torque.

Although in the above routine the first current supply at the start of the open-loop control is two-phase current supply, it may be one-phase current supply. Further, the current supply method to be employed in an open-loop control is not limited to the one/two-phase current supply; it may be the one-phase current supply method or the two-phase current supply method.

[Detection of Drive Coil Disconnection]

A drive coil disconnection detection routine shown in FIG. 80, which is activated every predetermined time (e.g., every 1 ms), serves as an abnormality diagnosis means. In this routine, a disconnection in the windings 33 and 34 of the drive coils 35 and 36 is detected in the following manner.

Figure 82:
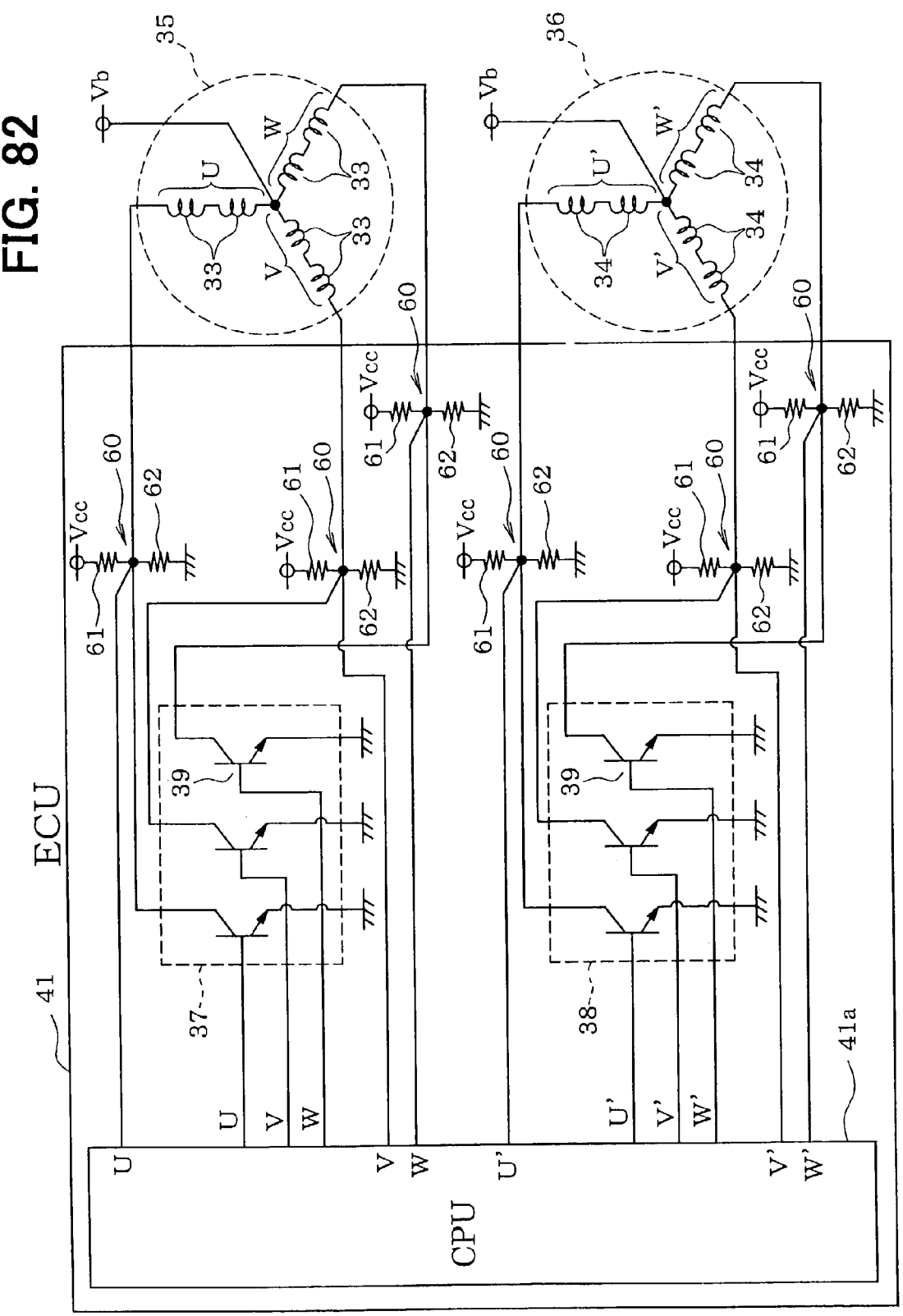
FIG. 82 is a circuit diagram showing a circuit for driving the SR motor.

As shown in FIG. 82, a disconnection detection circuit 60 is provided on the current supply line of each pair of windings 33 or 34 of each phase. A voltage level (a voltage level of the current supply line of each phase) at the connecting point of two resistors 61 and 62 of the disconnection detection circuit 60 of each phase is read into the ECU 41 via its corresponding input port. Where the windings 33 and 34 of the drive coils 35 and 36 are normal (i.e., free from a disconnection), when a switching element 39 of the motor driver 37 or 38 is turned off, the voltage level of the connecting point of the two corresponding resistors 61 and 62 is increased by a battery voltage Vb that is applied thereto via the corresponding windings 33 or 34, whereby the voltage level of (hereinafter referred to as "port level") of the corresponding input port of the ECU 41 becomes a high level. When the switching element 39 is thereafter turned on, the connecting point of the two resistors 61 and 62 is connected to the ground via the switching element 39, whereby the port level of the ECU 41 becomes a low level.

On the other hand, where a disconnection exists in the windings 33 or 34 of the drive coil 35 or 36, the battery voltage Vb is not applied to the connecting point of the resistors 61 and 62 via windings 33 or 34 even if the switching element 39 is turned off. Therefore, the port level of the ECU 41 is kept at a low level, that is, it is not inverted to a high level.

On the basis of the above relationship, the CPU 41a of the ECU 41 determines whether a disconnection exists in the windings 33 and 34 of the respective phases by determining whether the port levels of the respective phases are at a low level when the switching elements 39 of all the phases are off, that is, the drive coils 35 and 36 are not energized.

Upon activation of the drive coil disconnection detection routine of FIG. 80, at step 3501, it is determined whether current supply is turned off for all the phases. If current supply is not turned off for all the phases, this routine is finished without executing the remaining steps. When current supply is thereafter turned off for all the phases, whether the windings 33 of the U-phase, V-phase, and W-phase of the first-system drive coil 36 are normal (i.e., free from a disconnection) is determined at step 3502-3504 on the basis of whether the port levels of U-phase, V-phase, and W-phase are at a high level. If the port level of at least one of the U-phase, V-phase, and W-phase is at a low level, it is determined that a disconnection exists in the windings 33 of the low-level phase. The routine proceeds to step 3506, where it is decided that a disconnection exists in the first-system drive coil 35. The routine proceeds to step 3507 and the following steps, that is, the steps for detecting a disconnection in the second-system drive coil 36.

On the other hand, if the port levels of all of the U-phase, V-phase, and the W-phase are at a high level (i.e., the determination results at all of steps 3502-3504 are "yes"), the routine proceeds to step 3505, where it is determined that the first-system drive coil 35 is normal (i.e., free from a disconnection). The routine proceeds to step 3507 and the following steps, that is, the steps for detecting a disconnection in the second-system drive coil 36.

The steps for detecting a disconnection in the second-system drive coil 36 are similar to the above steps. Whether the windings 34 of the U'-phase, V'-phase, and W'-phase of the second-system drive coil 36 are normal (i.e., free from a disconnection) is determined at step 3507-3509 on the basis of whether the port levels of U'-phase, V'-phase, and W'-phase are at a high level. If the port level of at least one of the U'-phase, V'-phase, and W'-phase is at a low level, it is determined that a disconnection exists in the windings 34 of the low-level phase. The routine proceeds to step 3511, where it is decided that a disconnection exists in the second-system drive coil 36. Then, this routine is finished.

On the other hand, if the port levels of all of the U'-phase, V'-phase, and the W'-phase are at a high level (i.e., the determination results at all of steps 3507-3509 are "yes"), the routine proceeds to step 3510, where it is determined that the second-system drive coil 36 is normal (i.e., free from a disconnection). Then, this routine is finished.

If a disconnection is detected in the drive coil 35 or 36 of one system in the above routine, the fail-safe process execution condition is satisfied at step 901 of the fail-safe processing routine of FIGS. 58 and 59, whereby an alarm display is made and the open-loop control execution flag Xopen is set to "on." And an open-loop control is performed.

[Current Supply Process]

A current supply processing routine shown in FIG. 81 is a subroutine that is executed in the open-loop control routine of FIGS. 76-78. Upon activation of this routine, at steps 3981-3983, a disconnection is detected in one or both of the first-system drive coil 35 (U-phase, V-phase, and W-phase) and the second-system drive coil 36 (U'-phase, V'-phase, and W'-phase). If both systems of drive coils 35 and 36 are normal (no disconnection), the routine proceeds to step 3987, where both systems of drive coils 35 and 36 are energized.

On the other hand, it is determined that only the first-system drive coil 35 (U-phase, V-phase, and W-phase) has a disconnection, the routine proceeds to step 3984, where only the second-system drive coil 36 (U'-phase, V'-phase, and W'-phase) is energized. Conversely, if it is determined that only the second-system drive coil 36 (U'-phase, V'-phase, and W'-phase) has a disconnection, the routine proceeds to step 3986, where only the first-system drive coil 35 (U-phase, V-phase, and W-phase) is energized.

If it is determined that both systems of drive coils 35 and 36 have a disconnection, the routine proceeds to step 3985, where neither of the two systems of drive coils 35 and 36 are energized.

In the third embodiment described above, if a disconnection occurs in one of the two systems of drive coils 35 and 36 (windings 33 and 34) of the SR motor 12, an open-loop control is performed by using only the drive coil 35 or 36 of the other system that is free from a disconnection, whereby the rotor 32 can be driven at a low speed. Therefore, even if a disconnection occurs in the drive coil 35 or 36 of either system and the driving torque decreases, the rotor 32 can be rotated to a target position by an open-loop control. Not only can the reliability of the motor control be increased but also the drive coils 35 and 36 of the respective systems need not be increased in size, that is, increase in the size of the SR motor 12 can be avoided.

In addition, in the third embodiment, the maximum rotation speed parameter mspdmax is set in accordance with the battery voltage and the presence/absence of a disconnection in the drive coils 35 and 36 by using the table of FIG. 79, whereby the rotation speed of the rotor 32 is restricted in accordance with the battery voltage and the presence/absence of a disconnection in the drive coils 35 and 36. Even if a disconnection occurs in the drive coil 35 or 36 of either system in a state that the battery voltage is low, the rotor 32 can be rotated to a target position at a low speed by an open-loop control.

Fourth Embodiment

In the third embodiment described above, whether a disconnection exists in the windings 33 or 34 of the drive coil 35 or 36 is determined by detecting voltage levels of the current supply lines of the respective phases (i.e., a voltage level of the connecting point of the two resistors 61 and 62 of the disconnection detection circuit 60 of each phase). In a fourth embodiment of the invention shown in FIG. 83, whether a disconnection exists in the windings 33 or 34 of the drive coil 35 or 36 is determined by detecting, with current sensors 63, current supply currents flowing through the current supply lines of the respective phases.

Figure 83:
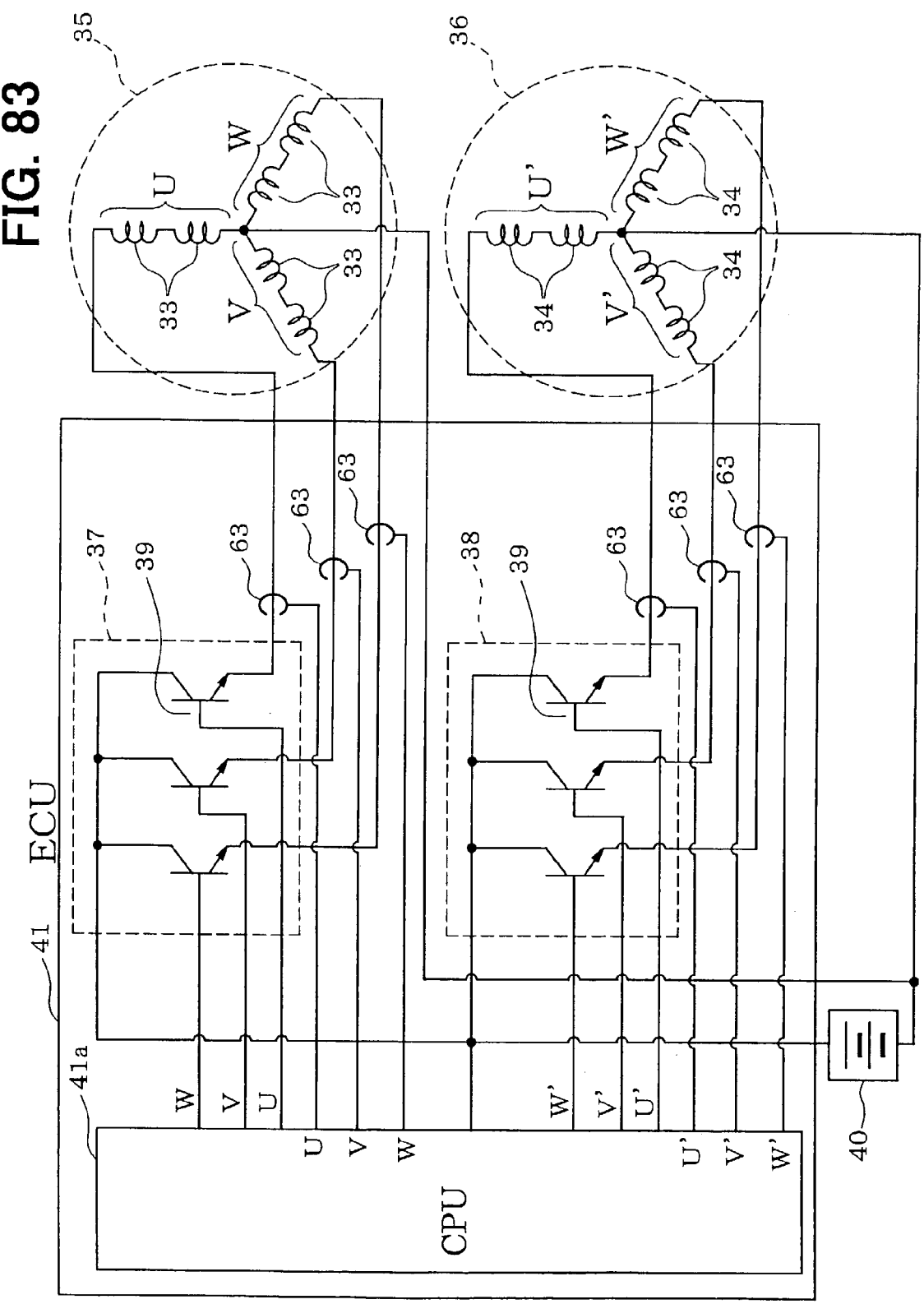
FIG. 83 is a circuit diagram showing a circuit for driving the SR motor according to a fourth embodiment of the invention.

In the fourth embodiment, as shown in FIG. 83, the neutral points of the respective drive coils 35 and 36 are connected to the negative pole of the battery 40 and one end of the windings 33 or 34 of each phase of each drive coil 35 or 36 is connected to the positive pole of the battery 40 via a corresponding switching element 39 of the motor driver 37 or 38. Current supply for each phase of the drive coil 35 or 36 of each system is turned on or off by turning on or off the corresponding switching element 39 of the motor driver 37 or 38 by the ECU 41.

The current supply line of each phase of the drive coil 35 or 36 of each system is provided with a current sensor 63, and an output signal of the current sensor 63 of each phase is input to a corresponding input port of the ECU 41.

If the windings 33 and 34 of the drive coils 35 and 36 of the respective systems are normal (i.e., free from a disconnection), a current supply current is detected by a current sensor 63 of a current supply phase for which a switching element 39 is turned on. However, even if a corresponding switching element 39 is turned on, no current supply current flows through windings 33 or 34 of that phase having a disconnection. Therefore, the current sensor 63 of that phase does not detect a current supply current.

On the basis of the above relationship, the ECU 41 determines that the windings 33 and 34 of the respective phases are free from a disconnection if the current sensors 63 of the respective phases detect current supply currents when the switching elements 39 of the respective phases are turned on. The ECU 41 determines that a disconnection exists in windings 33 or 34 of a certain phase if the current sensor 63 of that phase does not detect a current supply current even if the switching element 39 of that phase is turned on.

Figure 84:
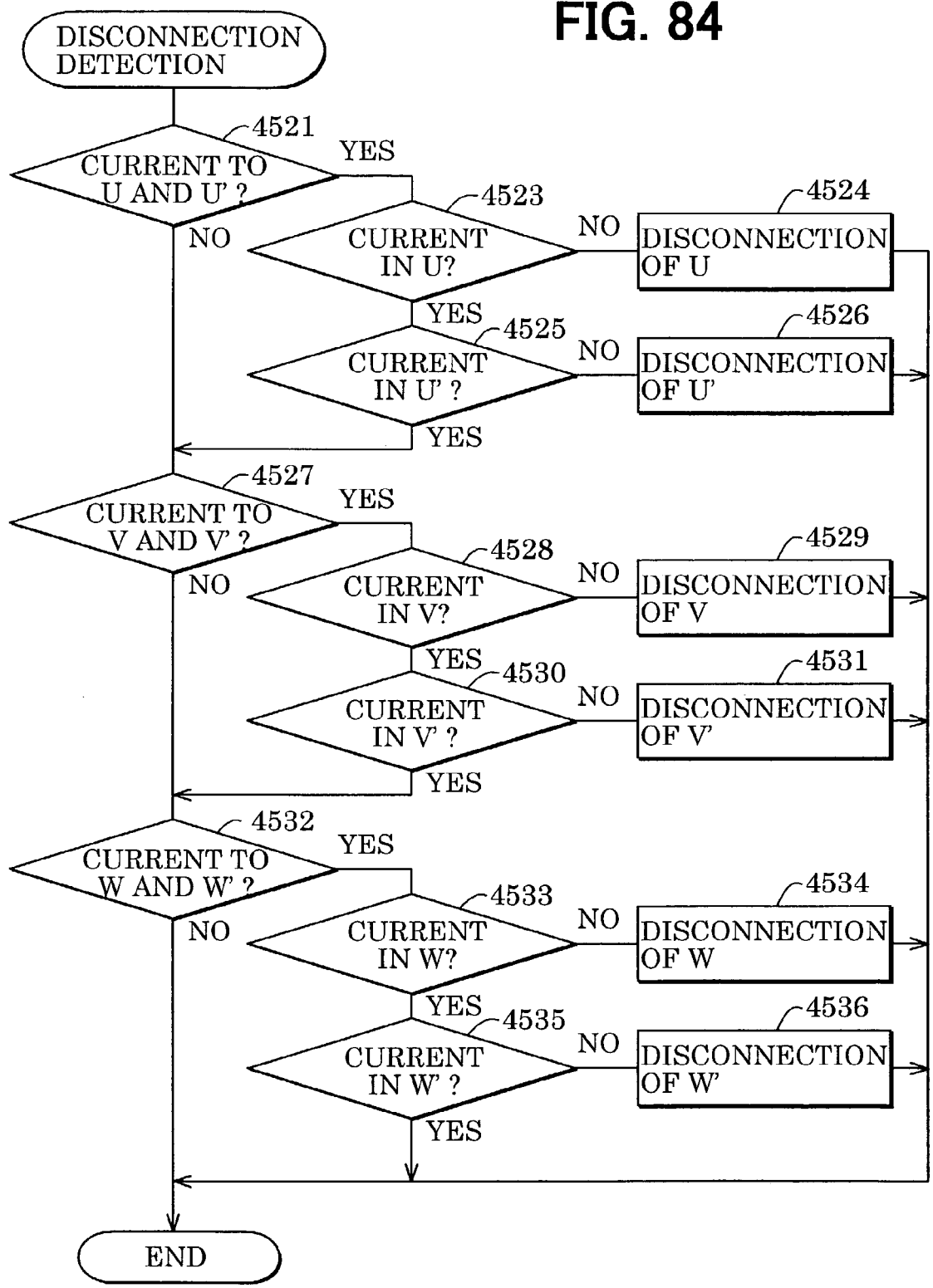
FIG. 84 is a flowchart showing a drive coil disconnection detection routine.

In the fourth embodiment, a disconnection in the drive coils 35 and 36 is detected according to a drive coil disconnection detection routine shown in FIG. 84. This routine is activated every predetermined time (e.g., every 1 ms). Upon activation of this routine, at step 4521, it is determined whether current supply is being effected for the U and U'-phases (i.e., whether the switching elements 39 of the U and U'-phases are on). If current supply is being effected for the U and U'-phases, it is determined at steps 4523 and 4524 whether the current sensors 63 of the U and U'-phases have detected current supply currents. If no current supply current of the U-phase has been detected, it is determined at step 4524 that a U-phase disconnection exists in the first-system drive coil 35. If no current supply current of the U'-phase has been detected, it is determined at step 4526 that a U'-phase disconnection exists in the second-system drive coil 36.

Then, the routine proceeds to step 4527, where it is determined whether current supply is being effected for the V and V'-phases (i.e., whether the switching elements 39 of the V and V'-phases are on). If current supply is being effected for the V and V'-phases, it is determined at steps 4528 and 4530 whether the current sensors 63 of the V and V'-phases have detected current supply currents. If no current supply current of the V-phase has been detected, it is determined at step 4529 that a V-phase disconnection exists in the first-system drive coil 35. If no current supply current of the V'-phase has been detected, it is determined at step 4531 that a V'-phase disconnection exists in the second-system drive coil 36.

Then, the routine proceeds to step 4532, where it is determined whether current supply is being effected for the W and W'-phases (i.e., whether the switching elements 39 of the W and W'-phases are on). If current supply is being effected for the W and W'-phases, it is determined at steps 4533 and 4535 whether the current sensors 63 of the W and W'-phases have detected current supply currents. If no current supply current of the W-phase has been detected, it is determined at step 4534 that a W-phase disconnection exists in the first-system drive coil 35. If no current supply current of the W'-phase has been detected, it is determined at step 4536 that a W-phase disconnection exists in the second-system drive coil 36.

In the fourth embodiment, the current supply lines of the respective phases of the drive coils 35 and 36 are provided with the respective current sensors 63. Alternatively, current supply currents flowing through the neutral points of the drive coils 35 and 36, respectively, may be detected. This can be done by providing a single current sensor in each of the drive coils 35 and 36, which enables cost reduction.

In the third and fourth embodiments, a disconnection in the drive coils 35 and 36 is detected. On the other hand, a failure in the motor drivers 37 and 38 may be detected. If the motor driver 37 or 38 of one system fails, the only drive coil 36 or 35 of the other system may be driven by an open-loop control by using the motor driver 38 or 37 of the other system.

For example, in the third embodiment, a failure in the motor drivers 37 and 38 can be detected in the following manner. If the port levels of the respective phases are inverted to a low level when the respective switching elements 39 are turned on, the motor drivers 37 and 38 are normal. On the other hand, if the port level of a certain phase is kept at a high level (i.e., not inverted to a low level) when the corresponding switching element 39 is turned on, it can be determined that that switching element 39 is in failure.

When a switching element 39 of the motor driver 37 or 38 has failed and hence become incapable of being turned on, even if a drive signal is supplied to the switching element 39 from the ECU 41 the switching element 39 is not turned on and hence no current supply current flows through the corresponding windings 33 or 34. Therefore, the method of the fourth embodiment in which presence/absence of a disconnection in the drive coils 35 and 36 is determined by detecting current supply currents of the respective phases with the current sensors 63 cannot discriminate between a failure in the switching elements 39 and a disconnection in the drive coils 35 and 36.

However, the drive coil 35 or 36 of a system a switching element 39 of which has failed cannot be energized as in a case that a disconnection occurs in the drive coil 35 or 36 itself. Therefore, even if the two cases are not discriminated from each other, it does not cause any trouble in performing an open-loop control using the drive coil and the motor driver of a normal system.

When a disconnection has occurred in the drive coil 35 or 36, the driving torque decreases more than with other kinds of abnormalities. In view of this, when a disconnection has been detected in the drive coil 35 or 36, an open-loop control may be performed by using the drive circuit and the drive coil of the other, normal system so that the rotor rotation speed is made lower than when other kinds of abnormalities are detected. This makes it possible to keep the motor control reliable even when an abnormality that decreases the driving torque has occurred.

Although in the third and fourth embodiments the two systems of drive coils and two systems of motor drivers are provided, they may be provided in three or more systems.

The encoder that is used in the invention is not limited to the magnetic encoder like the encoder 46. For example, an optical encoder or a brush-type encoder may be used.

The motor that is used in the invention is not limited to the SR motor. A brushless motor other than the SR motor may be used as long as it is of such a type that the motor current supply phase is switched sequentially by detecting the rotation position of the rotor on the basis of the count of an output signal of an encoder.

The position switching device of the above embodiments is of such a type that switching is made between the two ranges, that is, the P-position and the non-P-position. However, for example, the invention can also be applied to a position switching device that switches between ranges of P, R, N, D, etc. of an automatic transmission by switching between a position switching valve and a manual valve of the automatic transmission in link with a rotation operation of the detent lever 15.

Further, the invention can be applied to not only position switching devices but also various devices having a brushless motor such as an SR motor as a drive source.

What is claimed is:

1. A motor control apparatus comprising:
a single motor having a single rotor, a single stator, and at least two drive coils wound on the single stator and operable independently to rotate the single rotor;
an encoder for producing a pulse signal in synchronism with rotation of the single rotor of the motor, the motor rotating a control object;
feedback control means for performing a feedback control for rotating the rotor to a target position by detecting a rotation position of the rotor on a basis of a count of the pulse signal of the encoder and sequentially switching a current supply phase of the motor;
at least two systems each of which includes one of the drive coils of the motor and a drive circuit for separately driving the drive coil of the motor in that one of the at least two systems, wherein each of the at least two systems are independently operable from other of the at least two systems, the drive coil and the drive circuit of each system are provided so as to be able to rotate the rotor independently of the drive coil and the drive circuit of the other of the at least two systems, and the drive coil in each of the at least two independently operable systems includes a plurality of phase coils;
abnormality diagnosis means for determining presence or absence of an abnormality in the drive coil and/or the drive circuit of each system; and
open-loop control means for sequentially switching, when the abnormality diagnosis means has detected an abnormality in one of the at least two systems including a drive coil and a drive circuit, the current supply phase by supplying a drive signal to a drive circuit of a remaining system of the at least two systems by an open-loop control, counting pulses of the drive signal, and rotating the rotor to the target position on a basis of a resulting count.

2. The motor control apparatus according to claim 1, wherein, during the open-loop control, the open-loop control means restricts a rotation speed of the rotor in accordance with a power source voltage that is supplied to the motor.

3. A motor control apparatus comprising:
an encoder for producing a pulse signal in synchronism with rotation of a single rotor of a motor that rotates a control object;
feedback control means for performing a feedback control for rotating the rotor to a target position by detecting a rotation position of the rotor on a basis of a count of the pulse signal of the encoder and sequentially switching a current supply phase of the motor;
at least two systems each of which includes a drive coil of the motor and a drive circuit for separately driving the drive coil of the motor in that one of the at least two systems, wherein, each of the at least two systems are independently operable from other of the at least two systems and the drive coil and the drive circuit of each system are provided so as to be able to rotate the rotor independently of the drive coil and the drive circuit of the other of the at least two systems;

abnormality diagnosis means for determining presence or absence of an abnormality in the drive coil and/or the drive circuit of each system; and open-loop control means for sequentially switching, when the abnormality diagnosis means has detected an abnormality in one of the at least two systems including a drive coil and a drive circuit, the current supply phase by supplying a drive signal to a drive circuit of a remaining system of the at least two systems by an open-loop control, counting pulses of the drive signal, and rotating the rotor to the target position on a basis of a resulting count;

wherein the abnormality diagnosis means comprises means for detecting a disconnection in the drive coils, and wherein when a disconnection is detected in the drive coil of one system of the at least two systems, the open-loop control means supplies a drive signal to the drive circuit of a remaining system of the at least two systems so that a rotation speed of the rotor becomes lower than when an abnormality other than a disconnection is detected.

4. The motor control apparatus according to claim 1, wherein, in driving the motor from a stop state by the open-loop control, the open-loop control means performs two-phase current supply as first current supply and thereafter performs one-phase current supply and two-phase current supply alternately.

5. The motor control apparatus according to claim 1, wherein, in driving the motor from a stop state by the open-loop control, the open-loop control means sets a current supply time of a specific number of first current supply attempts so that the current supply time is longer than a current supply time of subsequent current supply attempts.

6. The motor control apparatus according to claim 1, wherein, during the open-loop control, the open-loop control means sets a current supply time on a basis of at least one of a rotation speed of the rotor, a rotation amount of the rotor after a start of driving, an elapsed time from the start of the driving, a rotation amount to the target position, and load torque.

7. The motor control apparatus according to claim 1, further comprising:

an output shaft sensor for detecting a rotation position of an output shaft of the motor or position information correlated with the output shaft of the motor, wherein the open-loop control means finishes the open-loop control when a rotation position of the rotor inferred on a basis of a count of the drive signal during the open-loop control has reached the target position, the open-loop control means determines whether driving of the motor by the open-loop control has succeeded or failed on a basis of an output signal of the output shaft sensor, and, if the driving of the motor has failed, the open-loop control means drives the motor again by an open-loop control.

8. The motor control apparatus according to claim 7, wherein, if the driving of the motor by the open-loop control has failed a specific number of times consecutively, the open-control means determines that the motor cannot be controlled by an open-loop control and turns off current supply of the motor.

9. The motor control apparatus according to claim 7, wherein the open-loop control means infers an initial position of the rotor at a start of the open-loop control on the basis of the output signal of the output shaft sensor, and infers a rotation position of the rotor during the open-loop control on a basis of the initial position of the rotor inferred by the open-loop control means and the count of the drive signal.

10. The motor control apparatus according to claim 1, wherein the motor is a switched reluctance motor.

11. The motor control apparatus according to claim 1, wherein the control object is a position switching device for switching between a parking position and another position of a vehicle.

12. A control method for a single motor having a single rotor, a single stator, and at least two drive coils wound on the single stator and operable independently to rotate the single rotor, and at least two independently operable systems including the drive coils and drive circuits for separately driving the drive coils, each independently operable system being able to rotate the single rotor of the motor independently of any other of the at least two independently operable systems, the method comprising:

supplying electric currents to each of the drive coils of the independently operable systems by each of the drive circuits of the independently operable systems, respectively, to drive the motor to a target position by rotating the rotor of the motor, wherein each of the drive coils of the independently operable systems includes a plurality of phase coils;

determining whether an abnormality is present in any of the drive circuits and/or any of the drive coils with respect to each of the independently operable systems; and supplying the electric current, when the abnormality is determined in one of the independently operable systems, to the drive coil of an other one of the independently operable systems to drive the motor to the target position without supplying the electric current to the drive coil of the one of the independently operable systems.

13. The control method according to claim 12, wherein:
determining an abnormality includes detecting the current flowing in the phase coils in each of the independently operable systems separately from each of an other of the phase coils in an other of the independently operable systems and determining the abnormality based on the detected current.

14. The method according to claim 12, further comprising, when the abnormality is determined, restricting a rotation speed of the rotor in accordance with a power source voltage that is supplied to the motor using an open loop control.

15. A control method for a motor having at least two independently operable systems of drive coils and drive circuits for separately driving the drive coils, each independently operable system being able to rotate a rotor of the motor independently of any other of the at least two independently operable systems, the method comprising:

supplying electric currents to each of the drive coils of the independently operable systems by each of the drive circuits of the independently operable systems, respectively, to drive the motor to a target position;

determining whether an abnormality is present in any of the drive circuits and/or any of the drive coils with respect to each of the independently operable systems; and supplying the electric current, when the abnormality is determined in one of the independently operable systems, to the drive coil of an other one of the independently operable systems to drive the motor to the target position without supplying the electric current to the drive coil of the one of the independently operable systems;

wherein determining an abnormality includes detecting a disconnection in the at least one of the drive coils, and wherein when a disconnection is detected in the drive coil of the one of the independently operable systems, a drive signal is supplied to the drive circuit of an other one of the independently operable systems so that a rotation speed of the rotor becomes lower than when an abnormality other than a disconnection is detected.

16. The method according to claim 12, further comprising, when the abnormality is determined, driving the motor from a stop state by an open-loop control, the open-loop control performing two-phase current supply as first current supply and thereafter performing one-phase current supply and two-phase current supply alternately.

17. The method according to claim 12, further comprising, when the abnormality is determined, driving the motor from a stop state by an open-loop control, the open-loop control setting a current supply time of a specific number of first current supply attempts so that the current supply time is longer than a current supply time of subsequent current supply attempts.

18. The method according to claim 12, further comprising, when the abnormality is determined, setting a current supply time on a basis of at least one of a rotation speed of the rotor, a rotation amount of the rotor after a start of driving, an elapsed time from the start of the driving, a rotation amount to the target position, and load torque.

19. The method according to claim 12, further comprising: detecting a rotation position of an output shaft of the motor or position information correlated with the output shaft of the motor, finishing open-loop control when a rotation position of the rotor inferred on a basis of a count of a drive signal during the open-loop control has reached a target position, determining whether driving of the motor by the open-loop control has succeeded or failed on a basis of an output signal of an output shaft sensor, and, if the driving of the motor has failed, driving the motor again by an open-loop control.

20. The method according to claim 19, further comprising if the driving of the motor by the open-loop control has failed a specific number of times consecutively, determining that the motor cannot be controlled by an open-loop control and turning off current supply of the motor.

21. The method according to claim 19, further comprising inferring an initial position of the rotor at a start of the open-loop control on the basis of the output signal of the output shaft sensor, and inferring a rotation position of the rotor during the open-loop control on a basis of the initial position of the rotor inferred at a start of the open-loop control and the count of the drive signal.

* * * * *